US012671553B2

(12) United States Patent
Zhu et al.

(10) Patent No.: US 12,671,553 B2
(45) Date of Patent: Jun. 30, 2026

(54) METHODS AND APPARATUSES FOR TCI STATE INDICATION IN A WIRELESS COMMUNICATIONS SYSTEM

(71) Applicant: Samsung Electronics Co., Ltd., Suwon-si (KR)

(72) Inventors: Dalin Zhu, Richardson, TX (US); Emad N. Farag, Flanders, NJ (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 766 days.

(21) Appl. No.: 17/811,061

(22) Filed: Jul. 6, 2022

(65) Prior Publication Data

US 2023/0022602 A1    Jan. 26, 2023

Related U.S. Application Data

(60) Provisional application No. 63/223,850, filed on Jul. 20, 2021.

(51) Int. Cl.
*H04W 72/231* (2023.01)
*H04B 7/06* (2006.01)
(Continued)

(52) U.S. Cl.
CPC ....... *H04L 5/0053* (2013.01); *H04B 7/06968* (2023.05); *H04W 72/23* (2023.01)

(58) Field of Classification Search
CPC ............. H04B 7/0695; H04B 7/06968; H04B 72/213; H04W 72/23; H04L 5/0023
See application file for complete search history.

(56) References Cited

U.S. PATENT DOCUMENTS 10,952,231 B2 * 3/2021 Liou ..................... H04W 72/23
11,337,203 B2 * 5/2022 Raghavan ........... H04W 72/542
(Continued)

FOREIGN PATENT DOCUMENTS

WO      2020033549 A1    2/2020
WO      2020225692 A1    11/2020
(Continued)

OTHER PUBLICATIONS

3GPP TSG RAN WG1 Meeting#91, R1-1719444 Title:Design of Dl/Ul Dmrs for data transmission (Year: 2017).*
(Continued)

*Primary Examiner* — Faruk Hamza
*Assistant Examiner* — Abusayeed M Haque

(57) ABSTRACT

Methods and apparatuses for transmission configuration indication (TCI) state indication in a wireless communication system. A method for operating a user equipment (UE) includes receiving a downlink control information (DCI) including at least one TCI codepoint indicating first and second TCI states; determining, based on the first or second TCI states, a third quasi co-location (QCL) assumption for receiving a physical downlink control channel (PDCCH); and receiving the PDCCH that schedules first or second transmission occasions of a first or second physical downlink shared channels (PDSCHs), respectively. The method further includes receiving information on PDSCH repetition schemes; determining, based on the first or second TCI states, a first QCL assumption for receiving the first PDSCH; and determining, based on the first or second TCI states, a second QCL assumption for receiving the second PDSCH.

12 Claims, 12 Drawing Sheets

(51) Int. Cl.
| | |
|---|---|
| *H04L 1/00* | (2006.01) |
| *H04L 5/00* | (2006.01) |
| *H04W 72/23* | (2023.01) |

(56) References Cited

U.S. PATENT DOCUMENTS

| | | | |
|---|---|---|---|
| 2020/0015200 A1 | 1/2020 | Vilaipornsawai et al. | |
| 2021/0014931 A1 | 1/2021 | Noh et al. | |
| 2021/0051635 A1 | 2/2021 | Lo et al. | |
| 2021/0112560 A1 | 4/2021 | Khoshnevisan et al. | |
| 2022/0216955 A1 | 7/2022 | Kim et al. | |
| 2022/0312459 A1* | 9/2022 | Yang | H04L 1/0025 |
| 2022/0322288 A1* | 10/2022 | Xu | H04L 12/189 |
| 2022/0330163 A1* | 10/2022 | Liu | H04W 52/34 |
| 2023/0007675 A1 | 1/2023 | Matsumura et al. | |
| 2023/0061726 A1* | 3/2023 | Jung | H04B 7/088 |
| 2023/0076897 A1* | 3/2023 | Svedman | H04L 5/0053 |
| 2023/0146642 A1* | 5/2023 | Matsumura | H04B 7/06964 |
| | | | 370/216 |

FOREIGN PATENT DOCUMENTS

| | | | | | |
|---|---|---|---|---|---|
| WO | 2021010707 A1 | 1/2021 | | | |
| WO | WO-2021068807 A1 * | 4/2021 | | | H04L 5/0048 |
| WO | 2021090204 A1 | 5/2021 | | | |
| WO | 2021106092 A1 | 6/2021 | | | |

OTHER PUBLICATIONS

GPP TSG-RAN WG1 Meeting#95, R1-1814236 Title:Draft CR on clearification of default QCL assumption for PDSCH (Year: 2018).*

International Search Report and Written Opinion issued Oct. 27, 2022 regarding International Application No. PCT/KR2022/010628, 7 pages.
"3rd Generation Partnership Project; Technical Specification Group Radio Access Network; NR; Physical channels and modulation (Release 16)", 3GPP TS 38.211 V16.1.0, Mar. 2020, 130 pages.
"3rd Generation Partnership Project; Technical Specification Group Radio Access Network; NR; Multiplexing and channel coding (Release 16)", 3GPP TS 38.212 V16.1.0, Mar. 2020, 146 pages.
"3rd Generation Partnership Project; Technical Specification Group Radio Access Network; NR; Physical layer procedures for control (Release 16)" 3GPP TS 38.213 V16.1.0, Mar. 2020, 156 pages.
"3rd Generation Partnership Project; Technical Specification Group Radio Access Network; NR; Physical layer procedures for data (Release 16)", 3GPP TS 38.214 V16.1.0, Mar. 2020, 151 pages.
"5G; NR; Medium Access Control (MAC) protocol specification (3GPP TS 38.321 version 16.1.0 Release 16)", ETSI TS 138 321 V16.1.0, Jul. 2020, 153 pages.
"5G; NR; Radio Resource Control (RRC); Protocol specification (3GPP TS 38.331 version 16.1.0 Release 16)", ETSI TS 138 331 V16.1.0, Jul. 2020, 886 pages.
Extended European Search Report issued Mar. 12, 2025 regarding Application No. 22846228.9, 17 pages.
Vivo, "Maintenance on multi TRP", 3GPP TSG RAN WG1 #104b-e, R1-2102947, Apr. 2021, 7 pages.
ZTE, "Maintenance of multi-TRP enhancements", 3GPP TSG RAN WG1 Meeting #100bis-e, Apr. 2020, R1-2001596, 13 pages.
Qualcomm Incorporated, "Discussion on QCL", 3GPP TSG RAN WG1 NR Ad-Hoc#2, R1-1711176, Jun. 2017, 4 pages.
Extended European Search Report issued Oct. 21, 2025 regarding Application No. 25194666.1, 11 pages.

* cited by examiner

600

650

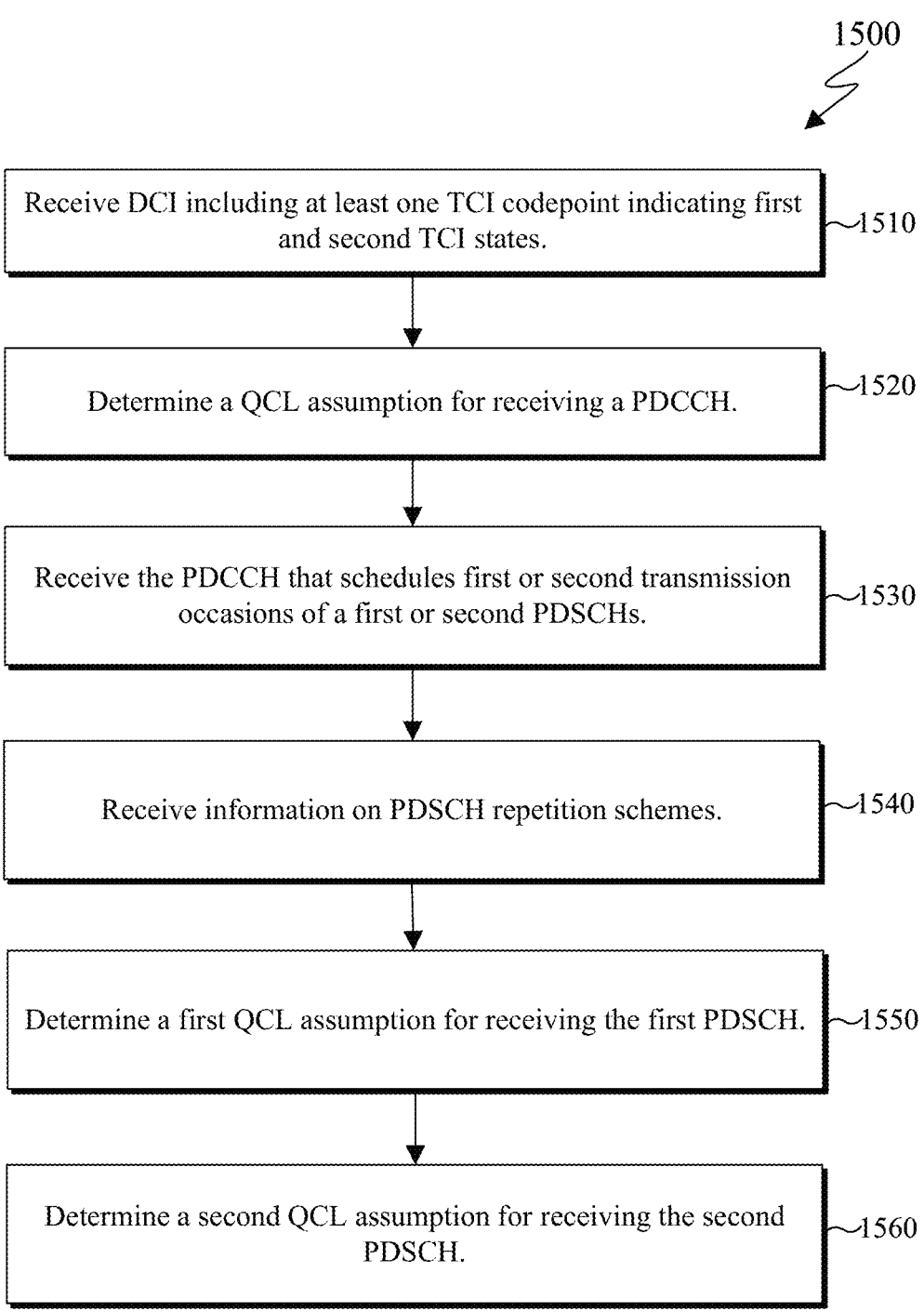

1500

Receive DCI including at least one TCI codepoint indicating first and second TCI states.    1510

Determine a QCL assumption for receiving a PDCCH.    1520

Receive the PDCCH that schedules first or second transmission occasions of a first or second PDSCHs.    1530

Receive information on PDSCH repetition schemes.    1540

Determine a first QCL assumption for receiving the first PDSCH.    1550

Determine a second QCL assumption for receiving the second PDSCH.    1560

FIG. 15

METHODS AND APPARATUSES FOR TCI STATE INDICATION IN A WIRELESS COMMUNICATIONS SYSTEM

CROSS-REFERENCE TO RELATED APPLICATIONS AND CLAIM OF PRIORITY

The present application claims priority to U.S. Provisional Patent Application No. 63/223,850, filed on Jul. 20, 2021. The content of the above-identified patent documents are incorporated herein by reference.

TECHNICAL FIELD

The present disclosure relates generally to wireless communication systems and, more specifically, the present disclosure relates to a transmission configuration indication (TCI) state indication in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to a TCI state indication in an ultra-reliable and low-latency communications system in a wireless communication system.

In one embodiment, a user equipment (UE) is provided. The UE includes a transceiver configured to receive a DCI including at least one TCI codepoint indicating first and second TCI states. A processor operably coupled to the transceiver, the processor configured to determine, based on the first or second TCI states, a third quasi co-location (QCL) assumption for receiving a physical downlink control channel (PDCCH). The transceiver is further configured to receive the PDCCH that schedules first or second transmission occasions of a first or second physical downlink shared channels (PDSCHs), respectively, and receive information on PDSCH repetition schemes. The processor is further configured to determine, based on the first or second TCI states, a first QCL assumption for receiving the first PDSCH and determine, based on the first or second TCI states, a second QCL assumption for receiving the second PDSCH.

In another embodiment, a base station (BS) is provided. The BS includes a transceiver configured to transmit a DCI including at least one TCI codepoint indicating first and second TCI states, the first or second TCI states indicating a third QCL assumption for reception of a PDCCH, transmit the PDCCH that schedules first or second transmission occasions of a first or second PDSCHs, respectively, and transmit information on PDSCH repetition schemes. The first or second TCI states indicates a first QCL assumption for reception of the first PDSCH. The first or second TCI states indicates a second QCL assumption for reception of the second PDSCH.

In yet another embodiment, a method for operating a user equipment (UE) is provided. The method includes receiving a DCI including at least one TCI codepoint indicating first and second TCI states; determining, based on the first or second TCI states, a third QCL assumption for receiving a PDCCH; and receiving the PDCCH that schedules first or second transmission occasions of a first or second PDSCHs, respectively. The method further includes receiving information on PDSCH repetition schemes; determining, based on the first or second TCI states, a first QCL assumption for receiving the first PDSCH; and determining, based on the first or second TCI states, a second QCL assumption for receiving the second PDSCH.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 15 illustrates an example of a flowchart of a method for TCI state indication according to embodiments of the present disclosure.

DETAILED DESCRIPTION

FIG. 1 through FIG. 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v16.1.0, "NR; Physical channels and modulation"; 3GPP TS 38.212 v16.1.0, "NR; Multiplexing and Channel coding"; 3GPP TS 38.213 v16.1.0, "NR; Physical Layer Procedures for Control"; 3GPP TS 38.214 v16.1.0, "NR; Physical Layer Procedures for Data"; 3GPP TS 38.321 v16.1.0, "NR; Medium Access Control (MAC) protocol specification"; and 3GPP TS 38.331 v16.1.0, "NR; Radio Resource Control (RRC) Protocol Specification."

Figure 1:
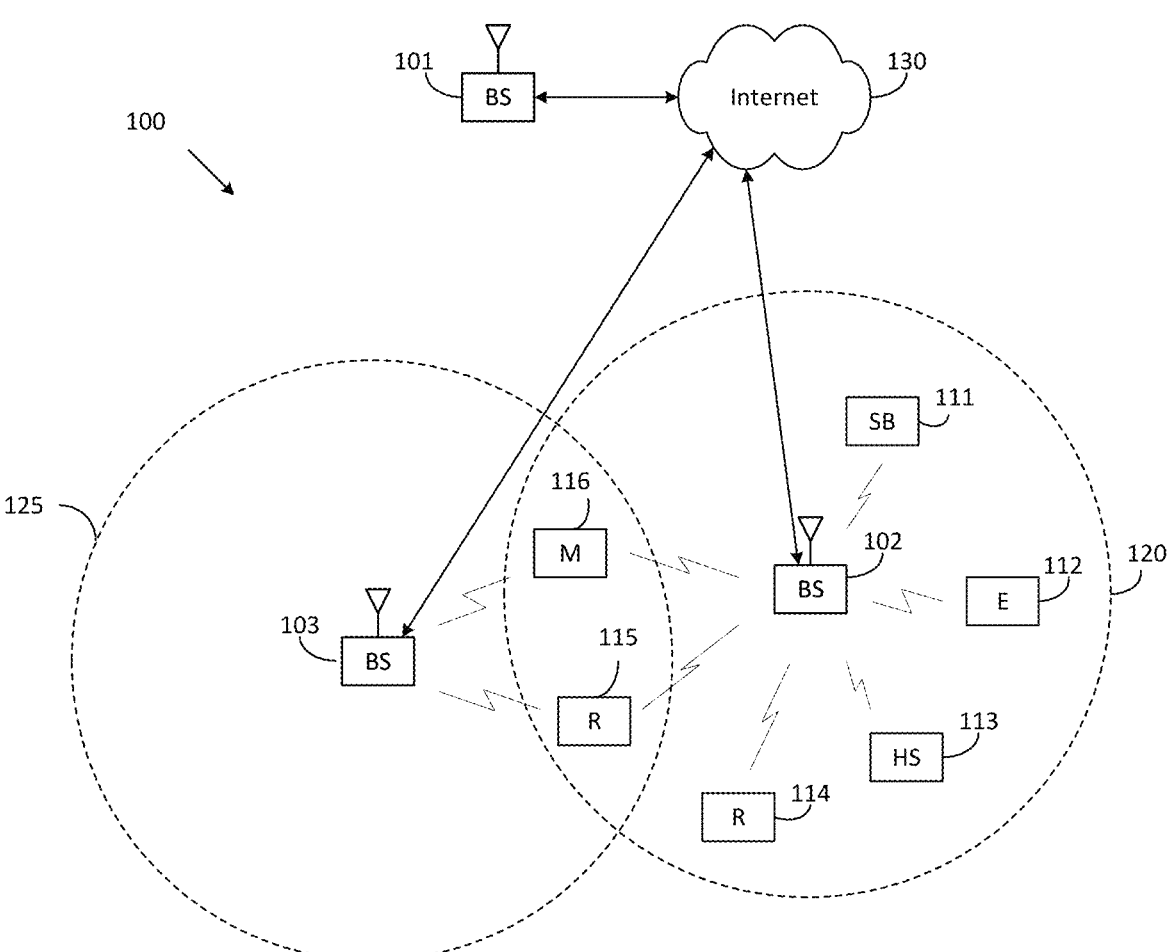
FIG. 1 illustrates an example of wireless network according to embodiments of the present disclosure.
Figure 2:
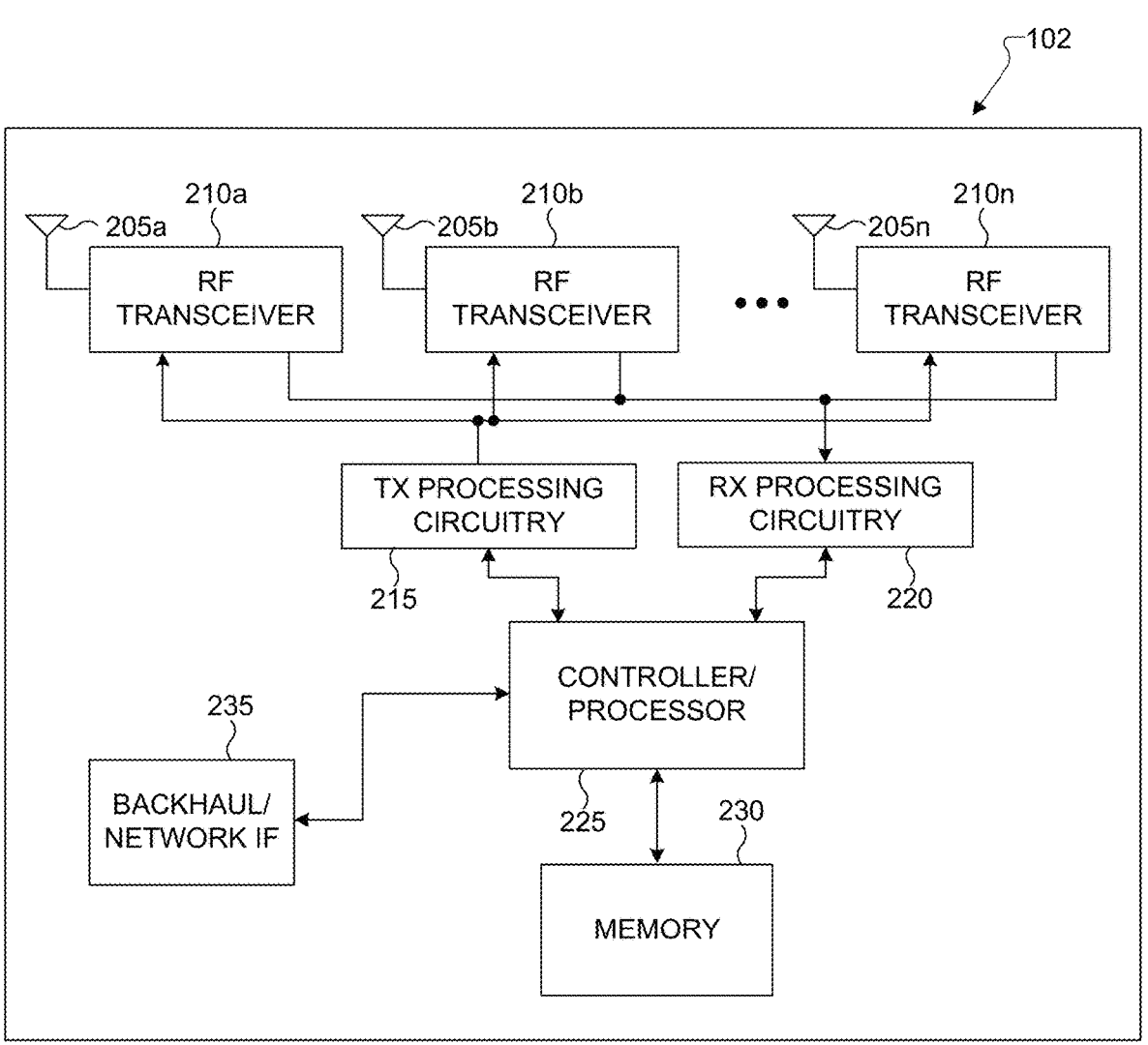
FIG. 2 illustrates an example of gNB according to embodiments of the present disclosure.
Figure 3:
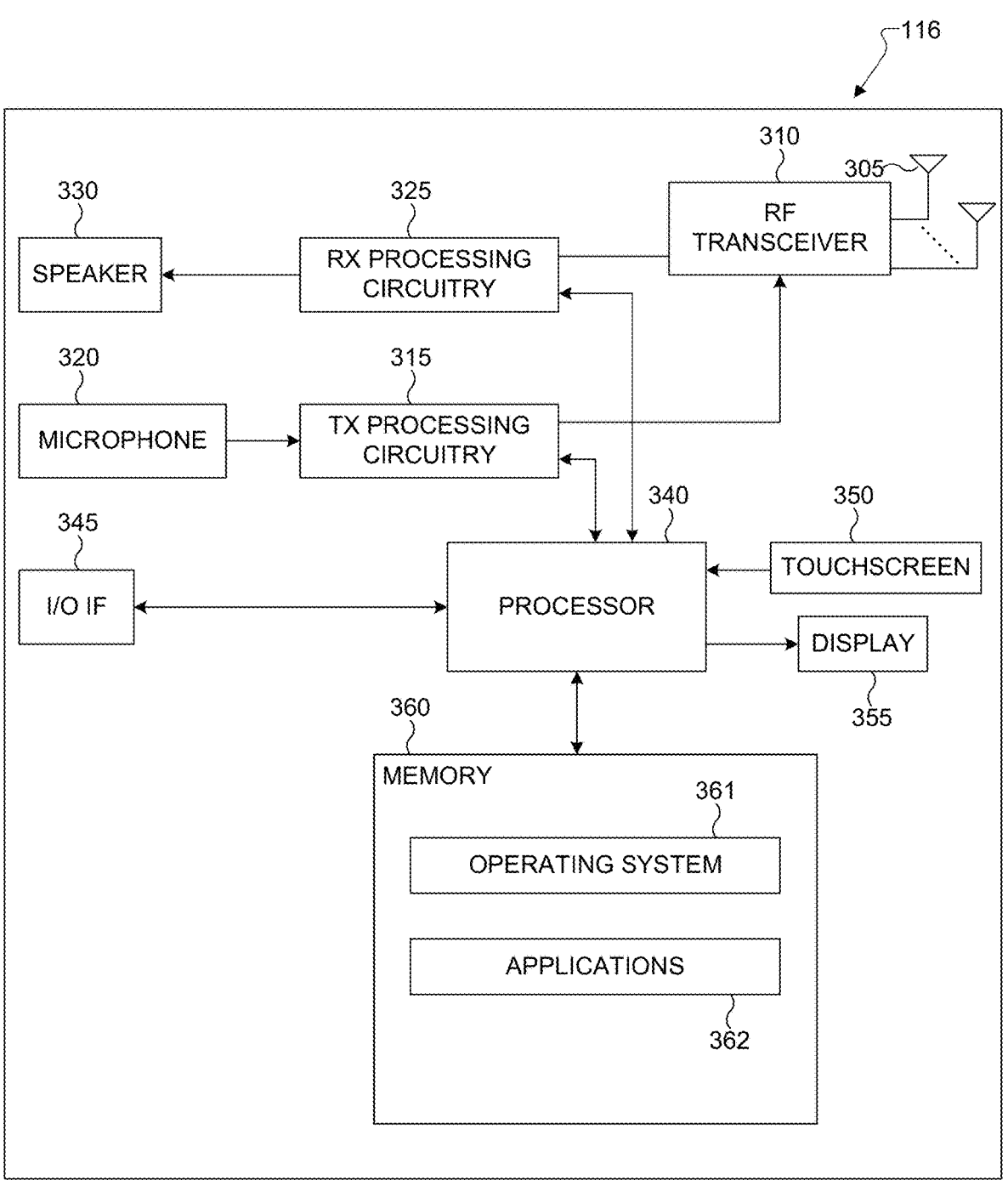
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3$^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal,"

"wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for a TCI state indication in an ultra-reliable and low-latency communications system in a wireless communication system. In certain embodiments, and one or more of the gNBs 101-103 includes circuitry, programing, or a combination thereof, for a TCI state indication in an ultra-reliable and low-latency communications system in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support a TCI state indication in an ultra-reliable and low-latency communications system in a wireless communication system. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and RX processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for a TCI state indication in an ultra-reliable and low-latency communications system in a wireless communication system. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figures 4, 5:
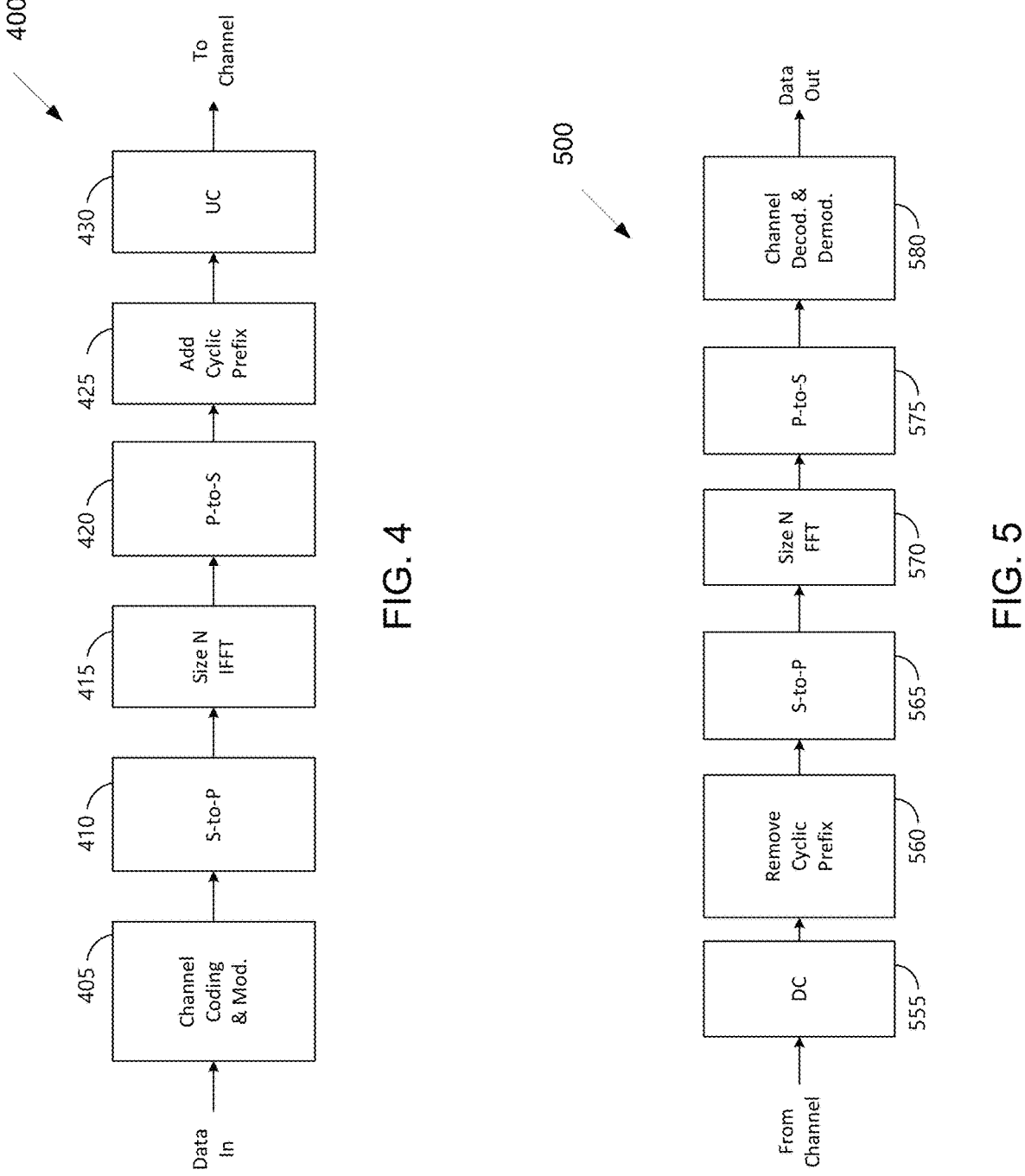
FIGS. 4 and 5 illustrate example of wireless transmit and receive paths according to this disclosure.

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the codebook design and structure for systems having 2D antenna arrays as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a downconverter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the downconverter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A unit for DL signaling or for UL signaling on a cell is referred to as a slot and can include one or more symbols. A bandwidth (BW) unit is referred to as a resource block (RB). One RB includes a number of sub-carriers (SCs). For example, a slot can have duration of one millisecond and an RB can have a bandwidth of 180 KHz and include 12 SCs with inter-SC spacing of 15 KHz. A slot can be either full DL slot, or full UL slot, or hybrid slot similar to a special subframe in time division duplex (TDD) systems.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. A UE can be indicated a spatial setting for a PDCCH reception based on a configuration of a value for a transmission configuration indication state (TCI state) of a control resource set (CORESET) where the UE receives the PDCCH. The UE can be indicated a spatial setting for a PDSCH reception based on a configuration by higher layers or based on an indication by a DCI format scheduling the PDSCH reception of a value for a TCI state. The gNB can configure the UE to receive signals on a cell within a DL bandwidth part (BWP) of the cell DL BW.

A gNB transmits one or more of multiple types of RS including channel state information RS (CSI-RS) and demodulation RS (DMRS). A CSI-RS is primarily intended for UEs to perform measurements and provide channel state information (CSI) to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process consists of NZP CSI-RS and CSI-IM resources. A UE can determine CSI-RS transmission parameters through DL control signaling or higher layer signaling, such as an RRC signaling from a gNB. Transmission instances of a CSI-RS can be indicated by DL control signaling or configured by higher layer signaling. A DMRS is transmitted only in the BW of a respective PDCCH or PDSCH and a UE can use the DMRS to demodulate data or control information.

UL signals also include data signals conveying information content, control signals conveying UL control information (UCI), DMRS associated with data or UCI demodulation, sounding RS (SRS) enabling a gNB to perform UL channel measurement, and a random access (RA) preamble enabling a UE to perform random access. A UE transmits data information or UCI through a respective physical UL shared channel (PUSCH) or a physical UL control channel (PUCCH). A PUSCH or a PUCCH can be transmitted over a variable number of slot symbols including one slot symbol. The gNB can configure the UE to transmit signals on a cell within an UL BWP of the cell UL BW.

UCI includes hybrid automatic repeat request acknowledgement (HARQ-ACK) information, indicating correct or incorrect detection of data transport blocks (TBs) in a PDSCH, scheduling request (SR) indicating whether a UE has data in the buffer of UE, and CSI reports enabling a gNB to select appropriate parameters for PDSCH or PDCCH transmissions to a UE. HARQ-ACK information can be configured to be with a smaller granularity than per TB and can be per data code block (CB) or per group of data CBs where a data TB includes a number of data CBs.

A CSI report from a UE can include a channel quality indicator (CQI) informing a gNB of a largest modulation and coding scheme (MCS) for the UE to detect a data TB with a predetermined block error rate (BLER), such as a 10% BLER, of a precoding matrix indicator (PMI) informing a gNB how to combine signals from multiple transmitter antennas in accordance with a multiple input multiple output (MIMO) transmission principle, and of a rank indicator (RI) indicating a transmission rank for a PDSCH. UL RS includes DMRS and SRS. DMRS is transmitted only in a BW of a respective PUSCH or PUCCH transmission. A gNB can use a DMRS to demodulate information in a respective PUSCH or PUCCH. SRS is transmitted by a UE to provide a gNB with an UL CSI and, for a TDD system, an SRS transmission can also provide a PMI for DL transmission. Additionally, in order to establish synchronization or an initial higher layer connection with a gNB, a UE can transmit a physical random-access channel.

In the present disclosure, a beam is determined by either of: (1) a TCI state, which establishes a quasi-colocation (QCL) relationship between a source reference signal (e.g., synchronization signal/physical broadcasting channel (PBCH) block (SSB) and/or CSI-RS) and a target reference signal; or (2) spatial relation information that establishes an association to a source reference signal, such as SSB or CSI-RS or SRS. In either case, the ID of the source reference signal identifies the beam.

The TCI state and/or the spatial relation reference RS can determine a spatial Rx filter for reception of downlink channels at the UE, or a spatial Tx filter for transmission of uplink channels from the UE.

Figure 6A:
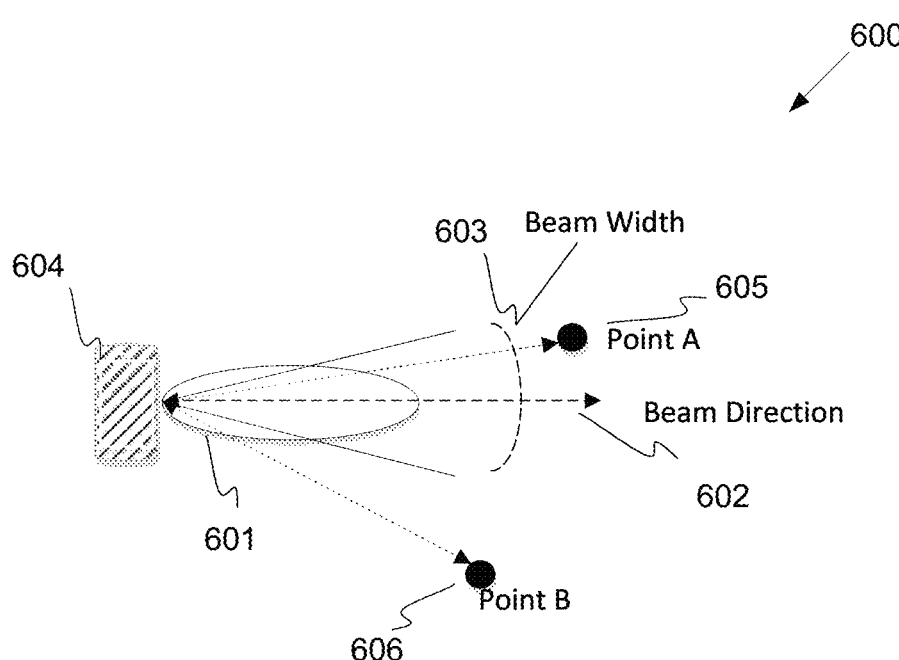
FIG. 6A illustrates an example of wireless system beam according to embodiments of the present disclosure.

FIG. 6A illustrates an example wireless system beam 600 according to embodiments of the present disclosure. An embodiment of the wireless system beam 600 shown in FIG. 6A is for illustration only.

As illustrated in FIG. 6A, in a wireless system a beam 601, for a device 604, can be characterized by a beam direction 602 and a beam width 603. For example, a device 604 with a transmitter transmits radio frequency (RF) energy in a beam direction and within a beam width. The device 604 with a receiver receives RF energy coming towards the device in a beam direction and within a beam width. As illustrated in FIG. 6A, a device at point A 605 can receive from and transmit to the device 604 as point A is within a beam width of a beam traveling in a beam direction and coming from the device 604.

As illustrated in FIG. 6A, a device at point B 606 cannot receive from and transmit to the device 604 as point B is outside a beam width of a beam traveling in a beam direction and coming from the device 604. While FIG. 6A, for illustrative purposes, shows a beam in 2-dimensions (2D), it may be apparent to those skilled in the art, that a beam can be in 3-dimensions (3D), where the beam direction and beam width are defined in space.

Figure 6B:
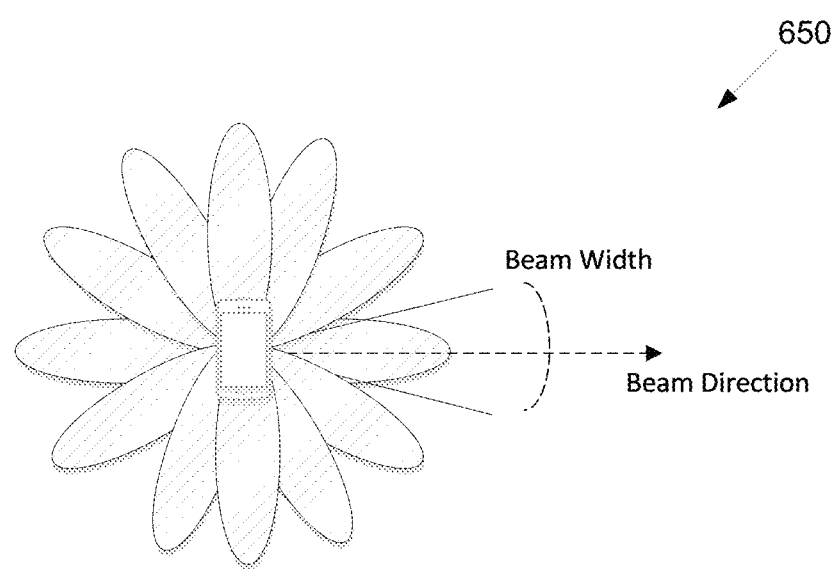
FIG. 6B illustrates an example of multi-beam operation according to embodiments of the present disclosure.

FIG. 6B illustrates an example multi-beam operation 650 according to embodiments of the present disclosure. An embodiment of the multi-beam operation 650 shown in FIG. 6B is for illustration only.

In a wireless system, a device can transmit and/or receive on multiple beams. This is known as "multi-beam operation" and is illustrated in FIG. 6B. While FIG. 6B, for illustrative purposes, is in 2D, it may be apparent to those skilled in the art, that a beam can be 3D, where a beam can be transmitted to or received from any direction in space.

Rel-14 LTE and Rel-15 NR support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 7.

Figure 7:
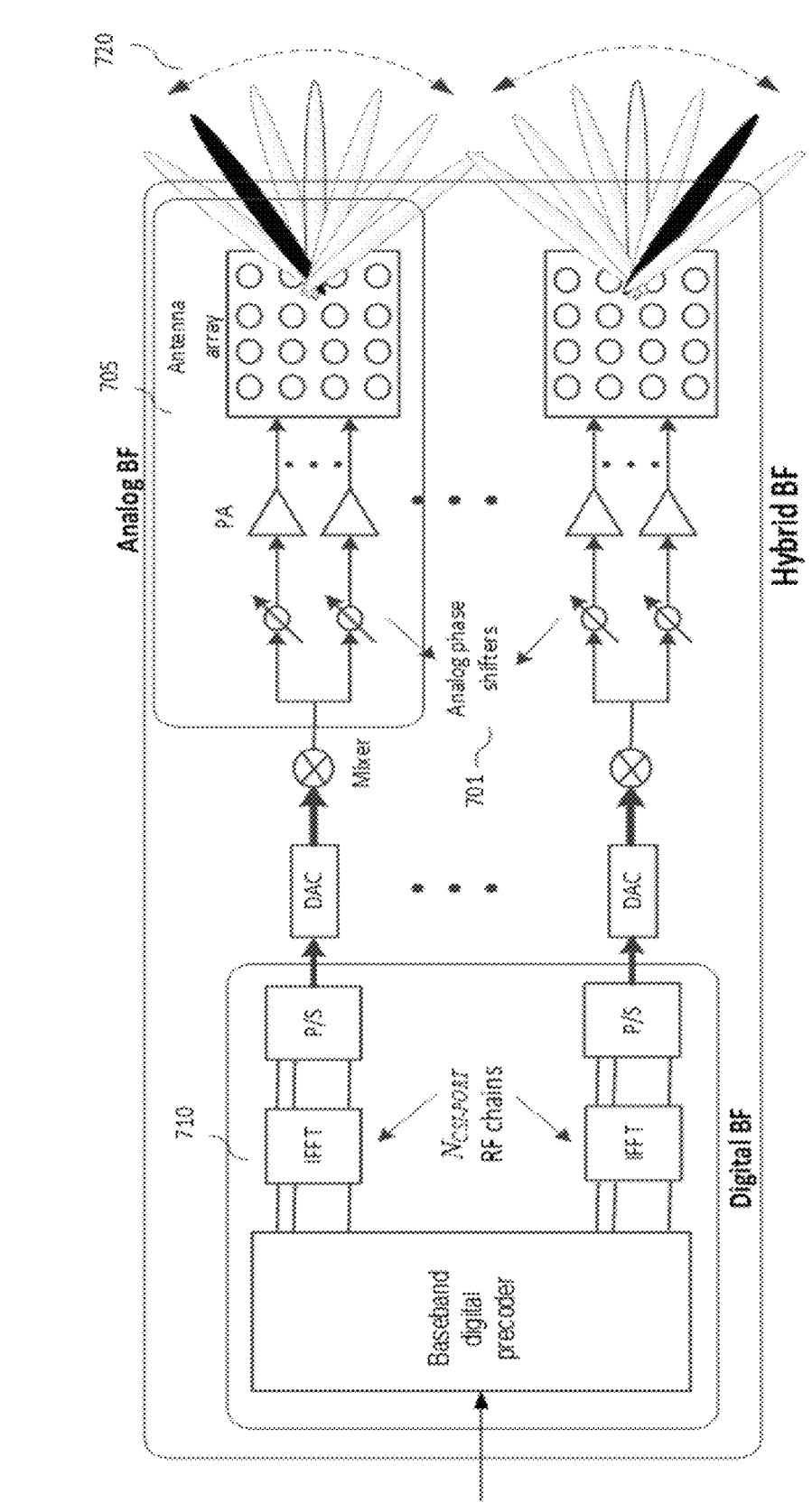
FIG. 7 illustrates an example of antenna structure according to embodiments of the present disclosure.

FIG. 7 illustrates an example antenna structure 700 according to embodiments of the present disclosure. An embodiment of the antenna structure 700 shown in FIG. 7 is for illustration only.

In this case, one CSI-RS port is mapped onto a large number of antenna elements which can be controlled by a bank of analog phase shifters 701. One CSI-RS port can then correspond to one sub-array which produces a narrow analog beam through analog beamforming 705. This analog beam can be configured to sweep across a wider range of angles 720 by varying the phase shifter bank across symbols or subframes. The number of sub-arrays (equal to the number of RF chains) is the same as the number of CSI-RS ports $N_{CSI\text{-}PORT}$. A digital beamforming unit 710 performs a linear combination across $N_{CSI\_PORT}$ analog beams to further increase precoding gain. While analog beams are wideband (hence not frequency-selective), digital precoding can be varied across frequency sub-bands or resource blocks. Receiver operation can be conceived analogously.

Since the aforementioned system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL TX beam (also termed "beam indication"), measuring at least one reference signal for calculating and performing beam reporting (also termed "beam measurement" and "beam reporting," respectively), and receiving a DL or UL transmission via a selection of a corresponding RX beam.

The aforementioned system is also applicable to higher frequency bands such as >52.6 GHz. In this case, the system can employ only analog beams. Due to the O2 absorption loss around 60 GHz frequency (~10 dB additional loss @100 m distance), larger number of and sharper analog beams (hence larger number of radiators in the array) may be needed to compensate for the additional path loss.

Figures 8, 9:
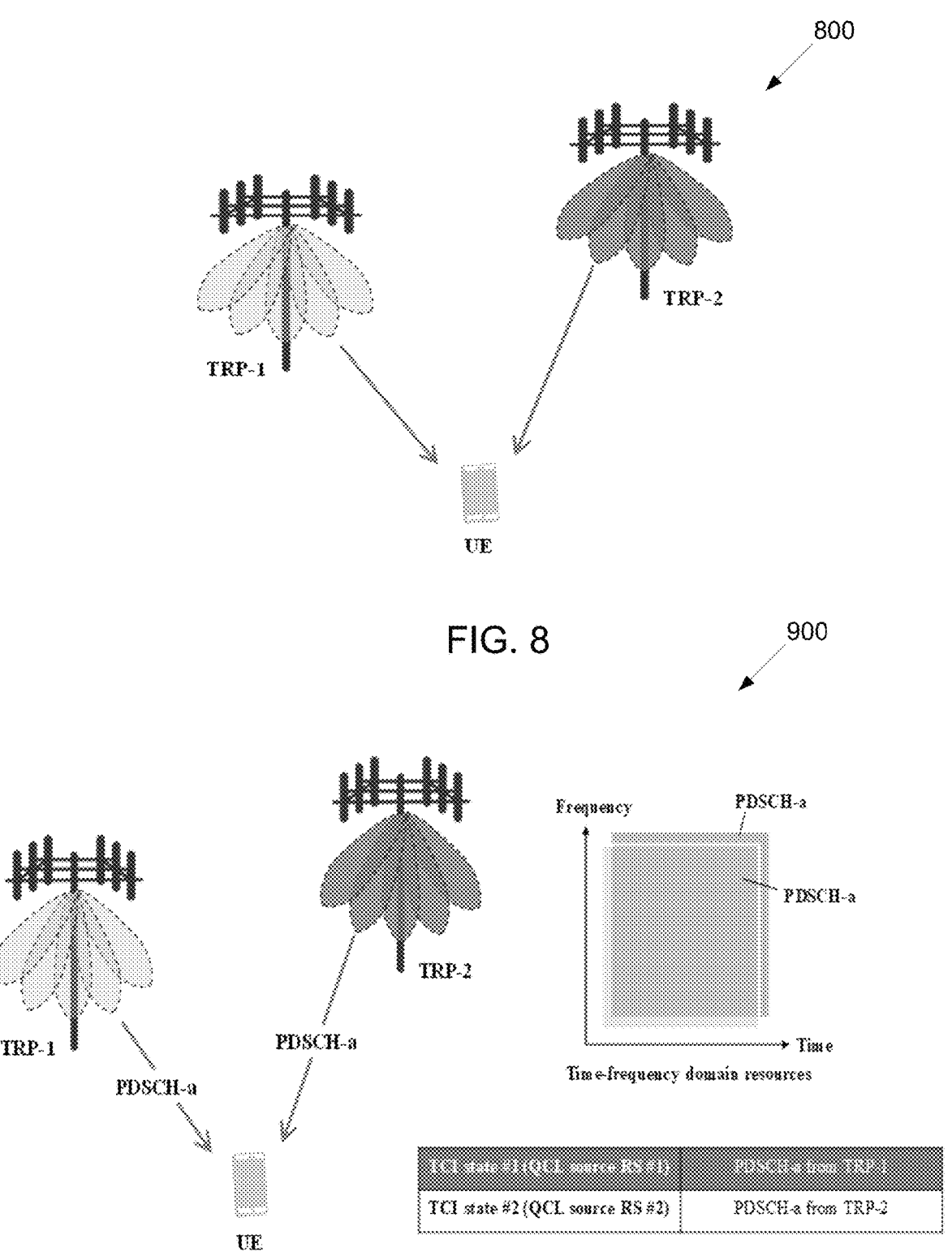
FIG. 8 illustrates an example of a multiple TRP (multi-TRP) system according to embodiments of the present disclosure.
FIG. 9 illustrates an example of SDM based PDSCH(s) repetition in a multi-TRP system according to embodiments of the present disclosure.

FIG. 8 illustrates an example of a multiple TRP (multi-TRP) system 800 according to embodiments of the present disclosure. An embodiment of the multiple TRP (multi-TRP) system 800 shown in FIG. 8 is for illustration only.

In a multiple transmission and reception point (TRP) system depicted in FIG. 8, the UE could simultaneously receive from multiple physically non-co-located TRPs various channels/RSs such as PDCCHs and/or PDSCHs using either a single receive (RX) panel or multiple RX panels. In this disclosure, a RX panel could correspond to a set of RX antenna elements/ports at the UE, a set of measurement RS resources such as SRS resources, a spatial domain RX filter or etc. Further, a TRP in the multi-TRP system can represent a collection of measurement antenna ports, measurement RS resources and/or control resource sets (CORESETs).

For example, a TRP could be associated with one or more of: (1) a plurality of CSI-RS resources; (2) a plurality of CRIs (CSI-RS resource indices/indicators); (3) a measurement RS resource set, for example, a CSI-RS resource set along with its indicator; (4) a plurality of CORESETs associated with a CORESETPoolIndex; and/or (5) a plurality of CORESETs associated with a TRP-specific index/indicator/identity.

In this disclosure, the non-serving cell(s) or the non-serving cell TRP(s) could have/broadcast or be associated/configured with different physical cell IDs (PCIs) and/or other higher layer signaling index values from that of the serving cell or the serving cell TRP (i.e., the serving cell PCI). In one example, the serving cell or the serving cell TRP could be associated with the serving cell ID (SCI) and/or the serving cell PCI. That is, for the inter-cell operation considered in the present disclosure, different cells/TRPs could broadcast/have or be associated/configured with different PCIs and/or one or more cells/TRPs (referred to/defined as non-serving cells/TRPs in the present disclosure) could broadcast/have or be associated/configured with different PCIs from that of the serving cell/TRP (i.e., the serving cell PCI) and/or one or more cells/TRPs are not associated with valid SCI (e.g., provided by the higher layer parameter ServCellIndex). In the present disclosure, a non-serving cell PCI can also be referred to as an additional PCI, another PCI or a different PCI (with respect to the serving cell PCI). The serving cell PCI or the PCI of/for the serving cell could be provided to the UE via higher layer parameter ServingCellCommonConfig.

The UE could be configured by the network one or more transmission configuration indication (TCI) states, which indicate the QCL information/assumptions for one or more RSs/channels such as PDCCHs and/or PDSCHs. The TCI state update/indication for PDCCH and/or PDSCH can also be referred to as beam indication.

For instance, for data transmissions on the shared channel (such as the physical downlink shared channel in NR, i.e., PDSCH), the corresponding beam indication procedure under the 3GPP Rel-15/16 TCI framework can be summarized as follows: a UE can be first higher layer configured by the network (e.g., via high layer RRC signaling) a set/pool of TCI states; the UE could then receive from the network a MAC CE command activating one or more TCI states from the set/pool of RRC configured TCI states; the UE could be indicated by the network via dynamic DCI signaling that one or more of the MAC CE activated TCI states are active for the reception of the PDSCH(s).

To improve reliability and/or reduce latency of a wireless communications system, the PDCCH(s)/PDSCH(s) could be repeatedly transmitted from the network to the UE using different time domain resources (e.g., different symbols, mini-slots, slots, etc.)—TDM strategy, and/or different frequency domain resources (e.g., different resource elements, resource blocks, etc.)—FDM strategy, and/or different spatial domain filters (i.e., different beams)—SDM strategy. Furthermore, additional spatial diversity can be exploited by transmitting the same PDSCH/PDCCH across different TRPs as different TRPs are geographically separated in a multi-TRP system.

The present disclosure provides various design aspects/enhancements for the TCI state/beam indication in a multi-TRP system, wherein the same PDSCH(s) could be repeatedly transmitted across different TRPs using different time domain resources and/or different frequency domain resources and/or different spatial domain filters. The solutions developed in this disclosure could reduce the TCI state (or beam) indication latency for URLLC communications.

As described in U.S. patent application Ser. No. 17/584,239 as incorporated by reference herein, a unified TCI framework could indicate/include N≥1 DL TCI states and/or M≥1 UL TCI states, wherein the indicated TCI state could be at least one of: (1) a DL TCI state and/or its corresponding/associated TCI state ID; (2) an UL TCI state and/or its corresponding/associated TCI state ID; (3) a joint DL and UL TCI state and/or its corresponding/associated TCI state ID; and/or (4) separate DL TCI state and UL TCI state and/or their corresponding/associated TCI state ID(s).

There could be various design options/channels to indicate to the UE a beam (i.e., a TCI state) for the transmission/reception of a PDCCH or a PDSCH. As described in U.S. patent application Ser. No. 17/584,239 as incorporated in reference herein, in one example, a MAC CE could be used to indicate to the UE a beam (i.e., a TCI state and/or a TCI state ID) for the transmission/reception of a PDCCH or a PDSCH. In another example, a DCI could be used to indicate to the UE a beam (i.e., a TCI state and/or a TCI state ID) for the transmission/reception of a PDCCH or a PDSCH. In such example: (1) a DL related DCI (e.g., DCI format 1_0, DCI format 1_1 or DCI format 1_2) could be used to indicate to the UE a beam (i.e., a TCI state and/or a TCI state ID) for the transmission/reception of a PDCCH or a PDSCH, wherein the DL related DCI may or may not include a DL assignment; (2) an UL related DCI (e.g., DCI format 0_0, DCI format 0_1, DCI format 0_2) could be used to indicate to the UE a beam (i.e., a TCI state and/or a TCI state ID) for the transmission/reception of a PDCCH or a PDSCH, wherein the UL related DCI may or may not include an UL scheduling grant; and/or (3) a custom/purpose designed DCI format could be used to indicate to the UE a beam (i.e., a TCI state and/or a TCI state ID) for the transmission/reception of a PDCCH or a PDSCH.

A unified TCI framework could indicate/include N≥1 DL TCI states and/or M≥1 UL TCI states, wherein the indicated TCI state could be at least one of: a DL TCI state and/or its corresponding/associated TCI state ID, an UL TCI state and/or its corresponding/associated TCI state ID, a joint DL and UL TCI state and/or its corresponding/associated TCI state ID, and separate DL TCI state and UL TCI state and/or their corresponding/associated TCI state ID(s).

There could be various design options/channels to indicate to the UE a beam (i.e., a TCI state) for the transmission/reception of a PDCCH or a PDSCH.

In one example, a MAC CE could be used to indicate to the UE a beam (i.e., a TCI state and/or a TCI state ID) for the transmission/reception of a PDCCH or a PDSCH.

In another example, a DCI could be used to indicate to the UE a beam (i.e., a TCI state and/or a TCI state ID) for the transmission/reception of a PDCCH or a PDSCH. For example, a DL related DCI (e.g., DCI format 1_0, DCI format 1_1 or DCI format 1_2) could be used to indicate to the UE a beam (i.e., a TCI state and/or a TCI state ID) for the transmission/reception of a PDCCH or a PDSCH, wherein the DL related DCI may or may not include a DL assignment. For another example, an UL related DCI (e.g., DCI format 0_0, DCI format 0_1, DCI format 0_2) could be used to indicate to the UE a beam (i.e., a TCI state and/or a TCI state ID) for the transmission/reception of a PDCCH or a PDSCH, wherein the UL related DCI may or may not include an UL scheduling grant. Yet for another example, a custom/purpose designed DCI format could be used to indicate to the UE a beam (i.e., a TCI state and/or a TCI state ID) for the transmission/reception of a PDCCH or a PDSCH.

Rel-17 introduced the unified TCI framework, where a unified or master or main TCI state is signaled to the UE. The unified or master or main TCI state can be one of: in case of joint TCI state indication, wherein a same beam is used for DL and UL channels, a joint TCI state that can be used at least for UE-dedicated DL channels and UE-dedicated UL channels; in case of separate TCI state indication, wherein different beams are used for DL and UL channels, a DL TCI state can be used at least for UE-dedicated DL channels; in case of separate TCI state indication, wherein different beams are used for DL and UL channels, a UL TCI state can be used at least for UE-dedicated UL channels.

The unified (master or main) TCI state is TCI state of UE-dedicated reception on PDSCH/PDCCH or dynamic-grant/configured-grant based PUSCH and all of dedicated PUCCH resources.

As discussed above, a UE could be provided by the network, e.g., via MAC CE or DCI (e.g., DCI format 1_1 or 1_2 with or without DL assignment) based signaling via higher layer parameters DLorJointTCIState or UL-TCIState, M>1 joint DL and UL TCI states or M>1 separate UL TCI states or a first combination of M>1 joint DL and UL TCI states and separate UL TCI states or N>1 separate DL TCI states or a second combination of N>1 joint DL and UL TCI states and separate DL TCI states or a third combination of N>1 joint DL and UL TCI states, separate DL TCI states and separate UL Rel-17 unified TCI for UE-dedicated reception on PDSCH/PDCCH or dynamic-grant/configured-grant based PUSCH and all of dedicated PUCCH resources. In the present disclosure, the term "TCI state" or "TCI state ID" could refer to a single Rel-17 unified TCI state as discussed above (e.g., a joint DL and UL TCI state, a separate DL TCI state or a separate UL TCI state) or a pair of Rel-17 unified TCI states as discussed above (e.g., a pair of separate DL and UL TCI states).

In the present disclosure, the TCI state/beam indication for the PDSCH(s) repetition in a multi-TRP system is discussed under the unified TCI framework, wherein one or more DL/UL TCI states could be separately/jointly indicated in various channels such as MAC CE and/or DCI. The same PDSCH(s) could be transmitted from different TRPs in the multi-TRP system using different time domain resources and/or different frequency domain resources and/or different spatial domain filters.

FIG. 9 illustrates an example of SDM based PDSCH(s) repetition in a multi-TRP system 900 according to embodiments of the present disclosure. An embodiment of the SDM based PDSCH(s) repetition in a multi-TRP system 900 shown in FIG. 9 is for illustration only.

One conceptual example of SDM based PDSCH(s) repetition in a multi-TRP system is presented in FIG. 9. As depicted in FIG. 9, the UE could receive the same PDSCH, i.e., PDSCH-a, from both TRP-1 and TRP-2 on the same time-frequency domain resources. The UE could be indicated by the network different TCI states—TCI state #1 and TCI state #2 in FIG. 9 (and therefore, different QCL source RSs indicated therein—QCL source RS #1 and QCL source RS #2 in FIG. 9) for the same PDSCH—PDSCH-a in FIG. 9—transmitted from different TRPs—TRP-1 and TRP-2 in FIG. 9—in the multi-TRP system.

Figures 10, 11:
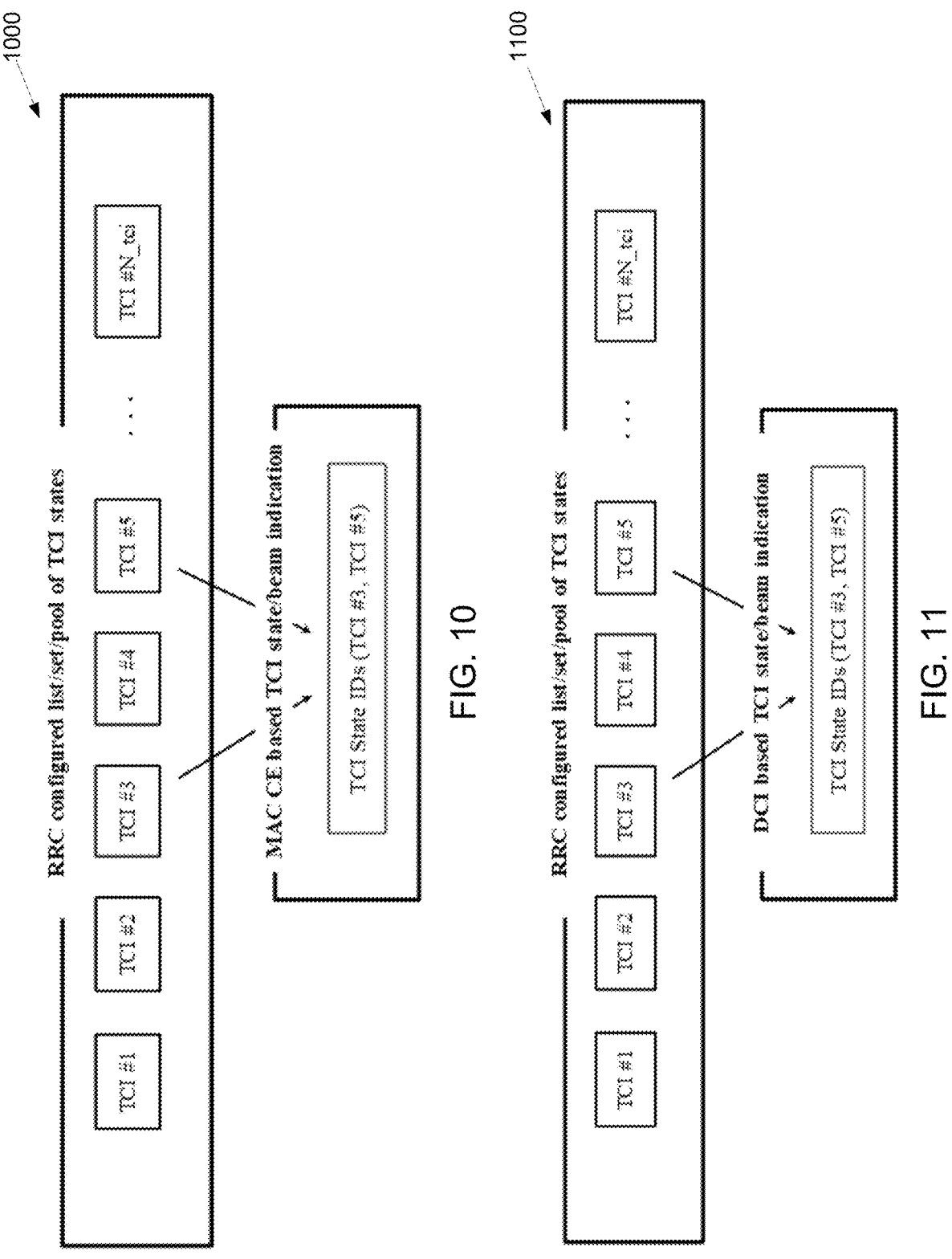
FIG. 10 illustrates an example of MAC CE based TCI state/beam indication according to embodiments of the present disclosure.
FIG. 11 illustrates an example of DCI based TCI state/beam indication according to embodiments of the present disclosure.

FIG. 10 illustrates an example of MAC CE based TCI state/beam indication 1000 according to embodiments of the present disclosure. An embodiment of the MAC CE based TCI state/beam indication 1000 shown in FIG. 10 is for illustration only.

In FIG. 10, an example of MAC CE based TCI state/beam indication for the multi-TRP operation with PDSCH(s) repetition is presented. As illustrated in FIG. 10, the UE could be first higher layer configured by the network, e.g., via the higher layer RRC signaling, a list/pool of N_tci TCI states. Each TCI state contains at least a QCL source RS with a QCL type, e.g., QCL-typeA/B/C/D. The UE could then receive from the network one or more MAC CE commands to indicate one or more beam(s) (i.e., the TCI state(s)) for the transmission/reception of the PDSCH(s) transmitted from/ associated with one or more TRPs in a multi-TRP system.

For instance, the UE could receive from the network a single MAC CE command for beam indication to indicate N>1 TCI states/beams for the same PDSCH(s) transmitted from/associated with different TRPs in the multi-TRP system on the same time-frequency domain resource(s). As depicted in FIG. 9 and FIG. 10, the UE could receive from the network a single MAC CE command for beam indication to indicate N=2 TCI states/beams (TCI #3 and TCI #5) for the same PDSCH-a transmitted from/associated with two TRPs, i.e., TRP-1 and TRP-2, in the multi-TRP system, respectively, on the same time-frequency domain resource(s).

The MAC CE for beam indication could include at least a TCI state ID. As discussed above, the TCI state corresponding to the TCI state ID could be at least one of: (1) a DL TCI state; (2) an UL TCI state; (3) a joint DL and UL TCI state; and/or (4) separate DL TCI state and UL TCI state.

The association/mapping between the TCI state(s)/ beam(s) indicated in the MAC CE command(s) and the TRPs in the multi-TRP system needs to be specified. There could be various means to associate/map the TCI state(s)/ beam(s) indicated in the MAC CE command(s) for beam indication and the TRPs in the multi-TRP system.

For N>1 TCI states/beams indication in a single MAC CE command for beam indication, in one example-1.1.1, the UE could be explicitly indicated by the network, e.g., via higher layer RRC signaling and/or MAC CE command and/or dynamic DCI signaling, the exact association/mapping between the TCI states/beams indicated in the MAC CE command for beam indication and the TRPs in the multi-TRP system. For example, the UE could be first higher layer configured by the network a list/set/pool of TRP-specific ID/index values such as PCIs. The first TCI state and/or the TCI state with the lowest TCI state ID value indicated in the MAC CE command for beam indication could correspond to the first entry/TRP in the list/set/pool of TRP-specific ID/index values, the second TCI state and/or the TCI state with the second lowest TCI state ID value indicated in the MAC CE command for beam indication could correspond to the second entry/TRP in the list/set/pool of TRP-specific ID/index values, and so on, and the last TCI state and/or the TCI state with the highest TCI state ID value indicated in the MAC CE command for beam indication could correspond to the last entry/TRP in the list/set/pool of TRP-specific ID/index values.

For another example, the UE could be first higher layer configured by the network a list/set/pool of TRP-specific ID/index values such as PCIs. The UE could then receive from the network one or more MAC CE activation commands/bitmaps to activate one or more TRP-specific ID/index values from the higher layer configured list/set/pool of TRP-specific ID/index values. The first TCI state and/or the TCI state with the lowest TCI state ID value indicated in the MAC CE command for beam indication could correspond to the first MAC CE(s)/bitmap(s) activated TRP-specific ID/index value, the second TCI state and/or the TCI state with the second lowest TCI state ID value indicated in the MAC CE command for beam indication could correspond to the second MAC CE(s)/bitmap(s) activated TRP-specific ID/index value, and so on, and the last TCI state and/or the TCI state with the highest TCI state ID value indicated in the MAC CE command for beam indication could correspond to the last MAC CE(s)/bitmap(s) activated TRP-specific ID/index value. Other exact association/mapping relationships between the TCI states/beams indicated in the MAC CE command for beam indication and the TRPs in the multi-TRP system and/or the corresponding indication method(s), e.g., via higher layer RRC signaling and/or MAC CE command and/or dynamic DCI signaling, are also possible.

For N>1 TCI states/beams indication in a single MAC CE command for beam indication, in another example-1.1.2, the UE could be implicitly indicated by the network the association/mapping between the TCI states/beams indicated in the MAC CE command for beam indication and the TRPs in the multi-TRP system. The UE could be higher layer configured by the network a list/set/pool of TRP-specific ID/index values such as PCIs. The UE could also receive from the network one or more MAC CE activation commands/bitmaps to activate one or more TRP-specific ID/index values from the higher layer configured list/set/pool of TRP-specific ID/index values. For example, the first TCI state and/or the TCI state with the lowest TCI state ID value indicated in the MAC CE command for beam indication could correspond to the TRP with the lowest/lowest MAC CE activated TRP-specific ID/index value such as the lowest PCI value and/or the first TRP (e.g., TRP #1), the second TCI state and/or the TCI state with the second lowest TCI state ID value indicated in the MAC CE command for beam indication could correspond to the TRP with the second lowest/ second lowest MAC CE activated TRP-specific ID/index value such as the second lowest PCI value and/or the second TRP (e.g., TRP #2), and so on, and the last TCI state and/or the TCI state with the highest TCI state ID value indicated in the MAC CE command for beam indication could correspond to the TRP with the highest/highest MAC CE activated TRP-specific ID/index value such as the highest PCI value and/or the last TRP (e.g., TRP #N).

For another example, the first TCI state and/or the TCI state with the lowest TCI state ID value indicated in the MAC CE command for beam indication could correspond to the TRP with the highest/highest MAC CE activated TRP-specific ID/index value such as the highest PCI value and/or the last TRP (e.g., TRP #N), the second TCI state and/or the TCI state with the second lowest TCI state ID value indicated in the MAC CE command for beam indication could correspond to the TRP with the second highest/second highest MAC CE activated TRP-specific ID/index value such as the second highest PCI value and/or the second last TRP (e.g., TRP #N−1), and so on, and the last TCI state and/or the TCI state with the highest TCI state ID value indicated in the MAC CE command for beam indication could correspond to the TRP with the lowest/lowest MAC CE activated TRP-specific ID/index value such as the lowest PCI value and/or the first TRP (e.g., TRP #1). Other implicit indication methods of the association/mapping between the N>1 TCI states/beams indicated in the MAC CE command for beam indication and the TRPs in the multi-TRP system are also possible.

For N>1 TCI states/beams indication in a single MAC CE command for beam indication, in yet another example-1.1.3, the UE could be explicitly indicated by the network, e.g., via higher layer RRC signaling and/or MAC CE command and/or dynamic DCI signaling, the exact association/mapping between the TCI states/beams indicated in the MAC CE command for beam indication and the CORESETPoolIndex values. For example, the UE could be first higher layer configured by the network a list/set/pool of CORESET-PoolIndex values—e.g., a set of two CORESETPoolIndex values 0 and 1. The first TCI state and/or the TCI state with the lowest TCI state ID value indicated in the MAC CE command for beam indication could correspond to the first entry/CORESETPoolIndex value in the list/set/pool of CORESETPoolIndex values, the second TCI state and/or the TCI state with the second lowest TCI state ID value indicated in the MAC CE command for beam indication could correspond to the second entry/CORESETPoolIndex value in the list/set/pool of CORESETPoolIndex values, and so on, and the last TCI state and/or the TCI state with the highest TCI state ID value indicated in the MAC CE command for beam indication could correspond to the last entry/CORESETPoolIndex value in the list/set/pool of CORESETPoolIndex values.

For another example, the UE could be first higher layer configured by the network a list/set/pool of CORESET-PoolIndex values—e.g., a set of two CORESETPoolIndex values 0 and 1. The UE could then receive from the network one or more MAC CE activation commands/bitmaps to activate one or more CORESETPoolIndex values from the higher layer configured list/set/pool of CORESETPoolIndex values. The first TCI state and/or the TCI state with the lowest TCI state ID value indicated in the MAC CE command for beam indication could correspond to the first MAC CE(s)/bitmap(s) activated CORESETPoolIndex value, the second TCI state and/or the TCI state with the second lowest TCI state ID value indicated in the MAC CE command for beam indication could correspond to the second MAC CE(s)/bitmap(s) activated CORESETPoolIndex value, and so on, and the last TCI state and/or the TCI state with the highest TCI state ID value indicated in the MAC CE command for beam indication could correspond to the last MAC CE(s)/bitmap(s) activated CORESETPoolIndex value. Other exact association/mapping relationships between the TCI states/beams indicated in the MAC CE command for beam indication and the CORESETPoolIndex values and/or the corresponding indication method(s), e.g., via higher layer RRC signaling and/or MAC CE command and/or dynamic DCI signaling, are also possible.

For N>1 TCI states/beams indication in a single MAC CE command for beam indication, in yet another example-1.1.4, the UE could be implicitly indicated by the network the association/mapping between the TCI states/beams indicated in the MAC CE command for beam indication and the CORESETPoolIndex values. The UE could be higher layer configured by the network a list/set/pool of CORESET-PoolIndex values—e.g., a set of two CORESETPoolIndex values 0 and 1. The UE could also receive from the network one or more MAC CE activation commands/bitmaps to activate one or more CORESETPoolIndex values from the higher layer configured list/set/pool of CORESETPoolIndex values. For example, the first TCI state and/or the TCI state with the lowest TCI state ID value indicated in the MAC CE command for beam indication could correspond to the lowest/lowest MAC CE activated CORESETPoolIndex value such as "0," the second TCI state and/or the TCI state with the second lowest TCI state ID value indicated in the MAC CE command for beam indication could correspond to the second lowest/second lowest MAC CE activated CORE-SETPoolIndex value such as "1," and so on, and the last TCI state and/or the TCI state with the highest TCI state ID value indicated in the MAC CE command for beam indication could correspond to the highest/highest MAC CE activated CORESETPoolIndex value such as "N−1."

For another example, the first TCI state and/or the TCI state with the lowest TCI state ID value indicated in the MAC CE command for beam indication could correspond to the highest/highest MAC CE activated CORESETPoolIndex value such as "N−1," the second TCI state and/or the TCI state with the second lowest TCI state ID value indicated in the MAC CE command for beam indication could correspond to the second highest/second highest MAC CE activated CORESETPoolIndex value such as "N−2," and so on, and the last TCI state and/or the TCI state with the highest TCI state ID value indicated in the MAC CE command for beam indication could correspond to the lowest/lowest MAC CE activated CORESETPoolIndex value such as "0." Other implicit indication methods of the association/mapping between the N>1 TCI states/beams indicated in the MAC CE command for beam indication and the CORESETPoolIndex values are also possible.

For N>1 TCI states/beams indication in a single MAC CE command for beam indication, in yet another example-1.1.5, a TCI state, e.g., the higher layer parameter TCI-State, indicated in the MAC CE command for beam indication could include/comprise/incorporate at least one ID/index value. For example, this ID/index value could be a (absolute) TRP-specific ID/index value such as PCI value, TRP ID value, TRP index value and etc., based on a list/set/pool of TRP-specific ID/index values, e.g., higher layer configured to the UE and/or higher layer configured to the UE and activated by one or more MAC CE activation commands/ bitmaps. For another example, this ID/index value could be an (relative) index within the list/set/pool of TRP-specific ID/index values, e.g., higher layer configured to the UE and/or higher layer configured to the UE and activated by one or more MAC CE activation commands/bitmaps. For yet another example, this ID/index value could be a CORE-SETPoolIndex value.

For a list/set/pool of N>1 MAC CE commands for beam indication with each MAC CE command indicating a single TCI state/beam; a unique entity ID/index could be included/incorporated in each MAC CE command for beam indication.

In one example-1.1.a, the UE could be explicitly indicated by the network, e.g., via higher layer RRC signaling and/or MAC CE command and/or dynamic DCI signaling, the exact association/mapping between the MAC CE commands for beam indication (and therefore, the TCI states/beams indicated therein) and the TRPs in the multi-TRP system. For example, the UE could be first higher layer configured by the network a list/set/pool of TRP-specific ID/index values such as PCIs. The first MAC CE command for beam indication in the list/set/pool of N>1 MAC CE commands for beam indication and/or the MAC CE command for beam indication indicating the lowest entity ID/index value and/or the MAC CE command for beam indication indicating the TCI state with the lowest TCI state ID value could correspond to the first entry/TRP in the list/set/pool of TRP-specific ID/index values, the second MAC CE command for beam indication in the list/set/pool of N>1 MAC CE commands for beam indication and/or the MAC CE command for beam indication indicating the second lowest entity ID/index value and/or the MAC CE command for beam indication indicating the TCI state with the second lowest TCI state ID value could correspond to the second entry/TRP in the list/set/pool of TRP-specific ID/index values, and so on, and the last MAC CE command for beam indication in the list/set/pool of N>1 MAC CE commands for beam indication and/or the MAC CE command for beam indication indicating the highest entity ID/index value and/or the MAC CE command for beam indication indicating the TCI state with the highest TCI state ID value could correspond to the last entry/TRP in the list/set/pool of TRP-specific ID/index values.

For another example, the UE could be first higher layer configured by the network a list/set/pool of TRP-specific ID/index values such as PCIs. The UE could then receive from the network one or more MAC CE activation commands/bitmaps to activate one or more TRP-specific ID/index values from the higher layer configured list/set/pool of TRP-specific ID/index values. The first MAC CE command for beam indication in the list/set/pool of N>1 MAC CE commands for beam indication and/or the MAC CE command indicating the lowest entity ID/index value and/or the MAC CE command for beam indication indicating the TCI state with the lowest TCI state ID value could correspond to the first MAC CE(s)/bitmap(s) activated TRP-specific ID/index values, the second MAC CE command for beam indication in the list/set/pool of N>1 MAC CE commands for beam indication and/or the MAC CE command for beam indication indicting the second lowest entity ID/index value and/or the MAC CE command for beam indication indicating the TCI state with the second lowest TCI state ID value could correspond to the second MAC CE(s)/bitmap(s) activated TRP-specific ID/index values, and so on, and the last MAC CE command for beam indication in the list/set/pool of N>1 MAC CE commands for beam indication and/or the MAC CE command for beam indication indicating the highest entity ID/index value and/or the MAC CE command for beam indication indicating the TCI state with the highest TCI state ID value could correspond to the last MAC CE(s)/bitmap(s) activated TRP-specific ID/index values. Other exact association/mapping relationships between the MAC CE commands for beam indication (and therefore, the TCI states/beams indicated therein) and the TRPs in the multi-TRP system and/or the corresponding indication method(s), e.g., via higher layer RRC signaling and/or MAC CE command and/or dynamic DCI signaling, are also possible.

In another example-1.1.b, the UE could be implicitly indicated by the network the association/mapping between the MAC CE commands for beam indication (and therefore, the TCI states/beams indicated therein) and the TRPs in the multi-TRP system. The UE could be higher layer configured by the network a list/set/pool of TRP-specific ID/index values such as PCIs. The UE could also receive from the network one or more MAC CE activation commands/bitmaps to activate one or more TRP-specific ID/index values from the higher layer configured list/set/pool of TRP-specific ID/index values. For example, the first MAC CE command for beam indication in the list/set/pool of N>1 MAC CE commands for beam indication and/or the MAC CE command for beam indication indicating the lowest entity ID/index value and/or the MAC CE command for beam indication indicating the lowest TCI state ID value could correspond to the TRP with the lowest/lowest MAC CE activated TRP-specific ID/index value such as the lowest PCI value and/or the first TRP (e.g., TRP #1), the second MAC CE command for beam indication in the list/set/pool of N>1 MAC CE commands for beam indication and/or the MAC CE command for beam indication indicating the second lowest entity ID/index value and/or the MAC CE command for beam indication indicating the second lowest TCI state ID value could correspond to the TRP with the second lowest/second lowest MAC CE activated TRP-specific ID/index value such as the second lowest PCI value and/or the second TRP (e.g., TRP #2), and so on, and the last MAC CE command for beam indication in the list/set/pool of N>1 MAC CE commands for beam indication and/or the MAC CE command for beam indication indicating the highest entity ID/index value and/or the MAC CE command for beam indication indicating the highest TCI state ID value could correspond to the TRP with the highest/highest MAC CE activated TRP-specific ID/index value such as the highest PCI value and/or the last TRP (e.g., TRP #N).

For another example, the first MAC CE command for beam indication in the list/set/pool of N>1 MAC CE commands for beam indication and/or the MAC CE command for beam indication indicating the lowest entity ID/index value and/or the MAC CE command for beam indication indicating the lowest TCI state ID value could correspond to the TRP with the highest/highest MAC CE activated TRP-specific ID/index value such as the highest PCI value and/or the last TRP (e.g., TRP #N), the second MAC CE command for beam indication in the list/set/pool of N>1 MAC CE commands for beam indication and/or the MAC CE command for beam indication indicating the second lowest entity ID/index value and/or the MAC CE command for beam indication indicating the second lowest TCI state ID value could correspond to the TRP with the second highest/second highest MAC CE activated TRP-specific ID/index value such as the second highest PCI value and/or the second last TRP (e.g., TRP #N−1), and so on, and the last MAC CE command for beam indication in the list/set/pool of N>1 MAC CE commands for beam indication and/or the MAC CE command for beam indication indicating the highest entity ID/index value and/or the MAC CE command for beam indication indicating the highest TCI state ID value indicated could correspond to the TRP with the lowest/lowest MAC CE activated TRP-specific ID/index value such as the lowest PCI value and/or the first TRP (e.g., TRP #1). Other implicit indication methods of the association/mapping between the N>1 MAC CE commands for beam indication (and therefore, the TCI states/beams indicated therein) and the TRPs in the multi-TRP system are also possible.

In yet another example-1.1.c, the UE could be explicitly indicated by the network, e.g., via higher layer RRC signaling and/or MAC CE command and/or dynamic DCI signaling, the exact association/mapping between the MAC CE commands for beam indication (and therefore, the TCI states/beams indicated therein) and the TRPs in the multi-TRP system. For example, the UE could be first higher layer configured by the network a list/set/pool of CORESET-PoolIndex values—e.g., a set of two CORESETPoolIndex values 0 and 1. The first MAC CE command for beam indication in the list/set/pool of N>1 MAC CE commands for beam indication and/or the MAC CE command for beam indication indicating the lowest entity ID/index value and/or the MAC CE command for beam indication indicating the TCI state with the lowest TCI state ID value could correspond to the first entry/CORESETPoolIndex value in the list/set/pool of CORESETPoolIndex values, the second MAC CE command for beam indication in the list/set/pool of N>1 MAC CE commands for beam indication and/or the MAC CE command for beam indication indicating the second lowest entity ID/index value and/or the MAC CE command for beam indication indicating the TCI state with the second lowest TCI state ID value could correspond to the second entry/CORESETPoolIndex value in the list/set/pool of CORESETPoolIndex values, and so on, and the last MAC CE command for beam indication in the list/set/pool of N>1 MAC CE commands for beam indication and/or the MAC CE command for beam indication indicating the highest entity ID/index value and/or the MAC CE command for beam indication indicating the TCI state with the highest TCI state ID value could correspond to the last entry/CORESETPoolIndex value in the list/set/pool of CORE-SETPoolIndex values.

For another example, the UE could be first higher layer configured by the network a list/set/pool of CORESET-PoolIndex values—e.g., a set of two CORESETPoolIndex values 0 and 1. The UE could then receive from the network one or more MAC CE activation commands/bitmaps to activate one or more CORESETPoolIndex values from the higher layer configured list/set/pool of CORESETPoolIndex values. The first MAC CE command for beam indication in the list/set/pool of N>1 MAC CE commands for beam indication and/or the MAC CE command for beam indication indicating the lowest entity ID/index value and/or the MAC CE command for beam indication indicating the TCI state with the lowest TCI state ID value could correspond to the first MAC CE(s)/bitmap(s) activated CORESETPoolIndex value, the second MAC CE command for beam indication in the list/set/pool of N>1 MAC CE commands for beam indication and/or the MAC CE command for beam indication indicating the second lowest entity ID/index value and/or the MAC CE command for beam indication indicating the TCI state with the second lowest TCI state ID value could correspond to the second MAC CE(s)/bitmap(s) activated CORESETPoolIndex value, and so on, and the last MAC CE command for beam indication in the list/set/pool of N>1 MAC CE commands for beam indication and/or the MAC CE command for beam indication indicating the highest entity ID/index value and/or the MAC CE command for beam indication indicating the TCI state with the highest TCI state ID value could correspond to the last MAC CE(s)/bitmap(s) activated CORESETPoolIndex value. Other exact association/mapping relationships between the MAC CE commands for beam indication (and therefore, the TCI states/beams indicated therein) and the CORESET-PoolIndex values and/or the corresponding indication method(s), e.g., via higher layer RRC signaling and/or MAC CE command and/or dynamic DCI signaling, are also possible.

In yet another example-1.1.d, the UE could be implicitly indicated by the network the association/mapping between the MAC CE commands for beam indication (and therefore, the TCI states/beams indicated therein) and the CORESET-PoolIndex values. The UE could be higher layer configured by the network a list/set/pool of CORESETPoolIndex values—e.g., a set of two CORESETPoolIndex values 0 and 1. The UE could also receive from the network one or more MAC CE activation commands/bitmaps to activate one or more CORESETPoolIndex values from the higher layer configured list/set/pool of CORESETPoolIndex values. For example, the first MAC CE command for beam indication in the list/set/pool of N>1 MAC CE commands for beam indication and/or the MAC CE command for beam indication indicating the lowest entity ID/index value and/or the MAC CE command for beam indication indicating the lowest TCI state ID value could correspond to the lowest/lowest MAC CE activated CORESETPoolIndex value, the second MAC CE command for beam indication in the list/set/pool of N>1 MAC CE commands for beam indication and/or the MAC CE command for beam indication indicating the second lowest entity ID/index value and/or the MAC CE command for beam indication indicating the second lowest TCI state ID value could correspond to the second lowest/second lowest MAC CE activated CORE-SETPoolIndex value, and so on, and the last MAC CE command for beam indication in the list/set/pool of N>1 MAC CE commands for beam indication and/or the MAC CE command for beam indication indicating the highest entity ID/index value and/or the MAC CE command for beam indication indicating the highest TCI state ID value could correspond to the highest/highest MAC CE activated CORESETPoolIndex value.

For another example, the first MAC CE command for beam indication in the list/set/pool of N>1 MAC CE commands for beam indication and/or the MAC CE command for beam indication indicating the lowest entity ID/index value and/or the MAC CE command for beam indication indicating the lowest TCI state ID value could correspond to the highest/highest MAC CE activated CORESETPoolIndex value, the second MAC CE command for beam indication in the list/set/pool of N>1 MAC CE commands for beam indication and/or the MAC CE command for beam indication indicating the second lowest entity ID/index value and/or the MAC CE command for beam indication indicating the second lowest TCI state ID value could correspond to the second highest/second highest MAC CE activated CORESETPoolIndex value, and so on, and the last MAC CE command for beam indication in the list/set/pool of N>1 MAC CE commands for beam indication and/or the MAC CE command for beam indication indicating the highest entity ID/index value and/or the MAC CE command for beam indication indicating the highest TCI state ID value indicated could correspond to the lowest/lowest MAC CE activated CORESETPoolIndex value. Other implicit indication methods of the association/mapping between the N>1 MAC CE commands for beam indication (and therefore, the TCI states/beams indicated therein) and the CORESET-PoolIndex values are also possible.

In yet another example-1.1.e, a MAC CE command for beam indication could include/comprise/incorporate at least one ID/index value. For example, this ID/index value could be a (absolute) TRP-specific ID/index value such as PCI value, TRP ID value, TRP index value and etc., based on a list/set/pool of TRP-specific ID/index values, e.g., higher layer configured to the UE and/or higher layer configured to the UE and activated by one or more MAC CE activation commands/bitmaps. For another example, this ID/index value could be an (relative) index within the list/set/pool of TRP-specific ID/index values, e.g., higher layer configured to the UE and/or higher layer configured to the UE and activated by one or more MAC CE activation commands/bitmaps. For yet another example, this ID/index value could be a CORESETPoolIndex value. The MAC CE command for beam indication may indicate/update the corresponding TCI state(s) for the TRP(s) associated with the same ID/index value, e.g., the CORESETPoolIndex value, as that indicated in the MAC CE command for beam indication.

FIG. 11 illustrates an example of DCI based TCI state/beam indication 1100 according to embodiments of the present disclosure. An embodiment of the DCI based TCI state/beam indication 1100 shown in FIG. 11 is for illustration only.

In FIG. 11, an example of DCI based TCI state/beam indication for the multi-TRP operation with PDSCH(s) repetition is presented. As illustrated in FIG. 11, the UE could be first higher layer configured by the network, e.g., via the higher layer RRC signaling, a list/pool of N_tci TCI states. Each TCI state contains at least a QCL source RS with a QCL type, e.g., QCL-typeA/B/C/D. The UE could then receive from the network one or more DCIs to indicate one or more beam(s) (i.e., the TCI state(s)) for the transmission/reception of the PDSCH(s) transmitted from/associated with one or more TRPs in a multi-TRP system on the same time-frequency domain resource(s). For instance, the UE could receive from the network a single DCI to indicate N>1 TCI states/beams for the same PDSCH(s) transmitted from/associated with different TRPs in the multi-TRP system on the same time-frequency domain resource(s).

As depicted in FIG. 9 and FIG. 11, the UE could receive from the network a single DCI to indicate N=2 TCI states/beams (TCI #3 and TCI #5) for the same PDSCH-a transmitted from/associated with two TRPs, i.e., TRP-1 and TRP-2, in the multi-TRP system, respectively, on the same time-frequency domain resource(s).

As described above, a DCI used to indicate to the UE a beam (i.e., a TCI state and/or a TCI state ID) for the transmission/reception of a PDCCH or a PDSCH could be at least one of the following: (1) a DL related DCI (e.g., DCI format 1_0, DCI format 1_1 or DCI format 1_2) could be used to indicate to the UE a beam (i.e., a TCI state and/or a TCI state ID) for the transmission/reception of a PDCCH or a PDSCH, wherein the DL related DCI may or may not include a DL assignment; (2) an UL related DCI (e.g., DCI format 0_0, DCI format 0_1, DCI format 0_2) could be used to indicate to the UE a beam (i.e., a TCI state and/or a TCI state ID) for the transmission/reception of a PDCCH or a PDSCH, wherein the UL related DCI may or may not include an UL scheduling grant; and/or (3) a custom/purpose designed DCI format could be used to indicate to the UE a beam (i.e., a TCI state and/or a TCI state ID) for the transmission/reception of a PDCCH or a PDSCH.

Furthermore, the TCI state indicated in the DCI for beam indication could be at least one of: (1) a DL TCI state; (2)

an UL TCI state; (3) a joint DL and UL TCI state; and/or (4) separate DL TCI state and UL TCI state.

The association/mapping between the TCI state(s)/beam(s) indicated in the DCI(s) and the TRPs in the multi-TRP system needs to be specified. There could be various means to associate/map the TCI state(s)/beam(s) indicated in the DCI(s) and the TRPs in the multi-TRP system.

For N>1 TCI states/beams indication in a single DCI, in one example-1.2.1, the UE could be explicitly indicated by the network, e.g., via higher layer RRC signaling and/or MAC CE command and/or dynamic DCI signaling, the exact association/mapping between the TCI states/beams indicated in the DCI and the TRPs in the multi-TRP system. For example, the UE could be first higher layer configured by the network a list/set/pool of TRP-specific ID/index values such as PCIs. The first TCI state and/or the TCI state with the lowest TCI state ID value indicated in the DCI for beam indication could correspond to the first entry/TRP in the list/set/pool of TRP-specific ID/index values, the second TCI state and/or the TCI state with the second lowest TCI state ID value indicated in the DCI for beam indication could correspond to the second entry/TRP in the list/set/pool of TRP-specific ID/index values, and so on, and the last TCI state and/or the TCI state with the highest TCI state ID value indicated in the DCI for beam indication could correspond to the last entry/TRP in the list/set/pool of TRP-specific ID/index values.

For another example, the UE could be first higher layer configured by the network a list/set/pool of TRP-specific ID/index values such as PCIs. The UE could then receive from the network one or more MAC CE activation commands/bitmaps to activate one or more TRP-specific ID/index values from the higher layer configured list/set/pool of TRP-specific ID/index values. The first TCI state and/or the TCI state with the lowest TCI state ID value indicated in the DCI for beam indication could correspond to the first MAC CE(s)/bitmap(s) activated TRP-specific ID/index value, the second TCI state and/or the TCI state with the second lowest TCI state ID value indicated in the DCI for beam indication could correspond to the second MAC CE(s)/bitmap(s) activated TRP-specific ID/index value, and so on, and the last TCI state and/or the TCI state with the highest TCI state ID value indicated in the DCI for beam indication could correspond to the last MAC CE(s)/bitmap(s) activated TRP-specific ID/index value. Other exact association/mapping relationships between the TCI states/beams indicated in the DCI for beam indication and the TRPs in the multi-TRP system and/or the corresponding indication method(s), e.g., via higher layer RRC signaling and/or MAC CE command and/or dynamic DCI signaling, are also possible.

For N>1 TCI states/beams indication in a single DCI, in another example-1.2.2, the UE could be implicitly indicated by the network the association/mapping between the TCI states/beams indicated in the DCI for beam indication and the TRPs in the multi-TRP system. The UE could be higher layer configured by the network a list/set/pool of TRP-specific ID/index values such as PCIs. The UE could also receive from the network one or more MAC CE activation commands/bitmaps to activate one or more TRP-specific ID/index values from the higher layer configured list/set/pool of TRP-specific ID/index values. For example, the first TCI state and/or the TCI state with the lowest TCI state ID value indicated in the DCI for beam indication could correspond to the TRP with the lowest/lowest MAC CE activated TRP-specific ID/index value such as the lowest PCI value and/or the first TRP (e.g., TRP #1), the second TCI state and/or the TCI state with the second lowest TCI state ID value indicated in the DCI for beam indication could correspond to the TRP with the second lowest/second lowest MAC CE activated TRP-specific ID/index value such as the second lowest PCI value and/or the second TRP (e.g., TRP #2), and so on, and the last TCI state and/or the TCI state with the highest TCI state ID value indicated in the DCI for beam indication could correspond to the TRP with the highest/highest MAC CE activated TRP-specific ID/index value such as the highest PCI value and/or the last TRP (e.g., TRP #N).

For another example, the first TCI state and/or the TCI state with the lowest TCI state ID value indicated in the DCI for beam indication could correspond to the TRP with the highest/highest MAC CE activated TRP-specific ID/index value such as PCI value, the second TCI state and/or the TCI state with the second lowest TCI state ID value indicated in the DCI for beam indication could correspond to the TRP with the second highest/second highest MAC CE activated TRP-specific ID/index value such as PCI value, and so on, and the last TCI state and/or the TCI state with the highest TCI state ID value indicated in the DCI for beam indication could correspond to the TRP with the lowest/lowest MAC CE activated TRP-specific ID/index value such as PCI value. Other implicit indication methods of the association/mapping between the N>1 TCI states/beams indicated in the DCI and the TRPs in the multi-TRP system are also possible.

For N>1 TCI states/beams indication in a single DCI, in yet another example-1.2.3, the UE could be explicitly indicated by the network, e.g., via higher layer RRC signaling and/or MAC CE command and/or dynamic DCI signaling, the exact association/mapping between the TCI states/beams indicated in the DCI for beam indication and the CORE-SETPoolIndex values. For example, the UE could be first higher layer configured by the network a list/set/pool of CORESETPoolIndex values—e.g., a set of two CORESET-PoolIndex values 0 and 1. The first TCI state and/or the TCI state with the lowest TCI state ID value indicated in the DCI for beam indication could correspond to the first entry/CORESETPoolIndex value in the list/set/pool of CORE-SETPoolIndex values, the second TCI state and/or the TCI state with the second lowest TCI state ID value indicated in the DCI for beam indication could correspond to the second entry/CORESETPoolIndex value in the list/set/pool of CORESETPoolIndex values, and so on, and the last TCI state and/or the TCI state with the highest TCI state ID value indicated in the DCI for beam indication could correspond to the last entry/CORESETPoolIndex value in the list/set/pool of CORESETPoolIndex values.

For another example, the UE could be first higher layer configured by the network a list/set/pool of CORESET-PoolIndex values—e.g., a set of two CORESETPoolIndex values 0 and 1. The UE could then receive from the network one or more MAC CE activation commands/bitmaps to activate one or more CORESETPoolIndex values from the higher layer configured list/set/pool of CORESETPoolIndex values. The first TCI state and/or the TCI state with the lowest TCI state ID value indicated in the DCI for beam indication could correspond to the first MAC CE(s)/bitmap(s) activated CORESETPoolIndex value, the second TCI state and/or the TCI state with the second lowest TCI state ID value indicated in the DCI for beam indication could correspond to the second MAC CE(s)/bitmap(s) activated CORESETPoolIndex value, and so on, and the last TCI state and/or the TCI state with the highest TCI state ID value indicated in the DCI for beam indication could correspond to the last MAC CE(s)/bitmap(s) activated CORESET-PoolIndex value. Other exact association/mapping relationships between the TCI states/beams indicated in the DCI for beam indication and the CORESETPoolIndex values and/or the corresponding indication method(s), e.g., via higher layer RRC signaling and/or MAC CE command and/or dynamic DCI signaling, are also possible.

For N>1 TCI states/beams indication in a single DCI, in yet another example-1.2.4, the UE could be implicitly indicated by the network the association/mapping between the TCI states/beams indicated in the DCI for beam indication and the CORESETPoolIndex values. The UE could be higher layer configured by the network a list/set/pool of CORESETPoolIndex values—e.g., a set of two CORESET-PoolIndex values 0 and 1. The UE could also receive from the network one or more MAC CE activation commands/bitmaps to activate one or more CORESETPoolIndex values from the higher layer configured list/set/pool of CORESET-PoolIndex values. For example, the first TCI state and/or the TCI state with the lowest TCI state ID value indicated in the DCI for beam indication could correspond to the lowest/lowest MAC CE activated CORESETPoolIndex value such as "0," the second TCI state and/or the TCI state with the second lowest TCI state ID value indicated in the DCI for beam indication could correspond to the second lowest/second lowest MAC CE activated CORESETPoolIndex value such as "1," and so on, and the last TCI state and/or the TCI state with the highest TCI state ID value indicated in the DCI for beam indication could correspond to the highest/highest MAC CE activated CORESETPoolIndex value such as "N−1."

For another example, the first TCI state and/or the TCI state with the lowest TCI state ID value indicated in the DCI for beam indication could correspond to the highest/highest MAC CE activated CORESETPoolIndex value, the second TCI state and/or the TCI state with the second lowest TCI state ID value indicated in the DCI for beam indication could correspond to the second highest/second highest MAC CE activated CORESETPoolIndex value, and so on, and the last TCI state and/or the TCI state with the highest TCI state ID value indicated in the DCI for beam indication could correspond to the lowest/lowest MAC CE activated CORE-SETPoolIndex value. Other implicit indication methods of the association/mapping between the N>1 TCI states/beams indicated in the DCI for beam indication and the CORE-SETPoolIndex values are also possible.

For N>1 TCI states/beams indication in a single DCI, in yet another example-1.2.5, a TCI state, e.g., the higher layer parameter TCI-State, indicated in the DCI for beam indication could include/comprise/incorporate at least one ID/index value. For example, this ID/index value could be a (absolute) TRP-specific ID/index value such as PCI value, TRP ID value, TRP index value and etc., based on a list/set/pool of TRP-specific ID/index values, e.g., higher layer configured to the UE and/or higher layer configured to the UE and activated by one or more MAC CE activation commands/bitmaps. For another example, this ID/index value could be an (relative) index within the list/set/pool of TRP-specific ID/index values, e.g., higher layer configured to the UE and/or higher layer configured to the UE and activated by one or more MAC CE activation commands/bitmaps. For yet another example, this ID/index value could be a CORESETPoolIndex value.

For N>1 DCIs with each DCI indicating a single TCI state/beam, in one example-1.2.a, the UE could be explicitly indicated by the network, e.g., via higher layer RRC signaling and/or MAC CE command and/or dynamic DCI signaling, the exact association/mapping between the DCIs for beam indication (and therefore, the TCI states/beams indicated therein) and the TRPs in the multi-TRP system. For example, the UE could be first higher layer configured by the network a list/set/pool of TRP-specific ID/index values such as PCIs. The DCI for beam indication associated with the lowest CORESETPoolIndex value (indicated in the corresponding higher layer parameter ControlResourceSet) and/or the DCI for beam indication indicating the TCI state with the lowest TCI state ID value could correspond to the first entry/TRP in the list/set/pool of TRP-specific ID/index values, the DCI for beam indication associated with the second lowest CORESETPoolIndex value (indicated in the corresponding higher layer parameter ControlResourceSet) and/or the DCI for beam indication indicating the TCI state with the second lowest TCI state ID value could correspond to the second entry/TRP in the list/set/pool of TRP-specific ID/index values, and so on, and the DCI for beam indication associated with the highest CORESETPoolIndex value (indicated in the corresponding higher layer parameter ControlResourceSet) and/or the DCI for beam indication indicating the TCI state with the highest TCI state ID value could correspond to the last entry/TRP in the list/set/pool of TRP-specific ID/index values.

For another example, the UE could be first higher layer configured by the network a list/set/pool of TRP-specific ID/index values such as PCIs. The UE could then receive from the network one or more MAC CE activation commands/bitmaps to activate one or more TRP-specific ID/index values from the higher layer configured list/set/pool of TRP-specific ID/index values. The DCI for beam indication associated with the lowest CORESETPoolIndex value (indicated in the corresponding higher layer parameter ControlResourceSet) and/or the DCI for beam indication indicating the TCI state with the lowest TCI state ID value could correspond to the first MAC CE(s)/bitmap(s) activated TRP-specific ID/index values, the DCI for beam indication associated with the second lowest CORESETPoolIndex value (indicated in the corresponding higher layer parameter ControlResourceSet) and/or the DCI for beam indication indicating the TCI state with the second lowest TCI state ID value could correspond to the second MAC CE(s)/bitmap(s) activated TRP-specific ID/index values, and so on, and the DCI for beam indication associated with the highest CORESETPoolIndex value (indicated in the corresponding higher layer parameter ControlResourceSet) and/or the DCI for beam indication indicating the TCI state with the highest TCI state ID value could correspond to the last MAC CE(s)/bitmap(s) activated TRP-specific ID/index values. Other exact association/mapping relationships between the DCIs for beam indication (and therefore, the TCI states/beams indicated therein) and the TRPs in the multi-TRP system and/or the corresponding indication method(s), e.g., via higher layer RRC signaling and/or MAC CE command and/or dynamic DCI signaling, are also possible.

For N>1 DCIs with each DCI indicating a single TCI state/beam, in another example-1.2.b, the UE could be implicitly indicated by the network the association/mapping between the DCIs for beam indication (and therefore, the TCI states/beams indicated therein) and the TRPs in the multi-TRP system. The UE could be higher layer configured by the network a list/set/pool of TRP-specific ID/index values such as PCIs. The UE could also receive from the network one or more MAC CE activation commands/bitmaps to activate one or more TRP-specific ID/index values from the higher layer configured list/set/pool of TRP-specific ID/index values.

For example, the DCI for beam indication associated with the lowest CORESETPoolIndex value (indicated in the corresponding higher layer parameter ControlResourceSet) and/or the DCI for beam indication indicating the lowest TCI state ID value could correspond to the TRP with the lowest/lowest MAC CE activated TRP-specific ID/index value such as the lowest PCI value and/or the first TRP (e.g., TRP #1), the DCI for beam indication associated with the second lowest CORESETPoolIndex value (indicated in the corresponding higher layer parameter ControlResourceSet) and/or the DCI for beam indication indicating the second lowest TCI state ID value could correspond to the TRP with the second lowest/second lowest MAC CE activated TRP-specific ID/index value such as the second lowest PCI value and/or the second TRP (e.g., TRP #2), and so on, and the DCI for beam indication associated with the highest CORESETPoolIndex value (indicated in the corresponding higher layer parameter ControlResourceSet) and/or the DCI for beam indication indicating the highest TCI state ID value could correspond to the TRP with the highest/highest MAC CE activated TRP-specific ID/index value such as the highest PCI value and/or the last TRP (e.g., TRP #N).

For another example, the DCI for beam indication associated with the lowest CORESETPoolIndex value (indicated in the corresponding higher layer parameter ControlResourceSet) and/or the DCI for beam indication indicating the lowest TCI state ID value could correspond to the TRP with the highest/highest MAC CE activated TRP-specific ID/index value such as PCI value, the DCI for beam indication associated with the second lowest CORESETPoolIndex value (indicated in the corresponding higher layer parameter ControlResourceSet) and/or the DCI for beam indication indicating the second lowest TCI state ID value could correspond to the TRP with the second highest/second highest MAC CE activated TRP-specific ID/index value such as PCI value, and so on, and the DCI for beam indication associated with the highest CORESETPoolIndex value (indicated in the corresponding higher layer parameter ControlResourceSet) and/or the DCI for beam indication indicating the highest TCI state ID value could correspond to the TRP with the lowest/lowest MAC CE activated TRP-specific ID/index value such as PCI value. Other implicit indication methods of the association/mapping between the N>1 DCIs for beam indication (and therefore, the TCI states/beams indicated therein) and the TRPs in the multi-TRP system are also possible.

For N>1 DCIs with each DCI indicating a single TCI state/beam, in yet another example-1.2.c, a DCI for beam indication could include/comprise/incorporate at least one ID/index value. For example, this ID/index value could be a (absolute) TRP-specific ID/index value such as PCI value, TRP ID value, TRP index value and etc., based on a list/set/pool of TRP-specific ID/index values, e.g., higher layer configured to the UE and/or higher layer configured to the UE and activated by one or more MAC CE activation commands/bitmaps. For another example, this ID/index value could be an (relative) index within the list/set/pool of TRP-specific ID/index values, e.g., higher layer configured to the UE and/or higher layer configured to the UE and activated by one or more MAC CE activation commands/bitmaps. For yet another example, this ID/index value could be a CORESETPoolIndex value. The DCI for beam indication may indicate/update the corresponding TCI state(s) for the TRP(s) associated with the same ID/index value, e.g., the CORESETPoolIndex value, as that indicated in the DCI for beam indication.

Figure 12:
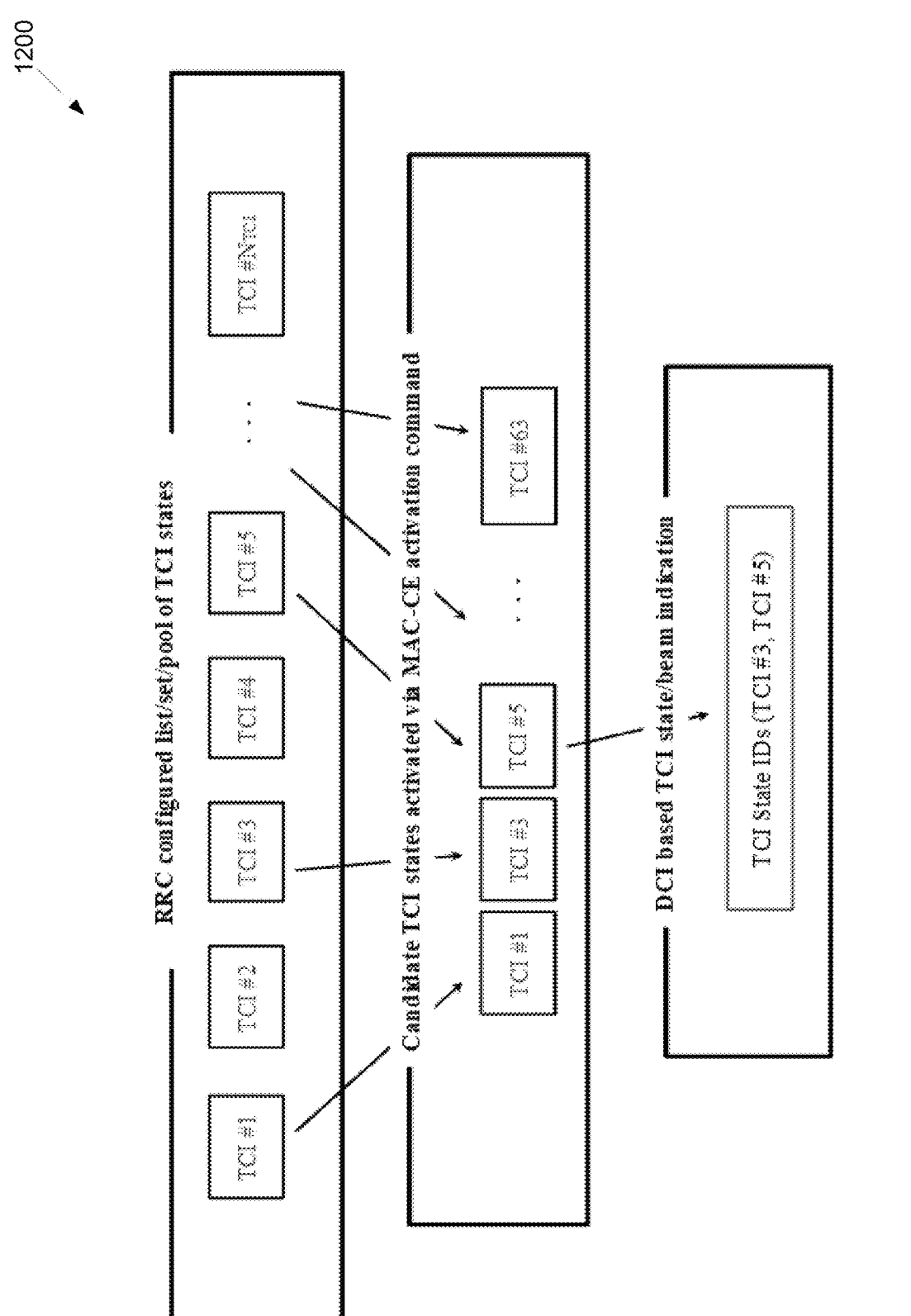
FIG. 12 illustrates another example of DCI based TCI state/beam indication according to embodiments of the present disclosure.

FIG. 12 illustrates another example of DCI based TCI state/beam indication 1200 according to embodiments of the present disclosure. An embodiment of the DCI based TCI state/beam indication 1200 shown in FIG. 12 is for illustration only.

In FIG. 12, an example of DCI based TCI state/beam indication (with MAC CE activated TCI states) for the multi-TRP operation and PDSCH(s) repetition is presented. As illustrated in FIG. 12, the UE could be first higher layer configured by the network, e.g., via the higher layer RRC signaling, a list/pool of N_tci TCI states. Each TCI state contains at least a QCL source RS with a QCL type, e.g., QCL-typeA/B/C/D. The UE could then receive from the network one or more MAC CE activation commands activating one or more TCI states from the higher layer configured list/pool of TCI states, e.g., up to eight TCI states could be activated by a MAC CE activation command. The UE could receive from the network one or more DCIs to indicate one or more beam(s) (i.e., the TCI state(s)) from the MAC CE activated TCI state(s)/beam(s) for the transmission/reception of the PDSCH(s) transmitted from/associated with one or more TRPs in a multi-TRP system on the same time-frequency domain resource(s).

For instance, the UE could receive from the network a single DCI to indicate N'>1 TCI states/beams from the MAC CE activated TCI states/beams for the same PDSCH(s) transmitted from/associated with different TRPs in the multi-TRP system on the same time-frequency domain resource(s). As depicted in FIG. 9 and FIG. 12, the UE could receive from the network a single DCI to indicate N'=2 TCI states/beams (TCI #3 and TCI #5) from the MAC CE activated TCI states/beams for the same PDSCH-a transmitted from/associated with two TRPs, i.e., TRP-1 and TRP-2, in the multi-TRP system, respectively, on the same time-frequency domain resource(s).

As described above, a DCI used to indicate to the UE a beam (i.e., a TCI state and/or a TCI state ID) for the transmission/reception of a PDCCH or a PDSCH could be at least one of the following: (1) a DL related DCI (e.g., DCI format 1_0, DCI format 1_1 or DCI format 1_2) could be used to indicate to the UE a beam (i.e., a TCI state and/or a TCI state ID) for the transmission/reception of a PDCCH or a PDSCH, wherein the DL related DCI may or may not include a DL assignment; (2) an UL related DCI (e.g., DCI format 0_0, DCI format 0_1, DCI format 0_2) could be used to indicate to the UE a beam (i.e., a TCI state and/or a TCI state ID) for the transmission/reception of a PDCCH or a PDSCH, wherein the UL related DCI may or may not include an UL scheduling grant; and/or (3) a custom/purpose designed DCI format could be used to indicate to the UE a beam (i.e., a TCI state and/or a TCI state ID) for the transmission/reception of a PDCCH or a PDSCH.

Furthermore, the TCI state indicated in the DCI for beam indication could be at least one of: (1) a DL TCI state; (2) an UL TCI state; (3) a joint DL and UL TCI state; and/or (4) separate DL TCI state and UL TCI state.

The association/mapping between the DCI(s) indicated TCI state(s)/beam(s)—from the MAC CE activated TCI state(s)/beam(s)—and the TRPs in the multi-TRP system needs to be specified. There could be various means to associate/map the DCI(s) indicated TCI state(s)/beam(s)—from the MAC CE activated TCI state(s)/beam(s)—and the TRPs in the multi-TRP system.

For N'>1 TCI states/beams indication in a single DCI, in one example-1.3.1, the UE could be explicitly indicated by the network, e.g., via higher layer RRC signaling and/or MAC CE command and/or dynamic DCI signaling, the exact association/mapping between the DCI indicated TCI states/beams (selected from the MAC CE activated TCI states/beams) and the TRPs in the multi-TRP system. For example, the UE could be first higher layer configured by the network a list/set/pool of TRP-specific ID/index values such as PCIs. The first TCI state and/or the TCI state with the lowest TCI state ID value indicated in the DCI for beam indication could correspond to the first entry/TRP in the list/set/pool of TRP-specific ID/index values, the second TCI state and/or the TCI state with the second lowest TCI state ID value indicated in the DCI for beam indication could correspond to the second entry/TRP in the list/set/pool of TRP-specific ID/index values, and so on, and the last TCI state and/or the TCI state with the highest TCI state ID value indicated in the DCI for beam indication could correspond to the last entry/TRP in the list/set/pool of TRP-specific ID/index values.

For another example, the UE could be first higher layer configured by the network a list/set/pool of TRP-specific ID/index values such as PCIs. The UE could then receive from the network one or more MAC CE activation commands/bitmaps to activate one or more TRP-specific ID/index values from the higher layer configured list/set/pool of TRP-specific ID/index values. The first TCI state and/or the TCI state with the lowest TCI state ID value indicated in the DCI for beam indication could correspond to the first MAC CE(s)/bitmap(s) activated TRP-specific ID/index value, the second TCI state and/or the TCI state with the second lowest TCI state ID value indicated in the DCI for beam indication could correspond to the second MAC CE(s)/bitmap(s) activated TRP-specific ID/index value, and so on, and the last TCI state and/or the TCI state with the highest TCI state ID value indicated in the DCI for beam indication could correspond to the last MAC CE(s)/bitmap(s) activated TRP-specific ID/index value. Other exact association/mapping relationships between the DCI indicated TCI states/beams (selected from the MAC CE activated TCI states/beams) and the TRPs in the multi-TRP system and/or the corresponding indication method(s), e.g., via higher layer RRC signaling and/or MAC CE command and/or dynamic DCI signaling, are also possible.

For N'>1 TCI states/beams indication in a single DCI, in another example-1.3.2, the UE could be implicitly indicated by the network the association/mapping between the DCI indicated TCI states/beams (selected from the MAC CE activated TCI states/beams) and the TRPs in the multi-TRP system. The UE could be higher layer configured by the network a list/set/pool of TRP-specific ID/index values such as PCIs. The UE could also receive from the network one or more MAC CE activation commands/bitmaps to activate one or more TRP-specific ID/index values from the higher layer configured list/set/pool of TRP-specific ID/index values.

For example, the first TCI state and/or the TCI state with the lowest TCI state ID value indicated in the DCI for beam indication could correspond to the TRP with the lowest/lowest MAC CE activated TRP-specific ID/index value such as the lowest PCI value and/or the first TRP (e.g., TRP #1), the second TCI state and/or the TCI state with the second lowest TCI state ID value indicated in the DCI for beam indication could correspond to the TRP with the second lowest/second lowest MAC CE activated TRP-specific ID/index value such as the second lowest PCI value and/or the second TRP (e.g., TRP #2), and so on, and the last TCI state and/or the TCI state with the highest TCI state ID value indicated in the DCI for beam indication could correspond to the TRP with the highest/highest MAC CE activated TRP-specific ID/index value such as the highest PCI value and/or the last TRP (e.g., TRP #N').

For another example, the first TCI state and/or the TCI state with the lowest TCI state ID value indicated in the DCI for beam indication could correspond to the TRP with the highest/highest MAC CE activated TRP-specific ID/index value such as the highest PCI value and/or the last TRP (e.g., TRP #N'), the second TCI state and/or the TCI state with the second lowest TCI state ID value indicated in the DCI for beam indication could correspond to the TRP with the second highest/second highest MAC CE activated TRP-specific ID/index value such as the second highest PCI value and/or the second last TRP (e.g., TRP #N'−1), and so on, and the last TCI state and/or the TCI state with the highest TCI state ID value indicated in the DCI for beam indication could correspond to the TRP with the lowest/lowest MAC CE activated TRP-specific ID/index value such as the lowest PCI value and/or the first TRP (e.g., TRP #1). Other implicit indication methods of the association/mapping between the N'>1 DCI indicated TCI states/beams (selected from the MAC CE activated TCI states/beams) and the TRPs in the multi-TRP system are also possible.

For N'>1 TCI states/beams indication in a single DCI, in yet another example-1.3.3, the UE could be explicitly indicated by the network, e.g., via higher layer RRC signaling and/or MAC CE command and/or dynamic DCI signaling, the exact association/mapping between the DCI indicated TCI states/beams (selected from the MAC CE activated TCI states/beams) and the CORESETPoolIndex values.

For example, the UE could be first higher layer configured by the network a list/set/pool of CORESETPoolIndex values—e.g., a set of two CORESETPoolIndex values 0 and 1. The first TCI state and/or the TCI state with the lowest TCI state ID value indicated in the DCI for beam indication could correspond to the first entry/CORESETPoolIndex value in the list/set/pool of CORESETPoolIndex values, the second TCI state and/or the TCI state with the second lowest TCI state ID value indicated in the DCI for beam indication could correspond to the second entry/CORESETPoolIndex value in the list/set/pool of CORESETPoolIndex values, and so on, and the last TCI state and/or the TCI state with the highest TCI state ID value indicated in the DCI for beam indication could correspond to the last entry/CORESETPoolIndex value in the list/set/pool of CORESETPoolIndex values.

For another example, the UE could be first higher layer configured by the network a list/set/pool of CORESETPoolIndex values—e.g., a set of two CORESETPoolIndex values 0 and 1. The UE could then receive from the network one or more MAC CE activation commands/bitmaps to activate one or more CORESETPoolIndex values from the higher layer configured list/set/pool of CORESETPoolIndex values. The first TCI state and/or the TCI state with the lowest TCI state ID value indicated in the DCI for beam indication could correspond to the first MAC CE(s)/bitmap(s) activated CORESETPoolIndex value, the second TCI state and/or the TCI state with the second lowest TCI state ID value indicated in the DCI for beam indication could correspond to the second MAC CE(s)/bitmap(s) activated CORESETPoolIndex value, and so on, and the last TCI state and/or the TCI state with the highest TCI state ID value indicated in the DCI for beam indication could correspond to the last MAC CE(s)/bitmap(s) activated CORESETPoolIndex value. Other exact association/mapping relationships between the DCI indicated TCI states/beams (selected from the MAC CE activated TCI states/beams) and the CORESETPoolIndex values and/or the corresponding indication method(s), e.g., via higher layer RRC signaling and/or MAC CE command and/or dynamic DCI signaling, are also possible.

For N'>1 TCI states/beams indication in a single DCI, in yet another example-1.3.4, the UE could be implicitly indicated by the network the association/mapping between the DCI indicated TCI states/beams (selected from the MAC CE activated TCI states/beams) and the CORESETPoolIndex values. The UE could be higher layer configured by the network a list/set/pool of CORESETPoolIndex values—e.g., a set of two CORESETPoolIndex values 0 and 1. The UE could also receive from the network one or more MAC CE activation commands/bitmaps to activate one or more CORESETPoolIndex values from the higher layer configured list/set/pool of CORESETPoolIndex values.

For example, the first TCI state and/or the TCI state with the lowest TCI state ID value indicated in the DCI for beam indication could correspond to the lowest/lowest MAC CE activated CORESETPoolIndex value such as "0," the second TCI state and/or the TCI state with the second lowest TCI state ID value indicated in the DCI for beam indication could correspond to the second lowest/second lowest MAC CE activated CORESETPoolIndex value such as "1," and so on, and the last TCI state and/or the TCI state with the highest TCI state ID value indicated in the DCI for beam indication could correspond to the highest/highest MAC CE activated CORESETPoolIndex value such as "N−1."

For another example, the first TCI state and/or the TCI state with the lowest TCI state ID value indicated in the DCI for beam indication could correspond to the highest/highest MAC CE activated CORESETPoolIndex value, the second TCI state and/or the TCI state with the second lowest TCI state ID value indicated in the DCI for beam indication could correspond to the second highest/second highest MAC CE activated CORESETPoolIndex value, and so on, and the last TCI state and/or the TCI state with the highest TCI state ID value indicated in the DCI for beam indication could correspond to the lowest/lowest MAC CE activated CORESETPoolIndex value. Other implicit indication methods of the association/mapping between the N'>1 DCI indicated TCI states/beams (selected from the MAC CE activated TCI states/beams) and the CORESETPoolIndex values are also possible.

For N'>1 TCI states/beams indication in a single DCI, in yet another example-1.3.5, a TCI state (selected from the MAC CE activated TCI states/beams), e.g., the higher layer parameter TCI-State, indicated in the MAC CE command for beam indication could include/comprise/incorporate at least one ID/index value. For example, this ID/index value could be a (absolute) TRP-specific ID/index value such as PCI value, TRP ID value, TRP index value and etc., based on a list/set/pool of TRP-specific ID/index values, e.g., higher layer configured to the UE and/or higher layer configured to the UE and activated by one or more MAC CE activation commands/bitmaps. For another example, this ID/index value could be an (relative) index within the list/set/pool of TRP-specific ID/index values, e.g., higher layer configured to the UE and/or higher layer configured to the UE and activated by one or more MAC CE activation commands/bitmaps. For yet another example, this ID/index value could be a CORESETPoolIndex value.

For N'>1 DCIs with each DCI indicating a single TCI state/beam, in one example-1.3.a, the UE could be explicitly indicated by the network, e.g., via higher layer RRC signaling and/or MAC CE command and/or dynamic DCI signaling, the exact association/mapping between the DCIs for beam indication (and therefore, the TCI states/beams indicated therein—selected from the MAC CE activated TCI states/beams) and the TRPs in the multi-TRP system. For example, the UE could be first higher layer configured by the network a list/set/pool of TRP-specific ID/index values such as PCIs. The DCI for beam indication associated with the lowest CORESETPoolIndex value (indicated in the corresponding higher layer parameter ControlResourceSet) and/or the DCI for beam indication indicating the TCI state with the lowest TCI state ID value could correspond to the first entry/TRP in the list/set/pool of TRP-specific ID/index values, the DCI for beam indication associated with the second lowest CORESETPoolIndex value (indicated in the corresponding higher layer parameter ControlResourceSet) and/or the DCI for beam indication indicating the TCI state with the second lowest TCI state ID value could correspond to the second entry/TRP in the list/set/pool of TRP-specific ID/index values, and so on, and the DCI for beam indication associated with the highest CORESETPoolIndex value (indicated in the corresponding higher layer parameter ControlResourceSet) and/or the DCI for beam indication indicating the TCI state with the highest TCI state ID value could correspond to the last entry/TRP in the list/set/pool of TRP-specific ID/index values.

For another example, the UE could be first higher layer configured by the network a list/set/pool of TRP-specific ID/index values such as PCIs. The UE could then receive from the network one or more MAC CE activation commands/bitmaps to activate one or more TRP-specific ID/index values from the higher layer configured list/set/pool of TRP-specific ID/index values. The DCI for beam indication associated with the lowest CORESETPoolIndex value (indicated in the corresponding higher layer parameter ControlResourceSet) and/or the DCI for beam indication indicating the TCI state with the lowest TCI state ID value could correspond to the first MAC CE(s)/bitmap(s) activated TRP-specific ID/index values, the DCI for beam indication associated with the second lowest CORESETPoolIndex value (indicated in the corresponding higher layer parameter ControlResourceSet) and/or the DCI for beam indication indicating the TCI state with the second lowest TCI state ID value could correspond to the second MAC CE(s)/bitmap(s) activated TRP-specific ID/index values, and so on, and the DCI for beam indication associated with the highest CORESETPoolIndex value (indicated in the corresponding higher layer parameter ControlResourceSet) and/or the DCI for beam indication indicating the TCI state with the highest TCI state ID value could correspond to the last MAC CE(s)/bitmap(s) activated TRP-specific ID/index values. Other exact association/mapping relationships between the DCIs for beam indication (and therefore, the TCI states/beams indicated therein—selected from the MAC CE activated TCI states/beams) and the TRPs in the multi-TRP system and/or the corresponding indication method(s), e.g., via higher layer RRC signaling and/or MAC CE command and/or dynamic DCI signaling, are also possible.

For N'>1 DCIs with each DCI indicating a single TCI state/beam, in another example-1.3.b, the UE could be implicitly indicated by the network the association/mapping between the DCIs for beam indication (and therefore, the TCI states/beams indicated therein—selected from the MAC CE activated TCI states/beams) and the TRPs in the multi-TRP system. The UE could be higher layer configured by the network a list/set/pool of TRP-specific ID/index values such as PCIs. The UE could also receive from the network one or more MAC CE activation commands/bitmaps to activate one or more TRP-specific ID/index values from the higher layer configured list/set/pool of TRP-specific ID/index values.

For example, the DCI for beam indication associated with the lowest CORESETPoolIndex value (indicated in the corresponding higher layer parameter ControlResourceSet) and/or the DCI for beam indication indicating the lowest TCI state ID value could correspond to the TRP with the lowest/lowest MAC CE activated TRP-specific ID/index value such as the lowest PCI value and/or the first TRP (e.g., TRP #1), the DCI for beam indication associated with the second lowest CORESETPoolIndex value (indicated in the corresponding higher layer parameter ControlResourceSet) and/or the DCI for beam indication indicating the second lowest TCI state ID value could correspond to the TRP with the second lowest/second lowest MAC CE activated TRP-specific ID/index value such as the second lowest PCI value and/or the second TRP (e.g., TRP #2), and so on, and the DCI for beam indication associated with the highest CORESETPoolIndex value (indicated in the corresponding higher layer parameter ControlResourceSet) and/or the DCI for beam indication indicating the highest TCI state ID value could correspond to the TRP with the highest/highest MAC CE activated TRP-specific ID/index value such as the highest PCI value and/or the last TRP (e.g., TRP #N').

For another example, the DCI for beam indication associated with the lowest CORESETPoolIndex value (indicated in the corresponding higher layer parameter ControlResourceSet) and/or the DCI for beam indication indicating the lowest TCI state ID value could correspond to the TRP with the highest/highest MAC CE activated TRP-specific ID/index value such as the highest PCI value and/or the last TRP (e.g., TRP #N'), the DCI for beam indication associated with the second lowest CORESETPoolIndex value (indicated in the corresponding higher layer parameter ControlResourceSet) and/or the DCI for beam indication indicating the second lowest TCI state ID value could correspond to the TRP with the second highest/second highest MAC CE activated TRP-specific ID/index value such as the second highest PCI value and/or the second last TRP (e.g., TRP #N'-1), and so on, and the DCI for beam indication associated with the highest CORESETPoolIndex value (indicated in the corresponding higher layer parameter ControlResourceSet) and/or the DCI for beam indication indicating the highest TCI state ID value could correspond to the TRP with the lowest/lowest MAC CE activated TRP-specific ID/index value such as the lowest PCI value and/or the first TRP (e.g., TRP #1). Other implicit indication methods of the association/mapping between the N'>1 DCIs for beam indication (and therefore, the TCI states/beams indicated therein— selected from the MAC CE activated TCI states/beams) and the TRPs in the multi-TRP system are also possible.

For N'>1 DCIs with each DCI indicating a single TCI state/beam, in yet another example-1.3.c, a DCI for beam indication (indicating the TCI state(s)/beam(s) selected from the MAC CE activated TCI states/beams) could include/ comprise/incorporate at least one ID/index value. For example, this ID/index value could be a (absolute) TRP-specific ID/index value such as PCI value, TRP ID value, TRP index value and etc., based on a list/set/pool of TRP-specific ID/index values, e.g., higher layer configured to the UE and/or higher layer configured to the UE and activated by one or more MAC CE activation commands/bitmaps. For another example, this ID/index value could be an (relative) index within the list/set/pool of TRP-specific ID/index values, e.g., higher layer configured to the UE and/or higher layer configured to the UE and activated by one or more MAC CE activation commands/bitmaps.

For yet another example, this ID/index value could be a CORESETPoolIndex value. The DCI for beam indication (indicating the TCI state(s)/beam(s) selected from the MAC CE activated TCI states/beams) may indicate/update the corresponding TCI state(s) for the TRP(s) associated with the same ID/index value, e.g., the CORESETPoolIndex value, as that indicated in the DCI for beam indication (indicating the TCI state(s)/beam(s) selected from the MAC CE activated TCI states/beams).

Figure 13:
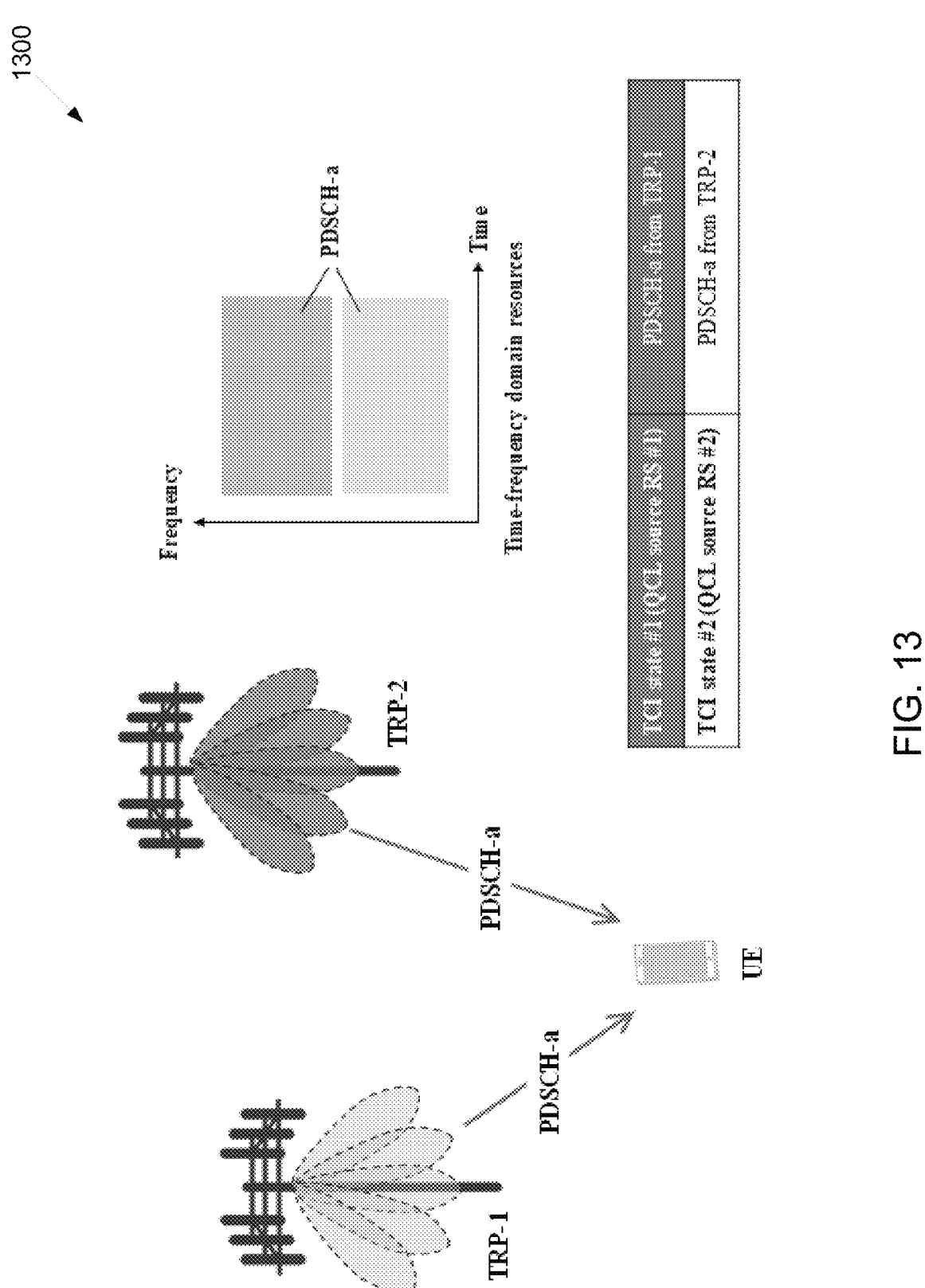
FIG. 13 illustrates an example of FDM based PDSCH(s) repetition in a multi-TRP system according to embodiments of the present disclosure.

FIG. 13 illustrates an example of FDM based PDSCH(s) repetition in a multi-TRP system 1300 according to embodiments of the present disclosure. An embodiment of the FDM based PDSCH(s) repetition in a multi-TRP system 1300 shown in FIG. 13 is for illustration only.

One conceptual example of FDM based PDSCH(s) repetition in a multi-TRP system is presented in FIG. 13. As depicted in FIG. 13, the UE could receive the same PDSCH, i.e., PDSCH-a, from both TRP-1 and TRP-2 on different/non-overlapping frequency domain resources. The UE could be indicated by the network different TCI states—TCI state #1 and TCI state #2 in FIG. 13 (and therefore, different QCL source RSs indicated therein—QCL source RS #1 and QCL source RS #2 in FIG. 13) for the same PDSCH—PDSCH-a in FIG. 13—transmitted from different TRPs—TRP-1 and TRP-2 in FIG. 13—in the multi-TRP system, on different/non-overlapping frequency domain resources.

The frequency domain resources indicated in the frequency domain resource allocation (FD-RA) field(s) could be associated with different TRPs in the multi-TRP system. The FD-RA field could contain a bitmap with each bit/entry in the bitmap corresponding to a resource block group (RBG)—Type 0; i.e., the bitmap indicates the frequency domain resource allocation in RBG(s). The FD-RA field could contain a resource indicator value (RIV) indicating the continuous virtual resource blocks (VRBs)—Type 1; depending on the value of "VRB-to-PRB mapping," the corresponding PRBs associated with the indicated VRBs could be identified. There could be various means to associate/map the (non-overlapping) frequency domain resources indicated in the FD-RA field(s) with/to different TRPs in the multi-TRP system.

For example, the UE could be indicated by the network a single DCI with a single FD-RA field indicating the frequency domain resource allocation.

In one example, the UE could be explicitly indicated by the network the association/mapping between one or more bits in the bitmap in the FD-RA field—Type 0 (and therefore, the corresponding one or more RBGs) and the TRPs in the multi-TRP system, and/or the association/mapping between one or more RIVs in the FD-RA field—Type 1 (and therefore, the corresponding one or more PRBs) and the TRPs in the multi-TRP system. For example, the UE could be first higher layer configured by the network a list/set/pool of TRP-specific ID/index values such as PCIs. The UE could be explicitly indicated by the network the association/mapping between one or more bits in the bitmap in the FD-RA field—Type 0 (and therefore, the corresponding one or more RBGs) and the TRP-specific ID/index values such as PCIs in the list/set/pool of TRP-specific ID/index values, and/or the association/mapping between one or more RIVs in the FD-RA field—Type 1 (and therefore, the corresponding one or more PRBs) and the TRP-specific ID/index values such as PCIs in the list/set/pool of TRP-specific ID/index values.

For the Type 0 based PDSCH frequency domain resource allocation: in one example (option-2.1.1), the 1-st to n_0-th (n_0≥1) (non-zero) bits/entries in the bitmap (and therefore, the corresponding RBGs) could correspond to the first entry/TRP in the list/set/pool of TRP-specific ID/index values, the (n_0+1)-th to n_1-th (n_1≥n_0) (non-zero) bits/entries in the bitmap (and therefore, the corresponding RBGs) could correspond to the second entry/TRP in the list/set/pool of TRP-specific ID/index values, and so on, and the n_p-th to n_q-th (n_q≥n_p) (non-zero) bits/entries in the bitmap (and therefore, the corresponding RBGs) could correspond to the last entry/TRP in the list/set/pool of TRP-specific ID/index values; for a multi-TRP system comprising of two TRPs, the first N_0 (N_0≥1) or the first half of the (non-zero) bits/entries in the bitmap (and therefore, the corresponding RBGs) could correspond to the first (or the second) entry/TRP in the list/set/pool of TRP-specific ID/index values, and the rest of or the second half of the (non-zero) bits/entries in the bitmap (and therefore, the corresponding RBGs) could correspond to the second (or the first) entry/TRP in the list/set/pool of TRP-specific ID/index values; in another example (option-2.1.2), the i-th (non-zero) bit/entry in the bitmap (and therefore, the corresponding RBG) could correspond to the (mod(i−1, N_trp)+1)-th entry/TRP in the list/set/pool of TRP-specific ID/index values, where N_trp represents the total number of TRPs in the multi-TRP system, i=1, . . . , N_bit, where N_bit represents the total number of (non-zero) bits/entries in the bitmap indicated in the FD-RA field, and mod(x, y) calculates the remainder of the Euclidean division of x by y; for a multi-TRP system comprising of two TRPs, the odd-numbered (non-zero) bits/entries in the bitmap (and therefore, the corresponding RBGs) could correspond to the first (or the second) entry/TRP in the list/set/pool of TRP-specific ID/index values, and the even-numbered (non-zero) bits/entries in the bitmap (and therefore, the corresponding RBGs) could correspond to the second (or the first) entry/TRP in the list/set/pool of TRP-specific ID/index values.

The total number of (non-zero) bits/entries in the bitmap N_bit indicated in the FD-RA field could be configured by the network (e.g., via higher layer RRC signaling and/or MAC CE command and/or dynamic DCI signaling) and/or fixed in the system specifications and/or reported by the UE based on UE's capability and/or equal to the total number of TRPs in the multi-TRP system. The UE could be indicated by the network, e.g., via higher layer RRC signaling and/or MAC CE command and/or dynamic DCI signaling, which option(s) (from/out of option-2.1.1 and option-2.1.2) to use/being used for indicating the mapping/association between the (non-zero) bit(s)/entry(s) in the bitmap in the FD-RA field and the TRPs in the multi-TRP system; for instance, a one-bit flag indicator could be incorporated/included in the DCI to differentiate between option-2.1.1 and option-2.1.2. The UE could be indicated by the network one or more conditions, e.g., whether the total number of TRPs in the multi-TRP system is larger than a threshold, to switch between option-2.1.1 and option-2.1.2.

For the Type 1 based PDSCH frequency domain resource allocation: in one example (option-2.1.3), the 1-st to n_0-th (n_0≥1) RIVs (and therefore, the corresponding PRBs) could correspond to the first entry/TRP in the list/set/pool of TRP-specific ID/index values, the (n_0+1)-th to n_1-th (n_1≥n_0) RIVs (and therefore, the corresponding PRBs) could correspond to the second entry/TRP in the list/set/pool of TRP-specific ID/index values, and so on, and the n_p-th to n_q-th (n_q≥n_p) RIVs (and therefore, the corresponding PRBs) could correspond to the last entry/TRP in the list/set/ pool of TRP-specific ID/index values; for a multi-TRP system comprising of two TRPs, the first N_0 (N_0≥1) or the first half of the RIVs (and therefore, the corresponding PRBs) could correspond to the first (or the second) entry/ TRP in the list/set/pool of TRP-specific ID/index values, and the rest of or the second half of the RIVs (and therefore, the corresponding PRBs) could correspond to the second (or the first) entry/TRP in the list/set/pool of TRP-specific ID/index values; in another example (option-2.1.4), the i-th RIV (and therefore, the corresponding PRB) could correspond to the (mod(i−1, N_trp)+1)-th entry/TRP in the list/set/pool of TRP-specific ID/index values, where N_trp represents the total number of TRPs in the multi-TRP system, i=1, . . . , N_riv, where N_riv represents the total number of RIVs indicated in the FD-RA field, and mod(x, y) calculates the remainder of the Euclidean division of x by y; for a multi-TRP system comprising of two TRPs, the odd-numbered RIVs (and therefore, the corresponding PRBs) could correspond to the first (or the second) entry/TRP in the list/set/pool of TRP-specific ID/index values, and the even-numbered RIVs (and therefore, the corresponding PRBs) could correspond to the second (or the first) entry/TRP in the list/set/pool of TRP-specific ID/index values.

The total number of RIVs N_riv indicated in the FD-RA field could be configured by the network (e.g., via higher layer RRC signaling and/or MAC CE command and/or dynamic DCI signaling) and/or fixed in the system specifications and/or reported by the UE based on UE's capability and/or equal to the total number of TRPs in the multi-TRP system. The UE could be indicated by the network, e.g., via higher layer RRC signaling and/or MAC CE command and/or dynamic DCI signaling, which option(s) (from/out of option-2.1.3 and option-2.1.4) to use/being used for indicating the mapping/association between the RIVs in the FD-RA field and the TRPs in the multi-TRP system; for instance, a one-bit flag indicator could be incorporated/included in the DCI to differentiate between option-2.1.3 and option-2.1.4. The UE could be indicated by the network one or more conditions, e.g., whether the total number of TRPs in the multi-TRP system is larger than a threshold, to switch between option-2.1.3 and option-2.1.4.

Furthermore, for the Type 1 based PDSCH frequency domain resource allocation, a RIV could be calculated/ determined based on at least a starting PRB position.

For example, the 1-st RIV indicated in the FD-RA field (e.g., corresponding to the first entry/TRP in the list/set/pool of TRP-specific ID/index values) could be calculated/determined based on a first starting PRB position and a first number of consecutive PRBs, the 2-nd RIV indicated in the FD-RA field (e.g., corresponding to the second entry/TRP in the list/set/pool of TRP-specific ID/index values) could be calculated/determined based on a second starting PRB position and a second number of consecutive PRBs, and so on, and the N-th RIV indicated in the FD-RA field (e.g., corresponding to the last entry/TRP in the list/set/pool of TRP-specific ID/index values) could be calculated/determined based on a N-th starting PRB position and a N-th number of consecutive PRBs. The first PRB starting position, the second starting PRB position, and so on, and the N-th PRB starting position could be different and are indicated/included in the FD-RA field; the first number of consecutive PRBs, the second number of consecutive PRBs, and so on, and the N-th number of consecutive PRBs could be different and are also indicated/included in the FD-RA field.

For another example, the 1-st RIV indicated in the FD-RA field (e.g., corresponding to the first entry/TRP in the list/ set/pool of TRP-specific ID/index values) could be calculated/determined based on a first starting PRB position and a first number of consecutive PRBs, the 2-nd RIV indicated in the FD-RA field (e.g., corresponding to the second entry/TRP in the list/set/pool of TRP-specific ID/index values) could be calculated/determined based on a second starting PRB position and a second number of consecutive PRBs same as the first number of consecutive PRBs, and so on, and the N-th RIV indicated in the FD-RA field (e.g., corresponding to the last entry/TRP in the list/set/pool of TRP-specific ID/index values) could be calculated/determined based on a N-th starting PRB position and a N-th number of consecutive PRBs same as the first number of consecutive PRBs. The first PRB starting position, the second starting PRB position, and so on, and the N-th PRB starting position could be different and are indicated/included in the FD-RA field; the first number of consecutive PRBs is also indicated/included in the FD-RA field.

Yet for another example, the 1-st RIV indicated in the FD-RA field (e.g., corresponding to the first entry/TRP in the list/set/pool of TRP-specific ID/index values) could be calculated/determined based on a first starting PRB position and a first number of consecutive PRBs, the 2-nd RIV indicated in the FD-RA field (e.g., corresponding to the second entry/TRP in the list/set/pool of TRP-specific ID/index values) could be calculated/determined based on a second number of consecutive PRBs and a second starting PRB position having a gap with respect to the last PRB indicated by the 1-st RIV, and so on, the N-th RIV indicated in the FD-RA field (e.g., corresponding to the last entry/TRP in the list/set/pool of TRP-specific ID/index values) could be calculated/determined based on a N-th number of consecutive PRBs and a N-th starting PRB position having a gap with respect to the last PRB indicated by the (N−1)-th RIV. The gap could be configured by the network and set to 0. The first number of consecutive PRBs, the second number of consecutive PRBs, and so on, and the N-th number of consecutive PRBs could be different and are indicated/ included in the FD-RA field; the first starting PRB position is also indicated/included in the FD-RA field.

For another example, the UE could be first higher layer configured by the network a list/set/pool of TRP-specific ID/index values such as PCIs. The UE could then receive from the network one or more MAC CE activation commands/bitmaps to activate one or more TRP-specific ID/index values from the higher layer configured list/set/pool of TRP-specific ID/index values. For the Type 0 based PDSCH frequency domain resource allocation: in one example (option-2.1.5), the 1-st to n_0-th (n_0≥1) (non-zero) bits/entries in the bitmap (and therefore, the corresponding RBGs) could correspond to the first MAC CE(s)/bitmap(s) activated TRP-specific ID/index value, the (n_0+1)-th to n_1-th (n_1≥n_0) (non-zero) bits/entries in the bitmap (and therefore, the corresponding RBGs) could correspond to the second MAC CE(s)/bitmap(s) activated TRP-specific ID/index value, and so on, and the n_p-th to n_q-th (n_q≥n_p) (non-zero) bits/entries in the bitmap (and therefore, the corresponding RBGs) could correspond to the last MAC CE(s)/bitmap(s) activated TRP-specific ID/index value; for a multi-TRP system comprising of two MAC CE(s)/bitmap(s) activated TRPs, the first N_0 (N_0≥1) or the first half of the (non-zero) bits/entries in the bitmap (and therefore, the corresponding RBGs) could correspond to the first (or the second) MAC CE(s)/bitmap(s) activated TRP-specific ID/index value, and the rest of or the second half of the (non-zero) bits/entries in the bitmap (and therefore, the corresponding RBGs) could correspond to the second (or the first) MAC CE(s)/bitmap(s) activated TRP-specific ID/index value; in another example (option-2.1.6), the i-th (non-zero) bit/entry in the bitmap (and therefore, the corresponding RBG) could correspond to the (mod(i−1, N_trp')+1)-th MAC CE(s)/bitmap(s) activated TRP-specific ID/index value, where N_trp' represents the total number of MAC CE(s)/bitmap(s) activated TRPs in the multi-TRP system, i=1, . . . , N_bit, where N_bit represents the total number of (non-zero) bits/entries in the bitmap indicated in the FD-RA field, and mod(x, y) calculates the remainder of the Euclidean division of x by y; for a multi-TRP system comprising of two MAC CE(s)/bitmap(s) activated TRPs, the first N_0 (N_0≥1) or the first half of the (non-zero) bits/entries in the bitmap (and therefore, the corresponding RBGs) could correspond to the first (or the second) MAC CE(s)/bitmap(s) activated TRP-specific ID/index value, and the rest of or the second half of the (non-zero) bits/entries in the bitmap (and therefore, the corresponding RBGs) could correspond to the second (or the first) MAC CE(s)/bitmap(s) activated TRP-specific ID/index value. The total number of (non-zero) bits/entries in the bitmap N_bit indicated in the FD-RA field could be configured by the network (e.g., via higher layer RRC signaling and/or MAC CE command and/or dynamic DCI signaling) and/or fixed in the system specifications and/or reported by the UE based on UE's capability and/or equal to the total number of MAC CE(s)/bitmap(s) activated TRPs in the multi-TRP system.

The UE could be indicated by the network, e.g., via higher layer RRC signaling and/or MAC CE command and/or dynamic DCI signaling, which option(s) (from/out of option-2.1.5 and option-2.1.6) to use/being used for indicating the mapping/association between the (non-zero) bit(s)/entry(s) in the bitmap in the FD-RA field and the MAC CE(s)/bitmap(s) activated TRPs in the multi-TRP system; for instance, a one-bit flag indicator could be incorporated/included in the DCI to differentiate between option-2.1.5 and option-2.1.6. The UE could be indicated by the network one or more conditions, e.g., whether the total number of MAC CE(s)/bitmap(s) activated TRPs in the multi-TRP system is larger than a threshold, to switch between option-2.1.5 and option-2.1.6. For the Type 1 based PDSCH frequency domain resource allocation: in one example (option-2.1.7), the 1-st to n_0-th (n_0≥1) RIVs (and therefore, the corresponding PRBs) could correspond to the first MAC CE(s)/bitmap(s) activated TRP-specific ID/index value, the (n_0+1)-th to n_1-th (n_1≥n_0) RIVs (and therefore, the corresponding PRBs) could correspond to the second MAC CE(s)/bitmap(s) activated TRP-specific ID/index value, and so on, and the n_p-th to n_q-th (n_q≥n_p) RIVs (and therefore, the corresponding PRBs) could correspond to the last MAC CE(s)/bitmap(s) activated TRP-specific ID/index value; for a multi-TRP system comprising of two MAC CE(s)/bitmap(s) activated TRPs, the first N_0 (N_0≥1) or the first half of the RIVs (and therefore, the corresponding PRBs) could correspond to the first (or the second) MAC CE(s)/bitmap(s) activated TRP-specific ID/index value, and the rest of or the second half of the RIVs (and therefore, the corresponding PRBs) could correspond to the second (or the first) MAC CE(s)/bitmap(s) activated TRP-specific ID/index value; in another example (option-2.1.8), the i-th RIV (and therefore, the corresponding PRB) could correspond to the (mod(i−1, N_trp')+1)-th MAC CE(s)/bitmap(s) activated TRP-specific ID/index value, where N_trp' represents the total number of MAC CE(s)/bitmap(s) activated TRPs in the multi-TRP system, i=1, . . . , N_riv, where N_riv represents the total number of RIVs indicated in the FD-RA field, and mod(x, y) calculates the remainder of the Euclidean division of x by y; for a multi-TRP system comprising of two MAC CE(s)/bitmap(s) activated TRPs, the odd-numbered RIVs (and therefore, the corresponding PRBs) could correspond to the first (or the second) MAC CE(s)/bitmap(s) activated TRP-specific ID/index value, and the even-numbered RIVs (and therefore, the corresponding PRBs) could correspond to the second (or the first) MAC CE(s)/bitmap(s) activated TRP-specific ID/index value. The total number of RIVs indicated in the FD-RA field could be configured by the network (e.g., via higher layer RRC signaling and/or MAC CE command and/or dynamic DCI signaling) and/or fixed in the system specifications and/or reported by the UE based on UE's capability and/or equal to the total number of MAC CE(s)/bitmap(s) activated TRPs in the multi-TRP system.

The UE could be indicated by the network, e.g., via higher layer RRC signaling and/or MAC CE command and/or dynamic DCI signaling, which option(s) (from/out of option-2.1.7 and option-2.1.8) to use/being used for indicating the mapping/association between the RIVs in the FD-RA field and the MAC CE(s)/bitmap(s) activated TRPs in the multi-TRP system; for instance, a one-bit flag indicator could be incorporated/included in the DCI to differentiate between option-2.1.7 and option-2.1.8. The UE could be indicated by the network one or more conditions, e.g., whether the total number of MAC CE(s)/bitmap(s) activated TRPs in the multi-TRP system is larger than a threshold, to switch between option-2.1.7 and option-2.1.8.

Furthermore, for the Type 1 based PDSCH frequency domain resource allocation, a RIV could be calculated/determined based on at least a starting PRB position.

For example, the 1-st RIV indicated in the FD-RA field (e.g., corresponding to the first MAC CE(s)/bitmap(s) activated TRP-specific ID/index value) could be calculated/determined based on a first starting PRB position and a first number of consecutive PRBs, the 2-nd RIV indicated in the FD-RA field (e.g., corresponding to the second MAC CE(s)/bitmap(s) activated TRP-specific ID/index value) could be calculated/determined based on a second starting PRB position and a second number of consecutive PRBs, and so on, and the N-th RIV indicated in the FD-RA field (e.g., corresponding to the last MAC CE(s)/bitmap(s) activated TRP-specific ID/index value) could be calculated/determined based on a N-th starting PRB position and a N-th number of consecutive PRBs. The first PRB starting position, the second starting PRB position, and so on, and the N-th PRB starting position could be different and are indicated/included in the FD-RA field; the first number of consecutive PRBs, the second number of consecutive PRBs, and so on, and the N-th number of consecutive PRBs could be different and are also indicated/included in the FD-RA field.

For another example, the 1-st RIV indicated in the FD-RA field (e.g., corresponding to the first MAC CE(s)/bitmap(s) activated TRP-specific ID/index value) could be calculated/determined based on a first starting PRB position and a first number of consecutive PRBs, the 2-nd RIV indicated in the FD-RA field (e.g., corresponding to the second MAC CE(s)/bitmap(s) activated TRP-specific ID/index value) could be calculated/determined based on a second starting PRB position and a second number of consecutive PRBs same as the first number of consecutive PRBs, and so on, and the N-th RIV indicated in the FD-RA field (e.g., corresponding to the last MAC CE(s)/bitmap(s) activated TRP-specific ID/index value) could be calculated/determined based on a N-th starting PRB position and a N-th number of consecutive PRBs same as the first number of consecutive PRBs. The first PRB starting position, the second starting PRB position, and so on, and the N-th PRB starting position could be different and are indicated/included in the FD-RA field; the first number of consecutive PRBs is also indicated/included in the FD-RA field.

Yet for another example, the 1-st RIV indicated in the FD-RA field (e.g., corresponding to the first MAC CE(s)/bitmap(s) activated TRP-specific ID/index value) could be calculated/determined based on a first starting PRB position and a first number of consecutive PRBs, the 2-nd RIV indicated in the FD-RA field (e.g., corresponding to the second MAC CE(s)/bitmap(s) activated TRP-specific ID/index value) could be calculated/determined based on a second number of consecutive PRBs and a second starting PRB position having a gap with respect to the last PRB indicated by the 1-st RIV, and so on, the N-th RIV indicated in the FD-RA field (e.g., corresponding to the last MAC CE(s)/bitmap(s) activated TRP-specific ID/index value) could be calculated/determined based on a N-th number of consecutive PRBs and a N-th starting PRB position having a gap with respect to the last PRB indicated by the (N–1)-th RIV. The gap could be configured by the network and set to 0. The first number of consecutive PRBs, the second number of consecutive PRBs, and so on, and the N-th number of consecutive PRBs could be different and are indicated/included in the FD-RA field; the first starting PRB position is also indicated/included in the FD-RA field.

Other exact association/mapping relationships between the frequency domain resources indicated in the FD-RA field and the TRPs in the multi-TRP system and/or the corresponding indication method(s), e.g., via higher layer RRC signaling and/or MAC CE command and/or dynamic DCI signaling, are also possible.

In another example, the UE could be implicitly indicated by the network the association/mapping between one or more bits in the bitmap in the FD-RA field—Type 0 (and therefore, the corresponding one or more RBGs) and the TRPs in the multi-TRP system, and/or the association/mapping between one or more RIVs in the FD-RA field—Type 1 (and therefore, the corresponding one or more PRBs) and the TRPs in the multi-TRP system. The UE could be higher layer configured by the network a list/set/pool of TRP-specific ID/index values such as PCIs. The UE could also receive from the network one or more MAC CE activation commands/bitmaps to activate one or more TRP-specific ID/index values from the higher layer configured list/set/pool of TRP-specific ID/index values.

For the Type 0 based PDSCH frequency domain resource allocation: in one example (option-2.1.9), the 1-st to n_0-th (n_0≥1) (non-zero) bits/entries in the bitmap (and therefore, the corresponding RBGs) could correspond to the TRP with the lowest/lowest MAC CE activated TRP-specific ID/index value such as the lowest PCI value and/or the first TRP (e.g., TRP #1), the (n_0+1)-th to n_1-th (n_1≥n_0) (non-zero) bits/entries in the bitmap (and therefore, the corresponding RBGs) could correspond to the TRP with the second lowest/second lowest MAC CE activated TRP-specific ID/index value such as the second lowest PCI value and/or the second TRP (e.g., TRP #2), and so on, and the n_p-th to n_q-th (n_q≥n_p) (non-zero) bits/entries in the bitmap (and therefore, the corresponding RBGs) could correspond to the TRP with the highest/highest MAC CE activated TRP-specific ID/index value such as the highest PCI value and/or the last TRP (e.g., TRP #N); for a multi-TRP system comprising of two (MAC CE activated) TRPs, the first N_0 (N_0≥1) or the first half of the (non-zero) bits/entries in the bitmap (and therefore, the corresponding RBGs) could correspond to the first, or the second, (MAC CE activated) TRP-specific ID/index value, and the rest of or the second half of the (non-zero) bits/entries in the bitmap (and therefore, the corresponding RBGs) could correspond to the second, or the first, (MAC CE activated) TRP-specific ID/index value; in another example (option-2.1.10), the i-th (non-zero) bit/entry in the bitmap (and therefore, the corresponding RBG) could correspond to the TRP with the (mod(i–1, N_trp)+1)-th lowest (or highest)/(mod(i–1, N_trp')+1)-th lowest (or highest) MAC CE activated TRP-specific ID/index value such as the lowest (or highest) PCI value and/or the (mod(i–1, N_trp)+1)-th TRP/(mod(i–1, N_trp')+1)-th MAC CE(s)/bitmap(s) activated TRP, where N_trp represents the total number of TRPs in the multi-TRP system, N_trp' represents the total number of MAC CE(s)/bitmap(s) activated TRPs in the multi-TRP system, i=1, . . . , N_bit, where N_bit represents the total number of (non-zero) bits/entries in the bitmap indicated in the FD-RA field, and mod(x, y) calculates the remainder of the Euclidean division of x by y; for a multi-TRP system comprising of two (MAC CE activated) TRPs, the odd-numbered (non-zero) bits/entries in the bitmap (and therefore, the corresponding RBGs) could correspond to the first, or the second, (MAC CE activated) TRP-specific ID/index value, and the even-numbered (non-zero) bits/entries in the bitmap (and therefore, the corresponding RBGs) could correspond to the second, or the first, (MAC CE activated) TRP-specific ID/index value.

The total number of (non-zero) bits/entries in the bitmap N_bit indicated in the FD-RA field could be configured by the network (e.g., via higher layer RRC signaling and/or MAC CE command and/or dynamic DCI signaling) and/or fixed in the system specifications and/or reported by the UE based on UE's capability and/or equal to the total number of (MAC CE activated) TRPs in the multi-TRP system. The UE could be indicated by the network, e.g., via higher layer RRC signaling and/or MAC CE command and/or dynamic DCI signaling, which option(s) (from/out of option-2.1.9 and option-2.1.10) to use/being used for indicating the mapping/association between the (non-zero) bit(s)/entry(s) in the bitmap in the FD-RA field and the (MAC CE activated) TRPs in the multi-TRP system; for instance, a one-bit flag indicator could be incorporated/included in the DCI to differentiate between option-2.1.9 and option-2.1.10. The UE could be indicated by the network one or more conditions, e.g., whether the total number of (MAC CE activated) TRPs in the multi-TRP system is larger than a threshold, to switch between option-2.1.9 and option-2.1.10.

For the Type 1 based PDSCH frequency domain resource allocation: in one example (option-2.1.11), the 1-st to n_0-th (n_0≥1) RIVs (and therefore, the corresponding PRBs) could correspond to the TRP with the lowest/lowest MAC CE activated TRP-specific ID/index value such as the lowest PCI value and/or the first TRP (e.g., TRP #1), the (n_0+1)-th to n_1-th (n_1≥n_0) RIVs (and therefore, the corresponding PRBs) could correspond to the TRP with the second lowest/second lowest MAC CE activated TRP-specific ID/index value such as the second lowest PCI value and/or the second TRP (e.g., TRP #2), and so on, and the n_p-th to n_q-th (n_q≥n_p) RIVs (and therefore, the corresponding PRBs) could correspond to the TRP with the highest/highest MAC CE activated TRP-specific ID/index value such as the highest PCI value and/or the last TRP (e.g., TRP #N); for a multi-TRP system comprising of two (MAC CE activated) TRPs, the first N_0 (N_0≥1) or the first half of the RIVs (and therefore, the corresponding PRBs) could correspond to the first, or the second, (MAC CE activated) TRP-specific ID/index value, and the rest of or the second half of the RIVs (and therefore, the corresponding PRBs) could correspond to the second, or the first, (MAC CE activated) TRP-specific ID/index value; in another example (option-2.1.12), the i-th RIV (and therefore, the corresponding PRB) could correspond to the TRP with the (mod(i−1,N_trp)+1)-th lowest (or highest)/(mod(i−1,N_trp')+1)-th lowest (or highest) MAC CE activated TRP-specific ID/index value such as the lowest (or the highest) PCI value and/or the (mod(i−1, N_trp)+1)-th TRP/(mod(i−1, N_trp')+1)-th MAC CE(s)/bitmap(s) activated TRP, where N_trp represents the total number of TRPs in the multi-TRP system, N_trp' represents the total number of MAC CE(s)/bitmap(s) activated TRPs in the multi-TRP system, i=1, . . . , N_riv, where N_riv represents the total number of RIVs indicated in the FD-RA field, and mod(x, y) calculates the remainder of the Euclidean division of x by y; for a multi-TRP system comprising of two (MAC CE activated) TRPs, the odd-numbered RIVs (and therefore, the corresponding PRBs) could correspond to the first, or the second, (MAC CE activated) TRP-specific ID/index value, and the even-numbered RIVs could correspond to the second, or the first, (MAC CE activated) TRP-specific ID/index value.

The total number of RIVs indicated in the FD-RA field could be configured by the network (e.g., via higher layer RRC signaling and/or MAC CE command and/or dynamic DCI signaling) and/or fixed in the system specifications and/or reported by the UE based on UE's capability and/or equal to the total number of (MAC CE activated) TRPs in the multi-TRP system. The UE could be indicated by the network, e.g., via higher layer RRC signaling and/or MAC CE command and/or dynamic DCI signaling, which option (s) (from/out of option-2.1.11 and option-2.1.12) to use/ being used for indicating the mapping/association between the RIVs in the FD-RA field and the (MAC CE activated) TRPs in the multi-TRP system; for instance, a one-bit flag indicator could be incorporated/included in the DCI to differentiate between option-2.1.11 and option-2.1.12. The UE could be indicated by the network one or more conditions, e.g., whether the total number of (MAC CE activated) TRPs in the multi-TRP system is larger than a threshold, to switch between option-2.1.11 and option-2.1.12.

Furthermore, for the Type 1 based PDSCH frequency domain resource allocation, a RIV could be calculated/ determined based on at least a starting PRB position.

For example, the 1-st RIV indicated in the FD-RA field (e.g., corresponding to the TRP with the lowest/lowest MAC CE activated TRP-specific ID/index value) could be calculated/determined based on a first starting PRB position and a first number of consecutive PRBs, the 2-nd RIV indicated in the FD-RA field (e.g., corresponding to the TRP with the second lowest/second lowest MAC CE activated TRP-specific ID/index value) could be calculated/determined based on a second starting PRB position and a second number of consecutive PRBs, and so on, and the N-th RIV indicated in the FD-RA field (e.g., corresponding to the TRP with the highest/highest MAC CE activated TRP-specific ID/index value) could be calculated/determined based on a N-th starting PRB position and a N-th number of consecutive PRBs. The first PRB starting position, the second starting PRB position, and so on, and the N-th PRB starting position could be different and are indicated/included in the FD-RA field; the first number of consecutive PRBs, the second number of consecutive PRBs, and so on, and the N-th number of consecutive PRBs could be different and are also indicated/included in the FD-RA field.

For another example, the 1-st RIV indicated in the FD-RA field (e.g., corresponding to the TRP with the lowest/lowest MAC CE activated TRP-specific ID/index value) could be calculated/determined based on a first starting PRB position and a first number of consecutive PRBs, the 2-nd RIV indicated in the FD-RA field (e.g., corresponding to the TRP with the second lowest/second lowest MAC CE activated TRP-specific ID/index value) could be calculated/determined based on a second starting PRB position and a second number of consecutive PRBs same as the first number of consecutive PRBs, and so on, and the N-th RIV indicated in the FD-RA field (e.g., corresponding to the TRP with the highest/highest MAC CE activated TRP-specific ID/index value) could be calculated/determined based on a N-th starting PRB position and a N-th number of consecutive PRBs same as the first number of consecutive PRBs. The first PRB starting position, the second starting PRB position, and so on, and the N-th PRB starting position could be different and are indicated/included in the FD-RA field; the first number of consecutive PRBs is also indicated/included in the FD-RA field.

Yet for another example, the 1-st RIV indicated in the FD-RA field (e.g., corresponding to the TRP with the lowest/lowest MAC CE activated TRP-specific ID/index value) could be calculated/determined based on a first starting PRB position and a first number of consecutive PRBs, the 2-nd RIV indicated in the FD-RA field (e.g., corresponding to the TRP with the second lowest/second lowest MAC CE activated TRP-specific ID/index value) could be calculated/determined based on a second number of consecutive PRBs and a second starting PRB position having a gap with respect to the last PRB indicated by the 1-st RIV, and so on, the N-th RIV indicated in the FD-RA field (e.g., corresponding to the TRP with the highest/highest MAC CE activated TRP-specific ID/index value) could be calculated/determined based on a N-th number of consecutive PRBs and a N-th starting PRB position having a gap with respect to the last PRB indicated by the (N−1)-th RIV. The gap could be configured by the network and set to 0. The first number of consecutive PRBs, the second number of consecutive PRBs, and so on, and the N-th number of consecutive PRBs could be different and are indicated/included in the FD-RA field; the first starting PRB position is also indicated/included in the FD-RA field.

Other implicit indication methods of the association/ mapping between the frequency domain resources indicated in the FD-RA field and the TRPs in the multi-TRP system are also possible.

In yet another example, the UE could be explicitly indicated by the network the association/mapping between one or more bits in the bitmap in the FD-RA field—Type 0 (and therefore, the corresponding one or more RBGs) and the CORESETPoolIndex values, and/or the association/mapping between one or more RIVs in the FD-RA field—Type 1 (and therefore, the corresponding one or more PRBs) and the CORESETPoolIndex values. For example, the UE could be first higher layer configured by the network a list/set/pool of CORESETPoolIndex values—e.g., a set of two CORE-SETPoolIndex values 0 and 1. For the Type 0 based PDSCH frequency domain resource allocation: in one example (option-2.1.13), the 1-st to n_0-th (n_0≥1) (non-zero) bits/ entries in the bitmap (and therefore, the corresponding RBGs) could correspond to the first entry/CORESETPoolIndex value in the list/set/pool of CORESETPoolIndex values, the (n_0+1)-th to n_1-th (n_1≥n_0) (non-zero) bits/entries in the bitmap (and therefore, the corresponding RBGs) could correspond to the second entry/CORESETPoolIndex value in the list/set/pool of CORESETPoolIndex values, and so on, and the n_p-th to n_q-th (n_q≥n_p) (non-zero) bits/ entries in the bitmap (and therefore, the corresponding RBGs) could correspond to the last entry/CORESETPoolIn-dex value in the list/set/pool of CORESETPoolIndex values; for a total of two CORESETPoolIndex values (e.g., 0 and 1), the first N_0 (N_0≥1) or the first half of the (non-zero) bits/entries in the bitmap (and therefore, the corresponding RBGs) could correspond to the first (or the second) entry/CORESETPoolIndex value in the list/set/pool of CORE-SETPoolIndex values (e.g., the CORESETPoolIndex value 0 or 1), and the rest of or the second half of the (non-zero) bits/entries in the bitmap (and therefore, the corresponding RBGs) could correspond to the second (or the first) entry/CORESETPoolIndex value in the list/set/pool of CORE-SETPoolIndex values (e.g., the CORESETPoolIndex value 1 or 0); in another example (option-2.1.14), the i-th (non-zero) bit/entry in the bitmap (and therefore, the correspond-ing RBG) could correspond to the (mod(i−1, N_cs)+1)-th entry/CORESETPoolIndex value in the list/set/pool of CORESETPoolIndex values, where N_cs represents the total number of CORESETPoolIndex values, i=1, . . . , N_bit, where N_bit represents the total number of (non-zero) bits/entries in the bitmap indicated in the FD-RA field, and mod(x, y) calculates the remainder of the Euclidean division of x by y; for a total of two CORESETPoolIndex values (e.g., 0 and 1), the odd-numbered (non-zero) bits/entries in the bitmap (and therefore, the corresponding RBGs) could correspond to the first (or the second) entry/CORESET-PoolIndex value in the list/set/pool of CORESETPoolIndex values (e.g., the CORESETPoolIndex value 0 or 1), and the even-numbered (non-zero) bits/entries in the bitmap (and therefore, the corresponding RBGs) could correspond to the second (or the first) entry/CORESETPoolIndex value in the list/set/pool of CORESETPoolIndex values (e.g., the CORESETPoolIndex value 1 or 0). The total number of (non-zero) bits/entries in the bitmap N_bit indicated in the FD-RA field could be configured by the network (e.g., via higher layer RRC signaling and/or MAC CE command and/or dynamic DCI signaling) and/or fixed in the system specifications and/or reported by the UE based on UE's capability and/or equal to the total number of CORESET-PoolIndex values.

The UE could be indicated by the network, e.g., via higher layer RRC signaling and/or MAC CE command and/or dynamic DCI signaling, which option(s) (from/out of option-2.1.13 and option-2.1.14) to use/being used for indi-cating the mapping/association between the (non-zero) bit(s)/entry(s) in the bitmap in the FD-RA field and the CORE-SETPoolIndex values; for instance, a one-bit flag indicator could be incorporated/included in the DCI to differentiate between option-2.1.13 and option-2.1.14. The UE could be indicated by the network one or more conditions, e.g., whether the total number of CORESETPoolIndex values is larger than a threshold, to switch between option-2.1.13 and option-2.1.14. For the Type 1 based PDSCH frequency domain resource allocation: in one example (option-2.1.15), the 1-st to n_0-th (n_0≥1) RIVs (and therefore, the corre-sponding PRBs) could correspond to the first entry/CORE-SETPoolIndex value in the list/set/pool of CORESET-PoolIndex values, the (n_0+1)-th to n_1-th (n_1≥n_0) RIVs (and therefore, the corresponding PRBs) could correspond to the second entry/CORESETPoolIndex value in the list/set/pool of CORESETPoolIndex values, and so on, and the n_p-th to n_q-th (n_q≥n_p) RIVs (and therefore, the corre-sponding PRBs) could correspond to the last entry/CORE-SETPoolIndex value in the list/set/pool of CORESET-PoolIndex values; for a total of two CORESETPoolIndex values (e.g., 0 and 1), the first N_0 (N_0≥1) or the first half of the RIVs (and therefore, the corresponding PRBs) could correspond to the first (or the second) entry/CORESET-PoolIndex value in the list/set/pool of CORESETPoolIndex values (e.g., the CORESETPoolIndex value 0 or 1), and the rest of or the second half of the RIVs (and therefore, the corresponding PRBs) could correspond to the second (or the first) entry/CORESETPoolIndex value in the list/set/pool of CORESETPoolIndex values (e.g., the CORESETPoolIndex value 1 or 0); in another example (option-2.1.16), the i-th RIV (and therefore, the corresponding PRB) could corre-spond to the (mod(i−1, N_cs)+1)-th entry/CORESET-PoolIndex value in the list/set/pool of CORESETPoolIndex values, where N_cs represents the total number of CORE-SETPoolIndex values, i=1, . . . , N_riv, where N_riv repre-sents the total number of RIVs indicated in the FD-RA field, and mod(x, y) calculates the remainder of the Euclidean division of x by y; for a total of two CORESETPoolIndex values (e.g., 0 and 1), the odd-numbered RIVs (and there-fore, the corresponding PRBs) could correspond to the first (or the second) entry/CORESETPoolIndex value in the list/set/pool of CORESETPoolIndex values (e.g., the CORESETPoolIndex value 0 or 1), and the even-numbered RIVs (and therefore, the corresponding PRBs) could corre-spond to the second (or the first) entry/CORESETPoolIndex value in the list/set/pool of CORESETPoolIndex values (e.g., the CORESETPoolIndex value 1 or 0).

The total number of RIVs N_riv indicated in the FD-RA field could be configured by the network (e.g., via higher layer RRC signaling and/or MAC CE command and/or dynamic DCI signaling) and/or fixed in the system specifi-cations and/or reported by the UE based on UE's capability and/or equal to the total number of CORESETPoolIndex values. The UE could be indicated by the network, e.g., via higher layer RRC signaling and/or MAC CE command and/or dynamic DCI signaling, which option(s) (from/out of option-2.1.15 and option-2.1.16) to use/being used for indi-cating the mapping/association between the RIVs in the FD-RA field and the CORESETPoolIndex values; for instance, a one-bit flag indicator could be incorporated/included in the DCI to differentiate between option-2.1.15 and option-2.1.16. The UE could be indicated by the net-work one or more conditions, e.g., whether the total number of CORESETPoolIndex values is larger than a threshold, to switch between option-2.1.15 and option-2.1.16.

Furthermore, for the Type 1 based PDSCH frequency domain resource allocation, a RIV could be calculated/determined based on at least a starting PRB position.

For example, the 1-st RIV indicated in the FD-RA field (e.g., corresponding to the first entry/CORESETPoolIndex value in the list/set/pool of CORESETPoolIndex values) could be calculated/determined based on a first starting PRB position and a first number of consecutive PRBs, the 2-nd RIV indicated in the FD-RA field (e.g., corresponding to the second entry/CORESETPoolIndex value in the list/set/pool of CORESETPoolIndex values) could be calculated/deter-mined based on a second starting PRB position and a second number of consecutive PRBs, and so on, and the N-th RIV indicated in the FD-RA field (e.g., corresponding to the last entry/CORESETPoolIndex value in the list/set/pool of CORESETPoolIndex values) could be calculated/deter-mined based on a N-th starting PRB position and a N-th number of consecutive PRBs. The first PRB starting posi-tion, the second starting PRB position, and so on, and the N-th PRB starting position could be different and are indi-cated/included in the FD-RA field; the first number of consecutive PRBs, the second number of consecutive PRBs, and so on, and the N-th number of consecutive PRBs could be different and are also indicated/included in the FD-RA field.

For another example, the 1-st RIV indicated in the FD-RA field (e.g., corresponding to the first entry/CORESET-PoolIndex value in the list/set/pool of CORESETPoolIndex values) could be calculated/determined based on a first starting PRB position and a first number of consecutive PRBs, the 2-nd RIV indicated in the FD-RA field (e.g., corresponding to the second entry/CORESETPoolIndex value in the list/set/pool of CORESETPoolIndex values) could be calculated/determined based on a second starting PRB position and a second number of consecutive PRBs same as the first number of consecutive PRBs, and so on, and the N-th RIV indicated in the FD-RA field (e.g., corresponding to the last entry/CORESETPoolIndex value in the list/set/pool of CORESETPoolIndex values) could be calculated/determined based on a N-th starting PRB position and a N-th number of consecutive PRBs same as the first number of consecutive PRBs. The first PRB starting position, the second starting PRB position, and so on, and the N-th PRB starting position could be different and are indicated/included in the FD-RA field; the first number of consecutive PRBs is also indicated/included in the FD-RA field.

Yet for another example, the 1-st RIV indicated in the FD-RA field (e.g., corresponding to the first entry/CORESETPoolIndex value in the list/set/pool of CORESET-PoolIndex values) could be calculated/determined based on a first starting PRB position and a first number of consecutive PRBs, the 2-nd RIV indicated in the FD-RA field (e.g., corresponding to the second entry/CORESETPoolIndex value in the list/set/pool of CORESETPoolIndex values) could be calculated/determined based on a second number of consecutive PRBs and a second starting PRB position having a gap with respect to the last PRB indicated by the 1-st RIV, and so on, the N-th RIV indicated in the FD-RA field (e.g., corresponding to the last entry/CORESETPoolIndex value in the list/set/pool of CORESETPoolIndex values) could be calculated/determined based on a N-th number of consecutive PRBs and a N-th starting PRB position having a gap with respect to the last PRB indicated by the (N−1)-th RIV. The gap could be configured by the network and set to 0. The first number of consecutive PRBs, the second number of consecutive PRBs, and so on, and the N-th number of consecutive PRBs could be different and are indicated/included in the FD-RA field; the first starting PRB position is also indicated/included in the FD-RA field.

For another example, the UE could be first higher layer configured by the network a list/set/pool of CORESET-PoolIndex values—e.g., a set of two CORESETPoolIndex values 0 and 1. The UE could then receive from the network one or more MAC CE activation commands/bitmaps to activate one or more CORESETPoolIndex values from the higher layer configured list/set/pool of CORESETPoolIndex values. For the Type 0 based PDSCH frequency domain resource allocation: in one example (option-2.1.17), the 1-st to n_0-th (n_0≥1) (non-zero) bits/entries in the bitmap (and therefore, the corresponding RBGs) could correspond to the first MAC CE(s)/bitmap(s) activated CORESETPoolIndex value, the (n_0+1)-th to n_1-th (n_1≥n_0) (non-zero) bits/entries in the bitmap (and therefore, the corresponding RBGs) could correspond to the second MAC CE(s)/bitmap(s) activated CORESETPoolIndex value, and so on, and the n_p-th to n_q-th (n_q≥n_p) (non-zero) bits/entries in the bitmap (and therefore, the corresponding RBGs) could correspond to the last MAC CE(s)/bitmap(s) activated CORESETPoolIndex value; for a total of two MAC CE(s)/bitmap(s) activated CORESETPoolIndex values (e.g., 0 and 1), the first N_0 (N_0>1) or the first half of the (non-zero) bits/entries in the bitmap (and therefore, the corresponding RBGs) could correspond to the first (or the second) MAC CE(s)/bitmap(s) activated CORESETPoolIndex value (e.g., the CORESETPoolIndex value 0 or 1), and the rest of or the second half of the (non-zero) bits/entries in the bitmap (and therefore, the corresponding RBGs) could correspond to the second (or the first) MAC CE(s)/bitmap(s) activated CORE-SETPoolIndex value (e.g., the CORESETPoolIndex value 1 or 0); in another example (option-2.1.18), the i-th (non-zero) bit/entry in the bitmap (and therefore, the corresponding RBG) could correspond to the (mod(i−1, N_cs')+1)-th MAC CE(s)/bitmap(s) activated CORESETPoolIndex value, where N_cs' represents the total number of MAC CE(s)/bitmap(s) activated CORESETPoolIndex values, i=1, . . . , N_bit, where N_bit represents the total number of (non-zero) bits/entries in the bitmap indicated in the FD-RA field, and mod(x, y) calculates the remainder of the Euclidean division of x by y; for a total of two MAC CE(s)/bitmap(s) activated CORESETPoolIndex values (e.g., 0 and 1), the odd-numbered (non-zero) bits/entries in the bitmap (and therefore, the corresponding RBGs) could correspond to the first (or the second) MAC CE(s)/bitmap(s) activated CORESET-PoolIndex value (e.g., the CORESETPoolIndex value 0 or 1), and the even-numbered (non-zero) bits/entries in the bitmap (and therefore, the corresponding RBGs) could correspond to the second (or the first) MAC CE(s)/bitmap(s) activated CORESETPoolIndex value (e.g., the CORESET-PoolIndex value 1 or 0).

The total number of (non-zero) bits/entries in the bitmap N_bit indicated in the FD-RA field could be configured by the network (e.g., via higher layer RRC signaling and/or MAC CE command and/or dynamic DCI signaling) and/or fixed in the system specifications and/or reported by the UE based on UE's capability and/or equal to the total number of MAC CE(s)/bitmap(s) activated CORESETPoolIndex values. The UE could be indicated by the network, e.g., via higher layer RRC signaling and/or MAC CE command and/or dynamic DCI signaling, which option(s) (from/out of option-2.1.17 and option-2.1.18) to use/being used for indicating the mapping/association between the (non-zero) bit(s)/entry(s) in the bitmap in the FD-RA field and the MAC CE(s)/bitmap(s) activated CORESETPoolIndex values; for instance, a one-bit flag indicator could be incorporated/included in the DCI to differentiate between option-2.1.17 and option-2.1.18. The UE could be indicated by the network one or more conditions, e.g., whether the total number of MAC CE(s)/bitmap(s) activated CORESETPoolIndex values is larger than a threshold, to switch between option-2.1.17 and option-2.1.18. For the Type 1 based PDSCH frequency domain resource allocation: in one example (option-2.1.19), the 1-st to n_0-th (n_0≥1) RIVs (and therefore, the corresponding PRBs) could correspond to the first MAC CE(s)/bitmap(s) activated CORESETPoolIndex value, the (n_0+1)-th to n_1-th (n_1≥n_0) RIVs (and therefore, the corresponding PRBs) could correspond to the second MAC CE(s)/bitmap(s) activated CORESETPoolIndex value, and so on, and the n_p-th to n_q-th (n_q≥n_p) RIVs (and therefore, the corresponding PRBs) could correspond to the last MAC CE(s)/bitmap(s) activated CORESETPoolIndex value; for a total of two MAC CE(s)/bitmap(s) activated CORESETPoolIndex values (e.g., 0 and 1), the first N_0 (N_0≥1) or the first half of the RIVs (and therefore, the corresponding PRBs) could correspond to the first (or the second) MAC CE(s)/bitmap(s) activated CORESETPoolIndex value (e.g., the CORESETPoolIndex value 0 or 1), and the rest of or the second half of the RIVs (and therefore, the corresponding PRBs) could correspond to the second (or the first) MAC CE(s)/bitmap(s) activated CORESETPoolIndex value (e.g., the CORESETPoolIndex value 1 or 0); in another example (option-2.1.20), the i-th RIV (and therefore, the corresponding PRB) could correspond to the (mod (i−1, N_cs')+1)-th MAC CE(s)/bitmap(s) activated CORE-SETPoolIndex value, where N_cs' represents the total number of MAC CE(s)/bitmap(s) activated CORESET-PoolIndex values, i=1, . . . , N_riv, where N_riv represents the total number of RIVs indicated in the FD-RA field, and mod(x, y) calculates the remainder of the Euclidean division of x by y; for a total of two MAC CE(s)/bitmap(s) activated CORESETPoolIndex values (e.g., 0 and 1), the odd-numbered RIVs (and therefore, the corresponding PRBs) could correspond to the first (or the second) MAC CE(s)/bitmap(s) activated CORESETPoolIndex value (e.g., the CORESET-PoolIndex value 0), and the even-numbered RIVs (and therefore, the corresponding PRBs) could correspond to the second (or the first) MAC CE(s)/bitmap(s) activated CORE-SETPoolIndex value (e.g., the CORESETPoolIndex value 1 or 0).

The total number of RIVs N_riv indicated in the FD-RA field could be configured by the network (e.g., via higher layer RRC signaling and/or MAC CE command and/or dynamic DCI signaling) and/or fixed in the system specifications and/or reported by the UE based on UE's capability and/or equal to the total number of MAC CE(s)/bitmap(s) activated CORESETPoolIndex values. The UE could be indicated by the network, e.g., via higher layer RRC signaling and/or MAC CE command and/or dynamic DCI signaling, which option(s) (from/out of option-2.1.19 and option-2.1.20) to use/being used for indicating the mapping/association between the RIVs in the FD-RA field and the MAC CE(s)/bitmap(s) activated CORESETPoolIndex values; for instance, a one-bit flag indicator could be incorporated/included in the DCI to differentiate between option-2.1.19 and option-2.1.20. The UE could be indicated by the network one or more conditions, e.g., whether the total number of MAC CE(s)/bitmap(s) activated CORESET-PoolIndex values is larger than a threshold, to switch between option-2.1.19 and option-2.1.20.

Furthermore, for the Type 1 based PDSCH frequency domain resource allocation, a RIV could be calculated/determined based on at least a starting PRB position.

For example, the 1-st RIV indicated in the FD-RA field (e.g., corresponding to the first MAC CE(s)/bitmap(s) activated CORESETPoolIndex value) could be calculated/determined based on a first starting PRB position and a first number of consecutive PRBs, the 2-nd RIV indicated in the FD-RA field (e.g., corresponding to the second MAC CE(s)/bitmap(s) activated CORESETPoolIndex value) could be calculated/determined based on a second starting PRB position and a second number of consecutive PRBs, and so on, and the N-th RIV indicated in the FD-RA field (e.g., corresponding to the last MAC CE(s)/bitmap(s) activated CORESETPoolIndex value) could be calculated/determined based on a N-th starting PRB position and a N-th number of consecutive PRBs. The first PRB starting position, the second starting PRB position, and so on, and the N-th PRB starting position could be different and are indicated/included in the FD-RA field; the first number of consecutive PRBs, the second number of consecutive PRBs, and so on, and the N-th number of consecutive PRBs could be different and are also indicated/included in the FD-RA field.

For another example, the 1-st RIV indicated in the FD-RA field (e.g., corresponding to the first MAC CE(s)/bitmap(s) activated CORESETPoolIndex value) could be calculated/determined based on a first starting PRB position and a first number of consecutive PRBs, the 2-nd RIV indicated in the FD-RA field (e.g., corresponding to the second MAC CE(s)/bitmap(s) activated CORESETPoolIndex value) could be calculated/determined based on a second starting PRB position and a second number of consecutive PRBs same as the first number of consecutive PRBs, and so on, and the N-th RIV indicated in the FD-RA field (e.g., corresponding to the last MAC CE(s)/bitmap(s) activated CORESETPoolIndex value) could be calculated/determined based on a N-th starting PRB position and a N-th number of consecutive PRBs same as the first number of consecutive PRBs. The first PRB starting position, the second starting PRB position, and so on, and the N-th PRB starting position could be different and are indicated/included in the FD-RA field; the first number of consecutive PRBs is also indicated/included in the FD-RA field.

Yet for another example, the 1-st RIV indicated in the FD-RA field (e.g., corresponding to the first MAC CE(s)/bitmap(s) activated CORESETPoolIndex value) could be calculated/determined based on a first starting PRB position and a first number of consecutive PRBs, the 2-nd RIV indicated in the FD-RA field (e.g., corresponding to the second MAC CE(s)/bitmap(s) activated CORESETPoolIndex value) could be calculated/determined based on a second number of consecutive PRBs and a second starting PRB position having a gap with respect to the last PRB indicated by the 1-st RIV, and so on, the N-th RIV indicated in the FD-RA field (e.g., corresponding to the last MAC CE(s)/bitmap(s) activated CORESETPoolIndex value) could be calculated/determined based on a N-th number of consecutive PRBs and a N-th starting PRB position having a gap with respect to the last PRB indicated by the (N−1)-th RIV. The gap could be configured by the network and set to 0. The first number of consecutive PRBs, the second number of consecutive PRBs, and so on, and the N-th number of consecutive PRBs could be different and are indicated/included in the FD-RA field; the first starting PRB position is also indicated/included in the FD-RA field.

Other exact association/mapping relationships between the frequency domain resources indicated in the FD-RA field and the CORESETPoolIndex values and/or the corresponding indication method(s), e.g., via higher layer RRC signaling and/or MAC CE command and/or dynamic DCI signaling, are also possible.

In yet another example, the UE could be implicitly indicated by the network the association/mapping between one or more bits in the bitmap in the FD-RA field—Type 0 (and therefore, the corresponding one or more RBGs) and the CORESETPoolIndex values, and/or the association/mapping between one or more RIVs in the FD-RA field—Type 1 (and therefore, the corresponding one or more PRBs) and the CORESETPoolIndex values. The UE could be higher layer configured by the network a list/set/pool of CORESETPoolIndex values—e.g., a set of two CORESET-PoolIndex values 0 and 1. The UE could also receive from the network one or more MAC CE activation commands/bitmaps to activate one or more CORESETPoolIndex values from the higher layer configured list/set/pool of CORESET-PoolIndex values.

For the Type 0 based PDSCH frequency domain resource allocation: in one example (option-2.1.21), the 1-st to n_0-th (n_0≥1) (non-zero) bits/entries in the bitmap (and therefore, the corresponding RBGs) could correspond to the lowest/ lowest MAC CE activated CORESETPoolIndex value, the (n_0+1)-th to n_1-th (n_1≥n_0) (non-zero) bits/entries in the bitmap (and therefore, the corresponding RBGs) could correspond to the second lowest/second lowest MAC CE activated CORESETPoolIndex value, and so on, and the n_p-th to n_q-th (n_q≥n_p) (non-zero) bits/entries in the bitmap (and therefore, the corresponding RBGs) could correspond to the highest/highest MAC CE activated CORESETPoolIndex value; for a total of two (MAC CE activated) CORESETPoolIndex values (e.g., 0 and 1), the first N_0 (N_0≥1) or the first half of the (non-zero) bits/entries in the bitmap (and therefore, the corresponding RBGs) could correspond to the first, or the second, (MAC CE activated) CORESETPoolIndex value (e.g., the CORESETPoolIndex value 0 or 1), and the rest of or the second half of the (non-zero) bits/entries in the bitmap (and therefore, the corresponding RBGs) could correspond to the second, or the first, (MAC CE activated) CORESETPoolIndex value (e.g., the CORESETPoolIndex value 1 or 0); in another example (option-2.1.22), the i-th (non-zero) bit/entry in the bitmap (and therefore, the corresponding RBG) could correspond to the (mod(i−1, N_cs)+1)-th lowest (or highest)/(mod(i−1, N_cs')+1)-th lowest (or highest) MAC CE activated CORESETPoolIndex value, where N_cs represents the total number of CORESETPoolIndex values, N_cs' represents the total number of MAC CE(s)/bitmap(s) activated CORESETPoolIndex values, i=1, ..., N_bit, where N_bit represents the total number of (non-zero) bits/entries in the bitmap indicated in the FD-RA field, and mod(x, y) calculates the remainder of the Euclidean division of x by y; for a total of two (MAC CE activated) CORESETPoolIndex values (e.g., 0 and 1), the odd-numbered (non-zero) bits/entries in the bitmap (and therefore, the corresponding RBGs) could correspond to the first, or the second, (MAC CE activated) CORESETPoolIndex value (e.g., the CORESETPoolIndex value 0 or 1), and the even-numbered (non-zero) bits/entries in the bitmap (and therefore, the corresponding RBGs) could correspond to the second, or the first, (MAC CE activated) CORESETPoolIndex value (e.g., the CORESETPoolIndex value 1 or 0).

The total number of (non-zero) bits/entries in the bitmap N_bit indicated in the FD-RA field could be configured by the network (e.g., via higher layer RRC signaling and/or MAC CE command and/or dynamic DCI signaling) and/or fixed in the system specifications and/or reported by the UE based on UE's capability and/or equal to the total number of (MAC CE activated) CORESETPoolIndex values. The UE could be indicated by the network, e.g., via higher layer RRC signaling and/or MAC CE command and/or dynamic DCI signaling, which option(s) (from/out of option-2.1.21 and option-2.1.22) to use/being used for indicating the mapping/association between the (non-zero) bit(s)/entry(s) in the bitmap in the FD-RA field and the (MAC CE activated) CORESETPoolIndex values; for instance, a one-bit flag indicator could be incorporated/included in the DCI to differentiate between option-2.1.21 and option-2.1.22.

The UE could be indicated by the network one or more conditions, e.g., whether the total number of (MAC CE activated) CORESETPoolIndex values is larger than a threshold, to switch between option-2.1.21 and option-2.1.22. For the Type 1 based PDSCH frequency domain resource allocation: in one example (option-2.1.23), the 1-st to n_0-th (n_0≥1) RIVs (and therefore, the corresponding PRBs) could correspond to the lowest/lowest MAC CE activated CORESETPoolIndex value, the (n_0+1)-th to n_1-th (n_1≥n_0) RIVs (and therefore, the corresponding PRBs) could correspond to the second lowest/second lowest MAC CE activated CORESETPoolIndex value, and so on, and the n_p-th to n_q-th (n_q≥n_p) RIVs (and therefore, the corresponding PRBs) could correspond to the highest/highest MAC CE activated CORESETPoolIndex value; for a total of two (MAC CE activated) CORESETPoolIndex values (e.g., 0 and 1), the first N_0 (N_0≥1) or the first half of the RIVs (and therefore, the corresponding PRBs) could correspond to the first, or the second, (MAC CE activated) CORESETPoolIndex value (e.g., the CORESETPoolIndex value 0 or 1), and the rest of or the second half of the RIVs (and therefore, the corresponding PRBs) could correspond to the second, or the first, (MAC CE activated) CORESETPoolIndex value (e.g., the CORESETPoolIndex value 1 or 0); in another example (option-2.1.24), the i-th RIV (and therefore, the corresponding PRB) could correspond to the (mod(i−1, N_cs)+1)-th lowest (or highest)/(mod(i−1, N_cs')+1) lowest (or highest) MAC CE activated CORESETPoolIndex value, where N_cs represents the total number of CORESETPoolIndex values, N_cs' represents the total number of MAC CE(s)/bitmap(s) activated CORESETPoolIndex values, i=1, ..., N_riv, where N_riv represents the total number of RIVs indicated in the FD-RA field, and mod(x, y) calculates the remainder of the Euclidean division of x by y; for a total of two (MAC CE activated) CORESETPoolIndex values (e.g., 0 and 1), the odd-numbered RIVs (and therefore, the corresponding PRBs) could correspond to the first, or the second, (MAC CE activated) CORESETPoolIndex value (e.g., the CORESETPoolIndex value 0 or 1), and the even-numbered RIVs (and therefore, the corresponding PRBs) could correspond to the second, or the first, (MAC CE activated) CORESETPoolIndex value (e.g., the CORESETPoolIndex value 1 or 0). The total number of RIVs N_riv indicated in the FD-RA field could be configured by the network (e.g., via higher layer RRC signaling and/or MAC CE command and/or dynamic DCI signaling) and/or fixed in the system specifications and/or reported by the UE based on UE's capability and/or equal to the total number of (MAC CE activated) CORESETPoolIndex values.

The UE could be indicated by the network, e.g., via higher layer RRC signaling and/or MAC CE command and/or dynamic DCI signaling, which option(s) (from/out of option-2.1.23 and option-2.1.24) to use/being used for indicating the mapping/association between the RIVs in the FD-RA field and the (MAC CE activated) CORESETPoolIndex values; for instance, a one-bit flag indicator could be incorporated/included in the DCI to differentiate between option-2.1.23 and option-2.1.24. The UE could be indicated by the network one or more conditions, e.g., whether the total number of (MAC CE activated) CORESETPoolIndex values is larger than a threshold, to switch between option-2.1.23 and option-2.1.24.

Furthermore, for the Type 1 based PDSCH frequency domain resource allocation, a RIV could be calculated/determined based on at least a starting PRB position. For example, the 1-st RIV indicated in the FD-RA field (e.g., corresponding to the lowest/lowest MAC CE activated CORESETPoolIndex value) could be calculated/determined based on a first starting PRB position and a first number of consecutive PRBs, the 2-nd RIV indicated in the FD-RA field (e.g., corresponding to the second lowest/second lowest MAC CE activated CORESETPoolIndex value) could be calculated/determined based on a second starting PRB position and a second number of consecutive PRBs, and so on, and the N-th RIV indicated in the FD-RA field (e.g., corresponding to the highest/highest MAC CE activated CORESETPoolIndex value) could be calculated/determined based on a N-th starting PRB position and a N-th number of consecutive PRBs. The first PRB starting position, the second starting PRB position, and so on, and the N-th PRB starting position could be different and are indicated/included in the FD-RA field; the first number of consecutive PRBs, the second number of consecutive PRBs, and so on, and the N-th number of consecutive PRBs could be different and are also indicated/included in the FD-RA field.

For another example, the 1-st RIV indicated in the FD-RA field (e.g., corresponding to the lowest/lowest MAC CE activated CORESETPoolIndex value) could be calculated/determined based on a first starting PRB position and a first number of consecutive PRBs, the 2-nd RIV indicated in the FD-RA field (e.g., corresponding to the second lowest/second lowest MAC CE activated CORESETPoolIndex value) could be calculated/determined based on a second starting PRB position and a second number of consecutive PRBs same as the first number of consecutive PRBs, and so on, and the N-th RIV indicated in the FD-RA field (e.g., corresponding to the highest/highest MAC CE activated CORESETPoolIndex value) could be calculated/determined based on a N-th starting PRB position and a N-th number of consecutive PRBs same as the first number of consecutive PRBs. The first PRB starting position, the second starting PRB position, and so on, and the N-th PRB starting position could be different and are indicated/included in the FD-RA field; the first number of consecutive PRBs is also indicated/included in the FD-RA field.

Yet for another example, the 1-st RIV indicated in the FD-RA field (e.g., corresponding to the lowest/lowest MAC CE activated CORESETPoolIndex value) could be calculated/determined based on a first starting PRB position and a first number of consecutive PRBs, the 2-nd RIV indicated in the FD-RA field (e.g., corresponding to the second lowest/second lowest MAC CE activated CORESETPoolIndex value) could be calculated/determined based on a second number of consecutive PRBs and a second starting PRB position having a gap with respect to the last PRB indicated by the 1-st RIV, and so on, the N-th RIV indicated in the FD-RA field (e.g., corresponding to the highest/highest MAC CE activated CORESETPoolIndex value) could be calculated/determined based on a N-th number of consecutive PRBs and a N-th starting PRB position having a gap with respect to the last PRB indicated by the (N−1)-th RIV. The gap could be configured by the network and set to 0. The first number of consecutive PRBs, the second number of consecutive PRBs, and so on, and the N-th number of consecutive PRBs could be different and are indicated/included in the FD-RA field; the first starting PRB position is also indicated/included in the FD-RA field.

Other implicit indication methods of the association/mapping between the frequency domain resources indicated in the FD-RA field and the CORESETPoolIndex values are also possible.

For another example, the UE could be indicated by the network a single DCI comprising of N>1 FD-RA fields to indicate the frequency domain resource allocation; each FD-RA field could correspond to/be associated with a TRP in the multi-TRP system.

In one example, the UE could be explicitly indicated by the network, e.g., via higher layer RRC signaling and/or MAC CE command and/or dynamic DCI signaling, the exact association/mapping between the N>1 FD-RA fields indicated in the DCI and the TRPs in the multi-TRP system. For example, the UE could be first higher layer configured by the network a list/set/pool of TRP-specific ID/index values such as PCIs. The first FD-RA field indicated in the DCI could correspond to the first entry/TRP in the list/set/ pool of TRP-specific ID/index values, the second FD-RA field indicated in the DCI could correspond to the second entry/TRP in the list/set/pool of TRP-specific ID/index values, and so on, and the last FD-RA field indicated in the DCI could correspond to the last entry/TRP in the list/set/pool of TRP-specific ID/index values.

For another example, the UE could be first higher layer configured by the network a list/set/pool of TRP-specific ID/index values such as PCIs. The UE could then receive from the network one or more MAC CE activation commands/bitmaps to activate one or more TRP-specific ID/index values from the higher layer configured list/set/pool of TRP-specific ID/index values. The first FD-RA field indicated in the DCI could correspond to the first MAC CE(s)/bitmap(s) activated TRP-specific ID/index value, the second FD-RA field indicated in the DCI could correspond to the second MAC CE(s)/bitmap(s) activated TRP-specific ID/index value, and so on, and the last FD-RA field indicated in the DCI could correspond to the last MAC CE(s)/bitmap(s) activated TRP-specific ID/index value. Other exact association/mapping relationships between the N>1 FD-RA fields indicated in the DCI and the TRPs in the multi-TRP system and/or the corresponding indication method(s), e.g., via higher layer RRC signaling and/or MAC CE command and/or dynamic DCI signaling, are also possible.

In another example, the UE could be implicitly indicated by the network the association/mapping between the N>1 FD-RA fields indicated in the DCI and the TRPs in the multi-TRP system. The UE could be higher layer configured by the network a list/set/pool of TRP-specific ID/index values such as PCIs. The UE could also receive from the network one or more MAC CE activation commands/bitmaps to activate one or more TRP-specific ID/index values from the higher layer configured list/set/pool of TRP-specific ID/index values. For example, the first FD-RA field indicated in the DCI could correspond to the TRP with the lowest/lowest MAC CE activated TRP-specific ID/index value such as the lowest PCI value and/or the first TRP (e.g., TRP #1), the second FD-RA field indicated in the DCI could correspond to the TRP with the second lowest/second lowest MAC CE activated TRP-specific ID/index value such as the second lowest PCI value and/or the second TRP (e.g., TRP #2), and so on, and the last FD-RA field indicated in the DCI could correspond to the TRP with the highest/highest MAC CE activated TRP-specific ID/index value such as the highest PCI value and/or the last TRP (e.g., TRP #N).

For another example, the first FD-RA field indicated in the DCI could correspond to the TRP with the highest/highest MAC CE activated TRP-specific ID/index value such as the highest PCI value and/or the last TRP (e.g., TRP #N), the second FD-RA field indicated in the DCI could correspond to the TRP with the second highest/second highest MAC CE activated TRP-specific ID/index value such as the second highest PCI value and/or the second last TRP (e.g., TRP #N−1), and so on, and the last FD-RA field indicated in the DCI could correspond to the TRP with the lowest/lowest MAC CE activated TRP-specific ID/index value such as the lowest PCI value and/or the first TRP (e.g., TRP #1). Other implicit indication methods of the association/mapping between the N>1 FD-RA fields indicated in the DCI and the TRPs in the multi-TRP system are also possible.

In yet another example, the UE could be explicitly indicated by the network, e.g., via higher layer RRC signaling and/or MAC CE command and/or dynamic DCI signaling, the exact association/mapping between the N>1 FD-RA fields indicated in the DCI and the CORESETPoolIndex values. For example, the UE could be first higher layer configured by the network a list/set/pool of CORESET-PoolIndex values—e.g., a set of two CORESETPoolIndex values 0 and 1. The first FD-RA field indicated in the DCI could correspond to the first entry/CORESETPoolIndex value in the list/set/pool of CORESETPoolIndex values, the second FD-RA field indicated in the DCI could correspond to the second entry/CORESETPoolIndex value in the list/set/pool of CORESETPoolIndex values, and so on, and the last FD-RA field indicated in the DCI could correspond to the last entry/CORESETPoolIndex value in the list/set/pool of CORESETPoolIndex values.

For another example, the UE could be first higher layer configured by the network a list/set/pool of CORESET-PoolIndex values—e.g., a set of two CORESETPoolIndex values 0 and 1. The UE could then receive from the network one or more MAC CE activation commands/bitmaps to activate one or more CORESETPoolIndex values from the higher layer configured list/set/pool of CORESETPoolIndex values. The first FD-RA field indicated in the DCI could correspond to the first MAC CE(s)/bitmap(s) activated CORESETPoolIndex value, the second FD-RA field indicated in the DCI could correspond to the second MAC CE(s)/bitmap(s) activated CORESETPoolIndex value, and so on, and the last FD-RA field indicated in the DCI could correspond to the last MAC CE(s)/bitmap(s) activated CORESETPoolIndex value. Other exact association/mapping relationships between the N>1 FD-RA fields indicated in the DCI and the CORESETPoolIndex values and/or the corresponding indication method(s), e.g., via higher layer RRC signaling and/or MAC CE command and/or dynamic DCI signaling, are also possible.

In yet another example, the UE could be implicitly indicated by the network the association/mapping between the N>1 FD-RA fields indicated in the DCI and the CORE-SETPoolIndex values. The UE could be higher layer configured by the network a list/set/pool of CORESETPoolIndex values—e.g., a set of two CORESETPoolIndex values 0 and 1. The UE could also receive from the network one or more MAC CE activation commands/bitmaps to activate one or more CORESETPoolIndex values from the higher layer configured list/set/pool of CORESETPoolIndex values. For example, the first FD-RA field indicated in the DCI could correspond to the lowest/lowest MAC CE activated CORESETPoolIndex value such as "0," the second FD-RA field indicated in the DCI could correspond to the second lowest/second lowest MAC CE activated CORESETPoolIndex value such as "1," and so on, and the last FD-RA field indicated in the DCI could correspond to the highest/highest MAC CE activated CORESETPoolIndex value such as "N−1."

For another example, the first FD-RA field indicated in the DCI could correspond to the highest/highest MAC CE activated CORESETPoolIndex value such as "N−1," the second FD-RA field indicated in the DCI could correspond to the second highest/second highest MAC CE activated CORESETPoolIndex value such as "N−2," and so on, and the last FD-RA field indicated in the DCI could correspond to the lowest/lowest MAC CE activated CORESETPoolIndex value such as "0." Other implicit indication methods of the association/mapping between the N>1 FD-RA fields indicated in the DCI and the CORESETPoolIndex values are also possible.

In yet another example, a FD-RA field indicated in the DCI could include/comprise/incorporate at least one ID/index value. For example, this ID/index value could be a (absolute) TRP-specific ID/index value such as PCI value, TRP ID value, TRP index value and etc., based on a list/set/pool of TRP-specific ID/index values, e.g., higher layer configured to the UE and/or higher layer configured to the UE and activated by one or more MAC CE activation commands/bitmaps. For another example, this ID/index value could be an (relative) index within the list/set/pool of TRP-specific ID/index values, e.g., higher layer configured to the UE and/or higher layer configured to the UE and activated by one or more MAC CE activation commands/bitmaps. For yet another example, this ID/index value could be a CORESETPoolIndex value.

Yet for another example, the UE could be indicated by the network N>1 DCIs with each DCI comprising of at least one FD-RA field to indicate the frequency domain resource allocation; each DCI, and therefore, the FD-RA field(s) indicated therein, could correspond to/be associated with a TRP in the multi-TRP system.

In one example, the UE could be explicitly indicated by the network, e.g., via higher layer RRC signaling and/or MAC CE command and/or dynamic DCI signaling, the exact association/mapping between the N>1 DCIs indicating the FD-RA fields and the TRPs in the multi-TRP system. For example, the UE could be first higher layer configured by the network a list/set/pool of TRP-specific ID/index values such as PCIs. The DCI (indicating at least one FD-RA field) associated with the lowest CORESETPoolIndex value (indicated in the corresponding higher layer parameter Control-ResourceSet) could correspond to the first entry/TRP in the list/set/pool of TRP-specific ID/index values, the DCI (indicating at least one FD-RA field) associated with the second lowest CORESETPoolIndex value (indicated in the corresponding higher layer parameter ControlResourceSet) could correspond to the second entry/TRP in the list/set/pool of TRP-specific ID/index values, and so on, and the DCI (indicating at least one FD-RA field) associated with the highest CORESETPoolIndex value (indicated in the corresponding higher layer parameter ControlResourceSet) could correspond to the last entry/TRP in the list/set/pool of TRP-specific ID/index values.

For another example, the UE could be first higher layer configured by the network a list/set/pool of TRP-specific ID/index values such as PCIs. The UE could then receive from the network one or more MAC CE activation commands/bitmaps to activate one or more TRP-specific ID/index values from the higher layer configured list/set/pool of TRP-specific ID/index values. The DCI (indicating at least one FD-RA field) associated with the lowest CORESET-PoolIndex value (indicated in the corresponding higher layer parameter ControlResourceSet) could correspond to the first MAC CE(s)/bitmap(s) activated TRP-specific ID/index value, the DCI (indicating at least one FD-RA field) associated with the second lowest CORESETPoolIndex value (indicated in the corresponding higher layer parameter ControlResourceSet) could correspond to the second MAC CE(s)/bitmap(s) activated TRP-specific ID/index value, and so on, and the DCI (indicating at least one FD-RA field) associated with the highest CORESETPoolIndex value (indicated in the corresponding higher layer parameter ControlResourceSet) could correspond to the last MAC CE(s)/bitmap(s) activated TRP-specific ID/index value. Other exact association/mapping relationships between the N>1 DCIs indicating the FD-RA fields and the TRPs in the multi-TRP system and/or the corresponding indication method(s), e.g., via higher layer RRC signaling and/or MAC CE command and/or dynamic DCI signaling, are also possible.

In another example, the UE could be implicitly indicated by the network the association/mapping between the N>1

DCIs indicating the FD-RA fields and the TRPs in the multi-TRP system. The UE could be higher layer configured by the network a list/set/pool of TRP-specific ID/index values such as PCIs. The UE could also receive from the network one or more MAC CE activation commands/bitmaps to activate one or more TRP-specific ID/index values from the higher layer configured list/set/pool of TRP-specific ID/index values.

For example, the DCI (indicating at least one FD-RA field) associated with the lowest CORESETPoolIndex value (indicated in the corresponding higher layer parameter ControlResourceSet) could correspond to the TRP with the lowest/lowest MAC CE activated TRP-specific ID/index value such as the lowest PCI value and/or the first TRP (e.g., TRP #1), the DCI (indicating at least one FD-RA field) associated with the second lowest CORESETPoolIndex value (indicated in the corresponding higher layer parameter ControlResourceSet) could correspond to the TRP with the second lowest/second lowest MAC CE activated TRP-specific ID/index value such as the second lowest PCI value and/or the second TRP (e.g., TRP #2), and so on, and the DCI (indicating at least one FD-RA field) associated with the highest CORESETPoolIndex value (indicated in the corresponding higher layer parameter ControlResourceSet) could correspond to the TRP with the highest/highest MAC CE activated TRP-specific ID/index value such as the highest PCI value and/or the last TRP (e.g., TRP #N).

For another example, the DCI (indicating at least one FD-RA field) associated with the lowest CORESETPoolIndex value (indicated in the corresponding higher layer parameter ControlResourceSet) could correspond to the TRP with the highest/highest MAC CE activated TRP-specific ID/index value such as the highest PCI value and/or the last TRP (e.g., TRP #N), the DCI (indicating at least one FD-RA field) associated with the second lowest CORESETPoolIndex value (indicated in the corresponding higher layer parameter ControlResourceSet) could correspond to the TRP with the second highest/second highest MAC CE activated TRP-specific ID/index value such as the second highest PCI value and/or the second last TRP (e.g., TRP #N−1), and so on, and the DCI (indicating at least one FD-RA field) associated with the highest CORESETPoolIndex value (indicated in the corresponding higher layer parameter ControlResourceSet) could correspond to the TRP with the lowest/lowest MAC CE activated TRP-specific ID/index value such as the lowest PCI value and/or the first TRP (e.g., TRP #1). Other implicit indication methods of the association/mapping between the N>1 DCIs indicating the FD-RA fields and the TRPs in the multi-TRP system are also possible.

In yet another example, a DCI indicating at least one FD-RA field could include/comprise/incorporate at least one ID/index value. For example, this ID/index value could be a (absolute) TRP-specific ID/index value such as PCI value, TRP ID value, TRP index value and etc., based on a list/set/pool of TRP-specific ID/index values, e.g., higher layer configured to the UE and/or higher layer configured to the UE and activated by one or more MAC CE activation commands/bitmaps. For another example, this ID/index value could be an (relative) index within the list/set/pool of TRP-specific ID/index values, e.g., higher layer configured to the UE and/or higher layer configured to the UE and activated by one or more MAC CE activation commands/bitmaps. For yet another example, this ID/index value could be a CORESETPoolIndex value.

An example of MAC CE based TCI state/beam indication for the multi-TRP operation with PDSCH(s) repetition is presented in FIG. 10. As illustrated in FIG. 10, the UE could be first higher layer configured by the network, e.g., via the higher layer RRC signaling, a list/pool of N_tci TCI states. Each TCI state contains at least a QCL source RS with a QCL type, e.g., QCL-typeA/B/C/D. The UE could then receive from the network one or more MAC CE commands to indicate one or more beam(s) (i.e., the TCI state(s)) for the transmission/reception of the PDSCH(s) transmitted from/associated with one or more TRPs in a multi-TRP system on different/non-overlapping frequency domain resources. For instance, the UE could receive from the network a single MAC CE command for beam indication to indicate N>1 TCI states/beams for the same PDSCH(s) transmitted from/associated with different TRPs in the multi-TRP system on different/non-overlapping frequency domain resources. As depicted in FIG. 9 and FIG. 10, the UE could receive from the network a single MAC CE command for beam indication to indicate N=2 TCI states/beams (TCI #3 and TCI #5) for the same PDSCH-a transmitted from/associated with two TRPs, i.e., TRP-1 and TRP-2, in the multi-TRP system, respectively, on different/non-overlapping frequency domain resources.

The MAC CE for beam indication could include at least a TCI state ID. As discussed above, the TCI state corresponding to the TCI state ID could be at least one of: (1) a DL TCI state; (2) an UL TCI state; (3) a joint DL and UL TCI state; and/or (4) separate DL TCI state and UL TCI state.

The association/mapping between the TCI state(s)/beam(s) indicated in the MAC CE command(s) and the TRPs in the multi-TRP system could follow those discussed/specified in example-1.1.1, example-1.1.2, example-1.1.3, example-1.1.4, example-1.1.5, example-1.1.a, example-1.1.b, example-1.1.c, example-1.1.d and example-1.1.e. There could be various means to associate/map between the TCI state(s)/beam(s) indicated in the MAC CE command(s) and the frequency domain resources indicated in the FD-RA field(s).

For N>1 TCI states/beams indication in a single MAC CE command for beam indication, for a single DCI indicating a single FD-RA field, wherein the frequency domain resources indicated in the FD-RA field are associated with different TRPs in the multi-TRP system, in one example, the UE could be explicitly indicated by the network the association/mapping between the TCI states/beams indicated in the MAC CE command for beam indication and the frequency domain resources indicated in the FD-RA field. For the Type 0 based PDSCH resource allocation, the UE could be indicated by the network the association/mapping between a TCI state/beam indicated in the MAC CE command for beam indication and one or more (non-zero) bits/entries in the bitmap in the FD-RA field. For example (option-2.2.1), the first TCI state and/or the TCI state with the lowest TCI state ID value indicated in the MAC CE command for beam indication could correspond to the 1-st to n_0-th (n_0≥1) (non-zero) bits/entries in the bitmap (and therefore, the corresponding RBGs), the second TCI state and/or the TCI state with the second lowest TCI state ID value indicated in the MAC CE command for beam indication could correspond to the (n_0+1)-th to n_1-th (n_1≥n_0) (non-zero) bits/entries in the bitmap (and therefore, the corresponding RBGs), and so on, and the last TCI state and/or the TCI state with the highest TCI state ID value indicated in the MAC CE command for beam indication could correspond to the n_p-th to n_q-th (n_q≥n_p) (non-zero) bits/entries in the bitmap (and therefore, the corresponding RBGs); for a total of two TCI states/beams indicated in the MAC CE command for beam indication, the first N_0 (N_0≥1) or the first half of the (non-zero) bits/entries in the bitmap (and therefore, the corresponding RBGs) could correspond to the first (or the second) TCI state and/or the TCI state with the lowest (or the highest) TCI state ID value indicated in the MAC CE command for beam indication, and the rest of or the second half of the (non-zero) bits/entries in the bitmap (and therefore, the corresponding RBGs) could correspond to the second (or the first) TCI state and/or the TCI state with the highest (or the lowest) TCI state ID value indicated in the MAC CE command for beam indication.

For another example (option-2.2.2), the $(\mathrm{mod}(i-1, N\_tci)+1)$-th TCI state and/or the TCI state with the $(\mathrm{mod}(i-1, N\_tci)+1)$-th lowest/highest TCI state ID value indicated in the MAC CE command for beam indication could correspond to the i-th (non-zero) bit/entry in the bitmap (and therefore, the corresponding RBG), where N_tci represents the total number of TCI state(s)/beam(s) indicated in the MAC CE command for beam indication, i=1, . . . , N_bit, where N_bit represents the total number of (non-zero) bits/entries in the bitmap indicated in the FD-RA field, and $\mathrm{mod}(x, y)$ calculates the remainder of the Euclidean division of x by y; for a total of two TCI states/beams indicated in the MAC CE command for beam indication, the odd-numbered (non-zero) bits/entries in the bitmap (and therefore, the corresponding RBGs) could correspond to the first (or the second) TCI state and/or the TCI state with the lowest (or the highest) TCI state ID value indicated in the MAC CE command for beam indication, and the even-numbered (non-zero) bits/entries in the bitmap (and therefore, the corresponding RBGs) could correspond to the second (or the first) TCI state and/or the TCI state with the highest (or the lowest) TCI state ID value indicated in the MAC CE command for beam indication.

The total number of bit(s)/entry(s) in the bitmap N_bit indicated in the FD-RA field could be configured by the network (e.g., via higher layer RRC signaling and/or MAC CE command and/or dynamic DCI signaling) and/or fixed in the system specifications and/or reported by the UE based on UE's capability and/or equal to the total number of TCI states/beams indicated in the MAC CE command for beam indication. The UE could be indicated by the network, e.g., via higher layer RRC signaling and/or MAC CE command and/or dynamic DCI signaling, which option(s) (from/out of option-2.2.1 and option-2.2.2) to use/being used for indicating the mapping/association between the (non-zero) bit(s)/ entry(s) in the bitmap in the FD-RA field and the TCI states/beams indicated in the MAC CE command for beam indication; for instance, a one-bit flag indicator could be incorporated/included in the DCI to differentiate between option-2.2.1 and option-2.2.2.

The UE could be indicated by the network one or more conditions, e.g., whether the total number of TCI states/ beams indicated in the MAC CE command for beam indication is larger than a threshold, to switch between option-2.2.1 and option-2.2.2. For the Type 1 based PDSCH resource allocation, the UE could be indicated by the network the association/mapping between a TCI state/beam indicated in the MAC CE command for beam indication and one or more RIVs in the FD-RA field. For example (option-2.2.3), the first TCI state and/or the TCI state with the lowest TCI state ID value indicated in the MAC CE command for beam indication could correspond to the 1-st to n_0-th $(n\_0 \geq 1)$ RIVs (and therefore, the corresponding PRBs), the second TCI state and/or the TCI state with the second lowest TCI state ID value indicated in the MAC CE command for beam indication could correspond to the $(n\_0+1)$-th to $n\_1$-th $(n\_1 \geq n\_0)$ RIVs (and therefore, the corresponding PRBs), and so on, and the last TCI state and/or the TCI state with the highest TCI state ID value indicated in the MAC CE command for beam indication could correspond to the $n\_p$-th to $n\_q$-th $(n\_q \geq n\_p)$ RIVs (and therefore, the corresponding PRBs); for a total of two TCI states/beams indicated in the MAC CE command for beam indication, the first $N\_0$ $(N\_0 \geq 1)$ or the first half of the RIVs (and therefore, the corresponding PRBs) could correspond to the first (or the second) TCI state and/or the TCI state with the lowest (or the highest) TCI state ID value indicated in the MAC CE command for beam indication, and the rest of or the second half of the RIVs (and therefore, the corresponding PRBs) could correspond to the second (or the first) TCI state and/or the TCI state with the highest (or the lowest) TCI state ID value indicated in the MAC CE command for beam indication. For another example (option-2.2.4), the $(\mathrm{mod}(i-1, N\_tci)+1)$-th TCI state and/or the TCI state with the $(\mathrm{mod}(i-1, N\_tci)+1)$-th lowest/highest TCI state ID value indicated in the MAC CE command for beam indication could correspond to the i-th RIV (and therefore, the corresponding PRB), where N_tci represents the total number of TCI state(s)/beam(s) indicated in the MAC CE command for beam indication, i=1, . . . , N_riv, where N_riv represents the total number of RIVs indicated in the FD-RA field, and $\mathrm{mod}(x, y)$ calculates the remainder of the Euclidean division of x by y; for a total of two TCI states/beams indicated in the MAC CE command for beam indication, the odd-numbered RIVs (and therefore, the corresponding PRBs) could correspond to the first (or the second) TCI state and/or the TCI state with the lowest (or the highest) TCI state ID value indicated in the MAC CE command for beam indication, and the even-numbered (and therefore, the corresponding PRBs) could correspond to the second (or the first) TCI state and/or the TCI state with the highest (or the lowest) TCI state ID value indicated in the MAC CE command for beam indication.

The total number of RIVs N_riv indicated in the FD-RA field could be configured by the network (e.g., via higher layer RRC signaling and/or MAC CE command and/or dynamic DCI signaling) and/or fixed in the system specifications and/or reported by the UE based on UE's capability and/or equal to the total number of TCI states/beams indicated in the MAC CE command for beam indication. The UE could be indicated by the network, e.g., via higher layer RRC signaling and/or MAC CE command and/or dynamic DCI signaling, which option(s) (from/out of option-2.2.3 and option-2.2.4) to use/being used for indicating the mapping/association between the RIVs in the FD-RA field and the TCI states/beams indicated in the MAC CE command for beam indication; for instance, a one-bit flag indicator could be incorporated/included in the DCI to differentiate between option-2.2.3 and option-2.2.4. The UE could be indicated by the network one or more conditions, e.g., whether the total number of TCI states/beams indicated in the MAC CE command for beam indication is larger than a threshold, to switch between option-2.2.3 and option-2.2.4.

Furthermore, for the Type 1 based PDSCH frequency domain resource allocation, a RIV could be calculated/ determined based on at least a starting PRB position, for example, the 1-st RIV indicated in the FD-RA field (e.g., corresponding to the first TCI state and/or the TCI state with the lowest TCI state ID value indicated in the MAC CE command for beam indication) could be calculated/determined based on a first starting PRB position and a first number of consecutive PRBs, the 2-nd RIV indicated in the FD-RA field (e.g., corresponding to the second TCI state and/or the TCI state with the second lowest TCI state ID value indicated in the MAC CE command for beam indication) could be calculated/determined based on a second starting PRB position and a second number of consecutive PRBs, and so on, and the N-th RIV indicated in the FD-RA field (e.g., corresponding to the last TCI state and/or the TCI state with the highest TCI state ID value indicated in the MAC CE command for beam indication) could be calculated/determined based on a N-th starting PRB position and a N-th number of consecutive PRBs. The first PRB starting position, the second starting PRB position, and so on, and the N-th PRB starting position could be different and are indicated/included in the FD-RA field; the first number of consecutive PRBs, the second number of consecutive PRBs, and so on, and the N-th number of consecutive PRBs could be different and are also indicated/included in the FD-RA field.

For another example, the 1-st RIV indicated in the FD-RA field (e.g., corresponding to the first TCI state and/or the TCI state with the lowest TCI state ID value indicated in the MAC CE command for beam indication) could be calculated/determined based on a first starting PRB position and a first number of consecutive PRBs, the 2-nd RIV indicated in the FD-RA field (e.g., corresponding to the second TCI state and/or the TCI state with the second lowest TCI state ID value indicated in the MAC CE command for beam indication) could be calculated/determined based on a second starting PRB position and a second number of consecutive PRBs same as the first number of consecutive PRBs, and so on, and the N-th RIV indicated in the FD-RA field (e.g., corresponding to the last TCI state and/or the TCI state with the highest TCI state ID value indicated in the MAC CE command for beam indication) could be calculated/determined based on a N-th starting PRB position and a N-th number of consecutive PRBs same as the first number of consecutive PRBs. The first PRB starting position, the second starting PRB position, and so on, and the N-th PRB starting position could be different and are indicated/included in the FD-RA field; the first number of consecutive PRBs is also indicated/included in the FD-RA field.

Yet for another example, the 1-st RIV indicated in the FD-RA field (e.g., corresponding to the first TCI state and/or the TCI state with the lowest TCI state ID value indicated in the MAC CE command for beam indication) could be calculated/determined based on a first starting PRB position and a first number of consecutive PRBs, the 2-nd RIV indicated in the FD-RA field (e.g., corresponding to the second TCI state and/or the TCI state with the second lowest TCI state ID value indicated in the MAC CE command for beam indication) could be calculated/determined based on a second number of consecutive PRBs and a second starting PRB position having a gap with respect to the last PRB indicated by the 1-st RIV, and so on, the N-th RIV indicated in the FD-RA field (e.g., corresponding to the last TCI state and/or the TCI state with the highest TCI state ID value indicated in the MAC CE command for beam indication) could be calculated/determined based on a N-th number of consecutive PRBs and a N-th starting PRB position having a gap with respect to the last PRB indicated by the (N−1)-th RIV. The gap could be configured by the network and set to 0. The first number of consecutive PRBs, the second number of consecutive PRBs, and so on, and the N-th number of consecutive PRBs could be different and are indicated/included in the FD-RA field; the first starting PRB position is also indicated/included in the FD-RA field.

Other exact association/mapping relationships between the frequency domain resources indicated in the FD-RA field and the TCI state(s)/beam(s) indicated in the MAC CE command for beam indication and/or the corresponding indication method(s), e.g., via higher layer RRC signaling and/or MAC CE command and/or dynamic DCI signaling, are also possible.

In another example, the UE could be implicitly indicated by the network the association/mapping between the TCI states/beams indicated in the MAC CE command for beam indication and the frequency domain resources indicated in the FD-RA field. For the Type 0 based PDSCH resource allocation, a TCI state/beam indicated in the MAC CE command for beam indication could be associated with/mapped to one or more (non-zero) bits/entries in the bitmap (and therefore, the corresponding RBGs) indicated in the FD-RA field if the TCI state/beam indicated in the MAC CE command for beam indication and the corresponding (non-zero) bit(s)/entry(s) in the bitmap indicated in the FD-RA field are associated with the same TRP-specific ID value such as PCI value and/or the same CORESETPoolIndex value.

For the Type 1 based PDSCH resource allocation, a TCI state/beam indicated in the MAC CE command for beam indication could be associated with/mapped to one or more RIVs (and therefore, the corresponding PRBs) indicated in the FD-RA field if the TCI state/beam indicated in the MAC CE command for beam indication and the corresponding RIV(s) indicated in the FD-RA field are associated with the same TRP-specific ID value such as PCI value and/or the same CORESETPoolIndex value. Other implicit indication methods of the association/mapping between the TCI state(s)/beam(s) indicated in the MAC CE command for beam indication and the frequency domain resources indicated in the FD-RA field are also possible.

For N>1 TCI states/beams indication in a single MAC CE command for beam indication, for a single DCI indicating N>1 FD-RA fields, wherein each FD-RA field is associated with a different TRP in the multi-TRP system, in one example, the UE could be explicitly indicated by the network, e.g., via higher layer RRC signaling and/or MAC CE command and/or dynamic DCI signaling, the exact association/mapping between the N>1 TCI states/beams indicated in the MAC CE command for beam indication and the N>1 FD-RA fields indicated in the DCI. For example, the first TCI state and/or the TCI state with the lowest TCI state ID value indicated in the MAC CE command for beam indication could correspond to the first FD-RA field indicated in the DCI, the second TCI state and/or the TCI state with the second lowest TCI state ID value indicated in the MAC CE command for beam indication could correspond to the second FD-RA field indicated in the DCI, and so on, and the last TCI state and/or the TCI state with the highest TCI state ID value indicated in the MAC CE command for beam indication could correspond to the last FD-RA field indicated in the DCI. Other exact association/mapping relationships between the TCI states/beams indicated in the MAC CE command for beam indication and the FD-RA fields indicated in the DCI and/or the corresponding indication method(s), e.g., via higher layer RRC signaling and/or MAC CE command and/or dynamic DCI signaling, are also possible.

In another example, a TCI state, e.g., the higher layer parameter TCI-State, indicated in the MAC CE command for beam indication could include/comprise/incorporate at least one (absolute) FD-RA field ID/index value indicated in the DCI and/or at least one (relative) FD-RA field index within the N>1 FD-RA fields indicated in the DCI.

In yet another example, a FD-RA field indicated in the DCI could include/comprise/incorporate at least one (absolute) TCI state ID/index value indicated in the MAC CE command for beam indication and/or at least one (relative) TCI state index within the N>1 TCI states/beams indicated in the MAC CE command for beam indication.

In yet another example, the UE could be implicitly indicated by the network the association/mapping between the N>1 TCI states/beams indicated in the MAC CE command for beam indication and the N>1 FD-RA fields indicated in the DCI. For example, a TCI state/beam indicated in the MAC CE command for beam indication could be associated with/mapped to a FD-RA field indicated in the DCI if the TCI state/beam indicated in the MAC CE command for beam indication and the FD-RA field indicated in the DCI are associated with the same TRP-specific ID value such as PCI value and/or the same CORESETPoolIndex value. Other implicit indication methods of the association/mapping between the N>1 TCI states/beams indicated in the MAC CE command for beam indication and the N>1 FD-RA fields indicated in the DCI are also possible.

In yet another example, a TCI state/beam indicated in the MAC CE command for beam indication could be associated with/mapped to a FD-RA field indicated in the DCI if the TCI state/beam indicated in the MAC CE command for beam indication and the FD-RA field indicated in the DCI include/comprise/incorporate the same ID/index value. For example, this ID/index value could be a (absolute) TRP-specific ID/index value such as PCI value, TRP ID value, TRP index value and etc., based on a list/set/pool of TRP-specific ID/index values, e.g., higher layer configured to the UE and/or higher layer configured to the UE and activated by one or more MAC CE activation commands/bitmaps. For another example, this ID/index value could be an (relative) index within the list/set/pool of TRP-specific ID/index values, e.g., higher layer configured to the UE and/or higher layer configured to the UE and activated by one or more MAC CE activation commands/bitmaps. For yet another example, this ID/index value could be a CORESETPoolIndex value.

For N>1 TCI states/beams indication in a single MAC CE command for beam indication, for N>1 DCIs each indicating at least one FD-RA field, wherein each DCI indicating at least one FD-RA field is associated with a different TRP in the multi-TRP system, in one example, the UE could be explicitly indicated by the network, e.g., via higher layer RRC signaling and/or MAC CE command and/or dynamic DCI signaling, the exact association/mapping between the N>1 TCI states/beams indicated in the MAC CE command for beam indication and the N>1 DCIs indicating the FD-RA fields.

For example, the first TCI state and/or the TCI state with the lowest TCI state ID value indicated in the MAC CE command for beam indication could correspond to the DCI (indicating at least one FD-RA field) associated with the lowest CORESETPoolIndex value (indicated in the corresponding higher layer parameter ControlResourceSet), the second TCI state and/or the TCI state with the second lowest TCI state ID value indicated in the MAC CE for beam indication could correspond to the DCI (indicating at least one FD-RA field) associated with the second lowest CORESETPoolIndex value (indicated in the corresponding higher layer parameter ControlResourceSet), and so on, and the last TCI state and/or the TCI state with the highest TCI state ID value indicated in the MAC CE command for beam indication could correspond to the DCI (indicating at least one FD-RA field) associated with the highest CORESETPoolIndex value (indicated in the corresponding higher layer parameter ControlResourceSet). Other exact association/ mapping relationships between the TCI states/beams indicated in the MAC CE command for beam indication and the DCIs indicating the FD-RA fields and/or the corresponding indication method(s), e.g., via higher layer RRC signaling and/or MAC CE command and/or dynamic DCI signaling, are also possible.

In another example, a TCI state, e.g., the higher layer parameter TCI-State, indicated in the MAC CE command for beam indication could include/comprise/incorporate at least one (absolute) FD-RA field ID/index value indicated in at least one DCI and/or at least one (relative) FD-RA field index within all the FD-RA fields indicated in the N>1 DCIs.

In yet another example, a DCI indicating at least one FD-RA field and/or a FD-RA field indicated in a DCI could include/comprise/incorporate at least one (absolute) TCI state ID/index value indicated in the MAC CE command for beam indication and/or at least one (relative) TCI state index within the N>1 TCI states/beams indicated in the MAC CE command for beam indication.

In yet another example, the UE could be implicitly indicated by the network the association/mapping between the N>1 TCI states/beams indicated in the MAC CE command for beam indication and the N>1 DCIs indicating the FD-RA fields. For example, a TCI state/beam indicated in the MAC CE command for beam indication could be associated with/mapped to a DCI indicating at least one FD-RA field if the TCI state/beam indicated in the MAC CE command for beam indication and the DCI indicating at least one FD-RA field are associated with the same TRP-specific ID value such as PCI value and/or the same CORESETPoolIndex value. Other implicit indication methods of the association/mapping between the N>1 TCI states/beams indicated in the MAC CE command for beam indication and the N>1 DCIs indicating the FD-RA fields are also possible.

In yet another example, a TCI state/beam indicated in the MAC CE command for beam indication could be associated with/mapped to a DCI indicating at least one FD-RA field if the TCI state/beam indicated in the MAC CE command for beam indication and the DCI indicating at least one FD-RA field include/comprise/incorporate the same ID/index value. For example, this ID/index value could be a (absolute) TRP-specific ID/index value such as PCI value, TRP ID value, TRP index value and etc., based on a list/set/pool of TRP-specific ID/index values, e.g., higher layer configured to the UE and/or higher layer configured to the UE and activated by one or more MAC CE activation commands/bitmaps. For another example, this ID/index value could be an (relative) index within the list/set/pool of TRP-specific ID/index values, e.g., higher layer configured to the UE and/or higher layer configured to the UE and activated by one or more MAC CE activation commands/bitmaps. For yet another example, this ID/index value could be a CORESETPoolIndex value.

For a list/set/pool of N>1 MAC CE commands for beam indication with each MAC CE command indicating a single TCI state/beam; a unique entity ID/index could be included/incorporated in each MAC CE command for beam indication, for a single DCI indicating a single FD-RA field, wherein the frequency domain resources indicated in the FD-RA field are associated with different TRPs in the multi-TRP system, in one example, the UE could be explicitly indicated by the network the association/mapping between the MAC CE commands for beam indication (and therefore, the TCI states/beams indicated therein) and the frequency domain resources indicated in the FD-RA field. For the Type 0 based PDSCH resource allocation, the UE could be indicated by the network the association/mapping between a MAC CE command for beam indication (and therefore, the TCI state/beam indicated therein) and one or more (non-zero) bits/entries in the bitmap in the FD-RA field. For example (option-2.2.5), the first MAC CE command for beam indication in the list/set/pool of N>1 MAC CE commands for beam indication and/or the MAC CE command for beam indication indicating the lowest entity ID/index value and/or the MAC CE command for beam indication indicating the TCI state with the lowest TCI state ID value could correspond to the 1-st to n_0-th (n_0≥1) (non-zero) bits/entries in the bitmap (and therefore, the corresponding RBGs), the second MAC CE command for beam indication in the list/set/pool of N>1 MAC CE commands for beam indication and/or the MAC CE command for beam indication indicating the second lowest entity ID/index value and/or the MAC CE command for beam indication indicating the TCI state with the second lowest TCI state ID value could correspond to the (n_0+1)-th to n_1-th (n_1≥n_0) (non-zero) bits/entries in the bitmap (and therefore, the corresponding RBGs), and so on, and the last MAC CE command for beam indication in the list/set/pool of N≥1 MAC CE commands for beam indication and/or the MAC CE command for beam indication indicating the highest entity ID/index value and/or the MAC CE command for beam indication indicating the TCI state with the highest TCI state ID value could correspond to the n_p-th to n_q-th (n_q≥n_p) (non-zero) bits/entries in the bitmap (and therefore, the corresponding RBGs); for a total of two MAC CE commands for beam indication, the first N_0 (N_0≥1) or the first half of the (non-zero) bits/entries in the bitmap (and therefore, the corresponding RBGs) could correspond to the first (or the second) MAC CE command for beam indication and/or the MAC CE command for beam indication indicating the TCI state with the lowest (or the highest) TCI state ID value, and the rest of or the second half of the (non-zero) bits/entries in the bitmap (and therefore, the corresponding RBGs) could correspond to the second (or the first) MAC CE command for beam indication and/or the MAC CE command for beam indication indicating the TCI state with the highest (or the lowest) TCI state ID value.

For another example (option-2.2.6), the (mod(i–1, N_mac)+1)-th MAC CE command for beam indication in the list/set/pool of N>1 MAC CE commands for beam indication and/or the MAC CE command for beam indication indicating the TCI state with the (mod(i–1, N_mac)+1)-th lowest/highest TCI state ID value could correspond to the i-th (non-zero) bit/entry in the bitmap (and therefore, the corresponding RBG), where N_mac represents the total number of MAC CE commands for beam indication, i=1, . . . , N_bit, where N_bit represents the total number of (non-zero) bits/entries in the bitmap indicated in the FD-RA field, and mod(x, y) calculates the remainder of the Euclidean division of x by y; for a total of two MAC CE commands for beam indication, the odd-numbered (non-zero) bits/entries in the bitmap (and therefore, the corresponding RBGs) could correspond to the first (or the second) MAC CE command for beam indication and/or the MAC CE command for beam indication indicating the TCI state with the lowest (or the highest) TCI state ID value, and the even-numbered (non-zero) bits/entries in the bitmap (and therefore, the corresponding RBGs) could correspond to the second (or the first) MAC CE command for beam indication and/or the MAC CE command for beam indication indicating the TCI state with the highest (or the lowest) TCI state ID value.

The total number of bit(s)/entry(s) in the bitmap N_bit indicated in the FD-RA field could be configured by the network (e.g., via higher layer RRC signaling and/or MAC CE command and/or dynamic DCI signaling) and/or fixed in the system specifications and/or reported by the UE based on UE's capability and/or equal to the total number of MAC CE commands for beam indication. The UE could be indicated by the network, e.g., via higher layer RRC signaling and/or MAC CE command and/or dynamic DCI signaling, which option(s) (from/out of option-2.2.5 and option-2.2.6) to use/being used for indicating the mapping/association between the (non-zero) bit(s)/entry(s) in the bitmap in the FD-RA field and the MAC CE commands for beam indication (and therefore, the TCI states/beams indicated therein); for instance, a one-bit flag indicator could be incorporated/included in the DCI to differentiate between option-2.2.5 and option-2.2.6. The UE could be indicated by the network one or more conditions, e.g., whether the total number of MAC CE commands for beam indication is larger than a threshold, to switch between option-2.2.5 and option-2.2.6. For the Type 1 based PDSCH resource allocation, the UE could be indicated by the network the association/mapping between a MAC CE command for beam indication (and therefore, the TCI state/beam indicated therein) and one or more RIVs in the FD-RA field.

For example (option-2.2.7), the first MAC CE command for beam indication in the list/set/pool of N>1 MAC CE commands for beam indication and/or the MAC CE command for beam indication indicating the lowest entity ID/index value and/or the MAC CE command for beam indication indicating the TCI state with the lowest TCI state ID value could correspond to the 1-st to n_0-th (n_0≥1) RIVs (and therefore, the corresponding PRBs), the second MAC CE command for beam indication in the list/set/pool of N>1 MAC CE commands for beam indication and/or the MAC CE command for beam indication indicating the second lowest entity ID/index value and/or the MAC CE command for beam indication indicating the TCI state with the second lowest TCI state ID value could correspond to the (n_0+1)-th to n_1-th (n_1≥n_0) RIVs (and therefore, the corresponding PRBs), and so on, and the last MAC CE command for beam indication in the list/set/pool of N>1 MAC CE commands for beam indication and/or the MAC CE command for beam indication indicating the highest entity ID/index value and/or the MAC CE command for beam indication indicating the TCI state with the highest TCI state ID value could correspond to the n_p-th to n_q-th (n_q≥n_p) RIVs (and therefore, the corresponding PRBs); for a total of two MAC CE commands for beam indication, the first N_0 (N_0≥1) or the first half of the RIVs (and therefore, the corresponding PRBs) could correspond to the first (or the second) MAC CE command for beam indication and/or the MAC CE command for beam indication indicating the TCI state with the lowest (or the highest) TCI state ID value, and the rest of or the second half of the RIVs (and therefore, the corresponding PRBs) could correspond to the second (or the first) MAC CE command for beam indication and/or the MAC CE command for beam indication indicating the TCI state with the highest (or the lowest) TCI state ID value.

For another example (option-2.2.8), the (mod(i–1, N_mac)+1)-th MAC CE command for beam indication in the list/set/pool of N>1 MAC CE commands for beam indication and/or the MAC CE command for beam indication indicating the TCI state with the (mod(i–1, N_mac)+1)-th lowest/highest TCI state ID value could correspond to the i-th RIV (and therefore, the corresponding PRB), where N_mac represents the total number of MAC CE commands for beam indication, i=1, . . . , N_riv, where N_riv represents the total number of RIVs indicated in the FD-RA field, and mod(x, y) calculates the remainder of the Euclidean division of x by y; for a total of two MAC CE commands for beam indication, the odd-numbered RIVs (and therefore, the corresponding PRBs) could correspond to the first (or the second) MAC CE command for beam indication and/or the MAC CE command for beam indication indicating the TCI state with the lowest (or the highest) TCI state ID value, and the even-numbered RIVs (and therefore, the corresponding PRBs) could correspond to the second (or the first) MAC CE command for beam indication and/or the MAC CE command for beam indication indicating the TCI state with the highest (or the lowest) TCI state ID value.

The total number of RIVs N_riv indicated in the FD-RA field could be configured by the network (e.g., via higher layer RRC signaling and/or MAC CE command and/or dynamic DCI signaling) and/or fixed in the system specifications and/or reported by the UE based on UE's capability and/or equal to the total number of MAC CE commands for beam indication. The UE could be indicated by the network, e.g., via higher layer RRC signaling and/or MAC CE command and/or dynamic DCI signaling, which option(s) (from/out of option-2.2.7 and option-2.2.8) to use/being used for indicating the mapping/association between the RIVs in the FD-RA field and the MAC CE commands for beam indication (and therefore, the TCI states/beams indicated therein); for instance, a one-bit flag indicator could be incorporated/included in the DCI to differentiate between option-2.2.7 and option-2.2.8. The UE could be indicated by the network one or more conditions, e.g., whether the total number of MAC CE commands for beam indication is larger than a threshold, to switch between option-2.2.7 and option-2.2.8.

Furthermore, for the Type 1 based PDSCH frequency domain resource allocation, a RIV could be calculated/determined based on at least a starting PRB position.

For example, the 1-st RIV indicated in the FD-RA field (e.g., corresponding to the first MAC CE command for beam indication in the list/set/pool of N>1 MAC CE commands for beam indication and/or the MAC CE command for beam indication indicating the lowest entity ID/index value and/or the MAC CE command for beam indication indicating the TCI state with the lowest TCI state ID value) could be calculated/determined based on a first starting PRB position and a first number of consecutive PRBs, the 2-nd RIV indicated in the FD-RA field (e.g., corresponding to the second MAC CE command for beam indication in the list/set/pool of N>1 MAC CE commands for beam indication and/or the MAC CE command for beam indication indicating the second lowest entity ID/index value and/or the MAC CE command for beam indication indicating the TCI state with the second lowest TCI state ID value) could be calculated/determined based on a second starting PRB position and a second number of consecutive PRBs, and so on, and the N-th RIV indicated in the FD-RA field (e.g., corresponding to the last MAC CE command for beam indication in the list/set/pool of N>1 MAC CE commands for beam indication and/or the MAC CE command for beam indication indicating the highest entity ID/index value and/or the MAC CE command for beam indication indicating the TCI state with the highest TCI state ID value) could be calculated/determined based on a N-th starting PRB position and a N-th number of consecutive PRBs. The first PRB starting position, the second starting PRB position, and so on, and the N-th PRB starting position could be different and are indicated/included in the FD-RA field; the first number of consecutive PRBs, the second number of consecutive PRBs, and so on, and the N-th number of consecutive PRBs could be different and are also indicated/included in the FD-RA field.

For another example, the 1-st RIV indicated in the FD-RA field (e.g., corresponding to the first MAC CE command for beam indication in the list/set/pool of N>1 MAC CE commands for beam indication and/or the MAC CE command for beam indication indicating the lowest entity ID/index value and/or the MAC CE command for beam indication indicating the TCI state with the lowest TCI state ID value) could be calculated/determined based on a first starting PRB position and a first number of consecutive PRBs, the 2-nd RIV indicated in the FD-RA field (e.g., corresponding to the second MAC CE command for beam indication in the list/set/pool of N>1 MAC CE commands for beam indication and/or the MAC CE command for beam indication indicating the second lowest entity ID/index value and/or the MAC CE command for beam indication indicating the TCI state with the second lowest TCI state ID value) could be calculated/determined based on a second starting PRB position and a second number of consecutive PRBs same as the first number of consecutive PRBs, and so on, and the N-th RIV indicated in the FD-RA field (e.g., corresponding to the last MAC CE command for beam indication in the list/set/pool of N>1 MAC CE commands for beam indication and/or the MAC CE command for beam indication indicating the highest entity ID/index value and/or the MAC CE command for beam indication indicating the TCI state with the highest TCI state ID value) could be calculated/determined based on a N-th starting PRB position and a N-th number of consecutive PRBs same as the first number of consecutive PRBs. The first PRB starting position, the second starting PRB position, and so on, and the N-th PRB starting position could be different and are indicated/included in the FD-RA field; the first number of consecutive PRBs is also indicated/included in the FD-RA field.

Yet for another example, the 1-st RIV indicated in the FD-RA field (e.g., corresponding to the first MAC CE command for beam indication in the list/set/pool of N>1 MAC CE commands for beam indication and/or the MAC CE command for beam indication indicating the lowest entity ID/index value and/or the MAC CE command for beam indication indicating the TCI state with the lowest TCI state ID value) could be calculated/determined based on a first starting PRB position and a first number of consecutive PRBs, the 2-nd RIV indicated in the FD-RA field (e.g., corresponding to the second MAC CE command for beam indication in the list/set/pool of N>1 MAC CE commands for beam indication and/or the MAC CE command for beam indication indicating the second lowest entity ID/index value and/or the MAC CE command for beam indication indicating the TCI state with the second lowest TCI state ID value) could be calculated/determined based on a second number of consecutive PRBs and a second starting PRB position having a gap with respect to the last PRB indicated by the 1-st RIV, and so on, the N-th RIV indicated in the FD-RA field (e.g., corresponding to the last MAC CE command for beam indication in the list/set/pool of N>1 MAC CE commands for beam indication and/or the MAC CE command for beam indication indicating the highest entity ID/index value and/or the MAC CE command for beam indication indicating the TCI state with the highest TCI state ID value) could be calculated/determined based on a N-th number of consecutive PRBs and a N-th starting PRB position having a gap with respect to the last PRB indicated by the (N−1)-th RIV. The gap could be configured by the network and set to 0. The first number of consecutive PRBs, the second number of consecutive PRBs, and so on, and the N-th number of consecutive PRBs could be different and are indicated/included in the FD-RA field; the first starting PRB position is also indicated/included in the FD-RA field.

Other exact association/mapping relationships between the frequency domain resources indicated in the FD-RA field and the MAC CE commands for beam indication (and therefore, the TCI states/beams indicated therein) and/or the corresponding indication method(s), e.g., via higher layer RRC signaling and/or MAC CE command and/or dynamic DCI signaling, are also possible.

In another example, the UE could be implicitly indicated by the network the association/mapping between the MAC CE commands for beam indication (and therefore, the TCI states/beams indicated therein) and the frequency domain resources indicated in the FD-RA field. For the Type 0 based PDSCH resource allocation, a MAC CE command for beam indication (and therefore, the TCI state/beam indicated therein) could be associated with/mapped to one or more (non-zero) bits/entries in the bitmap (and therefore, the corresponding RBGs) indicated in the FD-RA field if the MAC CE command for beam indication (and therefore, the TCI state/beam indicated therein) and the corresponding (non-zero) bit(s)/entry(s) in the bitmap indicated in the FD-RA field are associated with the same TRP-specific ID value such as PCI value and/or the same CORESETPoolIndex value.

For the Type 1 based PDSCH resource allocation, a MAC CE command for beam indication (and therefore, the TCI state/beam indicated therein) could be associated with/mapped to one or more RIVs (and therefore, the corresponding PRBs) indicated in the FD-RA field if the MAC CE command for beam indication (and therefore, the TCI state/beam indicated therein) and the corresponding RIV(s) indicated in the FD-RA field are associated with the same TRP-specific ID value such as PCI value and/or the same CORESETPoolIndex value. Other implicit indication methods of the association/mapping between the MAC CE commands for beam indication and the frequency domain resources indicated in the FD-RA field are also possible.

For a list/set/pool of N>1 MAC CE commands for beam indication with each MAC CE command indicating a single TCI state/beam; a unique entity ID/index could be included/incorporated in each MAC CE command for beam indication.

For a single DCI indicating N>1 FD-RA fields, wherein each FD-RA field is associated with a different TRP in the multi-TRP system, in one example, the UE could be explicitly indicated by the network, e.g., via higher layer RRC signaling and/or MAC CE command and/or dynamic DCI signaling, the exact association/mapping between the N>1 MAC CE commands for beam indication (and therefore, the TCI states/beams indicated therein) and the N>1 FD-RA fields indicated in the DCI.

For example, the first MAC CE command for beam indication in the list/set/pool of N>1 MAC CE commands for beam indication and/or the MAC CE command for beam indication indicating the lowest entity ID/index value and/or the MAC CE command for beam indication indicating the TCI state with the lowest TCI state ID value could correspond to the first FD-RA field indicated in the DCI, the second MAC CE command for beam indication in the list/set/pool of N>1 MAC CE commands for beam indication and/or the MAC CE command for beam indication indicating the second lowest entity ID/index value and/or the MAC CE command for beam indication indicating the TCI state with the second lowest TCI state ID value could correspond to the second FD-RA field indicated in the DCI, and so on, and the last MAC CE command for beam indication in the list/set/pool of N>1 MAC CE commands for beam indication and/or the MAC CE command for beam indication indicating the highest entity ID/index value and/or the MAC CE command for beam indication indicating the TCI state with the highest TCI state ID value could correspond to the last FD-RA field indicated in the DCI. Other exact association/mapping relationships between the MAC CE commands for beam indication and the FD-RA fields indicated in the DCI and/or the corresponding indication method(s), e.g., via higher layer RRC signaling and/or MAC CE command and/or dynamic DCI signaling, are also possible.

In another example, a MAC CE command for beam indication could include/comprise/incorporate at least one (absolute) FD-RA field ID/index value indicated in the DCI and/or at least one (relative) FD-RA field index within the N>1 FD-RA fields indicated in the DCI.

In yet another example, a FD-RA field indicated in the DCI could include/comprise/incorporate at least one (absolute) entity ID/index value of at least one MAC CE command for beam indication and/or at least one (relative) index of at least one MAC CE command for beam indication within the N>1 MAC CE commands for beam indication.

In yet another example, the UE could be implicitly indicated by the network the association/mapping between the N>1 MAC CE commands for beam indication (and therefore, the TCI states/beams indicated therein) and the N>1 FD-RA fields indicated in the DCI. For example, a MAC CE command for beam indication (and therefore, the TCI state/beam indicated therein) could be associated with/mapped to a FD-RA field indicated in the DCI if the MAC CE command for beam indication and the FD-RA field indicated in the DCI are associated with the same TRP-specific ID value such as PCI value and/or the same CORE-SETPoolIndex value. Other implicit indication methods of the association/mapping between the N>1 MAC CE commands for beam indication (and therefore, the TCI states/beams indicated therein) and the N>1 FD-RA fields indicated in the DCI are also possible.

In yet another example, a MAC CE command for beam indication could be associated with/mapped to a FD-RA field indicated in the DCI if the MAC CE command for beam indication and the FD-RA field indicated in the DCI include/comprise/incorporate the same ID/index value. For example, this ID/index value could be a (absolute) TRP-specific ID/index value such as PCI value, TRP ID value, TRP index value and etc., based on a list/set/pool of TRP-specific ID/index values, e.g., higher layer configured to the UE and/or higher layer configured to the UE and activated by one or more MAC CE activation commands/bitmaps. For another example, this ID/index value could be an (relative) index within the list/set/pool of TRP-specific ID/index values, e.g., higher layer configured to the UE and/or higher layer configured to the UE and activated by one or more MAC CE activation commands/bitmaps. For yet another example, this ID/index value could be a CORESETPoolIndex value.

For a list/set/pool of N>1 MAC CE commands for beam indication with each MAC CE command indicating a single TCI state/beam; a unique entity ID/index could be included/incorporated in each MAC CE command for beam indication.

For N>1 DCIs each indicating at least one FD-RA field, wherein each DCI indicating at least one FD-RA field is associated with a different TRP in the multi-TRP system, in one example, the UE could be explicitly indicated by the network, e.g., via higher layer RRC signaling and/or MAC CE command and/or dynamic DCI signaling, the exact association/mapping between the N>1 MAC CE commands for beam indication (and therefore, the TCI states/beams indicated therein) and the N>1 DCIs indicating the FD-RA fields.

For example, the first MAC CE command for beam indication in the list/set/pool of N>1 MAC CE commands for beam indication and/or the MAC CE command for beam indication indicating the lowest entity ID/index value and/or the MAC CE command for beam indication indicating the TCI state with the lowest TCI state ID value could correspond to the DCI (indicating at least one FD-RA field) associated with the lowest CORESETPoolIndex value (indicated in the corresponding higher layer parameter ControlResourceSet), the second MAC CE command for beam indication in the list/set/pool of N>1 MAC CE commands for beam indication and/or the MAC CE command for beam indication indicating the second lowest entity ID/index value and/or the MAC CE command for beam indication indicating the TCI state with the second lowest TCI state ID value could correspond to the DCI (indicating at least one FD-RA field) associated with the second lowest CORESETPoolIndex value (indicated in the corresponding higher layer parameter ControlResourceSet), and so on, and the last MAC CE command for beam indication in the list/set/pool of N>1 MAC CE commands for beam indication and/or the MAC CE command for beam indication indicating the highest entity ID/index value and/or the MAC CE command for beam indication indicating the TCI state with the highest TCI state ID value could correspond to the DCI (indicating at least one FD-RA field) associated with the highest CORESETPoolIndex value (indicated in the corresponding higher layer parameter ControlResourceSet). Other exact association/mapping relationships between the MAC CE commands for beam indication (and therefore, the TCI states/beams indicated therein) and the DCIs indicating the FD-RA fields and/or the corresponding indication method(s), e.g., via higher layer RRC signaling and/or MAC CE command and/or dynamic DCI signaling, are also possible.

In another example, a MAC CE command for beam indication could include/comprise/incorporate at least one (absolute) FD-RA field ID/index value indicated in at least one DCI and/or at least one (relative) FD-RA field index within all the FD-RA fields indicated in the N>1 DCIs.

In yet another example, a DCI indicating at least one FD-RA field and/or a FD-RA field indicated in a DCI could include/comprise/incorporate at least one (absolute) entity ID/index value of at least one MAC CE command for beam indication and/or at least one (relative) index of at least one MAC CE command for beam indication within the N>1 MAC CE commands for beam indication.

In yet another example, the UE could be implicitly indicated by the network the association/mapping between the N>1 TCI states/beams indicated in the MAC CE command for beam indication and the N>1 DCIs indicating the FD-RA fields. For example, a MAC CE command for beam indication (and therefore, the TCI state/beam indicated therein) could be associated with/mapped to a DCI indicating at least one FD-RA field if the MAC CE command for beam indication and the DCI indicating at least one FD-RA field are associated with the same TRP-specific ID value such as PCI value and/or the same CORESETPoolIndex value. Other implicit indication methods of the association/ mapping between the N>1 MAC CE commands for beam indication and the N>1 DCIs indicating the FD-RA fields are also possible.

In yet another example, a MAC CE command for beam indication could be associated with/mapped to a DCI indicating at least one FD-RA field if the MAC CE command for beam indication and the DCI indicating at least one FD-RA field include/comprise/incorporate the same ID/index value. For example, this ID/index value could be a (absolute) TRP-specific ID/index value such as PCI value, TRP ID value, TRP index value and etc., based on a list/set/pool of TRP-specific ID/index values, e.g., higher layer configured to the UE and/or higher layer configured to the UE and activated by one or more MAC CE activation commands/bitmaps. For another example, this ID/index value could be an (relative) index within the list/set/pool of TRP-specific ID/index values, e.g., higher layer configured to the UE and/or higher layer configured to the UE and activated by one or more MAC CE activation commands/bitmaps. For yet another example, this ID/index value could be a CORESETPoolIndex value.

An example of DCI based TCI state/beam indication for the multi-TRP operation with PDSCH(s) repetition is presented in FIG. 11. As illustrated in FIG. 11, the UE could be first higher layer configured by the network, e.g., via the higher layer RRC signaling, a list/pool of N_tci TCI states. Each TCI state contains at least a QCL source RS with a QCL type, e.g., QCL-typeA/B/C/D. The UE could then receive from the network one or more DCIs to indicate one or more beam(s) (i.e., the TCI state(s)) for the transmission/reception of the PDSCH(s) transmitted from/associated with one or more TRPs in a multi-TRP system on different/non-overlapping frequency domain resources. For instance, the UE could receive from the network a single DCI to indicate N>1 TCI states/beams for the same PDSCH(s) transmitted from/associated with different TRPs in the multi-TRP system on different/non-overlapping frequency domain resources.

As depicted in FIG. 9 and FIG. 11, the UE could receive from the network a single DCI to indicate N=2 TCI states/beams (TCI #3 and TCI #5) for the same PDSCH-a transmitted from/associated with two TRPs, i.e., TRP-1 and TRP-2, in the multi-TRP system, respectively, on different/non-overlapping frequency domain resources.

As described above, a DCI used to indicate to the UE a beam (i.e., a TCI state and/or a TCI state ID) for the transmission/reception of a PDCCH or a PDSCH could be at least one of the following.

In one example, a DL related DCI (e.g., DCI format 1_0, DCI format 1_1 or DCI format 1_2) could be used to indicate to the UE a beam (i.e., a TCI state and/or a TCI state ID) for the transmission/reception of a PDCCH or a PDSCH, wherein the DL related DCI may or may not include a DL assignment.

In another example, an UL related DCI (e.g., DCI format 0_0, DCI format 0_1, DCI format 0_2) could be used to indicate to the UE a beam (i.e., a TCI state and/or a TCI state ID) for the transmission/reception of a PDCCH or a PDSCH, wherein the UL related DCI may or may not include an UL scheduling grant.

Yet in another example, a custom/purpose designed DCI format could be used to indicate to the UE a beam (i.e., a TCI state and/or a TCI state ID) for the transmission/reception of a PDCCH or a PDSCH.

Furthermore, the TCI state indicated in the DCI for beam indication could be at least one of: (1) a DL TCI state; (2)

an UL TCI state; (3) a joint DL and UL TCI state; and/or (4) separate DL TCI state and UL TCI state.

The association/mapping between the TCI state(s)/beam(s) indicated in the DCI(s) and the TRPs in the multi-TRP system could follow those discussed/specified in example-1.2.1, example-1.2.2, example-1.2.3, example-1.2.4, example-1.2.5, example-1.2.a, example-1.2.b and example-1.2.c. There could be various means to associate/map between the TCI state(s)/beam(s) indicated in the DCI(s) and the frequency domain resources indicated in the FD-RA field(s).

For N>1 TCI states/beams indication in a single DCI for beam indication, for a single DCI indicating a single FD-RA field, wherein the frequency domain resources indicated in the FD-RA field are associated with different TRPs in the multi-TRP system, in one example, the UE could be explicitly indicated by the network the association/mapping between the TCI states/beams indicated in the DCI for beam indication and the frequency domain resources indicated in the FD-RA field. For the Type 0 based PDSCH resource allocation, the UE could be indicated by the network the association/mapping between a TCI state/beam indicated in the DCI for beam indication and one or more (non-zero) bits/entries in the bitmap in the FD-RA field. For example (option-2.3.1), the first TCI state and/or the TCI state with the lowest TCI state ID value indicated in the DCI for beam indication could correspond to the 1-st to n_0-th (n_0≥1) (non-zero) bits/entries in the bitmap (and therefore, the corresponding RBGs), the second TCI state and/or the TCI state with the second lowest TCI state ID value indicated in the DCI for beam indication could correspond to the (n_0+1)-th to n_1-th (n_1≥n_0) (non-zero) bits/entries in the bitmap (and therefore, the corresponding RBGs), and so on, and the last TCI state and/or the TCI state with the highest TCI state ID value indicated in the DCI for beam indication could correspond to the n_p-th to n_q-th (n_q≥n_p) (non-zero) bits/entries in the bitmap (and therefore, the corresponding RBGs); for a total of two TCI states/beams indicated in the DCI for beam indication, the first N_0 (N_0≥1) or the first half of the (non-zero) bits/entries in the bitmap (and therefore, the corresponding RBGs) could correspond to the first (or the second) TCI state and/or the TCI state with the lowest (or the highest) TCI state ID value indicated in the DCI for beam indication, and the rest of or the second half of the (non-zero) bits/entries in the bitmap (and therefore, the corresponding RBGs) could correspond to the second (or the first) TCI state and/or the TCI state with the highest (or the lowest) TCI state ID value indicated in the DCI for beam indication.

For another example (option-2.3.2), the (mod(i−1, N_tci)+1)-th TCI state and/or the TCI state with the (mod(i−1, N_tci)+1)-th lowest/highest TCI state ID value indicated in the DCI for beam indication could correspond to the i-th (non-zero) bit/entry in the bitmap (and therefore, the corresponding RBG), where N_tci represents the total number of TCI state(s)/beam(s) indicated in the DCI for beam indication, i=1, . . . , N_bit, where N_bit represents the total number of (non-zero) bits/entries in the bitmap indicated in the FD-RA field, and mod(x, y) calculates the remainder of the Euclidean division of x by y; for a total of two TCI states/beams indicated in the DCI for beam indication, the odd-numbered (non-zero) bits/entries in the bitmap (and therefore, the corresponding RBGs) could correspond to the first (or the second) TCI state and/or the TCI state with the lowest (or the highest) TCI state ID value indicated in the DCI for beam indication, and the even-numbered (non-zero) bits/entries in the bitmap (and therefore, the corresponding RBGs) could correspond to the second (or the first) TCI state and/or the TCI state with the highest (or the lowest) TCI state ID value indicated in the DCI for beam indication.

The total number of bit(s)/entry(s) in the bitmap N_bit indicated in the FD-RA field could be configured by the network (e.g., via higher layer RRC signaling and/or MAC CE command and/or dynamic DCI signaling) and/or fixed in the system specifications and/or reported by the UE based on UE's capability and/or equal to the total number of TCI states/beams indicated in the DCI for beam indication. The UE could be indicated by the network, e.g., via higher layer RRC signaling and/or MAC CE command and/or dynamic DCI signaling, which option(s) (from/out of option-2.3.1 and option-2.3.2) to use/being used for indicating the mapping/association between the (non-zero) bit(s)/entry(s) in the bitmap in the FD-RA field and the TCI states/beams indicated in the DCI for beam indication; for instance, a one-bit flag indicator could be incorporated/included in the DCI to differentiate between option-2.3.1 and option-2.3.2. The UE could be indicated by the network one or more conditions, e.g., whether the total number of TCI states/beams indicated in the DCI for beam indication is larger than a threshold, to switch between option-2.3.1 and option-2.3.2.

For the Type 1 based PDSCH resource allocation, the UE could be indicated by the network the association/mapping between a TCI state/beam indicated in the DCI for beam indication and one or more RIVs in the FD-RA field. For example (option-2.3.3), the first TCI state and/or the TCI state with the lowest TCI state ID value indicated in the DCI for beam indication could correspond to the 1-st to n_0-th (n_0≥1) RIVs (and therefore, the corresponding PRBs), the second TCI state and/or the TCI state with the second lowest TCI state ID value indicated in the DCI for beam indication could correspond to the (n_0+1)-th to n_1-th (n_1≥n_0) RIVs (and therefore, the corresponding PRBs), and so on, and the last TCI state and/or the TCI state with the highest TCI state ID value indicated in the DCI for beam indication could correspond to the n_p-th to n_q-th (n_q≥n_p) RIVs (and therefore, the corresponding PRBs); for a total of two TCI states/beams indicated in the DCI for beam indication, the first N_0 (N_0≥1) or the first half of the RIVs (and therefore, the corresponding PRBs) could correspond to the first (or the second) TCI state and/or the TCI state with the lowest (or the highest) TCI state ID value indicated in the DCI for beam indication, and the rest of or the second half of the RIVs (and therefore, the corresponding PRBs) could correspond to the second (or the first) TCI state and/or the TCI state with the highest (or the lowest) TCI state ID value indicated in the DCI for beam indication. For another example (option-2.3.4), the (mod(i−1, N_tci)+1)-th TCI state and/or the TCI state with the (mod(i−1, N_tci)+1)-th lowest/highest TCI state ID value indicated in the DCI for beam indication could correspond to the i-th RIV (and therefore, the corresponding PRB), where N_tci represents the total number of TCI state(s)/beam(s) indicated in the DCI for beam indication, i=1, . . . , N_riv, where N_riv represents the total number of RIVs indicated in the FD-RA field, and mod(x, y) calculates the remainder of the Euclidean division of x by y; for a total of two TCI states/beams indicated in the DCI for beam indication, the odd-numbered RIVs (and therefore, the corresponding PRBs) could correspond to the first (or the second) TCI state and/or the TCI state with the lowest (or the highest) TCI state ID value indicated in the DCI for beam indication, and the even-numbered RIVs (and therefore, the corresponding PRBs) could correspond to the second (or the first) TCI state and/or the TCI state with the highest (or the lowest) TCI state ID value indicated in the DCI for beam indication. The total number of RIVs N_riv indicated in the FD-RA field could be configured by the network (e.g., via higher layer RRC signaling and/or MAC CE command and/or dynamic DCI signaling) and/or fixed in the system specifications and/or reported by the UE based on UE's capability and/or equal to the total number of TCI states/beams indicated in the DCI for beam indication.

The UE could be indicated by the network, e.g., via higher layer RRC signaling and/or MAC CE command and/or dynamic DCI signaling, which option(s) (from/out of option-2.3.3 and option-2.3.4) to use/being used for indicating the mapping/association between the RIVs in the FD-RA field and the TCI states/beams indicated in the DCI for beam indication; for instance, a one-bit flag indicator could be incorporated/included in the DCI to differentiate between option-2.3.3 and option-2.3.4. The UE could be indicated by the network one or more conditions, e.g., whether the total number of TCI states/beams indicated in the DCI for beam indication is larger than a threshold, to switch between option-2.3.3 and option-2.3.4.

Furthermore, for the Type 1 based PDSCH frequency domain resource allocation, a RIV could be calculated/determined based on at least a starting PRB position.

For example, the 1-st RIV indicated in the FD-RA field (e.g., corresponding to the first TCI state and/or the TCI state with the lowest TCI state ID value indicated in the DCI for beam indication) could be calculated/determined based on a first starting PRB position and a first number of consecutive PRBs, the 2-nd RIV indicated in the FD-RA field (e.g., corresponding to the second TCI state and/or the TCI state with the second lowest TCI state ID value indicated in the DCI for beam indication) could be calculated/determined based on a second starting PRB position and a second number of consecutive PRBs, and so on, and the N-th RIV indicated in the FD-RA field (e.g., corresponding to the last TCI state and/or the TCI state with the highest TCI state ID value indicated in the DCI for beam indication) could be calculated/determined based on a N-th starting PRB position and a N-th number of consecutive PRBs. The first PRB starting position, the second starting PRB position, and so on, and the N-th PRB starting position could be different and are indicated/included in the FD-RA field; the first number of consecutive PRBs, the second number of consecutive PRBs, and so on, and the N-th number of consecutive PRBs could be different and are also indicated/included in the FD-RA field.

For another example, the 1-st RIV indicated in the FD-RA field (e.g., corresponding to the first TCI state and/or the TCI state with the lowest TCI state ID value indicated in the DCI for beam indication) could be calculated/determined based on a first starting PRB position and a first number of consecutive PRBs, the 2-nd RIV indicated in the FD-RA field (e.g., corresponding to the second TCI state and/or the TCI state with the second lowest TCI state ID value indicated in the DCI for beam indication) could be calculated/determined based on a second starting PRB position and a second number of consecutive PRBs same as the first number of consecutive PRBs, and so on, and the N-th RIV indicated in the FD-RA field (e.g., corresponding to the last TCI state and/or the TCI state with the highest TCI state ID value indicated in the DCI for beam indication) could be calculated/determined based on a N-th starting PRB position and a N-th number of consecutive PRBs same as the first number of consecutive PRBs. The first PRB starting position, the second starting PRB position, and so on, and the N-th PRB starting position could be different and are indicated/included in the FD-RA field; the first number of consecutive PRBs is also indicated/included in the FD-RA field.

Yet for another example, the 1-st RIV indicated in the FD-RA field (e.g., corresponding to the first TCI state and/or the TCI state with the lowest TCI state ID value indicated in the DCI for beam indication) could be calculated/determined based on a first starting PRB position and a first number of consecutive PRBs, the 2-nd RIV indicated in the FD-RA field (e.g., corresponding to the second TCI state and/or the TCI state with the second lowest TCI state ID value indicated in the DCI for beam indication) could be calculated/determined based on a second number of consecutive PRBs and a second starting PRB position having a gap with respect to the last PRB indicated by the 1-st RIV, and so on, the N-th RIV indicated in the FD-RA field (e.g., corresponding to the last TCI state and/or the TCI state with the highest TCI state ID value indicated in the DCI for beam indication) could be calculated/determined based on a N-th number of consecutive PRBs and a N-th starting PRB position having a gap with respect to the last PRB indicated by the (N−1)-th RIV. The gap could be configured by the network and set to 0. The first number of consecutive PRBs, the second number of consecutive PRBs, and so on, and the N-th number of consecutive PRBs could be different and are indicated/included in the FD-RA field; the first starting PRB position is also indicated/included in the FD-RA field.

Other exact association/mapping relationships between the frequency domain resources indicated in the FD-RA field and the TCI state(s)/beam(s) indicated in the DCI for beam indication and/or the corresponding indication method(s), e.g., via higher layer RRC signaling and/or MAC CE command and/or dynamic DCI signaling, are also possible.

In another example, the UE could be implicitly indicated by the network the association/mapping between the TCI states/beams indicated in the DCI for beam indication and the frequency domain resources indicated in the FD-RA field. For the Type 0 based PDSCH resource allocation, a TCI state/beam indicated in the DCI for beam indication could be associated with/mapped to one or more (non-zero) bits/entries in the bitmap (and therefore, the corresponding RBGs) indicated in the FD-RA field if the TCI state/beam indicated in the DCI for beam indication and the corresponding (non-zero) bit(s)/entry(s) in the bitmap indicated in the FD-RA field are associated with the same TRP-specific ID value such as PCI value and/or the same CORESETPoolIndex value. For the Type 1 based PDSCH resource allocation, a TCI state/beam indicated in the DCI for beam indication could be associated with/mapped to one or more RIVs (and therefore, the corresponding PRBs) indicated in the FD-RA field if the TCI state/beam indicated in the DCI for beam indication and the corresponding RIV(s) indicated in the FD-RA field are associated with the same TRP-specific ID value such as PCI value and/or the same CORESETPoolIndex value. Other implicit indication methods of the association/mapping between the TCI state(s)/beam(s) indicated in the DCI for beam indication and the frequency domain resources indicated in the FD-RA field are also possible.

For N>1 TCI states/beams indication in a single DCI for beam indication, for a single DCI indicating N>1 FD-RA fields, wherein each FD-RA field is associated with a different TRP in the multi-TRP system, in one example, the UE could be explicitly indicated by the network, e.g., via higher layer RRC signaling and/or MAC CE command and/or dynamic DCI signaling, the exact association/mapping between the N>1 TCI states/beams indicated in the DCI for beam indication and the N>1 FD-RA fields indicated in the DCI. For example, the first TCI state and/or the TCI state with the lowest TCI state ID value indicated in the DCI for beam indication could correspond to the first FD-RA field indicated in the DCI, the second TCI state and/or the TCI state with the second lowest TCI state ID value indicated in the DCI for beam indication could correspond to the second FD-RA field indicated in the DCI, and so on, and the last TCI state and/or the TCI state with the highest TCI state ID value indicated in the DCI for beam indication could correspond to the last FD-RA field indicated in the DCI. Other exact association/mapping relationships between the TCI states/ beams indicated in the DCI for beam indication and the FD-RA fields indicated in the DCI and/or the corresponding indication method(s), e.g., via higher layer RRC signaling and/or MAC CE command and/or dynamic DCI signaling, are also possible.

In another example, a TCI state, e.g., the higher layer parameter TCI-State, in the DCI for beam indication could include/comprise/incorporate at least one (absolute) FD-RA field ID/index value indicated in the DCI and/or at least one (relative) FD-RA field index within the N>1 FD-RA fields indicated in the DCI.

In yet another example, a FD-RA field indicated in the DCI could include/comprise/incorporate at least one (absolute) TCI state ID/index value indicated in the DCI for beam indication and/or at least one (relative) TCI state index within the N>1 TCI states/beams indicated in the DCI for beam indication.

In yet another example, the UE could be implicitly indicated by the network the association/mapping between the N>1 TCI states/beams indicated in the DCI for beam indication and the N>1 FD-RA fields indicated in the DCI. For example, a TCI state/beam indicated in the DCI for beam indication could be associated with/mapped to a FD-RA field indicated in the DCI if the TCI state/beam indicated in the DCI for beam indication and the FD-RA field indicated in the DCI are associated with the same TRP-specific ID value such as PCI value and/or the same CORESETPoolIndex value. Other implicit indication methods of the association/mapping between the N>1 TCI states/ beams indicated in the DCI for beam indication and the N>1 FD-RA fields indicated in the DCI are also possible.

In yet another example, a TCI state, e.g., the higher layer parameter TCI-State, indicated in the DCI for beam indication could be associated with/mapped to a FD-RA field indicated in the DCI if the TCI state/beam indicated in the DCI for beam indication and the FD-RA field indicated in the DCI include/comprise/incorporate the same ID/index value. For example, this ID/index value could be a (absolute) TRP-specific ID/index value such as PCI value, TRP ID value, TRP index value and etc., based on a list/set/pool of TRP-specific ID/index values, e.g., higher layer configured to the UE and/or higher layer configured to the UE and activated by one or more MAC CE activation commands/ bitmaps. For another example, this ID/index value could be an (relative) index within the list/set/pool of TRP-specific ID/index values, e.g., higher layer configured to the UE and/or higher layer configured to the UE and activated by one or more MAC CE activation commands/bitmaps. For yet another example, this ID/index value could be a CORE-SETPoolIndex value.

For N>1 TCI states/beams indication in a single DCI for beam indication, for N>1 DCIs each indicating at least one FD-RA field, wherein each DCI indicating at least one FD-RA field is associated with a different TRP in the multi-TRP system, in one example, the UE could be explicitly indicated by the network, e.g., via higher layer RRC signaling and/or MAC CE command and/or dynamic DCI signaling, the exact association/mapping between the N>1 TCI states/beams indicated in the DCI for beam indication and the N>1 DCIs indicating the FD-RA fields. For example, the first TCI state and/or the TCI state with the lowest TCI state ID value indicated in the DCI for beam indication could correspond to the DCI (indicating at least one FD-RA field) associated with the lowest CORESETPoolIndex value (indicated in the corresponding higher layer parameter Control-ResourceSet), the second TCI state and/or the TCI state with the second lowest TCI state ID value indicated in the DCI for beam indication could correspond to the DCI (indicating at least one FD-RA field) associated with the second lowest CORESETPoolIndex value (indicated in the corresponding higher layer parameter ControlResourceSet), and so on, and the last TCI state and/or the TCI state with the highest TCI state ID value indicated in the DCI for beam indication could correspond to the DCI (indicating at least one FD-RA field) associated with the highest CORESETPoolIndex value (indicated in the corresponding higher layer parameter ControlResourceSet). Other exact association/mapping relationships between the TCI states/beams indicated in the DCI for beam indication and the DCIs indicating the FD-RA fields and/or the corresponding indication method(s), e.g., via higher layer RRC signaling and/or MAC CE command and/or dynamic DCI signaling, are also possible.

In another example, a TCI state, e.g., the higher layer parameter TCI-State, indicated in the DCI for beam indication could include/comprise/incorporate at least one (absolute) FD-RA field ID/index value indicated in at least one DCI and/or at least one (relative) FD-RA field index within all the FD-RA fields indicated in the N>1 DCIs.

In yet another example, a DCI indicating at least one FD-RA field and/or a FD-RA field indicated in a DCI could include/comprise/incorporate at least one (absolute) TCI state ID/index value indicated in the DCI for beam indication and/or at least one (relative) TCI state index within the N>1 TCI states/beams indicated in the DCI for beam indication.

In yet another example, the UE could be implicitly indicated by the network the association/mapping between the N>1 TCI states/beams indicated in the DCI for beam indication and the N>1 DCIs indicating the FD-RA fields. For example, a TCI state/beam indicated in the DCI for beam indication could be associated with/mapped to a DCI indicating at least one FD-RA field if the TCI state/beam indicated in the DCI for beam indication and the DCI indicating at least one FD-RA field are associated with the same TRP-specific ID value such as PCI value and/or the same CORESETPoolIndex value. Other implicit indication methods of the association/mapping between the N>1 TCI states/beams indicated in the DCI for beam indication and the N>1 DCIs indicating the FD-RA fields are also possible.

In yet another example, a TCI state, e.g., the higher layer parameter TCI-State, indicated in the DCI for beam indication could be associated with/mapped to a DCI indicating at least one FD-RA field if the TCI state/beam indicated in the DCI for beam indication and the DCI indicating at least one FD-RA field include/comprise/incorporate the same ID/index value. For example, this ID/index value could be a (absolute) TRP-specific ID/index value such as PCI value, TRP ID value, TRP index value and etc., based on a list/set/pool of TRP-specific ID/index values, e.g., higher layer configured to the UE and/or higher layer configured to the UE and activated by one or more MAC CE activation commands/bitmaps. For another example, this ID/index value could be an (relative) index within the list/set/pool of TRP-specific ID/index values, e.g., higher layer configured to the UE and/or higher layer configured to the UE and activated by one or more MAC CE activation commands/bitmaps. For yet another example, this ID/index value could be a CORESETPoolIndex value.

For N>1 DCIs for beam indication with each DCI indicating a single TCI state/beam, for a single DCI indicating a single FD-RA field, wherein the frequency domain resources indicated in the FD-RA field are associated with different TRPs in the multi-TRP system, in one example, the UE could be explicitly indicated by the network the association/mapping between the DCIs for beam indication (and therefore, the TCI states/beams indicated therein) and the frequency domain resources indicated in the FD-RA field. For the Type 0 based PDSCH resource allocation, the UE could be indicated by the network the association/mapping between a DCI for beam indication (and therefore, the TCI state/beam indicated therein) and one or more (non-zero) bits/entries in the bitmap in the FD-RA field. For example (option-2.3.5), the DCI for beam indication associated with the lowest CORESETPoolIndex value (indicated in the corresponding higher layer parameter ControlResourceSet) and/or the DCI for beam indication indicating the lowest TCI state ID value could correspond to the 1-st to n_0-th (n_0≥1) (non-zero) bits/entries in the bitmap (and therefore, the corresponding RBGs), the DCI for beam indication associated with the second lowest CORESETPoolIndex value (indicated in the corresponding higher layer parameter ControlResourceSet) and/or the DCI for beam indication indicating the second lowest TCI state ID value could correspond to the (n_0+1)-th to n_1-th (n_1≥n_0) (non-zero) bits/entries in the bitmap (and therefore, the corresponding RBGs), and so on, and the DCI for beam indication associated with the highest CORESETPoolIndex value (indicated in the corresponding higher layer parameter ControlResourceSet) and/or the DCI for beam indication indicating the highest TCI state ID value could correspond to the n_p-th to n_q-th (n_q≥n_p) (non-zero) bits/entries in the bitmap (and therefore, the corresponding RBGs); for a total of two DCIs for beam indication, the first N_0 (N_0≥1) or the first half of the (non-zero) bits/entries in the bitmap (and therefore, the corresponding RBGs) could correspond to the DCI for beam indication associated with the lowest (or the highest) CORESETPoolIndex value (e.g., 0 or 1) and/or the DCI for beam indication indicating the lowest (or the highest) TCI state ID value, and the rest of or the second half of the (non-zero) bits/entries in the bitmap (and therefore, the corresponding RBGs) could correspond to the DCI for beam indication associated with the highest (or the lowest) CORESETPoolIndex value (e.g., 1 or 0) and/or the DCI for beam indication indicating the highest (or the lowest) TCI state ID value.

For another example (option-2.3.6), the DCI for beam indication associated with the (mod(i−1, N_dci)+1)-th lowest/highest CORESETPoolIndex value and/or the DCI for beam indication indicating the TCI state with the (mod(i−1, N_dci)+1)-th lowest/highest TCI state ID value could correspond to the i-th (non-zero) bit/entry in the bitmap (and therefore, the corresponding RBG), where N_dci represents the total number of DCIs for beam indication, i=1, . . . , N_bit, where N_bit represents the total number of (non-zero) bits/entries in the bitmap indicated in the FD-RA field, and mod(x, y) calculates the remainder of the Euclidean division of x by y; for a total of two DCIs for beam indication, the odd-numbered (non-zero) bits/entries in the bitmap (and therefore, the corresponding RBGs) could correspond to the DCI for beam indication associated with the lowest (or the highest) CORESETPoolIndex value (e.g., 0 or 1) and/or the DCI for beam indication indicating the lowest (or the highest) TCI state ID value, and the even-numbered (non-zero) bits/entries in the bitmap (and therefore, the corresponding RBGs) could correspond to the DCI for beam indication associated with the highest (or the lowest) CORESETPoolIndex value (e.g., 1 or 0) and/or the DCI for beam indication indicating the highest (or the lowest) TCI state ID value.

The total number of bit(s)/entry(s) in the bitmap N_bit indicated in the FD-RA field could be configured by the network (e.g., via higher layer RRC signaling and/or MAC CE command and/or dynamic DCI signaling) and/or fixed in the system specifications and/or reported by the UE based on UE's capability and/or equal to the total number of DCIs for beam indication. The UE could be indicated by the network, e.g., via higher layer RRC signaling and/or MAC CE command and/or dynamic DCI signaling, which option(s) (from/out of option-2.3.5 and option-2.3.6) to use/being used for indicating the mapping/association between the (non-zero) bit(s)/entry(s) in the bitmap in the FD-RA field and the DCIs for beam indication (and therefore, the TCI states/beams indicated therein); for instance, a one-bit flag indicator could be incorporated/included in the DCI to differentiate between option-2.3.5 and option-2.3.6.

The UE could be indicated by the network one or more conditions, e.g., whether the total number of DCIs for beam indication is larger than a threshold, to switch between option-2.3.5 and option-2.3.6. For the Type 1 based PDSCH resource allocation, the UE could be indicated by the network the association/mapping between a DCI for beam indication (and therefore, the TCI state/beam indicated therein) and one or more RIVs in the FD-RA field. For example (option-2.3.7), the DCI for beam indication associated with the lowest CORESETPoolIndex value (indicated in the corresponding higher layer parameter ControlResourceSet) and/or the DCI for beam indication indicating the lowest TCI state ID value could correspond to the 1-st to n_0-th (n_0≥1) RIVs (and therefore, the corresponding PRBs), the DCI for beam indication associated with the second lowest CORESETPoolIndex value (indicated in the corresponding higher layer parameter ControlResourceSet) and/or the DCI for beam indication indicating the second lowest TCI state ID value could correspond to the (n_0+1)-th to n_1-th (n_1≥n_0) RIVs (and therefore, the corresponding PRBs), and so on, and the DCI for beam indication associated with the highest CORESETPoolIndex value (indicated in the corresponding higher layer parameter ControlResourceSet) and/or the DCI for beam indication indicating the highest TCI state ID value could correspond to the n_p-th to n_q-th (n_q≥n_p) RIVs (and therefore, the corresponding PRBs); for a total of two DCIs for beam indication, the first N_0 (N_0>1) or the first half of the RIVs (and therefore, the corresponding PRBs) could correspond to the DCI for beam indication associated with the lowest (or the highest) CORESETPoolIndex value (e.g., 0 or 1) and/or the DCI for beam indication indicating the lowest (or the highest) TCI state ID value, and the rest of or the second half of the RIVs (and therefore, the corresponding PRBs) could correspond to the DCI for beam indication associated with the highest (or the lowest) CORESETPoolIndex value (e.g., 1 or 0) and/or the DCI for beam indication indicating the highest (or the lowest) TCI state ID value.

For another example (option-2.3.8), the DCI for beam indication associated with the (mod(i−1, N_dci)+1)-th highest/lowest CORESETPoolIndex value and/or the DCI for beam indication indicating the TCI state with the (mod(i−1, N_dci)+1)-th lowest/highest TCI state ID value could correspond to the i-th RIV (and therefore, the corresponding PRB), where N_dci represents the total number of DCIs for beam indication, i=1, . . . , N_riv, where N_riv represents the total number of RIVs indicated in the FD-RA field, and mod(x, y) calculates the remainder of the Euclidean division of x by y; for a total of two DCIs for beam indication, the odd-numbered RIVs (and therefore, the corresponding PRBs) could correspond to the DCI for beam indication associated with the lowest (or the highest) CORESET-PoolIndex value (e.g., 0 or 1) and/or the DCI for beam indication indicating the lowest (or the highest) TCI state ID value, and the even-numbered RIVs (and therefore, the corresponding PRBs) could correspond to the DCI for beam indication associated with the highest (or the lowest) CORE-SETPoolIndex value (e.g., 1 or 0) and/or the DCI for beam indication indicating the highest (or the lowest) TCI state ID value. The total number of RIVs N_riv indicated in the FD-RA field could be configured by the network (e.g., via higher layer RRC signaling and/or MAC CE command and/or dynamic DCI signaling) and/or fixed in the system specifications and/or reported by the UE based on UE's capability and/or equal to the total number of DCIs for beam indication.

The UE could be indicated by the network, e.g., via higher layer RRC signaling and/or MAC CE command and/or dynamic DCI signaling, which option(s) (from/out of option-2.3.7 and option-2.3.8) to use/being used for indicating the mapping/association between the RIVs in the FD-RA field and the DCIs for beam indication (and therefore, the TCI states/beams indicated therein); for instance, a one-bit flag indicator could be incorporated/included in the DCI to differentiate between option-2.3.7 and option-2.3.8. The UE could be indicated by the network one or more conditions, e.g., whether the total number of DCIs for beam indication is larger than a threshold, to switch between option-2.3.6 and option-2.3.7.

Furthermore, for the Type 1 based PDSCH frequency domain resource allocation, a RIV could be calculated/determined based on at least a starting PRB position.

For example, the 1-st RIV indicated in the FD-RA field (e.g., corresponding to the DCI for beam indication associated with the lowest CORESETPoolIndex value—indicated in the corresponding higher layer parameter ControlResourceSet—and/or the DCI for beam indication indicating the lowest TCI state ID value) could be calculated/determined based on a first starting PRB position and a first number of consecutive PRBs, the 2-nd RIV indicated in the FD-RA field (e.g., corresponding to the DCI for beam indication associated with the second lowest CORESET-PoolIndex value—indicated in the corresponding higher layer parameter ControlResourceSet—and/or the DCI for beam indication indicating the second lowest TCI state ID value) could be calculated/determined based on a second starting PRB position and a second number of consecutive PRBs, and so on, and the N-th RIV indicated in the FD-RA field (e.g., corresponding to the DCI for beam indication associated with the highest CORESETPoolIndex value—indicated in the corresponding higher layer parameter ControlResourceSet—and/or the DCI for beam indication indicating the highest TCI state ID value) could be calculated/determined based on a N-th starting PRB position and a N-th number of consecutive PRBs. The first PRB starting position, the second starting PRB position, and so on, and the N-th PRB starting position could be different and are indicated/included in the FD-RA field; the first number of consecutive PRBs, the second number of consecutive PRBs, and so on, and the N-th number of consecutive PRBs could be different and are also indicated/included in the FD-RA field.

For another example, the 1-st RIV indicated in the FD-RA field (e.g., corresponding to the DCI for beam indication associated with the lowest CORESETPoolIndex value—indicated in the corresponding higher layer parameter ControlResourceSet—and/or the DCI for beam indication indicating the lowest TCI state ID value) could be calculated/determined based on a first starting PRB position and a first number of consecutive PRBs, the 2-nd RIV indicated in the FD-RA field (e.g., corresponding to the DCI for beam indication associated with the second lowest CORESET-PoolIndex value—indicated in the corresponding higher layer parameter ControlResourceSet—and/or the DCI for beam indication indicating the second lowest TCI state ID value) could be calculated/determined based on a second starting PRB position and a second number of consecutive PRBs same as the first number of consecutive PRBs, and so on, and the N-th RIV indicated in the FD-RA field (e.g., corresponding to the DCI for beam indication associated with the highest CORESETPoolIndex value—indicated in the corresponding higher layer parameter ControlResource-Set—and/or the DCI for beam indication indicating the highest TCI state ID value) could be calculated/determined based on a N-th starting PRB position and a N-th number of consecutive PRBs same as the first number of consecutive PRBs. The first PRB starting position, the second starting PRB position, and so on, and the N-th PRB starting position could be different and are indicated/included in the FD-RA field; the first number of consecutive PRBs is also indicated/included in the FD-RA field.

Yet for another example, the 1-st RIV indicated in the FD-RA field (e.g., corresponding to the DCI for beam indication associated with the lowest CORESETPoolIndex value—indicated in the corresponding higher layer parameter ControlResourceSet—and/or the DCI for beam indication indicating the lowest TCI state ID value) could be calculated/determined based on a first starting PRB position and a first number of consecutive PRBs, the 2-nd RIV indicated in the FD-RA field (e.g., corresponding to the DCI for beam indication associated with the second lowest CORESETPoolIndex value—indicated in the corresponding higher layer parameter ControlResourceSet—and/or the DCI for beam indication indicating the second lowest TCI state ID value) could be calculated/determined based on a second number of consecutive PRBs and a second starting PRB position having a gap with respect to the last PRB indicated by the 1-st RIV, and so on, the N-th RIV indicated in the FD-RA field (e.g., corresponding to the DCI for beam indication associated with the highest CORESETPoolIndex value—indicated in the corresponding higher layer parameter ControlResourceSet—and/or the DCI for beam indication indicating the highest TCI state ID value) could be calculated/determined based on a N-th number of consecutive PRBs and a N-th starting PRB position having a gap with respect to the last PRB indicated by the (N−1)-th RIV. The gap could be configured by the network and set to 0. The first number of consecutive PRBs, the second number of consecutive PRBs, and so on, and the N-th number of consecutive PRBs could be different and are indicated/included in the FD-RA field; the first starting PRB position is also indicated/included in the FD-RA field.

Other exact association/mapping relationships between the frequency domain resources indicated in the FD-RA field and the DCIs for beam indication (and therefore, the TCI states/beams indicated therein) and/or the corresponding indication method(s), e.g., via higher layer RRC signaling and/or MAC CE command and/or dynamic DCI signaling, are also possible. In another example, the UE could be implicitly indicated by the network the association/mapping between the DCIs for beam indication (and therefore, the TCI states/beams indicated therein) and the frequency domain resources indicated in the FD-RA field. For the Type 0 based PDSCH resource allocation, a DCI for beam indication (and therefore, the TCI state/beam indicated therein) could be associated with/mapped to one or more (non-zero) bits/entries in the bitmap (and therefore, the corresponding RBGs) indicated in the FD-RA field if the DCI for beam indication (and therefore, the TCI state/beam indicated therein) and the corresponding (non-zero) bit(s)/entry(s) in the bitmap indicated in the FD-RA field are associated with the same TRP-specific ID value such as PCI value and/or the same CORESETPoolIndex value.

For the Type 1 based PDSCH resource allocation, a DCI for beam indication (and therefore, the TCI state/beam indicated therein) could be associated with/mapped to one or more RIVs (and therefore, the corresponding PRBs) indicated in the FD-RA field if the DCI for beam indication (and therefore, the TCI state/beam indicated therein) and the corresponding RIV(s) indicated in the FD-RA field are associated with the same TRP-specific ID value such as PCI value and/or the same CORESETPoolIndex value. Other implicit indication methods of the association/mapping between the DCIs for beam indication and the frequency domain resources indicated in the FD-RA field are also possible.

For a single DCI indicating N>1 FD-RA fields, wherein each FD-RA field is associated with a different TRP in the multi-TRP system, in one example, the UE could be explicitly indicated by the network, e.g., via higher layer RRC signaling and/or MAC CE command and/or dynamic DCI signaling, the exact association/mapping between the N>1 DCIs for beam indication (and therefore, the TCI states/beams indicated therein) and the N>1 FD-RA fields indicated in the DCI. For example, the DCI for beam indication associated with the lowest CORESETPoolIndex value (indicated in the corresponding higher layer parameter ControlResourceSet) and/or the DCI for beam indication indicating the lowest TCI state ID value could correspond to the first FD-RA field indicated in the DCI, the DCI for beam indication associated with the second lowest CORESET-PoolIndex value (indicated in the corresponding higher layer parameter ControlResourceSet) and/or the DCI for beam indication indicating the second lowest TCI state ID value could correspond to the second FD-RA field indicated in the DCI, and so on, and the DCI for beam indication associated with the highest CORESETPoolIndex value (indicated in the corresponding higher layer parameter ControlResource-Set) and/or the DCI for beam indication indicating the highest TCI state ID value could correspond to the last FD-RA field indicated in the DCI. Other exact association/mapping relationships between the DCIs for beam indication and the FD-RA fields indicated in the DCI and/or the corresponding indication method(s), e.g., via higher layer RRC signaling and/or MAC CE command and/or dynamic DCI signaling, are also possible.

In another example, a DCI for beam indication could include/comprise/incorporate at least one (absolute) FD-RA field ID/index value indicated in the DCI and/or at least one (relative) FD-RA field index within the N>1 FD-RA fields indicated in the DCI.

In yet another example, a FD-RA field indicated in the DCI could include/comprise/incorporate at least one (abso-lute) entity ID/index value such as CORESETPoolIndex value of/associated with at least one DCI for beam indica-tion and/or at least one (relative) index of at least one DCI for beam indication within the N>1 DCIs for beam indica-tion.

In yet another example, the UE could be implicitly indicated by the network the association/mapping between the N>1 DCIs for beam indication (and therefore, the TCI states/beams indicated therein) and the N>1 FD-RA fields indicated in the DCI. For example, a DCI for beam indica-tion (and therefore, the TCI state/beam indicated therein) could be associated with/mapped to a FD-RA field indicated in the DCI if the DCI for beam indication and the FD-RA field indicated in the DCI are associated with the same TRP-specific ID value such as PCI value and/or the same CORESETPoolIndex value. Other implicit indication meth-ods of the association/mapping between the N>1 DCIs for beam indication (and therefore, the TCI states/beams indi-cated therein) and the N>1 FD-RA fields indicated in the DCI are also possible.

In yet another example, a DCI for beam indication (and therefore, the TCI states/beams indicated therein) could be associated with/mapped to a FD-RA field indicated in the DCI if the DCI for beam indication and the FD-RA field indicated in the DCI include/comprise/incorporate the same ID/index value. For example, this ID/index value could be a (absolute) TRP-specific ID/index value such as PCI value, TRP ID value, TRP index value and etc., based on a list/set/pool of TRP-specific ID/index values, e.g., higher layer configured to the UE and/or higher layer configured to the UE and activated by one or more MAC CE activation commands/bitmaps. For another example, this ID/index value could be an (relative) index within the list/set/pool of TRP-specific ID/index values, e.g., higher layer configured to the UE and/or higher layer configured to the UE and activated by one or more MAC CE activation commands/bitmaps. For yet another example, this ID/index value could be a CORESETPoolIndex value.

For N>1 DCIs each indicating at least one FD-RA field, wherein each DCI indicating at least one FD-RA field is associated with a different TRP in the multi-TRP system, in one example, the UE could be explicitly indicated by the network, e.g., via higher layer RRC signaling and/or MAC CE command and/or dynamic DCI signaling, the exact association/mapping between the N>1 DCIs for beam indi-cation (and therefore, the TCI states/beams indicated therein) and the N>1 DCIs indicating the FD-RA fields. For example, the DCI for beam indication associated with the lowest CORESETPoolIndex value (indicated in the corre-sponding higher layer parameter ControlResourceSet) and/or the DCI for beam indication indicating the lowest TCI state ID value could correspond to the DCI (indicating at least one FD-RA field) associated with the lowest CORE-SETPoolIndex value (indicated in the corresponding higher layer parameter ControlResourceSet), the DCI for beam indication associated with the second lowest CORESET-PoolIndex value (indicated in the corresponding higher layer parameter ControlResourceSet) and/or the DCI for beam indication indicating the second lowest TCI state ID value could correspond to the DCI (indicating at least one FD-RA field) associated with the second lowest CORESETPoolIn-dex value (indicated in the corresponding higher layer parameter ControlResourceSet), and so on, and the DCI for beam indication associated with the highest CORESET-PoolIndex value (indicated in the corresponding higher layer parameter ControlResourceSet) and/or the DCI for beam indication indicating the highest TCI state ID value could correspond to the DCI (indicating at least one FD-RA field) associated with the highest CORESETPoolIndex value (indicated in the corresponding higher layer parameter ControlResourceSet). Other exact association/mapping relationships between the DCIs for beam indication (and therefore, the TCI states/beams indicated therein) and the DCIs indicating the FD-RA fields and/or the corresponding indication method(s), e.g., via higher layer RRC signaling and/or MAC CE command and/or dynamic DCI signaling, are also possible.

In another example, a DCI for beam indication could include/comprise/incorporate at least one (absolute) FD-RA field ID/index value indicated in at least one DCI and/or at least one (relative) FD-RA field index within all the FD-RA fields indicated in the N>1 DCIs.

In yet another example, a DCI indicating at least one FD-RA field and/or a FD-RA field indicated in a DCI could include/comprise/incorporate at least one (absolute) entity ID/index value such as CORESETPoolIndex value of/associated with at least one DCI for beam indication and/or at least one (relative) index of at least one DCI for beam indication within the N>1 DCIs for beam indication.

In yet another example, the UE could be implicitly indicated by the network the association/mapping between the N>1 DCIs for beam indication (and therefore, the TCI states/beams indicated therein) and the N>1 DCIs indicating the FD-RA fields. For example, a DCI for beam indication (and therefore, the TCI state/beam indicated therein) could be associated with/mapped to a DCI indicating at least one FD-RA field if the DCI for beam indication and the DCI indicating at least one FD-RA field are associated with the same TRP-specific ID value such as PCI value and/or the same CORESETPoolIndex value. Other implicit indication methods of the association/mapping between the N>1 DCIs for beam indication and the N>1 DCIs indicating the FD-RA fields are also possible.

In yet another example, a DCI for beam indication (and therefore, the TCI states/beams indicated therein) could be associated with/mapped to a DCI indicating at least one FD-RA field if the DCI for beam indication and the DCI indicating at least one FD-RA field include/comprise/incorporate the same ID/index value. For example, this ID/index value could be a (absolute) TRP-specific ID/index value such as PCI value, TRP ID value, TRP index value and etc., based on a list/set/pool of TRP-specific ID/index values, e.g., higher layer configured to the UE and/or higher layer configured to the UE and activated by one or more MAC CE activation commands/bitmaps. For another example, this ID/index value could be an (relative) index within the list/set/pool of TRP-specific ID/index values, e.g., higher layer configured to the UE and/or higher layer configured to the UE and activated by one or more MAC CE activation commands/bitmaps. For yet another example, this ID/index value could be a CORESETPoolIndex value.

An example of DCI based TCI state/beam indication (with MAC CE activated TCI states) for the multi-TRP operation and PDSCH(s) repetition is presented in FIG. 12. As illustrated in FIG. 12, the UE could be first higher layer configured by the network, e.g., via the higher layer RRC signaling, a list/pool of N_tci TCI states. Each TCI state contains at least a QCL source RS with a QCL type, e.g., QCL-typeA/B/C/D. The UE could then receive from the network one or more MAC CE activation commands activating one or more TCI states from the higher layer configured list/pool of TCI states, e.g., up to eight TCI states could be activated by a MAC CE activation command. The UE could receive from the network one or more DCIs to indicate one or more beam(s) (i.e., the TCI state(s)) from the MAC CE activated TCI state(s)/beam(s) for the transmission/reception of the same PDSCH(s) transmitted from/associated with one or more TRPs in a multi-TRP system on different/non-overlapping frequency domain resources.

For instance, the UE could receive from the network a single DCI to indicate N'>1 TCI states/beams from the MAC CE activated TCI states/beams for the same PDSCH(s) transmitted from/associated with different TRPs in the multi-TRP system on different/non-overlapping frequency domain resources. As depicted in FIG. 9 and FIG. 12, the UE could receive from the network a single DCI to indicate N'=2 TCI states/beams (TCI #3 and TCI #5) from the MAC CE activated TCI states/beams for the same PDSCH-a transmitted from/associated with two TRPs, i.e., TRP-1 and TRP-2, in the multi-TRP system, respectively, on different/non-overlapping frequency domain resources.

As described above, a DCI used to indicate to the UE a beam (i.e., a TCI state and/or a TCI state ID) for the transmission/reception of a PDCCH or a PDSCH could be at least one of the following.

In one example, a DL related DCI (e.g., DCI format 1_0, DCI format 1_1 or DCI format 1_2) could be used to indicate to the UE a beam (i.e., a TCI state and/or a TCI state ID) for the transmission/reception of a PDCCH or a PDSCH, wherein the DL related DCI may or may not include a DL assignment.

In another example, an UL related DCI (e.g., DCI format 0_0, DCI format 0_1, DCI format 0_2) could be used to indicate to the UE a beam (i.e., a TCI state and/or a TCI state ID) for the transmission/reception of a PDCCH or a PDSCH, wherein the UL related DCI may or may not include an UL scheduling grant.

Yet in another example, a custom/purpose designed DCI format could be used to indicate to the UE a beam (i.e., a TCI state and/or a TCI state ID) for the transmission/reception of a PDCCH or a PDSCH.

Furthermore, the TCI state indicated in the DCI for beam indication could be at least one of: (1) a DL TCI state; (2) an UL TCI state; (3) a joint DL and UL TCI state; and/or (4) separate DL TCI state and UL TCI state.

The association/mapping between the DCI(s) indicated TCI state(s)/beams (from the MAC CE activated TCI state(s)/beam(s)) and the TRPs in the multi-TRP system could follow those discussed/specified in example-1.3.1, example-1.3.2, example-1.3.3, example-1.3.4, example-1.3.5, example-1.3.a, example-1.3.b, and example-1.3.c. There could be various means to associate/map between DCI(s) indicated TCI state(s)/beam(s)—from the MAC CE activated TCI state(s)/beam(s)—and the frequency domain resources indicated in the FD-RA field(s).

For N'>1 TCI states/beams indication in a single DCI for beam indication, for a single DCI indicating a single FD-RA field, wherein the frequency domain resources indicated in the FD-RA field are associated with different TRPs in the multi-TRP system, in one example, the UE could be explicitly indicated by the network the association/mapping between the DCI indicated TCI states/beams (selected from the MAC CE activated TCI states/beams) and the frequency domain resources indicated in the FD-RA field. For the Type 0 based PDSCH resource allocation, the UE could be indicated by the network the association/mapping between a TCI state/beam indicated in the DCI for beam indication and one or more (non-zero) bits/entries in the bitmap in the FD-RA field.

For example (option-2.4.1), the first TCI state and/or the TCI state with the lowest TCI state ID value indicated in the DCI for beam indication could correspond to the 1-st to n_0-th (n_0≥1) (non-zero) bits/entries in the bitmap (and therefore, the corresponding RBGs), the second TCI state and/or the TCI state with the second lowest TCI state ID value indicated in the DCI for beam indication could correspond to the (n_0+1)-th to n_1-th (n_1≥n_0) (non-zero) bits/entries in the bitmap (and therefore, the corresponding RBGs), and so on, and the last TCI state and/or the TCI state with the highest TCI state ID value indicated in the DCI for beam indication could correspond to the n_p-th to n_q-th (n_q≥n_p) (non-zero) bits/entries in the bitmap (and therefore, the corresponding RBGs); for a total of two TCI states/beams—selected from the MAC CE activated TCI states/beams—indicated in the DCI for beam indication, the first N_0 (N_0≥1) or the first half of the (non-zero) bits/entries in the bitmap (and therefore, the corresponding RBGs) could correspond to the first (or the second) TCI state and/or the TCI state with the lowest (or the highest) TCI state ID value indicated in the DCI for beam indication, and the rest of or the second half of the (non-zero) bits/entries in the bitmap (and therefore, the corresponding RBGs) could correspond to the second (or the first) TCI state and/or the TCI state with the highest (or the lowest) TCI state ID value indicated in the DCI for beam indication. For another example (option-2.4.2), the (mod(i−1, N_tci)+1)-th TCI state and/or the TCI state with the (mod(i−1, N_tci)+1)-th lowest/highest TCI state ID value indicated in the DCI for beam indication could correspond to the i-th (non-zero) bit/entry in the bitmap (and therefore, the corresponding RBG), where N_tci represents the total number of TCI state(s)/beam(s)—selected from the MAC CE activated TCI states/beams—indicated in the DCI for beam indication, i=1, . . . , N_bit, where N_bit represents the total number of (non-zero) bits/entries in the bitmap indicated in the FD-RA field, and mod(x, y) calculates the remainder of the Euclidean division of x by y; for a total of two TCI states/beams—selected from the MAC CE activated TCI states/beams—indicated in the DCI for beam indication, the odd-numbered (non-zero) bits/entries in the bitmap (and therefore, the corresponding RBGs) could correspond to the first (or the second) TCI state and/or the TCI state with the lowest (or the highest) TCI state ID value indicated in the DCI for beam indication, and the even-numbered (non-zero) bits/entries in the bitmap (and therefore, the corresponding RBGs) could correspond to the second (or the first) TCI state and/or the TCI state with the highest (or the lowest) TCI state ID value indicated in the DCI for beam indication.

The total number of bit(s)/entry(s) in the bitmap N_bit indicated in the FD-RA field could be configured by the network (e.g., via higher layer RRC signaling and/or MAC CE command and/or dynamic DCI signaling) and/or fixed in the system specifications and/or reported by the UE based on UE's capability and/or equal to the total number of TCI states/beams—selected from the MAC CE activated TCI states/beams—indicated in the DCI for beam indication. The UE could be indicated by the network, e.g., via higher layer RRC signaling and/or MAC CE command and/or dynamic DCI signaling, which option(s) (from/out of option-2.4.1 and option-2.4.2) to use/being used for indicating the mapping/association between the (non-zero) bit(s)/entry(s) in the bitmap in the FD-RA field and the TCI states/beams—selected from the MAC CE activated TCI states/beams—indicated in the DCI for beam indication; for instance, a one-bit flag indicator could be incorporated/included in the DCI to differentiate between option-2.4.1 and option-2.4.2.

The UE could be indicated by the network one or more conditions, e.g., whether the total number of TCI states/ beams—selected from the MAC CE activated TCI states/beams—indicated in the DCI for beam indication is larger than a threshold, to switch between option-2.4.1 and option-2.4.2. For the Type 1 based PDSCH resource allocation, the UE could be indicated by the network the association/mapping between a TCI state/beam indicated in the DCI for beam indication and one or more RIVs in the FD-RA field. For example (option-2.4.3), the first TCI state and/or the TCI state with the lowest TCI state ID value indicated in the DCI for beam indication could correspond to the 1-st to n_0-th (n_0≥1) RIVs (and therefore, the corresponding PRBs), the second TCI state and/or the TCI state with the second lowest TCI state ID value indicated in the DCI for beam indication could correspond to the (n_0+1)-th to n_1-th (n_1≥n_0) RIVs (and therefore, the corresponding PRBs), and so on, and the last TCI state and/or the TCI state with the highest TCI state ID value indicated in the DCI for beam indication could correspond to the n_p-th to n_q-th (n_q≥n_p) RIVs (and therefore, the corresponding PRBs); for a total of two TCI states/beams—selected from the MAC CE activated TCI states/beams—indicated in the DCI for beam indication, the first N_0 (N_0≥1) or the first half of the RIVs (and therefore, the corresponding PRBs) could correspond to the first (or the second) TCI state and/or the TCI state with the lowest (or the highest) TCI state ID value indicated in the DCI for beam indication, and the rest of or the second half of the RIVs (and therefore, the corresponding PRBs) could correspond to the second (or the first) TCI state and/or the TCI state with the highest (or the lowest) TCI state ID value indicated in the DCI for beam indication. For another example (option-2.4.4), the (mod(i−1, N_tci)+1)-th TCI state and/or the TCI state with the (mod(i−1, N_tci)+1)-th lowest/highest TCI state ID value indicated in the DCI for beam indication could correspond to the i-th RIV (and therefore, the corresponding PRB), where N_tci represents the total number of TCI state(s)/beam(s)—selected from the MAC CE activated TCI states/beams—indicated in the DCI for beam indication, i=1, . . . , N_riv, where N_riv represents the total number of RIVs indicated in the FD-RA field, and mod(x, y) calculates the remainder of the Euclidean division of x by y; for a total of two TCI states/beams—selected from the MAC CE activated TCI states/beams—indicated in the DCI for beam indication, the odd-numbered RIVs (and therefore, the corresponding PRBs) could correspond to the first (or the second) TCI state and/or the TCI state with the lowest (or the highest) TCI state ID value indicated in the DCI for beam indication, and the even-numbered RIVs (and therefore, the corresponding PRBs) could correspond to the second (or the first) TCI state and/or the TCI state with the highest (or the lowest) TCI state ID value indicated in the DCI for beam indication.

The total number of RIVs N_riv indicated in the FD-RA field could be configured by the network (e.g., via higher layer RRC signaling and/or MAC CE command and/or dynamic DCI signaling) and/or fixed in the system specifications and/or reported by the UE based on UE's capability and/or equal to the total number of TCI states/beams—selected from the MAC CE activated TCI states/beams—indicated in the DCI for beam indication. The UE could be indicated by the network, e.g., via higher layer RRC signaling and/or MAC CE command and/or dynamic DCI signaling, which option(s) (from/out of option-2.4.3 and option-2.4.4) to use/being used for indicating the mapping/association between the RIVs in the FD-RA field and the TCI states/beams—selected from the MAC CE activated TCI states/beams—indicated in the DCI for beam indication; for instance, a one-bit flag indicator could be incorporated/included in the DCI to differentiate between option-2.4.3 and option-2.4.4. The UE could be indicated by the network one or more conditions, e.g., whether the total number of TCI states/beams—selected from the MAC CE activated TCI states/beams—indicated in the DCI for beam indication is larger than a threshold, to switch between option-2.4.3 and option-2.4.4.

Furthermore, for the Type 1 based PDSCH frequency domain resource allocation, a RIV could be calculated/determined based on at least a starting PRB position.

For example, the 1-st RIV indicated in the FD-RA field (e.g., corresponding to the first TCI state and/or the TCI state with the lowest TCI state ID value indicated in the DCI for beam indication) could be calculated/determined based on a first starting PRB position and a first number of consecutive PRBs, the 2-nd RIV indicated in the FD-RA field (e.g., corresponding to the second TCI state and/or the TCI state with the second lowest TCI state ID value indicated in the DCI for beam indication) could be calculated/determined based on a second starting PRB position and a second number of consecutive PRBs, and so on, and the N'-th RIV indicated in the FD-RA field (e.g., corresponding to the last TCI state and/or the TCI state with the highest TCI state ID value indicated in the DCI for beam indication) could be calculated/determined based on a N'-th starting PRB position and a N'-th number of consecutive PRBs. The first PRB starting position, the second starting PRB position, and so on, and the N'-th PRB starting position could be different are indicated/included in the FD-RA field; the first number of consecutive PRBs, the second number of consecutive PRBs, and so on, and the N'-th number of consecutive PRBs could be different and are also indicated/included in the FD-RA field.

For another example, the 1-st RIV indicated in the FD-RA field (e.g., corresponding to the first TCI state and/or the TCI state with the lowest TCI state ID value indicated in the DCI for beam indication) could be calculated/determined based on a first starting PRB position and a first number of consecutive PRBs, the 2-nd RIV indicated in the FD-RA field (e.g., corresponding to the second TCI state and/or the TCI state with the second lowest TCI state ID value indicated in the DCI for beam indication) could be calculated/determined based on a second starting PRB position and a second number of consecutive PRBs same as the first number of consecutive PRBs, and so on, and the N'-th RIV indicated in the FD-RA field (e.g., corresponding to the last TCI state and/or the TCI state with the highest TCI state ID value indicated in the DCI for beam indication) could be calculated/determined based on a N'-th starting PRB position and a N'-th number of consecutive PRBs same as the first number of consecutive PRBs. The first PRB starting position, the second starting PRB position, and so on, and the N'-th PRB starting position could be different and are indicated/included in the FD-RA field; the first number of consecutive PRBs is also indicated/included in the FD-RA field.

Yet for another example, the 1-st RIV indicated in the FD-RA field (e.g., corresponding to the first TCI state and/or the TCI state with the lowest TCI state ID value indicated in the DCI for beam indication) could be calculated/determined based on a first starting PRB position and a first number of consecutive PRBs, the 2-nd RIV indicated in the FD-RA field (e.g., corresponding to the second TCI state and/or the TCI state with the second lowest TCI state ID value indicated in the DCI for beam indication) could be calculated/determined based on a second number of consecutive PRBs and a second starting PRB position having a gap with respect to the last PRB indicated by the 1-st RIV, and so on, the N'-th RIV indicated in the FD-RA field (e.g., corresponding to the last TCI state and/or the TCI state with the highest TCI state ID value indicated in the DCI for beam indication) could be calculated/determined based on a N'-th number of consecutive PRBs and a N'-th starting PRB position having a gap with respect to the last PRB indicated by the (N'−1)-th RIV. The gap could be configured by the network and set to 0. The first number of consecutive PRBs, the second number of consecutive PRBs, and so on, and the N'-th number of consecutive PRBs could be different and are indicated/included in the FD-RA field; the first starting PRB position is also indicated/included in the FD-RA field.

Other exact association/mapping relationships between the frequency domain resources indicated in the FD-RA field and the DCI indicated TCI state(s)/beam(s)—selected from the MAC CE activated TCI state(s)/beam(s)—and/or the corresponding indication method(s), e.g., via higher layer RRC signaling and/or MAC CE command and/or dynamic DCI signaling, are also possible.

In another example, the UE could be implicitly indicated by the network the association/mapping between the DCI indicated TCI states/beams (selected from the MAC CE activated TCI states/beams) and the frequency domain resources indicated in the FD-RA field. For the Type 0 based PDSCH resource allocation, a TCI state/beam indicated in the DCI for beam indication could be associated with/mapped to one or more (non-zero) bits/entries in the bitmap (and therefore, the corresponding RBGs) indicated in the FD-RA field if the TCI state/beam indicated in the DCI for beam indication and the corresponding (non-zero) bit(s)/entry(s) in the bitmap indicated in the FD-RA field are associated with the same TRP-specific ID value such as PCI value and/or the same CORESETPoolIndex value.

For the Type 1 based PDSCH resource allocation, a TCI state/beam indicated in the DCI for beam indication could be associated with/mapped to one or more RIVs (and therefore, the corresponding PRBs) indicated in the FD-RA field if the TCI state/beam indicated in the DCI for beam indication and the corresponding RIV(s) indicated in the FD-RA field are associated with the same TRP-specific ID value such as PCI value and/or the same CORESETPoolIndex value. Other implicit indication methods of the association/mapping between the DCI indicated TCI state(s)/beam(s)—selected from the MAC CE activated TCI state(s)/beam(s)—and the frequency domain resources indicated in the FD-RA field are also possible.

For N'>1 TCI states/beams indication in a single DCI for beam indication, for a single DCI indicating N'>1 FD-RA fields, wherein each FD-RA field is associated with a different TRP in the multi-TRP system, in one example, the UE could be explicitly indicated by the network, e.g., via higher layer RRC signaling and/or MAC CE command and/or dynamic DCI signaling, the exact association/mapping between the N'>1 DCI indicated TCI states/beams (selected from the MAC CE activated TCI states/beams) and the N'>1 FD-RA fields indicated in the DCI.

For example, the first TCI state and/or the TCI state with the lowest TCI state ID value indicated in the DCI for beam indication could correspond to the first FD-RA field indicated in the DCI, the second TCI state and/or the TCI state with the second lowest TCI state ID value indicated in the DCI for beam indication could correspond to the second FD-RA field indicated in the DCI, and so on, and the last TCI state and/or the TCI state with the highest TCI state ID value indicated in the DCI for beam indication could correspond to the last FD-RA field indicated in the DCI. Other exact association/mapping relationships between the DCI indicated TCI states/beams—selected from the MAC CE activated TCI states/beams—and the FD-RA fields indicated in the DCI and/or the corresponding indication method(s), e.g., via higher layer RRC signaling and/or MAC CE command and/or dynamic DCI signaling, are also possible.

In another example, a TCI state (selected from the MAC CE activated TCI states/beams), e.g., the higher layer parameter TCI-State, indicated in the DCI for beam indication could include/comprise/incorporate at least one (absolute) FD-RA field ID/index value indicated in the DCI and/or at least one (relative) FD-RA field index within the N'>1 FD-RA fields indicated in the DCI.

In yet another example, a FD-RA field indicated in the DCI could include/comprise/incorporate at least one (absolute) TCI state ID/index value indicated in the DCI for beam indication and/or at least one (relative) TCI state index within the N'>1 TCI states/beams (selected from the MAC CE activated TCI states/beams) indicated in the DCI for beam indication.

In yet another example, the UE could be implicitly indicated by the network the association/mapping between the N'>1 DCI indicated TCI states/beams (selected from the MAC CE activated TCI states/beams) and the N'>1 FD-RA fields indicated in the DCI. For example, a TCI state/beam indicated in the DCI for beam indication could be associated with/mapped to a FD-RA field indicated in the DCI if the TCI state/beam indicated in the DCI for beam indication and the FD-RA field indicated in the DCI are associated with the same TRP-specific ID value such as PCI value and/or the same CORESETPoolIndex value. Other implicit indication methods of the association/mapping between the N'>1 DCI indicated TCI states/beams—selected from the MAC CE activated TCI states/beams—and the N'>1 FD-RA fields indicated in the DCI are also possible.

In yet another example, a TCI state/beam (selected from the MAC CE activated TCI states/beams) indicated in the DCI for beam indication could be associated with/mapped to a FD-RA field indicated in the DCI if the TCI state/beam (selected from the MAC CE activated TCI states/beams) indicated in the DCI for beam indication and the FD-RA field indicated in the DCI include/comprise/incorporate the same ID/index value. For example, this ID/index value could be a (absolute) TRP-specific ID/index value such as PCI value, TRP ID value, TRP index value and etc., based on a list/set/pool of TRP-specific ID/index values, e.g., higher layer configured to the UE and/or higher layer configured to the UE and activated by one or more MAC CE activation commands/bitmaps. For another example, this ID/index value could be an (relative) index within the list/set/pool of TRP-specific ID/index values, e.g., higher layer configured to the UE and/or higher layer configured to the UE and activated by one or more MAC CE activation commands/bitmaps. For yet another example, this ID/index value could be a CORESETPoolIndex value.

For N'>1 TCI states/beams indication in a single DCI for beam indication, for N'>1 DCIs each indicating at least one FD-RA field, wherein each DCI indicating at least one FD-RA field is associated with a different TRP in the multi-TRP system, in one example, the UE could be explicitly indicated by the network, e.g., via higher layer RRC signaling and/or MAC CE command and/or dynamic DCI signaling, the exact association/mapping between the N'>1 DCI indicated TCI states/beams (selected from the MAC CE activated TCI states/beams) and the N'>1 DCIs indicating the FD-RA fields. For example, the first TCI state and/or the TCI state with the lowest TCI state ID value indicated in the DCI for beam indication could correspond to the DCI (indicating at least one FD-RA field) associated with the lowest CORESETPoolIndex value (indicated in the corresponding higher layer parameter ControlResourceSet), the second TCI state and/or the TCI state with the second lowest TCI state ID value indicated in the DCI for beam indication could correspond to the DCI (indicating at least one FD-RA field) associated with the second lowest CORESETPoolIndex value (indicated in the corresponding higher layer parameter ControlResourceSet), and so on, and the last TCI state and/or the TCI state with the highest TCI state ID value indicated in the DCI for beam indication could correspond to the DCI (indicating at least one FD-RA field) associated with the highest CORESETPoolIndex value (indicated in the corresponding higher layer parameter ControlResourceSet). Other exact association/mapping relationships between the DCI indicated TCI states/beams—selected from the MAC CE activated TCI states/beams—and the DCIs indicating the FD-RA fields and/or the corresponding indication method(s), e.g., via higher layer RRC signaling and/or MAC CE command and/or dynamic DCI signaling, are also possible.

In another example, a TCI state (selected from the MAC CE activated TCI states/beams), e.g., the higher layer parameter TCI-State, indicated in the DCI for beam indication could include/comprise/incorporate at least one (absolute) FD-RA field ID/index value indicated in at least one DCI and/or at least one (relative) FD-RA field index within all the FD-RA fields indicated in the N'>1 DCIs.

In yet another example, a DCI indicating at least one FD-RA field and/or a FD-RA field indicated in a DCI could include/comprise/incorporate at least one (absolute) TCI state ID/index value indicated in the DCI for beam indication and/or at least one (relative) TCI state index within the N'>1 TCI states/beams (selected from the MAC CE activated TCI states/beams) indicated in the DCI for beam indication.

In yet another example, the UE could be implicitly indicated by the network the association/mapping between the N'>1 DCI indicated TCI states/beams (selected from the MAC CE activated TCI states/beams) and the N'>1 DCIs indicating the FD-RA fields. For example, a TCI state/beam indicated in the DCI for beam indication could be associated with/mapped to a DCI indicating at least one FD-RA field if the TCI state/beam indicated in the DCI for beam indication and the DCI indicating at least one FD-RA field are associated with the same TRP-specific ID value such as PCI value and/or the same CORESETPoolIndex value. Other implicit indication methods of the association/mapping between the N'>1 DCI indicated TCI states/beams—selected from the MAC CE activated TCI states/beams—and the N'>1 DCIs indicating the FD-RA fields are also possible.

In yet another example, a TCI state/beam (selected from the MAC CE activated TCI states/beams) indicated in the DCI for beam indication could be associated with/mapped to a DCI indicating at least one FD-RA field if the TCI state/beam (selected from the MAC CE activated TCI states/beams) indicated in the DCI for beam indication and the DCI indicting at least one FD-RA field include/comprise/incorporate the same ID/index value. For example, this ID/index value could be a (absolute) TRP-specific ID/index value such as PCI value, TRP ID value, TRP index value and etc., based on a list/set/pool of TRP-specific ID/index values, e.g., higher layer configured to the UE and/or higher layer configured to the UE and activated by one or more MAC CE activation commands/bitmaps. For another example, this ID/index value could be an (relative) index within the list/set/pool of TRP-specific ID/index values, e.g., higher layer configured to the UE and/or higher layer configured to the UE and activated by one or more MAC CE activation commands/bitmaps. For yet another example, this ID/index value could be a CORESETPoolIndex value.

For N'>1 DCIs for beam indication with each DCI indicating a single TCI state/beam, for a single DCI indicating a single FD-RA field, wherein the frequency domain resources indicated in the FD-RA field are associated with different TRPs in the multi-TRP system, in one example, the UE could be explicitly indicated by the network the association/mapping between the DCIs for beam indication (and therefore, the TCI states/beams indicated therein—selected from the MAC CE activated TCI states/beams) and the frequency domain resources indicated in the FD-RA field.

For the Type 0 based PDSCH resource allocation, the UE could be indicated by the network the association/mapping between a DCI for beam indication (and therefore, the TCI state/beam indicated therein—selected from the MAC CE activated TCI states/beams) and one or more (non-zero) bits/entries in the bitmap in the FD-RA field. For example (option-2.4.5), the DCI for beam indication associated with the lowest CORESETPoolIndex value (indicated in the corresponding higher layer parameter ControlResourceSet) and/or the DCI for beam indication indicating the lowest TCI state ID value could correspond to the 1-st to $n\_0$-th ($n\_0 \geq 1$) (non-zero) bits/entries in the bitmap (and therefore, the corresponding RBGs), the DCI for beam indication associated with the second lowest CORESETPoolIndex value (indicated in the corresponding higher layer parameter ControlResourceSet) and/or the DCI for beam indication indicating the second lowest TCI state ID value could correspond to the $(n\_0+1)$-th to $n\_1$-th ($n\_1 \geq n\_0$) (non-zero) bits/entries in the bitmap (and therefore, the corresponding RBGs), and so on, and the DCI for beam indication associated with the highest CORESETPoolIndex value (indicated in the corresponding higher layer parameter ControlResourceSet) and/or the DCI for beam indication indicating the highest TCI state ID value could correspond to the $n\_p$-th to $n\_q$-th ($n\_q \geq n\_p$) (non-zero) bits/entries in the bitmap (and therefore, the corresponding RBGs); for a total of two DCIs for beam indication (each indicating the TCI states/beams selected from the MAC CE activated TCI states/beams), the first $N\_0$ ($N\_0 \geq 1$) or the first half of the (non-zero) bits/entries in the bitmap (and therefore, the corresponding RBGs) could correspond to the DCI for beam indication associated with the lowest (or the highest) CORESETPoolIndex value and/or the DCI for beam indication indicating the lowest (or the highest) TCI state ID value, and the rest of or the second half of the (non-zero) bits/entries in the bitmap (and therefore, the corresponding RBGs) could correspond to the DCI for beam indication associated with the highest (or the lowest) CORESETPoolIndex value and/or the DCI for beam indication indicating the highest (or the lowest) TCI state ID value.

For another example (option-2.4.6), the DCI for beam indication associated with the $(\mathrm{mod}(i-1, N\_dci)+1)$-th lowest/highest CORESETPoolIndex value and/or the DCI for beam indication indicating the TCI state with the $(\mathrm{mod}(i-1, N\_dci)+1)$-th lowest/highest TCI state ID value could correspond to the i-th (non-zero) bit/entry in the bitmap (and therefore, the corresponding RBG), where $N\_dci$ represents the total number of DCIs for beam indication, $i=1, \ldots, N\_bit$, where $N\_bit$ represents the total number of (non-zero) bits/entries in the bitmap indicated in the FD-RA field, and $\mathrm{mod}(x, y)$ calculates the remainder of the Euclidean division of x by y; for a total of two DCIs for beam indication (each indicating the TCI states/beams selected from the MAC CE activated TCI states/beams), the odd-numbered (non-zero) bits/entries in the bitmap (and therefore, the corresponding RBGs) could correspond to the DCI for beam indication associated with the lowest (or the highest) CORESETPoolIndex value and/or the DCI for beam indication indicating the lowest (or the highest) TCI state ID value, and the even-numbered (non-zero) bits/entries in the bitmap (and therefore, the corresponding RBGs) could correspond to the DCI for beam indication associated with the highest (or the lowest) CORESETPoolIndex value and/or the DCI for beam indication indicating the highest (or the lowest) TCI state ID value.

The total number of bit(s)/entry(s) in the bitmap $N\_bit$ indicated in the FD-RA field could be configured by the network (e.g., via higher layer RRC signaling and/or MAC CE command and/or dynamic DCI signaling) and/or fixed in the system specifications and/or reported by the UE based on UE's capability and/or equal to the total number DCIs for beam indication indicating the TCI states/beams selected from the MAC CE activated TCI states/beams. The UE could be indicated by the network, e.g., via higher layer RRC signaling and/or MAC CE command and/or dynamic DCI signaling, which option(s) (from/out of option-2.4.5 and option-2.4.6) to use/being used for indicating the mapping/association between the (non-zero) bit(s)/entry(s) in the bitmap in the FD-RA field and the DCIs for beam indication (and therefore, the TCI states/beams—selected from the MAC CE activated TCI states/beams—indicated therein); for instance, a one-bit flag indicator could be incorporated/included in the DCI to differentiate between option-2.4.5 and option-2.4.6. The UE could be indicated by the network one or more conditions, e.g., whether the total number of DCIs for beam indication (indicating the TCI states/beams selected from the MAC CE activated TCI states/beams) is larger than a threshold, to switch between option-2.4.5 and option-2.4.6.

For the Type 1 based PDSCH resource allocation, the UE could be indicated by the network the association/mapping between a DCI for beam indication (and therefore, the TCI state/beam indicated therein—selected from the MAC CE activated TCI states/beams) and one or more RIVs in the FD-RA field. For example (option-2.4.7), the DCI for beam indication associated with the lowest CORESETPoolIndex value (indicated in the corresponding higher layer parameter ControlResourceSet) and/or the DCI for beam indication indicating the lowest TCI state ID value could correspond to the 1-st to $n\_0$-th ($n\_0 \geq 1$) RIVs (and therefore, the corresponding PRBs), the DCI for beam indication associated with the second lowest CORESETPoolIndex value (indicated in the corresponding higher layer parameter ControlResourceSet) and/or the DCI for beam indication indicating the second lowest TCI state ID value could correspond to the $(n\_0+1)$-th to $n\_1$-th ($n\_1 \geq n\_0$) RIVs (and therefore, the corresponding PRBs), and so on, and the DCI for beam indication associated with the highest CORESETPoolIndex value (indicated in the corresponding higher layer parameter ControlResourceSet) and/or the DCI for beam indication indicating the highest TCI state ID value could correspond to the $n\_p$-th to $n\_q$-th ($n\_q \geq n\_p$) RIVs (and therefore, the corresponding PRBs); for a total of two DCIs for beam indication (each indicating the TCI states/beams selected from the MAC CE activated TCI states/beams), the first $N\_0$ ($N\_0 \geq 1$) or the first half of the RIVs (and therefore, the corresponding PRBs) could correspond to the DCI for beam indication associated with the lowest (or the highest) CORESETPoolIndex value and/or the DCI for beam indication indicating the lowest (or the highest) TCI state ID value, and the rest of or the second half of the RIVs (and therefore, the corresponding PRBs) could correspond to the DCI for beam indication associated with the highest (or the lowest) CORE-SETPoolIndex value and/or the DCI for beam indication indicating the highest (or the lowest) TCI state ID value.

For another example (option-2.4.8), the DCI for beam indication associated with the (mod(i−1, N_dci)+1)-th highest/lowest CORESETPoolIndex value and/or the DCI for beam indication indicating the TCI state with the (mod(i−1, N_dci)+1)-th lowest/highest TCI state ID value could correspond to the i-th RIV (and therefore, the corresponding PRB), where N_dci represents the total number of DCIs for beam indication, i=1, . . . , N_riv, where N_riv represents the total number of RIVs indicated in the FD-RA field, and mod(x, y) calculates the remainder of the Euclidean division of x by y; for a total of two DCIs for beam indication (each indicating the TCI states/beams selected from the MAC CE activated TCI states/beams), the odd-numbered RIVs (and therefore, the corresponding PRBs) could correspond to the DCI for beam indication associated with the lowest (or the highest) CORESETPoolIndex value and/or the DCI for beam indication indicating the lowest (or the highest) TCI state ID value, and the even-numbered RIVs (and therefore, the corresponding PRBs) could correspond to the DCI for beam indication associated with the highest (or the lowest) CORESETPoolIndex value and/or the DCI for beam indication indicating the highest (or the lowest) TCI state ID value.

The total number of RIVs N_riv indicated in the FD-RA field could be configured by the network (e.g., via higher layer RRC signaling and/or MAC CE command and/or dynamic DCI signaling) and/or fixed in the system specifications and/or reported by the UE based on UE's capability and/or equal to the total number of DCIs for beam indication indicating the TCI states/beams selected from the MAC CE activated TCI states/beams. The UE could be indicated by the network, e.g., via higher layer RRC signaling and/or MAC CE command and/or dynamic DCI signaling, which option(s) (from/out of option-2.4.7 and option-2.4.8) to use/being used for indicating the mapping/association between the RIVs in the FD-RA field and the DCIs for beam indication (and therefore, the TCI states/beams—selected from the MAC CE activated TCI states/beams—indicated therein); for instance, a one-bit flag indicator could be incorporated/included in the DCI to differentiate between option-2.4.7 and option-2.4.8. The UE could be indicated by the network one or more conditions, e.g., whether the total number of DCIs for beam indication (indicating the TCI states/beams selected from the MAC CE activated TCI states/beams) is larger than a threshold, to switch between option-2.4.7 and option-2.4.8.

Furthermore, for the Type 1 based PDSCH frequency domain resource allocation, a RIV could be calculated/determined based on at least a starting PRB position.

For example, the 1-st RIV indicated in the FD-RA field (e.g., corresponding to the DCI for beam indication associated with the lowest CORESETPoolIndex value—indicated in the corresponding higher layer parameter ControlResourceSet—and/or the DCI for beam indication indicating the lowest TCI state ID value) could be calculated/determined based on a first starting PRB position and a first number of consecutive PRBs, the 2-nd RIV indicated in the FD-RA field (e.g., corresponding to the DCI for beam indication associated with the second lowest CORESET-PoolIndex value—indicated in the corresponding higher layer parameter ControlResourceSet—and/or the DCI for beam indication indicating the second lowest TCI state ID value) could be calculated/determined based on a second starting PRB position and a second number of consecutive PRBs, and so on, and the N'-th RIV indicated in the FD-RA field (e.g., corresponding to the DCI for beam indication associated with the highest CORESETPoolIndex value— indicated in the corresponding higher layer parameter ControlResourceSet—and/or the DCI for beam indication indicating the highest TCI state ID value) could be calculated/ determined based on a N'-th starting PRB position and a N'-th number of consecutive PRBs. The first PRB starting position, the second starting PRB position, and so on, and the N'-th PRB starting position could be different and are indicated/included in the FD-RA field; the first number of consecutive PRBs, the second number of consecutive PRBs, and so on, and the N'-th number of consecutive PRBs could be different and are also indicated/included in the FD-RA field.

For another example, the 1-st RIV indicated in the FD-RA field (e.g., corresponding to the DCI for beam indication associated with the lowest CORESETPoolIndex value— indicated in the corresponding higher layer parameter ControlResourceSet—and/or the DCI for beam indication indicating the lowest TCI state ID value) could be calculated/determined based on a first starting PRB position and a first number of consecutive PRBs, the 2-nd RIV indicated in the FD-RA field (e.g., corresponding to the DCI for beam indication associated with the second lowest CORESET-PoolIndex value—indicated in the corresponding higher layer parameter ControlResourceSet—and/or the DCI for beam indication indicating the second lowest TCI state ID value) could be calculated/determined based on a second starting PRB position and a second number of consecutive PRBs same as the first number of consecutive PRBs, and so on, and the N'-th RIV indicated in the FD-RA field (e.g., corresponding to the DCI for beam indication associated with the highest CORESETPoolIndex value—indicated in the corresponding higher layer parameter ControlResource-Set—and/or the DCI for beam indication indicating the highest TCI state ID value) could be calculated/determined based on a N'-th starting PRB position and a N'-th number of consecutive PRBs same as the first number of consecutive PRBs. The first PRB starting position, the second starting PRB position, and so on, and the N'-th PRB starting position could be different and are indicated/included in the FD-RA field; the first number of consecutive PRBs is also indicated/ included in the FD-RA field.

Yet for another example, the 1-st RIV indicated in the FD-RA field (e.g., corresponding to the DCI for beam indication associated with the lowest CORESETPoolIndex value—indicated in the corresponding higher layer parameter ControlResourceSet—and/or the DCI for beam indication indicating the lowest TCI state ID value) could be calculated/determined based on a first starting PRB position and a first number of consecutive PRBs, the 2-nd RIV indicated in the FD-RA field (e.g., corresponding to the DCI for beam indication associated with the second lowest CORESETPoolIndex value—indicated in the corresponding higher layer parameter ControlResourceSet—and/or the DCI for beam indication indicating the second lowest TCI state ID value) could be calculated/determined based on a second number of consecutive PRBs and a second starting PRB position having a gap with respect to the last PRB indicated by the 1-st RIV, and so on, the N'-th RIV indicated in the FD-RA field (e.g., corresponding to the DCI for beam indication associated with the highest CORESETPoolIndex value—indicated in the corresponding higher layer parameter ControlResourceSet—and/or the DCI for beam indication indicating the highest TCI state ID value) could be calculated/determined based on a N'-th number of consecutive PRBs and a N'-th starting PRB position having a gap with respect to the last PRB indicated by the (N'—1)-th RIV. The gap could be configured by the network and set to 0. The first number of consecutive PRBs, the second number of consecutive PRBs, and so on, and the N'-th number of consecutive PRBs could be different and are indicated/included in the FD-RA field; the first starting PRB position is also indicated/included in the FD-RA field.

Other exact association/mapping relationships between the frequency domain resources indicated in the FD-RA field and the DCIs for beam indication (and therefore, the TCI states/beams indicated therein—selected from the MAC CE activated TCI states/beams) and/or the corresponding indication method(s), e.g., via higher layer RRC signaling and/or MAC CE command and/or dynamic DCI signaling, are also possible.

In another example, the UE could be implicitly indicated by the network the association/mapping between the DCIs for beam indication (and therefore, the TCI states/beams indicated therein—selected from the MAC CE activated TCI states/beams) and the frequency domain resources indicated in the FD-RA field. For the Type 0 based PDSCH resource allocation, a DCI for beam indication (and therefore, the TCI state/beam indicated therein—selected from the MAC CE activated TCI states/beams) could be associated with/mapped to one or more (non-zero) bits/entries in the bitmap (and therefore, the corresponding RBGs) indicated in the FD-RA field if the DCI for beam indication (and therefore, the TCI state/beam indicated therein—selected from the MAC CE activated TCI states/beams) and the corresponding (non-zero) bit(s)/entry(s) in the bitmap indicated in the FD-RA field are associated with the same TRP-specific ID value such as PCI value and/or the same CORESETPoolIndex value.

For the Type 1 based PDSCH resource allocation, a DCI for beam indication (and therefore, the TCI state/beam indicated therein—selected from the MAC CE activated TCI states/beams) could be associated with/mapped to one or more RIVs (and therefore, the corresponding PRBs) indicated in the FD-RA field if the DCI for beam indication (and therefore, the TCI state/beam indicated therein—selected from the MAC CE activated TCI states/beams) and the corresponding RIV(s) indicated in the FD-RA field are associated with the same TRP-specific ID value such as PCI value and/or the same CORESETPoolIndex value. Other implicit indication methods of the association/mapping between the DCIs for beam indication and the frequency domain resources indicated in the FD-RA field are also possible.

For N'>1 DCIs for beam indication with each DCI indicating a single TCI state/beam, for a single DCI indicating N'>1 FD-RA fields, wherein each FD-RA field is associated with a different TRP in the multi-TRP system, in one example, the UE could be explicitly indicated by the network, e.g., via higher layer RRC signaling and/or MAC CE command and/or dynamic DCI signaling, the exact association/mapping between the N'>1 DCIs for beam indication (and therefore, the TCI states/beams indicated therein—selected from the MAC CE activated TCI states/beams) and the N'>1 FD-RA fields indicated in the DCI. For example, the DCI for beam indication associated with the lowest CORESETPoolIndex value (indicated in the corresponding higher layer parameter ControlResourceSet) and/or the DCI for beam indication indicating the lowest TCI state ID value could correspond to the first FD-RA field indicated in the DCI, the DCI for beam indication associated with the second lowest CORESETPoolIndex value (indicated in the corresponding higher layer parameter ControlResourceSet) and/or the DCI for beam indication indicating the second lowest TCI state ID value could correspond to the second FD-RA field indicated in the DCI, and so on, and the DCI for beam indication associated with the highest CORESETPoolIndex value (indicated in the corresponding higher layer parameter ControlResourceSet) and/or the DCI for beam indication indicating the highest TCI state ID value could correspond to the last FD-RA field indicated in the DCI. Other exact association/mapping relationships between the DCIs for beam indication and the FD-RA fields indicated in the DCI and/or the corresponding indication method(s), e.g., via higher layer RRC signaling and/or MAC CE command and/or dynamic DCI signaling, are also possible.

In another example, a DCI for beam indication (and therefore, the TCI states/beams indicated therein—selected from the MAC CE activated TCI states/beams) could include/comprise/incorporate at least one (absolute) FD-RA field ID/index value indicated in the DCI and/or at least one (relative) FD-RA field index within the N'≥1 FD-RA fields indicated in the DCI.

In yet another example, a FD-RA field indicated in the DCI could include/comprise/incorporate at least one (absolute) entity ID/index value such as CORESETPoolIndex value of/associated with at least one DCI for beam indication (and therefore, the TCI states/beams indicated therein—selected from the MAC CE activated TCI states/beams) and/or at least one (relative) index of at least one DCI for beam indication (and therefore, the TCI states/beams indicated therein—selected from the MAC CE activated TCI states/beams) within the N'>1 DCIs for beam indication.

In another example, the UE could be implicitly indicated by the network the association/mapping between the N'>1 DCIs for beam indication (and therefore, the TCI states/beams indicated therein—selected from the MAC CE activated TCI states/beams) and the N'>1 FD-RA fields indicated in the DCI. For example, a DCI for beam indication (and therefore, the TCI state/beam indicated therein—selected from the MAC CE activated TCI states/beams) could be associated with/mapped to a FD-RA field indicated in the DCI if the DCI for beam indication and the FD-RA field indicated in the DCI are associated with the same TRP-specific ID value such as PCI value and/or the same CORESETPoolIndex value. Other implicit indication methods of the association/mapping between the N'>1 DCIs for beam indication (and therefore, the TCI states/beams indicated therein—selected from the MAC CE activated TCI states/beams) and the N'>1 FD-RA fields indicated in the DCI are also possible.

In yet another example, a DCI for beam indication (and therefore, the TCI states/beams indicated therein—selected from the MAC CE activated TCI states/beams) could be associated with/mapped to a FD-RA field indicated in the DCI if the DCI for beam indication and the FD-RA field indicated in the DCI include/comprise/incorporate the same ID/index value. For example, this ID/index value could be a (absolute) TRP-specific ID/index value such as PCI value, TRP ID value, TRP index value and etc., based on a list/set/pool of TRP-specific ID/index values, e.g., higher layer configured to the UE and/or higher layer configured to the UE and activated by one or more MAC CE activation commands/bitmaps. For another example, this ID/index value could be an (relative) index within the list/set/pool of TRP-specific ID/index values, e.g., higher layer configured to the UE and/or higher layer configured to the UE and activated by one or more MAC CE activation commands/bitmaps. For yet another example, this ID/index value could be a CORESETPoolIndex value.

For N'>1 DCIs for beam indication with each DCI indicating a single TCI state/beam, for N'>1 DCIs each indicating at least one FD-RA field, wherein each DCI indicating at least one FD-RA field is associated with a different TRP in the multi-TRP system, in one example, the UE could be explicitly indicated by the network, e.g., via higher layer RRC signaling and/or MAC CE command and/or dynamic DCI signaling, the exact association/mapping between the N'>1 DCIs for beam indication (and therefore, the TCI states/beams indicated therein—selected from the MAC CE activated TCI states/beams) and the N'>1 DCIs indicating the FD-RA fields. For example, the DCI for beam indication associated with the lowest CORESETPoolIndex value (indicated in the corresponding higher layer parameter ControlResourceSet) and/or the DCI for beam indication indicating the lowest TCI state ID value could correspond to the DCI (indicating at least one FD-RA field) associated with the lowest CORESETPoolIndex value (indicated in the corresponding higher layer parameter ControlResourceSet), the DCI for beam indication associated with the second lowest CORESETPoolIndex value (indicated in the corresponding higher layer parameter ControlResourceSet) and/or the DCI for beam indication indicating the second lowest TCI state ID value could correspond to the DCI (indicating at least one FD-RA field) associated with the second lowest CORESET-PoolIndex value (indicated in the corresponding higher layer parameter ControlResourceSet), and so on, and the DCI for beam indication associated with the highest CORESET-PoolIndex value (indicated in the corresponding higher layer parameter ControlResourceSet) and/or the DCI for beam indication indicating the highest TCI state ID value could correspond to the DCI (indicating at least one FD-RA field) associated with the highest CORESETPoolIndex value (indicated in the corresponding higher layer parameter ControlResourceSet). Other exact association/mapping relationships between the DCIs for beam indication (and therefore, the TCI states/beams indicated therein—selected from the MAC CE activated TCI states/beams) and the DCIs indicating the FD-RA fields and/or the corresponding indication method(s), e.g., via higher layer RRC signaling and/or MAC CE command and/or dynamic DCI signaling, are also possible.

In another example, a DCI for beam indication (and therefore, the TCI states/beams indicated therein—selected from the MAC CE activated TCI states/beams) could include/comprise/incorporate at least one (absolute) FD-RA field ID/index value indicated in at least one DCI and/or at least one (relative) FD-RA field index within all the FD-RA fields indicated in the N>1 DCIs.

In yet another example, a DCI indicating at least one FD-RA field and/or a FD-RA field indicated in a DCI could include/comprise/incorporate at least one (absolute) entity ID/index value such as CORESETPoolIndex value of/associated with at least one DCI for beam indication (and therefore, the TCI states/beams indicated therein—selected from the MAC CE activated TCI states/beams) and/or at least one (relative) index of at least one DCI for beam indication (and therefore, the TCI states/beams indicated therein—selected from the MAC CE activated TCI states/beams) within the N'>1 DCIs for beam indication.

In yet another example, the UE could be implicitly indicated by the network the association/mapping between the N'>1 DCIs for beam indication (and therefore, the TCI states/beams indicated therein—selected from the MAC CE activated TCI states/beams) and the N'>1 DCIs indicating the FD-RA fields. For example, a DCI for beam indication (and therefore, the TCI state/beam indicated therein—selected from the MAC CE activated TCI states/beams) could be associated with/mapped to a DCI indicating at least one FD-RA field if the DCI for beam indication and the DCI indicating at least one FD-RA field are associated with the same TRP-specific ID value such as PCI value and/or the same CORESETPoolIndex value. Other implicit indication methods of the association/mapping between the N'>1 DCIs for beam indication and the N'>1 DCIs indicating the FD-RA fields are also possible.

In yet another example, a DCI for beam indication (and therefore, the TCI states/beams indicated therein—selected from the MAC CE activated TCI states/beams) could be associated with/mapped to a DCI indicating at least one FD-RA field if the DCI for beam indication and the DCI indicating at least one FD-RA field include/comprise/incorporate the same ID/index value. For example, this ID/index value could be a (absolute) TRP-specific ID/index value such as PCI value, TRP ID value, TRP index value and etc., based on a list/set/pool of TRP-specific ID/index values, e.g., higher layer configured to the UE and/or higher layer configured to the UE and activated by one or more MAC CE activation commands/bitmaps. For another example, this ID/index value could be an (relative) index within the list/set/pool of TRP-specific ID/index values, e.g., higher layer configured to the UE and/or higher layer configured to the UE and activated by one or more MAC CE activation commands/bitmaps. For yet another example, this ID/index value could be a CORESETPoolIndex value.

Figure 14:
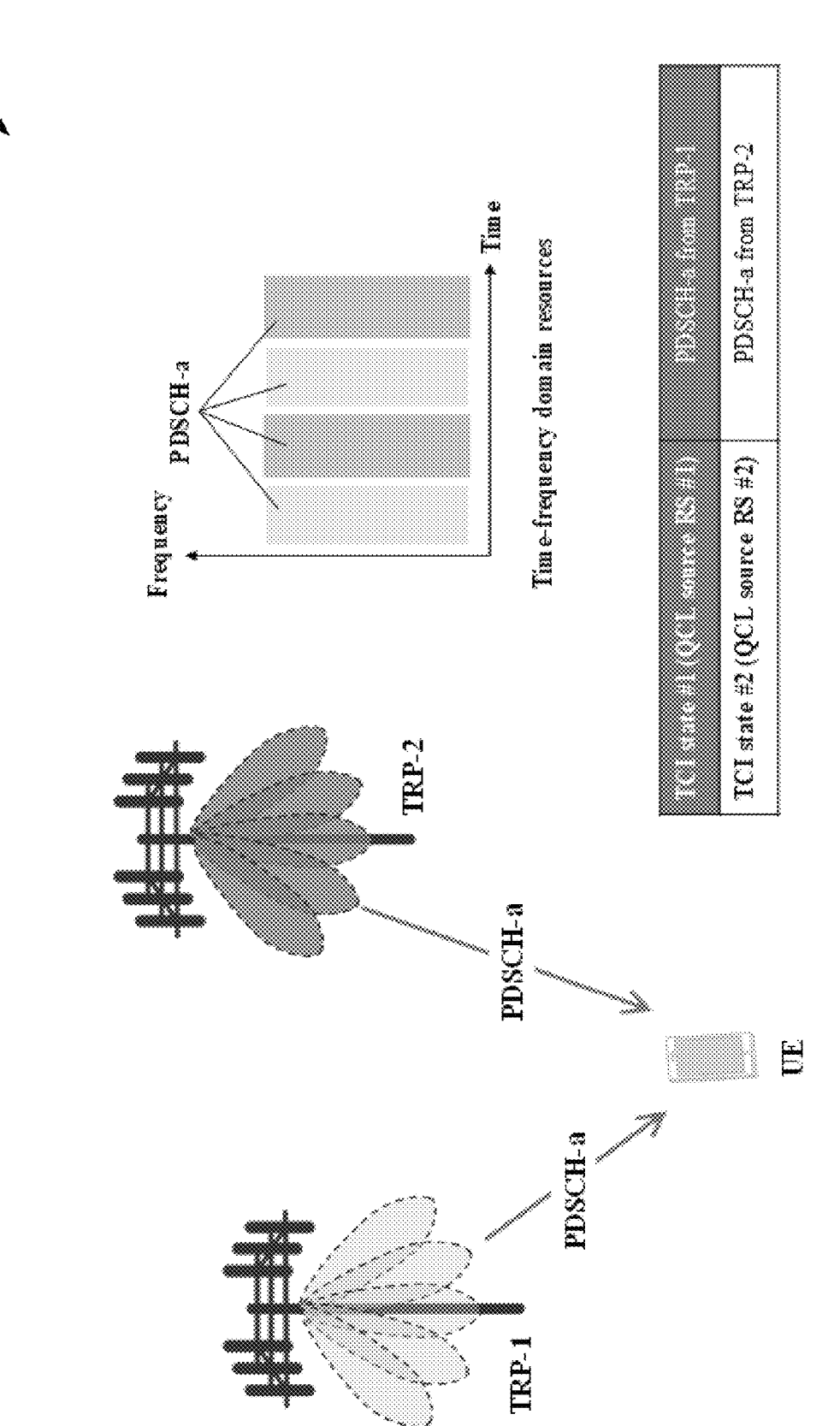
FIG. 14 illustrates an example of TDM based PDSCH(s) repetition in a multi-TRP system according to embodiments of the present disclosure.

FIG. 14 illustrates an example of TDM based PDSCH(s) repetition in a multi-TRP system 1400 according to embodiments of the present disclosure. An embodiment of the TDM based PDSCH(s) repetition in a multi-TRP system 1400 shown in FIG. 14 is for illustration only.

One conceptual example of TDM based PDSCH(s) repetition in a multi-TRP system is presented in FIG. 14. As depicted in FIG. 14, the UE could receive the same PDSCH, i.e., PDSCH-a, from both TRP-1 and TRP-2 on different/non-overlapping time domain resources/transmission occasions (e.g., in terms of slots, mini-slots, symbols and etc.). The UE could be indicated by the network different TCI states—TCI state #1 and TCI state #2 in FIG. 12 (and therefore, different QCL source RSs indicated therein—QCL source RS #1 and QCL source RS #2 in FIG. 14) for the same PDSCH—PDSCH-a in FIG. 14—transmitted from different TRPs—TRP-1 and TRP-2 in FIG. 14—in the multi-TRP system on different/non-overlapping time domain resources/transmission occasions such as slots, mini-slots, symbols and etc.

The time domain resources indicated in the time domain resource allocation (TD-RA) field(s) could be associated with different TRPs in the multi-TRP system. The TD-RA field could indicate one or more slots/mini-slots/symbols (also referred to as transmission occasions). A transmission occasion could be defined/determined based on K0—the time delay between the indicating DCI slot and the PDSCH slot, and/or S—the starting symbol of the PDSCH, and/or L—the length of the consecutive symbols for the PDSCH; the values of K0 and/or S and/or L are indicated/configured in the corresponding TD-RA field. There could be various means to associate/map the (non-overlapping) time domain resources (or transmission occasions) indicated in the TD-RA field(s) with/to different TRPs in the multi-TRP system.

For example, the UE could be indicated by the network a single DCI with a single TD-RA field indicating the time domain resource allocation.

In one example, the UE could be explicitly indicated by the network the association/mapping between one or more transmission occasions in the TD-RA field and the TRPs in the multi-TRP system. For example, the UE could be first higher layer configured by the network a list/set/pool of TRP-specific ID/index values such as PCIs. The UE could be explicitly indicated by the network the association/mapping between one or more transmission occasions in the TD-RA field and the TRP-specific ID/index values such as PCIs in the list/set/pool of TRP-specific ID/index values. In one example (option-3.1.1), the 1-st to n_0-th (n_0≥1) transmission occasions in the TD-RA field could correspond to the first entry/TRP in the list/set/pool of TRP-specific ID/index values, the (n_0+1)-th to n_1-th (n_1≥n_0) transmission occasions in the TD-RA field could correspond to the second entry/TRP in the list/set/pool of TRP-specific ID/index values, and so on, and the n_p-th to n_q-th (n_q≥n_p) transmission occasions in the TD-RA field could correspond to the last entry/TRP in the list/set/pool of TRP-specific ID/index values; for a total of two TRPs in the multi-TRP system, the first N_0 (N_0≥1) or the first half of the transmission occasions could correspond to the first (or the second) entry/TRP in the list/set/pool of TRP-specific ID/index values, and the rest of or the second half of the transmission occasions could correspond to the second (or the first) entry/TRP in the list/set/pool of TRP-specific ID/index values; in another example (option-3.1.2), the i-th transmission occasion in the TD-RA field could correspond to the (mod(i−1, N_trp)+1)-th entry/TRP in the list/set/pool of TRP-specific ID/index values, where N_trp represents the total number of TRPs in the multi-TRP system, i=1, . . . , K, where K represents the total number of transmission occasions in the TD-RA field, and mod(x, y) calculates the remainder of the Euclidean division of x by y; for a total of two TRPs in the multi-TRP system, the odd-numbered transmission occasions could correspond to the first (or the second) entry/TRP in the list/set/pool of TRP-specific ID/index values, and the even-numbered occasions could correspond to the second (or the first) entry/TRP in the list/set/pool of TRP-specific ID/index values. The total number of transmission occasions K indicated in the TD-RA field could be configured by the network (e.g., via higher layer RRC signaling and/or MAC CE command and/or dynamic DCI signaling) and/or fixed in the system specifications and/or reported by the UE based on UE's capability and/or equal to the total number of TRPs in the multi-TRP system.

For a TRP in the multi-TRP system, the UE could be indicated by the network the starting/ending symbol/slot/mini-slot and/or the number of consecutive symbols/slots/mini-slots of the transmission occasion(s) associated with the TRP. The UE could be indicated by the network, e.g., via higher layer RRC signaling and/or MAC CE command and/or dynamic DCI signaling, which option(s) (from/out of option-3.1.1 and option-3.1.2) to use/being used for indicating the mapping/association between the transmission occasion(s) in the TD-RA field and the TRPs in the multi-TRP system; for instance, a one-bit flag indicator could be incorporated/included in the DCI to differentiate between option-3.1.1 and option-3.1.2. The UE could be indicated by the network one or more conditions, e.g., whether the total number of TRPs in the multi-TRP system is larger than a threshold, to switch between option-3.1.1 and option-3.1.2.

Specifically, a transmission occasion could be defined/determined as follows.

For example, the 1-st transmission occasion indicated in the TD-RA field (e.g., corresponding to the first entry/TRP in the list/set/pool of TRP-specific ID/index values) could be calculated/determined based on a first K0 value, a first S value and a first L value, the 2-nd transmission occasion indicated in the TD-RA field (e.g., corresponding to the second entry/TRP in the list/set/pool of TRP-specific ID/index values) could be calculated/determined based on a second K0 value, a second S value, and a second L value, and so on, and the N-th transmission occasion indicated in the TD-RA field (e.g., corresponding to the last entry/TRP in the list/set/pool of TRP-specific ID/index values) could be calculated/determined based on a N-th K0 value, a N-th S value, and a N-th L value. The first K0 value, the second K0 value, and so on, and the N-th K0 value could be different; the first S value, the second S value, and so on, and the N-th S value could be different; the first L value, the second L value, and so on, and the N-th L value could be different. The first K0 value, the second K0 value, and so on, and the N-th K0 value are indicated/included in the TD-RA field; the first S value, the second S value, and so on, and the N-th S value are indicated/included in the TD-RA field; the first L value, the second L value, and so on, and the N-th L value are indicated/included in the TD-RA field.

For another example, the 1-st transmission occasion indicated in the TD-RA field (e.g., corresponding to the first entry/TRP in the list/set/pool of TRP-specific ID/index values) could be calculated/determined based on a first K0 value, a first S value and a first L value, the 2-nd transmission occasion indicated in the TD-RA field (e.g., corresponding to the second entry/TRP in the list/set/pool of TRP-specific ID/index values) could be calculated/determined based on a second K0 value, a second S value having the same value as the first S value, and a second L value having the same value as the first L value, and so on, and the N-th transmission occasion indicated in the TD-RA field (e.g., corresponding to the last entry/TRP in the list/set/pool of TRP-specific ID/index values) could be calculated/determined based on a N-th K0 value, a N-th S value having the same value as the first S value, and a N-th L value having the same value as the first L value. The first K0 value, the second K0 value, and so on, and the N-th K0 value could be different. The first K0 value, the second K0 value, and so on, and the N-th K0 value are indicated/included in the TD-RA field; the first S value and the first L value are indicated/included in the TD-RA field.

Yet for another example, the 1-st transmission occasion indicated in the TD-RA field (e.g., corresponding to the first entry/TRP in the list/set/pool of TRP-specific ID/index values) could be calculated/determined based on a first K0 value, a first S value and a first L value, the 2-nd transmission occasion indicated in the TD-RA field (e.g., corresponding to the second entry/TRP in the list/set/pool of TRP-specific ID/index values) could be calculated/determined based on a second K0 value having a difference/gap with respect to the first K0 value, a second S value, and a second L value, and so on, and the N-th transmission occasion indicated in the TD-RA field (e.g., corresponding to the last entry/TRP in the list/set/pool of TRP-specific ID/index values) could be calculated/determined based on a N-th K0 value having a difference/gap with respect to the (N−1)-th K0 value, a N-th S value, and a N-th L value. The difference/gap could be configured by the network and set to 1 slot. The first S value, the second S value, and so on, and the N-th S value could be different; the first L value, the second L value, and so on, and the N-th L value could be different. The first K0 value is indicated/included in the TD-RA field; the first S value, the second S value, and so on, and the N-th S value are indicated/included in the TD-RA field; the first L value, the second L value, and so on, and the N-th L value are indicated/included in the TD-RA field.

Yet for another example, the 1-st transmission occasion indicated in the TD-RA field (e.g., corresponding to the first entry/TRP in the list/set/pool of TRP-specific ID/index values) could be calculated/determined based on a first K0 value, a first S value and a first L value, the 2-nd transmission occasion indicated in the TD-RA field (e.g., corresponding to the second entry/TRP in the list/set/pool of TRP-specific ID/index values) could be calculated/determined based on a second K0 value having a difference/gap with respect to the first K0 value, a second S value having the same value as the first S value, and a second L value having the same value as the first L value, and so on, and the N-th transmission occasion indicated in the TD-RA field (e.g., corresponding to the last entry/TRP in the list/set/pool of TRP-specific ID/index values) could be calculated/determined based on a N-th K0 value having a difference/gap with respect to the (N−1)-th K0 value, a N-th S value having the same value as the first S value, and a N-th L value having the same value as the first L value. The difference/gap could be configured by the network and set to 1 slot. The first K0 value, the first S value and the first L value are indicated/included in the TD-RA field.

For another example, the UE could be first higher layer configured by the network a list/set/pool of TRP-specific ID/index values such as PCIs. The UE could then receive from the network one or more MAC CE activation commands/bitmaps to activate one or more TRP-specific ID/index values from the higher layer configured list/set/pool of TRP-specific ID/index values.

In one example (option-3.1.3), the 1-st to n_0-th (n_0≥1) transmission occasions in the TD-RA field could correspond to the first MAC CE(s)/bitmap(s) activated TRP-specific ID/index value, the (n_0+1)-th to n_1-th (n_1≥n_0) transmission occasions in the TD-RA field could correspond to the second MAC CE(s)/bitmap(s) activated TRP-specific ID/index value, and so on, and the n_p-th to n_q-th (n_q≥n_p) transmission occasions in the TD-RA field could correspond to the last MAC CE(s)/bitmap(s) activated TRP-specific ID/index value; for a total of two MAC CE(s)/bitmap(s) activated TRPs in the multi-TRP system, the first N_0 (N_0≥1) or the first half of the transmission occasions could correspond to the first (or the second) MAC CE(s)/bitmap(s) activated TRP-specific ID/index value, and the rest of or the second half of the transmission occasions could correspond to the second (or the first) MAC CE(s)/bitmap(s) activated TRP-specific ID/index value; in another example (option-3.1.4), the i-th transmission occasion in the TD-RA field could correspond to the (mod(i−1, N_trp')+1)-th MAC CE(s)/bitmap(s) activated TRP-specific ID/index value, where N_trp' represents the total number of MAC CE(s)/bitmap(s) activated TRPs in the multi-TRP system, i=1, . . . , K, where K represents the total number of transmission occasions indicated in the TD-RA field, and mod(x, y) calculates the remainder of the Euclidean division of x by y; for a total of two MAC CE(s)/bitmap(s) activated TRPs in the multi-TRP system, the odd-numbered transmission occasions could correspond to the first (or the second) MAC CE(s)/bitmap(s) activated TRP-specific ID/index value, and the even-numbered transmission occasions could correspond to the second (or the first) MAC CE(s)/bitmap(s) activated TRP-specific ID/index value. The total number of transmission occasions K indicated in the TD-RA field could be configured by the network (e.g., via higher layer RRC signaling and/or MAC CE command and/or dynamic DCI signaling) and/or fixed in the system specifications and/or reported by the UE based on UE's capability and/or equal to the total number of MAC CE(s)/bitmap(s) activated TRPs in the multi-TRP system. For a MAC CE activated TRP in the multi-TRP system, the UE could be indicated by the network the starting/ending symbol/slot/mini-slot and/or the number of consecutive symbols/slots/mini-slots of the transmission occasion(s) associated with the MAC CE activated TRP. The UE could be indicated by the network, e.g., via higher layer RRC signaling and/or MAC CE command and/or dynamic DCI signaling, which option(s) (from/out of option-3.1.3 and option-3.1.4) to use/being used for indicating the mapping/association between the transmission occasion(s) in the TD-RA field and the MAC CE(s)/bitmap(s) activated TRPs in the multi-TRP system; for instance, a one-bit flag indicator could be incorporated/included in the DCI to differentiate between option-3.1.3 and option-3.1.4.

The UE could be indicated by the network one or more conditions, e.g., whether the total number of MAC CE(s)/bitmap(s) activated TRPs in the multi-TRP system is larger than a threshold, to switch between option-3.1.3 and option-3.1.4.

Specifically, a transmission occasion could be defined/determined as follows.

For example, the 1-st transmission occasion indicated in the TD-RA field (e.g., corresponding to the first MAC CE(s)/bitmap(s) activated TRP-specific ID/index value) could be calculated/determined based on a first K0 value, a first S value and a first L value, the 2-nd transmission occasion indicated in the TD-RA field (e.g., corresponding to the second MAC CE(s)/bitmap(s) activated TRP-specific ID/index value) could be calculated/determined based on a second K0 value, a second S value, and a second L value, and so on, and the N-th transmission occasion indicated in the TD-RA field (e.g., corresponding to the last MAC CE(s)/bitmap(s) activated TRP-specific ID/index value) could be calculated/determined based on a N-th K0 value, a N-th S value, and a N-th L value. The first K0 value, the second K0 value, and so on, and the N-th K0 value could be different; the first S value, the second S value, and so on, and the N-th S value could be different; the first L value, the second L value, and so on, and the N-th L value could be different. The first K0 value, the second K0 value, and so on, and the N-th K0 value are indicated/included in the TD-RA field; the first S value, the second S value, and so on, and the N-th S value are indicated/included in the TD-RA field; the first L value, the second L value, and so on, and the N-th L value are indicated/included in the TD-RA field.

For another example, the 1-st transmission occasion indicated in the TD-RA field (e.g., corresponding to the first MAC CE(s)/bitmap(s) activated TRP-specific ID/index value) could be calculated/determined based on a first K0 value, a first S value and a first L value, the 2-nd transmission occasion indicated in the TD-RA field (e.g., corresponding to the second MAC CE(s)/bitmap(s) activated TRP-specific ID/index value) could be calculated/determined based on a second K0 value, a second S value having the same value as the first S value, and a second L value having the same value as the first L value, and so on, and the N-th transmission occasion indicated in the TD-RA field (e.g., corresponding to the last MAC CE(s)/bitmap(s) activated TRP-specific ID/index value) could be calculated/determined based on a N-th K0 value, a N-th S value having the same value as the first S value, and a N-th L value having the same value as the first L value. The first K0 value, the second K0 value, and so on, and the N-th K0 value could be different. The first K0 value, the second K0 value, and so on, and the N-th K0 value are indicated/included in the TD-RA field; the first S value and the first L value are indicated/included in the TD-RA field.

Yet for another example, the 1-st transmission occasion indicated in the TD-RA field (e.g., corresponding to the first MAC CE(s)/bitmap(s) activated TRP-specific ID/index value) could be calculated/determined based on a first K0 value, a first S value and a first L value, the 2-nd transmission occasion indicated in the TD-RA field (e.g., corresponding to the second MAC CE(s)/bitmap(s) activated TRP-specific ID/index value) could be calculated/determined based on a second K0 value having a difference/gap with respect to the first K0 value, a second S value, and a second L value, and so on, and the N-th transmission occasion indicated in the TD-RA field (e.g., corresponding to the last MAC CE(s)/bitmap(s) activated TRP-specific ID/index value) could be calculated/determined based on a N-th K0 value having a difference/gap with respect to the (N−1)-th K0 value, a N-th S value, and a N-th L value. The difference/gap could be configured by the network and set to 1 slot. The first S value, the second S value, and so on, and the N-th S value could be different; the first L value, the second L value, and so on, and the N-th L value could be different. The first K0 value is indicated/included in the TD-RA field; the first S value, the second S value, and so on, and the N-th S value are indicated/included in the TD-RA field; the first L value, the second L value, and so on, and the N-th L value are indicated/included in the TD-RA field.

Yet for another example, the 1-st transmission occasion indicated in the TD-RA field (e.g., corresponding to the first MAC CE(s)/bitmap(s) activated TRP-specific ID/index value) could be calculated/determined based on a first K0 value, a first S value and a first L value, the 2-nd transmission occasion indicated in the TD-RA field (e.g., corresponding to the second MAC CE(s)/bitmap(s) activated TRP-specific ID/index value) could be calculated/determined based on a second K0 value having a difference/gap with respect to the first K0 value, a second S value having the same value as the first S value, and a second L value having the same value as the first L value, and so on, and the N-th transmission occasion indicated in the TD-RA field (e.g., corresponding to the last MAC CE(s)/bitmap(s) activated TRP-specific ID/index value) could be calculated/determined based on a N-th K0 value having a difference/gap with respect to the (N−1)-th K0 value, a N-th S value having the same value as the first S value, and a N-th L value having the same value as the first L value. The difference/gap could be configured by the network and set to 1 slot. The first K0 value, the first S value and the first L value are indicated/included in the TD-RA field.

Other exact association/mapping relationships between the time domain resources or the transmission occasions indicated in the TD-RA field and the TRPs in the multi-TRP system and/or the corresponding indication method(s), e.g., via higher layer RRC signaling and/or MAC CE command and/or dynamic DCI signaling, are also possible.

In another example, the UE could be implicitly indicated by the network the association/mapping between one or more transmission occasions in the TD-RA field and the TRPs in the multi-TRP system. The UE could be higher layer configured by the network a list/set/pool of TRP-specific ID/index values such as PCIs. The UE could also receive from the network one or more MAC CE activation commands/bitmaps to activate one or more TRP-specific ID/index values from the higher layer configured list/set/pool of TRP-specific ID/index values.

In one example (option-3.1.5), the 1-st to n_0-th (n_0≥1) transmission occasions in the TD-RA field could correspond to the TRP with the lowest/lowest MAC CE activated TRP-specific ID/index value such as the lowest PCI value and/or the first TRP (e.g., TRP #1), the (n_0+1)-th to n_1-th (n_1≥n_0) transmission occasions in the TD-RA field could correspond to the TRP with the second lowest/second lowest MAC CE activated TRP-specific ID/index value such as the second lowest PCI value and/or the second TRP (e.g., TRP #2), and so on, and the n_p-th to n_q-th (n_q≥n_p) transmission occasions in the TD-RA field could correspond to the TRP with the highest/highest MAC CE activated TRP-specific ID/index value such as the highest PCI value and/or the last TRP (e.g., TRP #N); for a total of two (MAC CE activated) TRPs in the multi-TRP system, the first N_0 (N_0≥1) or the first half of the transmission occasions could correspond to the TRP with the lowest, or the highest, (MAC CE activated) TRP-specific ID/index value, and the rest of or the second half of the transmission occasions could correspond to the TRP with the highest, or the lowest, (MAC CE activated) TRP-specific ID/index value; in another example (option-3.1.6), the i-th transmission occasion in the TD-RA field could correspond to the TRP with the (mod(i−1, N_trp)+1)-th lowest (or highest)/(mod(i−1, N_trp')+1)-th lowest (or highest) MAC CE activated TRP-specific ID/index value such as the lowest (or highest) PCI value and/or the (mod(i−1, N_trp)+1)-th TRP/(mod(i−1, N_trp')+1)-th MAC CE(s)/bitmap(s) activated TRP, where N_trp represents the total number of TRPs in the multi-TRP system, N_trp' represents the total number of MAC CE(s)/bitmap(s) activated TRPs in the multi-TRP system, i=1, . . . , K, where K represents the total number of transmission occasions indicated in the TD-RA field, and mod(x, y) calculates the remainder of the Euclidean division of x by y; for a total of two (MAC CE activated) TRPs in the multi-TRP system, the odd-numbered transmission occasions could correspond to the TRP with the lowest, or the highest, (MAC CE activated) TRP-specific ID/index value, and the even-numbered transmission occasions could correspond to the TRP with the highest, or the lowest, (MAC CE activated) TRP-specific ID/index value.

The total number of transmission occasions K indicated in the TD-RA field could be configured by the network (e.g., via higher layer RRC signaling and/or MAC CE command and/or dynamic DCI signaling) and/or fixed in the system specifications and/or reported by the UE based on UE's capability and/or equal to the total number of (MAC CE activated) TRPs in the multi-TRP system. For a (MAC CE activated) TRP in the multi-TRP system, the UE could be indicated by the network the starting/ending symbol/slot/mini-slot and/or the number of consecutive symbols/slots/mini-slots of the transmission occasion(s) associated with the (MAC CE activated) TRP. The UE could be indicated by the network, e.g., via higher layer RRC signaling and/or MAC CE command and/or dynamic DCI signaling, which option(s) (from/out of option-3.1.5 and option-3.1.6) to use/being used for indicating the mapping/association between the transmission occasion(s) in the TD-RA field and the (MAC CE activated) TRPs in the multi-TRP system; for instance, a one-bit flag indicator could be incorporated/included in the DCI to differentiate between option-3.1.5 and option-3.1.6. The UE could be indicated by the network one or more conditions, e.g., whether the total number of (MAC CE activated) TRPs in the multi-TRP system is larger than a threshold, to switch between option-3.1.5 and option-3.1.6.

Specifically, a transmission occasion could be defined/determined as follows.

For example, the 1-st transmission occasion indicated in the TD-RA field (e.g., corresponding to the TRP with the lowest/lowest MAC CE activated TRP-specific ID/index value) could be calculated/determined based on a first K0 value, a first S value and a first L value, the 2-nd transmission occasion indicated in the TD-RA field (e.g., corresponding to the TRP with the second lowest/second lowest MAC CE activated TRP-specific ID/index value) could be calculated/determined based on a second K0 value, a second S value, and a second L value, and so on, and the N-th transmission occasion indicated in the TD-RA field (e.g., corresponding to the TRP with the highest/highest MAC CE activated TRP-specific ID/index value) could be calculated/determined based on a N-th K0 value, a N-th S value, and a N-th L value. The first K0 value, the second K0 value, and so on, and the N-th K0 value could be different; the first S value, the second S value, and so on, and the N-th S value could be different; the first L value, the second L value, and so on, and the N-th L value could be different. The first K0 value, the second K0 value, and so on, and the N-th K0 value are indicated/included in the TD-RA field; the first S value, the second S value, and so on, and the N-th S value are indicated/included in the TD-RA field; the first L value, the second L value, and so on, and the N-th L value are indicated/included in the TD-RA field.

For another example, the 1-st transmission occasion indicated in the TD-RA field (e.g., corresponding to the TRP with the lowest/lowest MAC CE activated TRP-specific ID/index value) could be calculated/determined based on a first K0 value, a first S value and a first L value, the 2-nd transmission occasion indicated in the TD-RA field (e.g., corresponding to the TRP with the second lowest/second lowest MAC CE activated TRP-specific ID/index value) could be calculated/determined based on a second K0 value, a second S value having the same value as the first S value, and a second L value having the same value as the first L value, and so on, and the N-th transmission occasion indicated in the TD-RA field (e.g., corresponding to the TRP with the highest/highest MAC CE activated TRP-specific ID/index value) could be calculated/determined based on a N-th K0 value, a N-th S value having the same value as the first S value, and a N-th L value having the same value as the first L value. The first K0 value, the second K0 value, and so on, and the N-th K0 value could be different. The first K0 value, the second K0 value, and so on, and the N-th K0 value are indicated/included in the TD-RA field; the first S value and the first L value are indicated/included in the TD-RA field.

Yet for another example, the 1-st transmission occasion indicated in the TD-RA field (e.g., corresponding to the TRP with the lowest/lowest MAC CE activated TRP-specific ID/index value) could be calculated/determined based on a first K0 value, a first S value and a first L value, the 2-nd transmission occasion indicated in the TD-RA field (e.g., corresponding to the TRP with the second lowest/second lowest MAC CE activated TRP-specific ID/index value) could be calculated/determined based on a second K0 value having a difference/gap with respect to the first K0 value, a second S value, and a second L value, and so on, and the N-th transmission occasion indicated in the TD-RA field (e.g., corresponding to the TRP with the highest/highest MAC CE activated TRP-specific ID/index value) could be calculated/determined based on a N-th K0 value having a difference/gap with respect to the (N−1)-th K0 value, a N-th S value, and a N-th L value.

The difference/gap could be configured by the network and set to 1 slot. The first S value, the second S value, and so on, and the N-th S value could be different; the first L value, the second L value, and so on, and the N-th L value could be different. The first K0 value is indicated/included in the TD-RA field; the first S value, the second S value, and so on, and the N-th S value are indicated/included in the TD-RA field; the first L value, the second L value, and so on, and the N-th L value are indicated/included in the TD-RA field.

Yet for another example, the 1-st transmission occasion indicated in the TD-RA field (e.g., corresponding to the TRP with the lowest/lowest MAC CE activated TRP-specific ID/index value) could be calculated/determined based on a first K0 value, a first S value and a first L value, the 2-nd transmission occasion indicated in the TD-RA field (e.g., corresponding to the TRP with the second lowest/second lowest MAC CE activated TRP-specific ID/index value) could be calculated/determined based on a second K0 value having a difference/gap with respect to the first K0 value, a second S value having the same value as the first S value, and a second L value having the same value as the first L value, and so on, and the N-th transmission occasion indicated in the TD-RA field (e.g., corresponding to the TRP with the highest/highest MAC CE activated TRP-specific ID/index value) could be calculated/determined based on a N-th K0 value having a difference/gap with respect to the (N−1)-th K0 value, a N-th S value having the same value as the first S value, and a N-th L value having the same value as the first L value. The difference/gap could be configured by the network and set to 1 slot. The first K0 value, the first S value and the first L value are indicated/included in the TD-RA field.

Other implicit indication methods of the association/mapping between the time domain resources or the transmission occasions indicated in the TD-RA field and the TRPs in the multi-TRP system are also possible.

In yet another example, the UE could be explicitly indicated by the network the association/mapping between one or more transmission occasions in the TD-RA field and the CORESETPoolIndex values. For example, the UE could be first higher layer configured by the network a list/set/pool of CORESETPoolIndex values—e.g., a set of two CORESETPoolIndex values 0 and 1. In one example (option-3.1.7), the 1-st to n_0-th (n_0≥1) transmission occasions in the TD-RA field could correspond to the first entry/CORESETPoolIndex value in the list/set/pool of CORESETPoolIndex values, the (n_0+1)-th to n_1-th (n_1≥n_0) transmission occasions in the TD-RA field could correspond to the second entry/CORESETPoolIndex value in the list/set/pool of CORESETPoolIndex values, and so on, and the n_p-th to n_q-th (n_q≥n_p) transmission occasions in the TD-RA field could correspond to the last entry/CORESETPoolIndex value in the list/set/pool of CORESETPoolIndex values; for a total of two CORESETPoolIndex values (e.g., 0 and 1), the first N_0 (N_0≥1) or the first half of the transmission occasions could correspond to the first (or the second) entry/CORESETPoolIndex value in the list/set/pool of CORESETPoolIndex values (e.g., the CORESETPoolIndex value 0 or 1), and the rest of or the second half of the transmission occasions could correspond to the second (or the first) entry/CORESETPoolIndex value in the list/set/pool of CORESETPoolIndex values (e.g., the CORESETPoolIndex value 1 or 0); in another example (option-3.1.8), the i-th transmission occasion in the TD-RA field could correspond to the (mod(i−1, N_cs)+1)-th entry/CORESETPoolIndex value in the list/set/pool of CORESETPoolIndex values, where N_cs represents the total number of CORESETPoolIndex values, i=1, . . . , K, where K represents the total number of transmission occasions indicated in the FD-RA field, and mod(x, y) calculates the remainder of the Euclidean division of x by y; for a total of two CORESETPoolIndex values (e.g., 0 and 1), the odd-numbered transmission occasions could correspond to the first (or the second) entry/CORESETPoolIndex value in the list/set/pool of CORESETPoolIndex values (e.g., the CORESETPoolIndex value 0 or 1), and the even-numbered transmission occasions could correspond to the second (or the first) entry/CORESETPoolIndex value in the list/set/ pool of CORESETPoolIndex values (e.g., the CORESET-PoolIndex value 1 or 0).

The total number of transmission occasions K indicated in the TD-RA field could be configured by the network (e.g., via higher layer RRC signaling and/or MAC CE command and/or dynamic DCI signaling) and/or fixed in the system specifications and/or reported by the UE based on UE's capability and/or equal to the total number of CORESET-PoolIndex values. For a CORESETPoolIndex value, the UE could be indicated by the network the starting/ending symbol/slot/mini-slot and/or the number of consecutive symbols/slots/mini-slots of the transmission occasion(s) associated with the CORESETPoolIndex value.

The UE could be indicated by the network, e.g., via higher layer RRC signaling and/or MAC CE command and/or dynamic DCI signaling, which option(s) (from/out of option-3.1.7 and option-3.1.8) to use/being used for indicating the mapping/association between the transmission occasion(s) in the TD-RA field and the CORESETPoolIndex values; for instance, a one-bit flag indicator could be incorporated/included in the DCI to differentiate between option-3.1.7 and option-3.1.8. The UE could be indicated by the network one or more conditions, e.g., whether the total number of CORESETPoolIndex values is larger than a threshold, to switch between option-3.1.7 and option-3.1.8.

Specifically, a transmission occasion could be defined/determined as follows.

For example, the 1-st transmission occasion indicated in the TD-RA field (e.g., corresponding to the first entry/CORESETPoolIndex value in the list/set/pool of CORE-SETPoolIndex values) could be calculated/determined based on a first K0 value, a first S value and a first L value, the 2-nd transmission occasion indicated in the TD-RA field (e.g., corresponding to the second entry/CORESETPoolIndex value in the list/set/pool of CORESETPoolIndex values) could be calculated/determined based on a second K0 value, a second S value, and a second L value, and so on, and the N-th transmission occasion indicated in the TD-RA field (e.g., corresponding to the last entry/CORESETPoolIndex value in the list/set/pool of CORESETPoolIndex values) could be calculated/determined based on a N-th K0 value, a N-th S value, and a N-th L value. The first K0 value, the second K0 value, and so on, and the N-th K0 value could be different; the first S value, the second S value, and so on, and the N-th S value could be different; the first L value, the second L value, and so on, and the N-th L value could be different. The first K0 value, the second K0 value, and so on, and the N-th K0 value are indicated/included in the TD-RA field; the first S value, the second S value, and so on, and the N-th S value are indicated/included in the TD-RA field; the first L value, the second L value, and so on, and the N-th L value are indicated/included in the TD-RA field.

For another example, the 1-st transmission occasion indicated in the TD-RA field (e.g., corresponding to the first entry/CORESETPoolIndex value in the list/set/pool of CORESETPoolIndex values) could be calculated/determined based on a first K0 value, a first S value and a first L value, the 2-nd transmission occasion indicated in the TD-RA field (e.g., corresponding to the second entry/CORE-SETPoolIndex value in the list/set/pool of CORESET-PoolIndex values) could be calculated/determined based on a second K0 value, a second S value having the same value as the first S value, and a second L value having the same value as the first L value, and so on, and the N-th transmission occasion indicated in the TD-RA field (e.g., corresponding to the last entry/CORESETPoolIndex value in the list/set/pool of CORESETPoolIndex values) could be calculated/determined based on a N-th K0 value, a N-th S value having the same value as the first S value, and a N-th L value having the same value as the first L value. The first K0 value, the second K0 value, and so on, and the N-th K0 value could be different. The first K0 value, the second K0 value, and so on, and the N-th K0 value are indicated/included in the TD-RA field; the first S value and the first L value are indicated/included in the TD-RA field.

Yet for another example, the 1-st transmission occasion indicated in the TD-RA field (e.g., corresponding to the first entry/CORESETPoolIndex value in the list/set/pool of CORESETPoolIndex values) could be calculated/determined based on a first K0 value, a first S value and a first L value, the 2-nd transmission occasion indicated in the TD-RA field (e.g., corresponding to the second entry/CORE-SETPoolIndex value in the list/set/pool of CORESET-PoolIndex values) could be calculated/determined based on a second K0 value having a difference/gap with respect to the first K0 value, a second S value, and a second L value, and so on, and the N-th transmission occasion indicated in the TD-RA field (e.g., corresponding to the last entry/CORESETPoolIndex value in the list/set/pool of CORE-SETPoolIndex values) could be calculated/determined based on a N-th K0 value having a difference/gap with respect to the (N−1)-th K0 value, a N-th S value, and a N-th L value.

The difference/gap could be configured by the network and set to 1 slot. The first S value, the second S value, and so on, and the N-th S value could be different; the first L value, the second L value, and so on, and the N-th L value could be different. The first K0 value is indicated/included in the TD-RA field; the first S value, the second S value, and so on, and the N-th S value are indicated/included in the TD-RA field; the first L value, the second L value, and so on, and the N-th L value are indicated/included in the TD-RA field.

Yet for another example, the 1-st transmission occasion indicated in the TD-RA field (e.g., corresponding to the first entry/CORESETPoolIndex value in the list/set/pool of CORESETPoolIndex values) could be calculated/determined based on a first K0 value, a first S value and a first L value, the 2-nd transmission occasion indicated in the TD-RA field (e.g., corresponding to the second entry/CORE-SETPoolIndex value in the list/set/pool of CORESET-PoolIndex values) could be calculated/determined based on a second K0 value having a difference/gap with respect to the first K0 value, a second S value having the same value as the first S value, and a second L value having the same value as the first L value, and so on, and the N-th transmission occasion indicated in the TD-RA field (e.g., corresponding to the last entry/CORESETPoolIndex value in the list/set/pool of CORESETPoolIndex values) could be calculated/determined based on a N-th K0 value having a difference/gap with respect to the (N−1)-th K0 value, a N-th S value having the same value as the first S value, and a N-th L value having the same value as the first L value. The difference/gap could be configured by the network and set to 1 slot. The first K0 value, the first S value and the first L value are indicated/included in the TD-RA field.

For another example, the UE could be first higher layer configured by the network a list/set/pool of CORESET-PoolIndex values—e.g., a set of two CORESETPoolIndex values 0 and 1. The UE could then receive from the network one or more MAC CE activation commands/bitmaps to activate one or more CORESETPoolIndex values from the higher layer configured list/set/pool of CORESETPoolIndex values.

In one example (option-3.1.9), the 1-st to n_0-th (n_0≥1) transmission occasions in the TD-RA field could correspond to the first MAC CE(s)/bitmap(s) activated CORESET-PoolIndex value, the (n_0+1)-th to n_1-th (n_1≥n_0) transmission occasions in the TD-RA field could correspond to the second MAC CE(s)/bitmap(s) activated CORESET-PoolIndex value, and so on, and the n_p-th to n_q-th (n_q≥n_p) transmission occasions in the TD-RA field could correspond to the last MAC CE(s)/bitmap(s) activated CORESETPoolIndex value; for a total of two MAC CE(s)/bitmap(s) activated CORESETPoolIndex values (e.g., 0 and 1), the first N_0 (N_0≥1) or the first half of the transmission occasions could correspond to the first (or the second) MAC CE(s)/bitmap(s) activated CORESETPoolIndex value (e.g., the CORESETPoolIndex value 0 or 1), and the rest of or the second half of the transmission occasions could correspond to the second (or the first) MAC CE(s)/bitmap(s) activated CORESETPoolIndex value (e.g., the CORESETPoolIndex value 1 or 0); in another example (option-3.1.10), the i-th transmission occasion in the TD-RA field could correspond to the (mod(i−1, N_cs')+1)-th MAC CE(s)/bitmap(s) activated CORESETPoolIndex value, where N_cs' represents the total number of MAC CE(s)/bitmap(s) activated CORE-SETPoolIndex values, i=1, . . . , K, where K represents the total number of transmission occasions indicated in the TD-RA field, and mod(x, y) calculates the remainder of the Euclidean division of x by y; for a total of two MAC CE(s)/bitmap(s) activated CORESETPoolIndex values (e.g., 0 and 1), the odd-numbered transmission occasions could correspond to the first (or second) MAC CE(s)/bitmap(s) activated CORESETPoolIndex value (e.g., the CORESET-PoolIndex value 0 or 1), and the even-numbered transmission occasions could correspond to the second (or the first) MAC CE(s)/bitmap(s) activated CORESETPoolIndex value (e.g., the CORESETPoolIndex value 1 or 0).

The total number of transmission occasions K indicated in the TD-RA field could be configured by the network (e.g., via higher layer RRC signaling and/or MAC CE command and/or dynamic DCI signaling) and/or fixed in the system specifications and/or reported by the UE based on UE's capability and/or equal to the total number of MAC CE(s)/bitmap(s) activated CORESETPoolIndex values. For a MAC CE(s)/bitmap(s) activated CORESETPoolIndex value, the UE could be indicated by the network the starting/ending symbol/slot/mini-slot and/or the number of consecutive symbols/slots/mini-slots of the transmission occasion(s) associated with the MAC CE(s)/bitmap(s) activated CORE-SETPoolIndex value.

The UE could be indicated by the network, e.g., via higher layer RRC signaling and/or MAC CE command and/or dynamic DCI signaling, which option(s) (from/out of option-3.1.9 and option-3.1.10) to use/being used for indicating the mapping/association between the transmission occasion(s) in the TD-RA field and the MAC CE(s)/bitmap(s) activated CORESETPoolIndex values; for instance, a one-bit flag indicator could be incorporated/included in the DCI to differentiate between option-3.1.9 and option-3.1.10. The UE could be indicated by the network one or more conditions, e.g., whether the total number of MAC CE(s)/bitmap(s) activated CORESETPoolIndex values is larger than a threshold, to switch between option-3.1.9 and option-3.1.10.

Specifically, a transmission occasion could be defined/determined as follows.

For example, the 1-st transmission occasion indicated in the TD-RA field (e.g., corresponding to the first MAC CE(s)/bitmap(s) activated CORESETPoolIndex value) could be calculated/determined based on a first K0 value, a first S value and a first L value, the 2-nd transmission occasion indicated in the TD-RA field (e.g., corresponding to the second MAC CE(s)/bitmap(s) activated CORESET-PoolIndex value) could be calculated/determined based on a second K0 value, a second S value, and a second L value, and so on, and the N-th transmission occasion indicated in the TD-RA field (e.g., corresponding to the last MAC CE(s)/bitmap(s) activated CORESETPoolIndex value) could be calculated/determined based on a N-th K0 value, a N-th S value, and a N-th L value. The first K0 value, the second K0 value, and so on, and the N-th K0 value could be different; the first S value, the second S value, and so on, and the N-th S value could be different; the first L value, the second L value, and so on, and the N-th L value could be different. The first K0 value, the second K0 value, and so on, and the N-th K0 value are indicated/included in the TD-RA field; the first S value, the second S value, and so on, and the N-th S value are indicated/included in the TD-RA field; the first L value, the second L value, and so on, and the N-th L value are indicated/included in the TD-RA field.

For another example, the 1-st transmission occasion indicated in the TD-RA field (e.g., corresponding to the first MAC CE(s)/bitmap(s) activated CORESETPoolIndex value) could be calculated/determined based on a first K0 value, a first S value and a first L value, the 2-nd transmission occasion indicated in the TD-RA field (e.g., corresponding to the second MAC CE(s)/bitmap(s) activated CORE-SETPoolIndex value) could be calculated/determined based on a second K0 value, a second S value having the same value as the first S value, and a second L value having the same value as the first L value, and so on, and the N-th transmission occasion indicated in the TD-RA field (e.g., corresponding to the last MAC CE(s)/bitmap(s) activated CORESETPoolIndex value) could be calculated/determined based on a N-th K0 value, a N-th S value having the same value as the first S value, and a N-th L value having the same value as the first L value. The first K0 value, the second K0 value, and so on, and the N-th K0 value could be different. The first K0 value, the second K0 value, and so on, and the N-th K0 value are indicated/included in the TD-RA field; the first S value and the first L value are indicated/included in the TD-RA field.

Yet for another example, the 1-st transmission occasion indicated in the TD-RA field (e.g., corresponding to the first MAC CE(s)/bitmap(s) activated CORESETPoolIndex value) could be calculated/determined based on a first K0 value, a first S value and a first L value, the 2-nd transmission occasion indicated in the TD-RA field (e.g., corresponding to the second MAC CE(s)/bitmap(s) activated CORE-SETPoolIndex value) could be calculated/determined based on a second K0 value having a difference/gap with respect to the first K0 value, a second S value, and a second L value, and so on, and the N-th transmission occasion indicated in the TD-RA field (e.g., corresponding to the last MAC CE(s)/bitmap(s) activated CORESETPoolIndex value)

could be calculated/determined based on a N-th K0 value having a difference/gap with respect to the (N–1)-th K0 value, a N-th S value, and a N-th L value.

The difference/gap could be configured by the network and set to 1 slot. The first S value, the second S value, and so on, and the N-th S value could be different; the first L value, the second L value, and so on, and the N-th L value could be different. The first K0 value is indicated/included in the TD-RA field; the first S value, the second S value, and so on, and the N-th S value are indicated/included in the TD-RA field; the first L value, the second L value, and so on, and the N-th L value are indicated/included in the TD-RA field.

Yet for another example, the 1-st transmission occasion indicated in the TD-RA field (e.g., corresponding to the first MAC CE(s)/bitmap(s) activated CORESETPoolIndex value) could be calculated/determined based on a first K0 value, a first S value and a first L value, the 2-nd transmission occasion indicated in the TD-RA field (e.g., corresponding to the second MAC CE(s)/bitmap(s) activated CORESETPoolIndex value) could be calculated/determined based on a second K0 value having a difference/gap with respect to the first K0 value, a second S value having the same value as the first S value, and a second L value having the same value as the first L value, and so on, and the N-th transmission occasion indicated in the TD-RA field (e.g., corresponding to the last MAC CE(s)/bitmap(s) activated CORESETPoolIndex value) could be calculated/determined based on a N-th K0 value having a difference/gap with respect to the (N–1)-th K0 value, a N-th S value having the same value as the first S value, and a N-th L value having the same value as the first L value. The difference/gap could be configured by the network and set to 1 slot. The first K0 value, the first S value and the first L value are indicated/included in the TD-RA field.

Other exact association/mapping relationships between the time domain resources or the transmission occasions indicated in the TD-RA field and the CORESETPoolIndex values and/or the corresponding indication method(s), e.g., via higher layer RRC signaling and/or MAC CE command and/or dynamic DCI signaling, are also possible.

In yet another example, the UE could be implicitly indicated by the network the association/mapping between one or more transmission occasions in the TD-RA field and the CORESETPoolIndex values. The UE could be higher layer configured by the network a list/set/pool of CORESETPoolIndex values—e.g., a set of two CORESETPoolIndex values 0 and 1. The UE could also receive from the network one or more MAC CE activation commands/bitmaps to activate one or more CORESETPoolIndex values from the higher layer configured list/set/pool of CORESETPoolIndex values. In one example (option-3.1.11), the 1-st to n_0-th (n_0≥1) transmission occasions in the TD-RA field could correspond to the lowest/lowest MAC CE activated CORESETPoolIndex value, the (n_0+1)-th to n_1-th (n_1≥n_0) transmission occasions in the TD-RA field could correspond to the second lowest/second lowest MAC CE activated CORESETPoolIndex value, and so on, and the n_p-th to n_q-th (n_q≥n_p) transmission occasions in the TD-RA field could correspond to the highest/highest MAC CE activated CORESETPoolIndex value; for a total of two (MAC CE activated) CORESETPoolIndex values (e.g., 0 and 1), the first N_0 (N_0≥1) or the first half of the transmission occasions could correspond to the first, or the second, (MAC CE activated) CORESETPoolIndex value (e.g., the CORESETPoolIndex value 0 or 1), and the rest of or the second half of the transmission occasions could correspond to the second, or the first, (MAC CE activated) CORESETPoolIndex value (e.g., the CORESETPoolIndex value 1 or 0); in another example (option-3.1.12), the i-th transmission occasion in the TD-RA field could correspond to the (mod(i–1, N_cs)+1)-th lowest (or highest)/(mod(i–1, N_cs')+1)-th lowest (or highest) MAC CE activated CORESETPoolIndex value, where N_cs represents the total number of CORESETPoolIndex values, N_cs' represents the total number of MAC CE(s)/bitmap(s) activated CORESETPoolIndex values, i=1, . . . , K, where K represents the total number of transmission occasions indicated in the TD-RA field, and mod(x, y) calculates the remainder of the Euclidean division of x by y; for a total of two (MAC CE activated) CORESETPoolIndex values (e.g., 0 and 1), the odd-numbered transmission occasions could correspond to the first, or the second, (MAC CE activated) CORESETPoolIndex value (e.g., the CORESETPoolIndex value 0 or 1), and the even-numbered transmission occasions could correspond to the second, or the first, (MAC CE activated) CORESETPoolIndex value (e.g., the CORESETPoolIndex value 1 or 0).

The total number of transmission occasions K indicated in the TD-RA field could be configured by the network (e.g., via higher layer RRC signaling and/or MAC CE command and/or dynamic DCI signaling) and/or fixed in the system specifications and/or reported by the UE based on UE's capability and/or equal to the total number of (MAC CE activated) CORESETPoolIndex values. For a (MAC CE activated) CORESETPoolIndex value, the UE could be indicated by the network the starting/ending symbol/slot/mini-slot and/or the number of consecutive symbols/slots/mini-slots of the transmission occasion(s) associated with the (MAC CE activated) CORESETPoolIndex value. The UE could be indicated by the network, e.g., via higher layer RRC signaling and/or MAC CE command and/or dynamic DCI signaling, which option(s) (from/out of option-3.1.11 and option-3.1.12) to use/being used for indicating the mapping/association between the transmission occasion(s) in the TD-RA field and the MAC CEs(s)/bitmap(s) activated CORESETPoolIndex values; for instance, a one-bit flag indicator could be incorporated/included in the DCI to differentiate between option-3.1.11 and option-3.1.12. The UE could be indicated by the network one or more conditions, e.g., whether the total number of (MAC CE activated) CORESETPoolIndex values is larger than a threshold, to switch between option-3.1.11 and option-3.1.12.

Specifically, a transmission occasion could be defined/determined as follows.

For example, the 1-st transmission occasion indicated in the TD-RA field (e.g., corresponding to the lowest/lowest MAC CE activated CORESETPoolIndex value) could be calculated/determined based on a first K0 value, a first S value and a first L value, the 2-nd transmission occasion indicated in the TD-RA field (e.g., corresponding to the second lowest/second lowest MAC CE activated CORESETPoolIndex value) could be calculated/determined based on a second K0 value, a second S value, and a second L value, and so on, and the N-th transmission occasion indicated in the TD-RA field (e.g., corresponding to the highest/highest MAC CE activated CORESETPoolIndex value) could be calculated/determined based on a N-th K0 value, a N-th S value, and a N-th L value.

The first K0 value, the second K0 value, and so on, and the N-th K0 value could be different; the first S value, the second S value, and so on, and the N-th S value could be different; the first L value, the second L value, and so on, and the N-th L value could be different. The first K0 value, the second K0 value, and so on, and the N-th K0 value are indicated/included in the TD-RA field; the first S value, the second S value, and so on, and the N-th S value are indicated/included in the TD-RA field; the first L value, the second L value, and so on, and the N-th L value are indicated/included in the TD-RA field.

For another example, the 1-st transmission occasion indicated in the TD-RA field (e.g., corresponding to the lowest/lowest MAC CE activated CORESETPoolIndex value) could be calculated/determined based on a first K0 value, a first S value and a first L value, the 2-nd transmission occasion indicated in the TD-RA field (e.g., corresponding to the second lowest/second lowest MAC CE activated CORESETPoolIndex value) could be calculated/determined based on a second K0 value, a second S value having the same value as the first S value, and a second L value having the same value as the first L value, and so on, and the N-th transmission occasion indicated in the TD-RA field (e.g., corresponding to the highest/highest MAC CE activated CORESETPoolIndex value) could be calculated/determined based on a N-th K0 value, a N-th S value having the same value as the first S value, and a N-th L value having the same value as the first L value. The first K0 value, the second K0 value, and so on, and the N-th K0 value could be different. The first K0 value, the second K0 value, and so on, and the N-th K0 value are indicated/included in the TD-RA field; the first S value and the first L value are indicated/included in the TD-RA field.

Yet for another example, the 1-st transmission occasion indicated in the TD-RA field (e.g., corresponding to the lowest/lowest MAC CE activated CORESETPoolIndex value) could be calculated/determined based on a first K0 value, a first S value and a first L value, the 2-nd transmission occasion indicated in the TD-RA field (e.g., corresponding to the second lowest/second lowest MAC CE activated CORESETPoolIndex value) could be calculated/determined based on a second K0 value having a difference/gap with respect to the first K0 value, a second S value, and a second L value, and so on, and the N-th transmission occasion indicated in the TD-RA field (e.g., corresponding to the highest/highest MAC CE activated CORESETPoolIndex value) could be calculated/determined based on a N-th K0 value having a difference/gap with respect to the (N−1)-th K0 value, a N-th S value, and a N-th L value.

The difference/gap could be configured by the network and set to 1 slot. The first S value, the second S value, and so on, and the N-th S value could be different; the first L value, the second L value, and so on, and the N-th L value could be different. The first K0 value is indicated/included in the TD-RA field; the first S value, the second S value, and so on, and the N-th S value are indicated/included in the TD-RA field; the first L value, the second L value, and so on, and the N-th L value are indicated/included in the TD-RA field.

Yet for another example, the 1-st transmission occasion indicated in the TD-RA field (e.g., corresponding to the lowest/lowest MAC CE activated CORESETPoolIndex value) could be calculated/determined based on a first K0 value, a first S value and a first L value, the 2-nd transmission occasion indicated in the TD-RA field (e.g., corresponding to the second lowest/second lowest MAC CE activated CORESETPoolIndex value) could be calculated/determined based on a second K0 value having a difference/gap with respect to the first K0 value, a second S value having the same value as the first S value, and a second L value having the same value as the first L value, and so on, and the N-th transmission occasion indicated in the TD-RA field (e.g., corresponding to the highest/highest MAC CE activated CORESETPoolIndex value) could be calculated/determined based on a N-th K0 value having a difference/gap with respect to the (N−1)-th K0 value, a N-th S value having the same value as the first S value, and a N-th L value having the same value as the first L value. The difference/gap could be configured by the network and set to 1 slot. The first K0 value, the first S value and the first L value are indicated/included in the TD-RA field.

Other implicit indication methods of the association/mapping between the time domain resources or the transmission occasions indicated in the TD-RA field and the CORESETPoolIndex values are also possible.

For another example, the UE could be indicated by the network a single DCI comprising of N>1 TD-RA fields to indicate the time domain resource allocation; each TD-RA field could indicate one or more transmission occasions and correspond to/be associated with a TRP in the multi-TRP system.

In one example, the UE could be explicitly indicated by the network, e.g., via higher layer RRC signaling and/or MAC CE command and/or dynamic DCI signaling, the exact association/mapping between the N>1 TD-RA fields (each indicating one or more transmission occasions) indicated in the DCI and the TRPs in the multi-TRP system.

For example, the UE could be first higher layer configured by the network a list/set/pool of TRP-specific ID/index values such as PCIs. The first TD-RA field (indicating one or more transmission occasions) indicated in the DCI could correspond to the first entry/TRP in the list/set/pool of TRP-specific ID/index values, the second TD-RA field (indicating one or more transmission occasions) indicated in the DCI could correspond to the second entry/TRP in the list/set/pool of TRP-specific ID/index values, and so on, and the last TD-RA field (indicating one or more transmission occasions) indicated in the DCI could correspond to the last entry/TRP in the list/set/pool of TRP-specific ID/index values.

For another example, the UE could be first higher layer configured by the network a list/set/pool of TRP-specific ID/index values such as PCIs. The UE could then receive from the network one or more MAC CE activation commands/bitmaps to activate one or more TRP-specific ID/index values from the higher layer configured list/set/pool of TRP-specific ID/index values. The first TD-RA field (indicating one or more transmission occasions) indicated in the DCI could correspond to the first MAC CE(s)/bitmap(s) activated TRP-specific ID/index value, the second TD-RA field (indicating one or more transmission occasions) indicated in the DCI could correspond to the second MAC CE(s)/bitmap(s) activated TRP-specific ID/index value, and so on, and the last TD-RA field (indicating one or more transmission occasions) indicated in the DCI could correspond to the last MAC CE(s)/bitmap(s) activated TRP-specific ID/index value. Other exact association/mapping relationships between the N>1 TD-RA fields (each indicating one or more transmission occasions) indicated in the DCI and the TRPs in the multi-TRP system and/or the corresponding indication method(s), e.g., via higher layer RRC signaling and/or MAC CE command and/or dynamic DCI signaling, are also possible.

In another example, the UE could be implicitly indicated by the network the association/mapping between the N>1 TD-RA fields (each indicating one or more transmission occasions) indicated in the DCI and the TRPs in the multi- TRP system. The UE could be higher layer configured by the network a list/set/pool of TRP-specific ID/index values such as PCIs.

The UE could also receive from the network one or more MAC CE activation commands/bitmaps to activate one or more TRP-specific ID/index values from the higher layer configured list/set/pool of TRP-specific ID/index values. For example, the first TD-RA field (indicating one or more transmission occasions) indicated in the DCI could correspond to the TRP with the lowest/lowest MAC CE activated TRP-specific ID/index value such as the lowest PCI value and/or the first TRP (e.g., TRP #1), the second TD-RA field (indicating one or more transmission occasions) indicated in the DCI could correspond to the TRP with the second lowest/second lowest MAC CE activated TRP-specific ID/index value such as the second lowest PCI value and/or the second TRP (e.g., TRP #2), and so on, and the last TD-RA field (indicating one or more transmission occasions) indicated in the DCI could correspond to the TRP with the highest/highest MAC CE activated TRP-specific ID/index value such as the highest PCI value and/or the last TRP (e.g., TRP #N).

For another example, the first TD-RA field (indicating one or more transmission occasions) indicated in the DCI could correspond to the TRP with the highest/highest MAC CE activated TRP-specific ID/index value such as the highest PCI value and/or the last TRP (e.g., TRP #N), the second TD-RA field (indicating one or more transmission occasions) indicated in the DCI could correspond to the TRP with the second highest/second highest MAC CE activated TRP-specific ID/index value such as the second highest PCI value and/or the second last TRP (e.g., TRP #N−1), and so on, and the last TD-RA field (indicating one or more transmission occasions) indicated in the DCI could correspond to the TRP with the lowest/lowest MAC CE activated TRP-specific ID/index value such as the lowest PCI value and/or the first TRP (e.g., TRP #1). Other implicit indication methods of the association/mapping between the N>1 TD-RA fields (each indicating one or more transmission occasions) indicated in the DCI and the TRPs in the multi-TRP system are also possible.

In yet another example, the UE could be explicitly indicated by the network, e.g., via higher layer RRC signaling and/or MAC CE command and/or dynamic DCI signaling, the exact association/mapping between the N>1 TD-RA fields (each indicating one or more transmission occasions) indicated in the DCI and the CORESETPoolIndex values.

For example, the UE could be first higher layer configured by the network a list/set/pool of CORESETPoolIndex values—e.g., a set of two CORESETPoolIndex values 0 and 1. The first TD-RA field (indicating one or more transmission occasions) indicated in the DCI could correspond to the first entry/CORESETPoolIndex value in the list/set/pool of CORESETPoolIndex values, the second TD-RA field (indicating one or more transmission occasions) indicated in the DCI could correspond to the second entry/CORESET-PoolIndex value in the list/set/pool of CORESETPoolIndex values, and so on, and the last TD-RA field (indicating one or more transmission occasions) indicated in the DCI could correspond to the last entry/CORESETPoolIndex value in the list/set/pool of CORESETPoolIndex values.

For another example, the UE could be first higher layer configured by the network a list/set/pool of CORESET-PoolIndex values—e.g., a set of two CORESETPoolIndex values 0 and 1. The UE could then receive from the network one or more MAC CE activation commands/bitmaps to activate one or more CORESETPoolIndex values from the higher layer configured list/set/pool of CORESETPoolIndex values. The first TD-RA field (indicating one or more transmission occasions) indicated in the DCI could correspond to the first MAC CE(s)/bitmap(s) activated CORE-SETPoolIndex value, the second TD-RA field (indicating one or more transmission occasions) indicated in the DCI could correspond to the second MAC CE(s)/bitmap(s) activated CORESETPoolIndex value, and so on, and the last TD-RA field (indicating one or more transmission occasions) indicated in the DCI could correspond to the last MAC CE(s)/bitmap(s) activated CORESETPoolIndex value. Other exact association/mapping relationships between the N>1 TD-RA fields (each indicating one or more transmission occasions) indicated in the DCI and the CORE-SETPoolIndex values and/or the corresponding indication method(s), e.g., via higher layer RRC signaling and/or MAC CE command and/or dynamic DCI signaling, are also possible.

In yet another example, the UE could be implicitly indicated by the network the association/mapping between the N>1 TD-RA fields (each indicating one or more transmission occasions) indicated in the DCI and the CORESET-PoolIndex values. The UE could be higher layer configured by the network a list/set/pool of CORESETPoolIndex values—e.g., a set of two CORESETPoolIndex values 0 and 1. The UE could also receive from the network one or more MAC CE activation commands/bitmaps to activate one or more CORESETPoolIndex values from the higher layer configured list/set/pool of CORESETPoolIndex values.

For example, the first TD-RA field (indicating one or more transmission occasions) indicated in the DCI could correspond to the lowest/lowest MAC CE activated CORE-SETPoolIndex value such as "0," the second TD-RA field (indicating one or more transmission occasions) indicated in the DCI could correspond to the second lowest/second lowest MAC CE activated CORESETPoolIndex value such as "1," and so on, and the last TD-RA field (indicating one or more transmission occasions) indicated in the DCI could correspond to the highest/highest MAC CE activated CORESETPoolIndex value such as "N−1."

For another example, the first TD-RA field (indicating one or more transmission occasions) indicated in the DCI could correspond to the highest/highest MAC CE activated CORESETPoolIndex value such as "N−1," the second TD-RA field (indicating one or more transmission occasions) indicated in the DCI could correspond to the second highest/second highest MAC CE activated CORESETPoolIndex value such as "N−2," and so on, and the last TD-RA field (indicating one or more transmission occasions) indicated in the DCI could correspond to the lowest/lowest MAC CE activated CORESETPoolIndex value such as "0." Other implicit indication methods of the association/mapping between the N>1 TD-RA fields (each indicating one or more transmission occasions) indicated in the DCI and the CORE-SETPoolIndex values are also possible.

In yet another example, a TD-RA field indicated in the DCI could include/comprise/incorporate at least one ID/index value. For example, this ID/index value could be a (absolute) TRP-specific ID/index value such as PCI value, TRP ID value, TRP index value and etc., based on a list/set/pool of TRP-specific ID/index values, e.g., higher layer configured to the UE and/or higher layer configured to the UE and activated by one or more MAC CE activation commands/bitmaps. For another example, this ID/index value could be an (relative) index within the list/set/pool of TRP-specific ID/index values, e.g., higher layer configured to the UE and/or higher layer configured to the UE and activated by one or more MAC CE activation commands/ bitmaps. For yet another example, this ID/index value could be a CORESETPoolIndex value.

Yet for another example, the UE could be indicated by the network N>1 DCIs with each DCI comprising of at least one TD-RA field to indicate the time domain resource allocation (e.g., one or more transmission occasions); each DCI, and therefore, the TD-RA field(s) indicated therein, could correspond to/be associated with a TRP in the multi-TRP system.

In one example, the UE could be explicitly indicated by the network, e.g., via higher layer RRC signaling and/or MAC CE command and/or dynamic DCI signaling, the exact association/mapping between the N>1 DCIs indicating the TD-RA fields (each indicating one or more transmission occasions) and the TRPs in the multi-TRP system. For example, the UE could be first higher layer configured by the network a list/set/pool of TRP-specific ID/index values such as PCIs. The DCI (indicating at least one TD-RA field indicating one or more transmission occasions) associated with the lowest CORESETPoolIndex value (indicated in the corresponding higher layer parameter ControlResourceSet) could correspond to the first entry/TRP in the list/set/pool of TRP-specific ID/index values, the DCI (indicating at least one TD-RA field indicating one or more transmission occasions) associated with the second lowest CORESETPoolIndex value (indicated in the corresponding higher layer parameter ControlResourceSet) could correspond to the second entry/TRP in the list/set/pool of TRP-specific ID/index values, and so on, and the DCI (indicating at least one TD-RA field indicating one or more transmission occasions) associated with the highest CORESETPoolIndex value (indicated in the corresponding higher layer parameter ControlResourceSet) could correspond to the last entry/TRP in the list/set/pool of TRP-specific ID/index values.

For another example, the UE could be first higher layer configured by the network a list/set/pool of TRP-specific ID/index values such as PCIs. The UE could then receive from the network one or more MAC CE activation commands/bitmaps to activate one or more TRP-specific ID/index values from the higher layer configured list/set/pool of TRP-specific ID/index values. The DCI (indicating at least one TD-RA field indicating one or more transmission occasions) associated with the lowest CORESETPoolIndex value (indicated in the corresponding higher layer parameter ControlResourceSet) could correspond to the first MAC CE(s)/bitmap(s) activated TRP-specific ID/index value, the DCI (indicating at least one TD-RA field indicating one or more transmission occasions) associated with the second lowest CORESETPoolIndex value (indicated in the corresponding higher layer parameter ControlResourceSet) could correspond to the second MAC CE(s)/bitmap(s) activated TRP-specific ID/index value, and so on, and the DCI (indicating at least one TD-RA field indicating one or more transmission occasions) associated with the highest CORESETPoolIndex value (indicated in the corresponding higher layer parameter ControlResourceSet) could correspond to the last MAC CE(s)/bitmap(s) activated TRP-specific ID/index value.

Other exact association/mapping relationships between the N>1 DCIs indicating the TD-RA fields (each indicating one or more transmission occasions) and the TRPs in the multi-TRP system and/or the corresponding indication method(s), e.g., via higher layer RRC signaling and/or MAC CE command and/or dynamic DCI signaling, are also possible.

In another example, the UE could be implicitly indicated by the network the association/mapping between the N>1 DCIs indicating the TD-RA fields (each indicating one or more transmission occasions) and the TRPs in the multi-TRP system. The UE could be higher layer configured by the network a list/set/pool of TRP-specific ID/index values such as PCIs.

The UE could also receive from the network one or more MAC CE activation commands/bitmaps to activate one or more TRP-specific ID/index values from the higher layer configured list/set/pool of TRP-specific ID/index values. For example, the DCI (indicating at least one TD-RA field indicating one or more transmission occasions) associated with the lowest CORESETPoolIndex value (indicated in the corresponding higher layer parameter ControlResourceSet) could correspond to the TRP with the lowest/lowest MAC CE activated TRP-specific ID/index value such as the lowest PCI value and/or the first TRP (e.g., TRP #1), the DCI (indicating at least one TD-RA field indicating one or more transmission occasions) associated with the second lowest CORESETPoolIndex value (indicated in the corresponding higher layer parameter ControlResourceSet) could correspond to the TRP with the second lowest/second lowest MAC CE activated TRP-specific ID/index value such as the second lowest PCI value and/or the second TRP (e.g., TRP #2), and so on, and the DCI (indicating at least one TD-RA field indicating one or more transmission occasions) associated with the highest CORESETPoolIndex value (indicated in the corresponding higher layer parameter ControlResourceSet) could correspond to the TRP with the highest/highest MAC CE activated TRP-specific ID/index value such as the highest PCI value and/or the last TRP (e.g., TRP #N).

For another example, the DCI (indicating at least one TD-RA field indicating one or more transmission occasions) associated with the lowest CORESETPoolIndex value (indicated in the corresponding higher layer parameter ControlResourceSet) could correspond to the TRP with the highest/highest MAC CE activated TRP-specific ID/index value such as the highest PCI value and/or the last TRP (e.g., TRP #N), the DCI (indicating at least one TD-RA field indicating one or more transmission occasions) associated with the second lowest CORESETPoolIndex value (indicated in the corresponding higher layer parameter ControlResourceSet) could correspond to the TRP with the second highest/second highest MAC CE activated TRP-specific ID/index value such as the second highest PCI value and/or the second last TRP (e.g., TRP #N−1), and so on, and the DCI (indicating at least one TD-RA field indicating one or more transmission occasions) associated with the highest CORESETPoolIndex value (indicated in the corresponding higher layer parameter ControlResourceSet) could correspond to the TRP with the lowest/lowest MAC CE activated TRP-specific ID/index value such as the lowest PCI value and/or the first TRP (e.g., TRP #1).

Other implicit indication methods of the association/ mapping between the N>1 DCIs indicating the TD-RA fields (each indicating one or more transmission occasions) and the TRPs in the multi-TRP system are also possible.

In yet another example, a DCI indicating at least one TD-RA field could include/comprise/incorporate at least one ID/index value. For example, this ID/index value could be a (absolute) TRP-specific ID/index value such as PCI value, TRP ID value, TRP index value and etc., based on a list/set/pool of TRP-specific ID/index values, e.g., higher layer configured to the UE and/or higher layer configured to the UE and activated by one or more MAC CE activation commands/bitmaps. For another example, this ID/index value could be an (relative) index within the list/set/pool of TRP-specific ID/index values, e.g., higher layer configured to the UE and/or higher layer configured to the UE and activated by one or more MAC CE activation commands/ bitmaps. For yet another example, this ID/index value could be a CORESETPoolIndex value.

An example of MAC CE based TCI state/beam indication for the multi-TRP operation with PDSCH(s) repetition is presented in FIG. 10. As illustrated in FIG. 10, the UE could be first higher layer configured by the network, e.g., via the higher layer RRC signaling, a list/pool of N_tci TCI states. Each TCI state contains at least a QCL source RS with a QCL type, e.g., QCL-typeA/B/C/D. The UE could then receive from the network one or more MAC CE commands to indicate one or more beam(s) (i.e., the TCI state(s)) for the transmission/reception of the same PDSCH(s) transmitted from/associated with one or more TRPs in a multi-TRP system on different/non-overlapping time domain resources, e.g., different transmission occasions including different slots/mini-slots/symbols/etc. For instance, the UE could receive from the network a single MAC CE command for beam indication to indicate N>1 TCI states/beams for the same PDSCH(s) transmitted from/associated with different TRPs in the multi-TRP system on different/non-overlapping time domain resources such as different slots/mini-slots/ symbols/etc.—also referred to as different transmission occasions. As depicted in FIG. 9 and FIG. 10, the UE could receive from the network a single MAC CE command for beam indication to indicate N=2 TCI states/beams (TCI #3 and TCI #5) for the same PDSCH-a transmitted from/ associated with two TRPs, i.e., TRP-1 and TRP-2, in the multi-TRP system, respectively, on different/non-overlapping time domain resources/transmission occasions.

The MAC CE for beam indication could include at least a TCI state ID. As discussed above, the TCI state corresponding to the TCI state ID could be at least one of: (1) a DL TCI state; (2) an UL TCI state; (3) a joint DL and UL TCI state; and/or (4) separate DL TCI state and UL TCI state.

The association/mapping between the TCI state(s)/ beam(s) indicated in the MAC CE command(s) and the TRPs in the multi-TRP system could follow those discussed/ specified in example-1.1.1, example-1.1.2, example-1.1.3, example-1.1.4, example-1.1.5, example-1.1.a, example-1.1.b, example-1.1.c, example-1.1.d, and example-1.1.e. There could be various means to associate/map between the TCI state(s)/beam(s) indicated in the MAC CE command(s) and the time domain resources/transmission occasions indicated in the TD-RA field(s).

For N>1 TCI states/beams indication in a single MAC CE command for beam indication, for a single DCI indicating a single TD-RA field, wherein the time domain resources/ transmission occasions indicated in the TD-RA field are associated with different TRPs in the multi-TRP system, in one example, the UE could be explicitly indicated by the network the association/mapping between the TCI states/ beams indicated in the MAC CE command for beam indication and the time domain resources/transmission occasions indicated in the TD-RA field.

For example (option-3.2.1), the first TCI state and/or the TCI state with the lowest TCI state ID value indicated in the MAC CE command for beam indication could correspond to the 1-st to n_0-th (n_0≥1) transmission occasions in the TD-RA field, the second TCI state and/or the TCI state with the second lowest TCI state ID value indicated in the MAC CE command for beam indication could correspond to the (n_0+1)-th to n_1-th (n_1≥n_0) transmission occasions in the TD-RA field, and so on, and the last TCI state and/or the TCI state with the highest TCI state ID value indicated in the MAC CE command for beam indication could correspond to the n_p-th to n_q-th (n_q≥n_p) transmission occasions in the TD-RA field; for a total of two TCI states/beams indicated in the MAC CE for beam indication, the first N_0 (N_0≥1) or the first half of the transmission occasions could correspond to the first (or the second) TCI state and/or the TCI state with the lowest (or the highest) TCI state ID value indicated in the MAC CE command for beam indication, and the rest of or the second half of the transmission occasions could correspond to the second (or the first) TCI state and/or the TCI state with the highest (or the lowest) TCI state ID value indicated in the MAC CE command for beam indication.

For another example (option-3.2.2), the (mod(i–1, N_tci)+1)-th TCI state and/or the TCI state with the (mod (i–1, N_tci)+1)-th lowest/highest TCI state ID value indicated in the MAC CE command for beam indication could correspond to the i-th transmission occasion in the TD-RA field, where N_tci represents the total number of TCI state(s)/beam(s) indicated in the MAC CE command for beam indication, i=1, . . . , K, where K represents the total number of transmission occasions indicated in the TD-RA field, and mod(x, y) calculates the remainder of the Euclidean division of x by y; for a total of two TCI states/beams indicated in the MAC CE for beam indication, the odd-numbered transmission occasions could correspond to the first (or the second) TCI state and/or the TCI state with the lowest (or the highest) TCI state ID value indicated in the MAC CE command for beam indication, and the even-numbered transmission occasions could correspond to the second (or the first) TCI state and/or the TCI state with the highest (or the lowest) TCI state ID value indicated in the MAC CE command for beam indication.

The total number of transmission occasions K indicated in the TD-RA field could be configured by the network (e.g., via higher layer RRC signaling and/or MAC CE command and/or dynamic DCI signaling) and/or fixed in the system specifications and/or reported by the UE based on UE's capability and/or equal to the total number of TCI states/ beams indicated in the MAC CE command for beam indication. For a TCI state/beam indicated in the MAC CE command for beam indication, the UE could be indicated by the network the starting/ending symbol/slot/mini-slot and/or the number of consecutive symbols/slots/mini-slots of the transmission occasion(s) associated with the TCI state/beam indicated in the MAC CE command for beam indication.

The UE could be indicated by the network, e.g., via higher layer RRC signaling and/or MAC CE command and/or dynamic DCI signaling, which option(s) (from/out of option-3.2.1 and option-3.2.2) to use/being used for indicating the mapping/association between the transmission occasion(s) in the TD-RA field and the TCI states/beams indicated in the MAC CE command for beam indication; for instance, a one-bit flag indicator could be incorporated/ included in the DCI to differentiate between option-3.2.1 and option-3.2.2. The UE could be indicated by the network one or more conditions, e.g., whether the total number of TCI states/beams indicated in the MAC CE command for beam indication is larger than a threshold, to switch between option-3.2.1 and option-3.2.2.

Specifically, a transmission occasion could be defined/ determined as follows.

For example, the 1-st transmission occasion indicated in the TD-RA field (e.g., corresponding to the first TCI state and/or the TCI state with the lowest TCI state ID value indicated in the MAC CE command for beam indication) could be calculated/determined based on a first K0 value, a first S value and a first L value, the 2-nd transmission occasion indicated in the TD-RA field (e.g., corresponding to the second TCI state and/or the TCI state with the second lowest TCI state ID value indicated in the MAC CE command for beam indication) could be calculated/determined based on a second K0 value, a second S value, and a second L value, and so on, and the N-th transmission occasion indicated in the TD-RA field (e.g., corresponding to the last TCI state and/or the TCI state with the highest TCI state ID value indicated in the MAC CE command for beam indication) could be calculated/determined based on a N-th K0 value, a N-th S value, and a N-th L value. The first K0 value, the second K0 value, and so on, and the N-th K0 value could be different; the first S value, the second S value, and so on, and the N-th S value could be different; the first L value, the second L value, and so on, and the N-th L value could be different. The first K0 value, the second K0 value, and so on, and the N-th K0 value are indicated/included in the TD-RA field; the first S value, the second S value, and so on, and the N-th S value are indicated/included in the TD-RA field; the first L value, the second L value, and so on, and the N-th L value are indicated/included in the TD-RA field.

For another example, the 1-st transmission occasion indicated in the TD-RA field (e.g., corresponding to the first TCI state and/or the TCI state with the lowest TCI state ID value indicated in the MAC CE command for beam indication) could be calculated/determined based on a first K0 value, a first S value and a first L value, the 2-nd transmission occasion indicated in the TD-RA field (e.g., corresponding to the second TCI state and/or the TCI state with the second lowest TCI state ID value indicated in the MAC CE command for beam indication) could be calculated/determined based on a second K0 value, a second S value having the same value as the first S value, and a second L value having the same value as the first L value, and so on, and the N-th transmission occasion indicated in the TD-RA field (e.g., corresponding to the last TCI state and/or the TCI state with the highest TCI state ID value indicated in the MAC CE command for beam indication) could be calculated/determined based on a N-th K0 value, a N-th S value having the same value as the first S value, and a N-th L value having the same value as the first L value. The first K0 value, the second K0 value, and so on, and the N-th K0 value could be different. The first K0 value, the second K0 value, and so on, and the N-th K0 value are indicated/included in the TD-RA field; the first S value and the first L value are indicated/included in the TD-RA field.

Yet for another example, the 1-st transmission occasion indicated in the TD-RA field (e.g., corresponding to the first TCI state and/or the TCI state with the lowest TCI state ID value indicated in the MAC CE command for beam indication) could be calculated/determined based on a first K0 value, a first S value and a first L value, the 2-nd transmission occasion indicated in the TD-RA field (e.g., corresponding to the second TCI state and/or the TCI state with the second lowest TCI state ID value indicated in the MAC CE command for beam indication) could be calculated/determined based on a second K0 value having a difference/gap with respect to the first K0 value, a second S value, and a second L value, and so on, and the N-th transmission occasion indicated in the TD-RA field (e.g., corresponding to the last TCI state and/or the TCI state with the highest TCI state ID value indicated in the MAC CE command for beam indication) could be calculated/determined based on a N-th K0 value having a difference/gap with respect to the (N−1)-th K0 value, a N-th S value, and a N-th L value.

The difference/gap could be configured by the network and set to 1 slot. The first S value, the second S value, and so on, and the N-th S value could be different; the first L value, the second L value, and so on, and the N-th L value could be different. The first K0 value is indicated/included in the TD-RA field; the first S value, the second S value, and so on, and the N-th S value are indicated/included in the TD-RA field; the first L value, the second L value, and so on, and the N-th L value are indicated/included in the TD-RA field.

Yet for another example, the 1-st transmission occasion indicated in the TD-RA field (e.g., corresponding to the first TCI state and/or the TCI state with the lowest TCI state ID value indicated in the MAC CE command for beam indication) could be calculated/determined based on a first K0 value, a first S value and a first L value, the 2-nd transmission occasion indicated in the TD-RA field (e.g., corresponding to the second TCI state and/or the TCI state with the second lowest TCI state ID value indicated in the MAC CE command for beam indication) could be calculated/determined based on a second K0 value having a difference/gap with respect to the first K0 value, a second S value having the same value as the first S value, and a second L value having the same value as the first L value, and so on, and the N-th transmission occasion indicated in the TD-RA field (e.g., corresponding to the last TCI state and/or the TCI state with the highest TCI state ID value indicated in the MAC CE command for beam indication) could be calculated/determined based on a N-th K0 value having a difference/gap with respect to the (N−1)-th K0 value, a N-th S value having the same value as the first S value, and a N-th L value having the same value as the first L value. The difference/gap could be configured by the network and set to 1 slot. The first K0 value, the first S value and the first L value are indicated/included in the TD-RA field.

Other exact association/mapping relationships between the time domain resources/transmission occasions indicated in the TD-RA field and the TCI state(s)/beam(s) indicated in the MAC CE command for beam indication and/or the corresponding indication method(s), e.g., via higher layer RRC signaling and/or MAC CE command and/or dynamic DCI signaling, are also possible.

In another example, the UE could be implicitly indicated by the network the association/mapping between the TCI states/beams indicated in the MAC CE command for beam indication and the time domain resources/transmission occasions indicated in the TD-RA field. For instance, a TCI state/beam indicated in the MAC CE command for beam indication could be associated with/mapped to one or more transmission occasions indicated in the TD-RA field if the TCI state/beam indicated in the MAC CE command for beam indication and the corresponding transmission occasion(s) indicated in the TD-RA field are associated with the same TRP-specific ID value such as PCI value and/or the same CORESETPoolIndex value. Other implicit indication methods of the association/mapping between the TCI state(s)/beam(s) indicated in the MAC CE command for beam indication and the time domain resources/transmission occasions indicated in the TD-RA field are also possible.

For N>1 TCI states/beams indication in a single MAC CE command for beam indication, for a single DCI indicating N>1 TD-RA fields, wherein each TD-RA field, and therefore, the transmission occasions indicated therein, is associated with a different TRP in the multi-TRP system, in one example, the UE could be explicitly indicated by the network, e.g., via higher layer RRC signaling and/or MAC CE command and/or dynamic DCI signaling, the exact association/mapping between the N>1 TCI states/beams indicated in the MAC CE command for beam indication and the N>1 TD-RA fields (each indicating one or more transmission occasions) indicated in the DCI.

For example, the first TCI state and/or the TCI state with the lowest TCI state ID value indicated in the MAC CE command for beam indication could correspond to the first TD-RA field (indicating one or more transmission occasions) indicated in the DCI, the second TCI state and/or the TCI state with the second lowest TCI state ID value indicated in the MAC CE command for beam indication could correspond to the second TD-RA field (indicating one or more transmission occasions) indicated in the DCI, and so on, and the last TCI state and/or the TCI state with the highest TCI state ID value indicated in the MAC CE command for beam indication could correspond to the last TD-RA field (indicating one or more transmission occasions) indicated in the DCI. Other exact association/mapping relationships between the TCI states/beams indicated in the MAC CE command for beam indication and the TD-RA fields (each indicating one or more transmission occasions) indicated in the DCI and/or the corresponding indication method(s), e.g., via higher layer RRC signaling and/or MAC CE command and/or dynamic DCI signaling, are also possible.

In another example, a TCI state, e.g., the higher layer parameter TCI-State, indicated in the MAC CE command for beam indication could include/comprise/incorporate at least one (absolute) TD-RA field ID/index value indicated in the DCI and/or at least one (relative) TD-RA field index within the N>1 TD-RA fields indicated in the DCI.

In yet another example, a TD-RA field indicated in the DCI could include/comprise/incorporate at least one (absolute) TCI state ID/index value indicated in the MAC CE command for beam indication and/or at least one (relative) TCI state index within the N>1 TCI states/beams indicated in the MAC CE command for beam indication.

In yet another example, the UE could be implicitly indicated by the network the association/mapping between the N>1 TCI states/beams indicated in the MAC CE command for beam indication and the N>1 TD-RA fields (each indicating one or more transmission occasions) indicated in the DCI. For example, a TCI state/beam indicated in the MAC CE command for beam indication could be associated with/mapped to a TD-RA field (indicating one or more transmission occasions) indicated in the DCI if the TCI state/beam indicated in the MAC CE command for beam indication and the TD-RA field (indicating one or more transmission occasions) indicated in the DCI are associated with the same TRP-specific ID value such as PCI value and/or the same CORESETPoolIndex value. Other implicit indication methods of the association/mapping between the N>1 TCI states/beams indicated in the MAC CE command for beam indication and the N>1 TD-RA fields (each indicating one or more transmission occasions) indicated in the DCI are also possible.

In yet another example, a TCI state/beam indicated in the MAC CE command for beam indication could be associated with/mapped to a TD-RA field indicated in the DCI if the TCI state/beam indicated in the MAC CE command for beam indication and the TD-RA field indicated in the DCI include/comprise/incorporate the same ID/index value. For example, this ID/index value could be a (absolute) TRP-specific ID/index value such as PCI value, TRP ID value, TRP index value and etc., based on a list/set/pool of TRP-specific ID/index values, e.g., higher layer configured to the UE and/or higher layer configured to the UE and activated by one or more MAC CE activation commands/bitmaps. For another example, this ID/index value could be an (relative) index within the list/set/pool of TRP-specific ID/index values, e.g., higher layer configured to the UE and/or higher layer configured to the UE and activated by one or more MAC CE activation commands/bitmaps. For yet another example, this ID/index value could be a CORESETPoolIndex value.

For N>1 TCI states/beams indication in a single MAC CE command for beam indication, for N>1 DCIs each indicating at least one TD-RA field, wherein each DCI indicating at least one TD-RA field (indicating one or more transmission occasions) is associated with a different TRP in the multi-TRP system, in one example, the UE could be explicitly indicated by the network, e.g., via higher layer RRC signaling and/or MAC CE command and/or dynamic DCI signaling, the exact association/mapping between the N>1 TCI states/beams indicated in the MAC CE command for beam indication and the N>1 DCIs indicating the TD-RA fields (each indicating one or more transmission occasions). For example, the first TCI state and/or the TCI state with the lowest TCI state ID value indicated in the MAC CE command for beam indication could correspond to the DCI (indicating at least one TD-RA field comprising of one or more transmission occasions) associated with the lowest CORESETPoolIndex value (indicated in the corresponding higher layer parameter ControlResourceSet), the second TCI state and/or the TCI state with the second lowest TCI state ID value indicated in the MAC CE for beam indication could correspond to the DCI (indicating at least one TD-RA field comprising of one or more transmission occasions) associated with the second lowest CORESETPoolIndex value (indicated in the corresponding higher layer parameter ControlResourceSet), and so on, and the last TCI state and/or the TCI state with the highest TCI state ID value indicated in the MAC CE command for beam indication could correspond to the DCI (indicating at least one TD-RA field comprising of one or more transmission occasions) associated with the highest CORESETPoolIndex value (indicated in the corresponding higher layer parameter ControlResourceSet).

Other exact association/mapping relationships between the TCI states/beams indicated in the MAC CE command for beam indication and the DCIs indicating the TD-RA fields (each indicating one or more transmission occasions) and/or the corresponding indication method(s), e.g., via higher layer RRC signaling and/or MAC CE command and/or dynamic DCI signaling, are also possible.

In another example, a TCI state, e.g., the higher layer parameter TCI-State, indicated in the MAC CE command for beam indication could include/comprise/incorporate at least one (absolute) TD-RA field ID/index value indicated in at least one DCI and/or at least one (relative) TD-RA field index within all the TD-RA fields indicated in the N>1 DCIs.

In yet another example, a DCI indicating at least one TD-RA field and/or a TD-RA field indicated in a DCI could include/comprise/incorporate at least one (absolute) TCI state ID/index value indicated in the MAC CE command for beam indication and/or at least one (relative) TCI state index within the N>1 TCI states/beams indicated in the MAC CE command for beam indication.

In yet another example, the UE could be implicitly indicated by the network the association/mapping between the N>1 TCI states/beams indicated in the MAC CE command for beam indication and the N>1 DCIs indicating the TD-RA fields (each indicating one or more transmission occasions). For example, a TCI state/beam indicated in the MAC CE command for beam indication could be associated with/mapped to a DCI indicating at least one TD-RA field (indicating one or more transmission occasions) if the TCI state/beam indicated in the MAC CE command for beam indication and the DCI indicating at least one TD-RA field (indicating one or more transmission occasions) are associated with the same TRP-specific ID value such as PCI value and/or the same CORESETPoolIndex value. Other implicit indication methods of the association/mapping between the N>1 TCI states/beams indicated in the MAC CE command for beam indication and the N>1 DCIs indicating the TD-RA fields (each indicating one or more transmission occasions) are also possible.

In yet another example, a TCI state/beam indicated in the MAC CE command for beam indication could be associated with/mapped to a DCI indicating at least one TD-RA field if the TCI state/beam indicated in the MAC CE command for beam indication and the DCI indicating at least one TD-RA field include/comprise/incorporate the same ID/index value. For example, this ID/index value could be a (absolute) TRP-specific ID/index value such as PCI value, TRP ID value, TRP index value and etc., based on a list/set/pool of TRP-specific ID/index values, e.g., higher layer configured to the UE and/or higher layer configured to the UE and activated by one or more MAC CE activation commands/bitmaps. For another example, this ID/index value could be an (relative) index within the list/set/pool of TRP-specific ID/index values, e.g., higher layer configured to the UE and/or higher layer configured to the UE and activated by one or more MAC CE activation commands/bitmaps. For yet another example, this ID/index value could be a CORE-SETPoolIndex value.

For a list/set/pool of N>1 MAC CE commands for beam indication with each MAC CE command indicating a single TCI state/beam; a unique entity ID/index could be included/incorporated in each MAC CE command for beam indication.

For a single DCI indicating a single TD-RA field, wherein the time domain resources/transmission occasions indicated in the TD-RA field are associated with different TRPs in the multi-TRP system, in one example, the UE could be explicitly indicated by the network the association/mapping between the MAC CE commands for beam indication (and therefore, the TCI states/beams indicated therein) and the time domain resources/transmission occasions indicated in the TD-RA field. For instance, the UE could be indicated by the network the association/mapping between a MAC CE command for beam indication (and therefore, the TCI state/beam indicated therein) and one or more transmission occasions in the TD-RA field.

For example (option-3.2.3), the first MAC CE command for beam indication in the list/set/pool of N>1 MAC CE commands for beam indication and/or the MAC CE command for beam indication indicating the lowest entity ID/index value and/or the MAC CE command for beam indication indicating the TCI state with the lowest TCI state ID value could correspond to the 1-st to n_0-th (n_0≥1) transmission occasions in the TD-RA field, the second MAC CE command for beam indication in the list/set/pool of N>1 MAC CE commands for beam indication and/or the MAC CE command for beam indication indicating the second lowest entity ID/index value and/or the MAC CE command for beam indication indicating the TCI state with the second lowest TCI state ID value could correspond to the (n_0+1)-th to n_1-th (n_1≥n_0) transmission occasions in the TD-RA field, and so on, and the last MAC CE command for beam indication in the list/set/pool of N>1 MAC CE commands for beam indication and/or the MAC CE command for beam indication indicating the highest entity ID/index value and/or the MAC CE command for beam indication indicating the TCI state with the highest TCI state ID value could correspond to the n_p-th to n_q-th (n_q≥n_p) transmission occasions in the TD-RA field; for a total of two MAC CE commands for beam indication, the first N_0 (N_0≥1) or the first half of the transmission occasions could correspond to the first (or the second) MAC CE command for beam indication and/or the MAC CE command for beam indication indicating the TCI state with the lowest (or the highest) TCI state ID value, and the rest of or the second half of the transmission occasions could correspond to the second (or the first) MAC CE command for beam indication and/or the MAC CE command for beam indication indicating the TCI state with the highest (or the lowest) TCI state ID value.

For another example (option-3.2.4), the (mod(i−1, N_mac)+1)-th MAC CE command for beam indication in the list/set/pool of N>1 MAC CE commands for beam indication and/or the MAC CE command for beam indication indicating the TCI state with the (mod(i−1, N_mac)+1)-th lowest/highest TCI state ID value could correspond to the i-th transmission occasion indicated in the TD-RA field, where N_mac represents the total number of MAC CE commands for beam indication, i=1, . . . , K, where K represents the total number of transmission occasions indicated in the TD-RA field, and mod(x, y) calculates the remainder of the Euclidean division of x by y; for a total of two MAC CE commands for beam indication, the odd-numbered transmission occasions could correspond to the first (or the second) MAC CE command for beam indication and/or the MAC CE command for beam indication indicating the TCI state with the lowest (or the highest) TCI state ID value, and the even-numbered transmission occasions could correspond to the second (or the first) MAC CE command for beam indication and/or the MAC CE command for beam indication indicating the TCI state with the highest (or the lowest) TCI state ID value. The total number of transmission occasions K indicated in the TD-RA field could be configured by the network (e.g., via higher layer RRC signaling and/or MAC CE command and/or dynamic DCI signaling) and/or fixed in the system specifications and/or reported by the UE based on UE's capability and/or equal to the total number of MAC CE commands for beam indication. For a MAC CE command for beam indication (and therefore, the TCI state/beam indicated therein), the UE could be indicated by the network the starting/ending symbol/slot/mini-slot and/or the number of consecutive symbols/slots/mini-slots of its associated transmission occasions.

The UE could be indicated by the network, e.g., via higher layer RRC signaling and/or MAC CE command and/or dynamic DCI signaling, which option(s) (from/out of option-3.2.3 and option-3.2.4) to use/being used for indicating the mapping/association between the transmission occasion(s) in the TD-RA field and the MAC CE commands for beam indication (and therefore, the TCI states/beams indicated therein); for instance, a one-bit flag indicator could be incorporated/included in the DCI to differentiate between option-3.2.3 and option-3.2.4. The UE could be indicated by the network one or more conditions, e.g., whether the total number of MAC CE commands for beam indication is larger than a threshold, to switch between option-3.2.3 and option-3.2.4.

Specifically, a transmission occasion could be defined/determined as follows.

For example, the 1-st transmission occasion indicated in the TD-RA field (e.g., corresponding to the first MAC CE command for beam indication in the list/set/pool of N>1 MAC CE commands for beam indication and/or the MAC CE command for beam indication indicating the lowest entity ID/index value and/or the MAC CE command for beam indication indicating the TCI state with the lowest TCI state ID value) could be calculated/determined based on a first K0 value, a first S value and a first L value, the 2-nd transmission occasion indicated in the TD-RA field (e.g., corresponding to the second MAC CE command for beam indication in the list/set/pool of N>1 MAC CE commands for beam indication and/or the MAC CE command for beam indication indicating the second lowest entity ID/index value and/or the MAC CE command for beam indication indicat- ing the TCI state with the second lowest TCI state ID value) could be calculated/determined based on a second K0 value, a second S value, and a second L value, and so on, and the N-th transmission occasion indicated in the TD-RA field (e.g., corresponding to the last MAC CE command for beam indication in the list/set/pool of N>1 MAC CE commands for beam indication and/or the MAC CE command for beam indication indicating the highest entity ID/index value and/ or the MAC CE command for beam indication indicating the TCI state with the highest TCI state ID value) could be calculated/determined based on a N-th K0 value, a N-th S value, and a N-th L value. The first K0 value, the second K0 value, and so on, and the N-th K0 value could be different; the first S value, the second S value, and so on, and the N-th S value could be different; the first L value, the second L value, and so on, and the N-th L value could be different. The first K0 value, the second K0 value, and so on, and the N-th K0 value are indicated/included in the TD-RA field; the first S value, the second S value, and so on, and the N-th S value are indicated/included in the TD-RA field; the first L value, the second L value, and so on, and the N-th L value are indicated/included in the TD-RA field.

For another example, the 1-st transmission occasion indi- cated in the TD-RA field (e.g., corresponding to the first MAC CE command for beam indication in the list/set/pool of N>1 MAC CE commands for beam indication and/or the MAC CE command for beam indication indicating the lowest entity ID/index value and/or the MAC CE command for beam indication indicating the TCI state with the lowest TCI state ID value) could be calculated/determined based on a first K0 value, a first S value and a first L value, the 2-nd transmission occasion indicated in the TD-RA field (e.g., corresponding to the second MAC CE command for beam indication in the list/set/pool of N>1 MAC CE commands for beam indication and/or the MAC CE command for beam indication indicating the second lowest entity ID/index value and/or the MAC CE command for beam indication indicat- ing the TCI state with the second lowest TCI state ID value) could be calculated/determined based on a second K0 value, a second S value having the same value as the first S value, and a second L value having the same value as the first L value, and so on, and the N-th transmission occasion indi- cated in the TD-RA field (e.g., corresponding to the last MAC CE command for beam indication in the list/set/pool of N>1 MAC CE commands for beam indication and/or the MAC CE command for beam indication indicating the highest entity ID/index value and/or the MAC CE command for beam indication indicating the TCI state with the highest TCI state ID value) could be calculated/determined based on a N-th K0 value, a N-th S value having the same value as the first S value, and a N-th L value having the same value as the first L value.

The first K0 value, the second K0 value, and so on, and the N-th K0 value could be different. The first K0 value, the second K0 value, and so on, and the N-th K0 value are indicated/included in the TD-RA field; the first S value and the first L value are indicated/included in the TD-RA field.

Yet for another example, the 1-st transmission occasion indicated in the TD-RA field (e.g., corresponding to the first MAC CE command for beam indication in the list/set/pool of N>1 MAC CE commands for beam indication and/or the MAC CE command for beam indication indicating the lowest entity ID/index value and/or the MAC CE command for beam indication indicating the TCI state with the lowest TCI state ID value) could be calculated/determined based on a first K0 value, a first S value and a first L value, the 2-nd transmission occasion indicated in the TD-RA field (e.g., corresponding to the second MAC CE command for beam indication in the list/set/pool of N>1 MAC CE commands for beam indication and/or the MAC CE command for beam indication indicating the second lowest entity ID/index value and/or the MAC CE command for beam indication indicat- ing the TCI state with the second lowest TCI state ID value) could be calculated/determined based on a second K0 value having a difference/gap with respect to the first K0 value, a second S value, and a second L value, and so on, and the N-th transmission occasion indicated in the TD-RA field (e.g., corresponding to the last MAC CE command for beam indication in the list/set/pool of N>1 MAC CE commands for beam indication and/or the MAC CE command for beam indication indicating the highest entity ID/index value and/ or the MAC CE command for beam indication indicating the TCI state with the highest TCI state ID value) could be calculated/determined based on a N-th K0 value having a difference/gap with respect to the (N−1)-th K0 value, a N-th S value, and a N-th L value.

The difference/gap could be configured by the network and set to 1 slot. The first S value, the second S value, and so on, and the N-th S value could be different; the first L value, the second L value, and so on, and the N-th L value could be different. The first K0 value is indicated/included in the TD-RA field; the first S value, the second S value, and so on, and the N-th S value are indicated/included in the TD-RA field; the first L value, the second L value, and so on, and the N-th L value are indicated/included in the TD-RA field.

Yet for another example, the 1-st transmission occasion indicated in the TD-RA field (e.g., corresponding to the first MAC CE command for beam indication in the list/set/pool of N>1 MAC CE commands for beam indication and/or the MAC CE command for beam indication indicating the lowest entity ID/index value and/or the MAC CE command for beam indication indicating the TCI state with the lowest TCI state ID value) could be calculated/determined based on a first K0 value, a first S value and a first L value, the 2-nd transmission occasion indicated in the TD-RA field (e.g., corresponding to the second MAC CE command for beam indication in the list/set/pool of N>1 MAC CE commands for beam indication and/or the MAC CE command for beam indication indicating the second lowest entity ID/index value and/or the MAC CE command for beam indication indicat- ing the TCI state with the second lowest TCI state ID value) could be calculated/determined based on a second K0 value having a difference/gap with respect to the first K0 value, a second S value having the same value as the first S value, and a second L value having the same value as the first L value, and so on, and the N-th transmission occasion indi- cated in the TD-RA field (e.g., corresponding to the last MAC CE command for beam indication in the list/set/pool of N>1 MAC CE commands for beam indication and/or the MAC CE command for beam indication indicating the highest entity ID/index value and/or the MAC CE command for beam indication indicating the TCI state with the highest TCI state ID value) could be calculated/determined based on a N-th K0 value having a difference/gap with respect to the (N−1)-th K0 value, a N-th S value having the same value as the first S value, and a N-th L value having the same value as the first L value. The difference/gap could be configured by the network and set to 1 slot. The first K0 value, the first S value and the first L value are indicated/included in the TD-RA field.

Other exact association/mapping relationships between the time domain resources/transmission occasions indicated in the TD-RA field and the MAC CE commands for beam indication (and therefore, the TCI states/beams indicated therein) and/or the corresponding indication method(s), e.g., via higher layer RRC signaling and/or MAC CE command and/or dynamic DCI signaling, are also possible.

In another example, the UE could be implicitly indicated by the network the association/mapping between the MAC CE commands for beam indication (and therefore, the TCI states/beams indicated therein) and the time domain resources/transmission occasions indicated in the TD-RA field. For instance, a MAC CE command for beam indication (and therefore, the TCI state/beam indicated therein) could be associated with/mapped to one or more transmission occasions indicated in the TD-RA field if the MAC CE command for beam indication (and therefore, the TCI state/beam indicated therein) and the corresponding transmission occasion(s) indicated in the TD-RA field are associated with the same TRP-specific ID value such as PCI value and/or the same CORESETPoolIndex value. Other implicit indication methods of the association/mapping between the MAC CE commands for beam indication and the time domain resources/transmission occasions indicated in the TD-RA field are also possible.

For a single DCI indicating N>1 TD-RA fields, wherein each TD-RA field indicating one or more transmission occasions is associated with a different TRP in the multi-TRP system, in one example, the UE could be explicitly indicated by the network, e.g., via higher layer RRC signaling and/or MAC CE command and/or dynamic DCI signaling, the exact association/mapping between the N>1 MAC CE commands for beam indication (and therefore, the TCI states/beams indicated therein) and the N>1 TD-RA fields (each indicating one or more transmission occasions) indicated in the DCI.

For example, the first MAC CE command for beam indication in the list/set/pool of N>1 MAC CE commands for beam indication and/or the MAC CE command for beam indication indicating the lowest entity ID/index value and/or the MAC CE command for beam indication indicating the TCI state with the lowest TCI state ID value could correspond to the first TD-RA field (indicating one or more transmission occasions) indicated in the DCI, the second MAC CE command for beam indication in the list/set/pool of N>1 MAC CE commands for beam indication and/or the MAC CE command for beam indication indicating the second lowest entity ID/index value and/or the MAC CE command for beam indication indicating the TCI state with the second lowest TCI state ID value could correspond to the second TD-RA field (indicating one or more transmission occasions) indicated in the DCI, and so on, and the last MAC CE command for beam indication in the list/set/pool of N>1 MAC CE commands for beam indication and/or the MAC CE command for beam indication indicating the highest entity ID/index value and/or the MAC CE command for beam indication indicating the TCI state with the highest TCI state ID value could correspond to the last TD-RA field (indicating one or more transmission occasions) indicated in the DCI.

Other exact association/mapping relationships between the MAC CE commands for beam indication and the TD-RA fields (each indicating one or more transmission occasions) indicated in the DCI and/or the corresponding indication method(s), e.g., via higher layer RRC signaling and/or MAC CE command and/or dynamic DCI signaling, are also possible.

In another example, a MAC CE command for beam indication could include/comprise/incorporate at least one (absolute) TD-RA field ID/index value indicated in the DCI and/or at least one (relative) FD-RA field index within the N>1 TD-RA fields indicated in the DCI.

In yet another example, a TD-RA field indicated in the DCI could include/comprise/incorporate at least one (absolute) entity ID/index value of at least one MAC CE command for beam indication and/or at least one (relative) index of at least one MAC CE command for beam indication within the N>1 MAC CE commands for beam indication.

In yet another example, the UE could be implicitly indicated by the network the association/mapping between the N>1 MAC CE commands for beam indication (and therefore, the TCI states/beams indicated therein) and the N>1 TD-RA fields (each indicating one or more transmission occasions) indicated in the DCI. For example, a MAC CE command for beam indication (and therefore, the TCI state/beam indicated therein) could be associated with/mapped to a TD-RA field (indicating one or more transmission occasions) indicated in the DCI if the MAC CE command for beam indication and the TD-RA field (each indicating one or more transmission occasions) indicated in the DCI are associated with the same TRP-specific ID value such as PCI value and/or the same CORESETPoolIndex value. Other implicit indication methods of the association/mapping between the N>1 MAC CE commands for beam indication (and therefore, the TCI states/beams indicated therein) and the N>1 TD-RA fields (each indicating one or more transmission occasions) indicated in the DCI are also possible.

In yet another example, a MAC CE command for beam indication could be associated with/mapped to a TD-RA field indicated in the DCI if the MAC CE command for beam indication and the TD-RA field indicated in the DCI include/comprise/incorporate the same ID/index value. For example, this ID/index value could be a (absolute) TRP-specific ID/index value such as PCI value, TRP ID value, TRP index value and etc., based on a list/set/pool of TRP-specific ID/index values, e.g., higher layer configured to the UE and/or higher layer configured to the UE and activated by one or more MAC CE activation commands/bitmaps. For another example, this ID/index value could be an (relative) index within the list/set/pool of TRP-specific ID/index values, e.g., higher layer configured to the UE and/or higher layer configured to the UE and activated by one or more MAC CE activation commands/bitmaps. For yet another example, this ID/index value could be a CORESETPoolIndex value.

For N>1 DCIs each indicating at least one TD-RA field (indicating one or more transmission occasions), wherein each DCI indicating at least one TD-RA field (indicating one or more transmission occasions) is associated with a different TRP in the multi-TRP system, in one example, the UE could be explicitly indicated by the network, e.g., via higher layer RRC signaling and/or MAC CE command and/or dynamic DCI signaling, the exact association/mapping between the N>1 MAC CE commands for beam indication (and therefore, the TCI states/beams indicated therein) and the N>1 DCIs indicating the TD-RA fields each indicating one or more transmission occasions.

For example, the first MAC CE command for beam indication in the list/set/pool of N>1 MAC CE commands for beam indication and/or the MAC CE command for beam indication indicating the lowest entity ID/index value and/or the MAC CE command for beam indication indicating the TCI state with the lowest TCI state ID value could correspond to the DCI (indicating at least one TD-RA field comprising of one or more transmission occasions) associated with the lowest CORESETPoolIndex value (indicated in the corresponding higher layer parameter ControlResourceSet), the second MAC CE command for beam indication in the list/set/pool of N>1 MAC CE commands for beam indication and/or the MAC CE command for beam indication indicating the second lowest entity ID/index value and/or the MAC CE command for beam indication indicating the TCI state with the second lowest TCI state ID value could correspond to the DCI (indicating at least one TD-RA field comprising of one or more transmission occasions) associated with the second lowest CORESETPoolIndex value (indicated in the corresponding higher layer parameter ControlResourceSet), and so on, and the last MAC CE command for beam indication in the list/set/pool of N>1 MAC CE commands for beam indication and/or the MAC CE command for beam indication indicating the highest entity ID/index value and/or the MAC CE command for beam indication indicating the TCI state with the highest TCI state ID value could correspond to the DCI (indicating at least one TD-RA field comprising of one or more transmission occasions) associated with the highest CORESET-PoolIndex value (indicated in the corresponding higher layer parameter ControlResourceSet).

Other exact association/mapping relationships between the MAC CE commands for beam indication (and therefore, the TCI states/beams indicated therein) and the DCIs indicating the TD-RA fields (each indicating one or more transmission occasions) and/or the corresponding indication method(s), e.g., via higher layer RRC signaling and/or MAC CE command and/or dynamic DCI signaling, are also possible.

In another example, a MAC CE command for beam indication could include/comprise/incorporate at least one (absolute) TD-RA field ID/index value indicated in at least one DCI and/or at least one (relative) TD-RA field index within all the TD-RA fields indicated in the N>1 DCIs.

In yet another example, a DCI indicating at least one TD-RA field and/or a TD-RA field indicated in a DCI could include/comprise/incorporate at least one (absolute) entity ID/index value of at least one MAC CE command for beam indication and/or at least one (relative) index of at least one MAC CE command for beam indication within the N>1 MAC CE commands for beam indication.

In yet another example, the UE could be implicitly indicated by the network the association/mapping between the N>1 TCI states/beams indicated in the MAC CE command for beam indication and the N>1 DCIs indicating the TD-RA fields (each indicating one or more transmission occasions). For example, a MAC CE command for beam indication (and therefore, the TCI state/beam indicated therein) could be associated with/mapped to a DCI indicating at least one TD-RA field (indicating one or more transmission occasions) if the MAC CE command for beam indication and the DCI indicating at least one TD-RA field (indicating one or more transmission occasions) are associated with the same TRP-specific ID value such as PCI value and/or the same CORESETPoolIndex value. Other implicit indication methods of the association/mapping between the N>1 MAC CE commands for beam indication and the N>1 DCIs indicating the TD-RA fields (each indicating one or more transmission occasions) are also possible.

In yet another example, a MAC CE command for beam indication could be associated with/mapped to a DCI indicating at least one TD-RA field if the MAC CE command for beam indication and the DCI indicating at least one TD-RA field include/comprise/incorporate the same ID/index value. For example, this ID/index value could be a (absolute) TRP-specific ID/index value such as PCI value, TRP ID value, TRP index value and etc., based on a list/set/pool of TRP-specific ID/index values, e.g., higher layer configured to the UE and/or higher layer configured to the UE and activated by one or more MAC CE activation commands/bitmaps. For another example, this ID/index value could be an (relative) index within the list/set/pool of TRP-specific ID/index values, e.g., higher layer configured to the UE and/or higher layer configured to the UE and activated by one or more MAC CE activation commands/bitmaps. For yet another example, this ID/index value could be a CORE-SETPoolIndex value.

An example of DCI based TCI state/beam indication for the multi-TRP operation with PDSCH(s) repetition is presented in FIG. 11. As illustrated in FIG. 11, the UE could be first higher layer configured by the network, e.g., via the higher layer RRC signaling, a list/pool of N_tci TCI states. Each TCI state contains at least a QCL source RS with a QCL type, e.g., QCL-typeA/B/C/D. The UE could then receive from the network one or more DCIs to indicate one or more beam(s) (i.e., the TCI state(s)) for the transmission/reception of the same PDSCH(s) transmitted from/associated with one or more TRPs in a multi-TRP system on different/non-overlapping time domain resources, e.g., different transmission occasions including different slots/mini-slots/symbols/etc.

For instance, the UE could receive from the network a single DCI to indicate N>1 TCI states/beams for the same PDSCH(s) transmitted from/associated with different TRPs in the multi-TRP system on different/non-overlapping time domain resources such as different slots/mini-slots/symbols/etc.—also referred to as different transmission occasions. As depicted in FIG. 9 and FIG. 11, the UE could receive from the network a single DCI to indicate N=2 TCI states/beams (TCI #3 and TCI #5) for the same PDSCH-a transmitted from/associated with two TRPs, i.e., TRP-1 and TRP-2, in the multi-TRP system, respectively, on different/non-overlapping time domain resources/transmission occasions.

As described above, a DCI used to indicate to the UE a beam (i.e., a TCI state and/or a TCI state ID) for the transmission/reception of a PDCCH or a PDSCH could be at least one of the following.

In one example, a DL related DCI (e.g., DCI format 1_0, DCI format 1_1 or DCI format 1_2) could be used to indicate to the UE a beam (i.e., a TCI state and/or a TCI state ID) for the transmission/reception of a PDCCH or a PDSCH, wherein the DL related DCI may or may not include a DL assignment.

In another example, an UL related DCI (e.g., DCI format 0_0, DCI format 0_1, DCI format 0_2) could be used to indicate to the UE a beam (i.e., a TCI state and/or a TCI state ID) for the transmission/reception of a PDCCH or a PDSCH, wherein the UL related DCI may or may not include an UL scheduling grant.

Yet in another example, a custom/purpose designed DCI format could be used to indicate to the UE a beam (i.e., a TCI state and/or a TCI state ID) for the transmission/reception of a PDCCH or a PDSCH.

Furthermore, the TCI state indicated in the DCI for beam indication could be at least one of: (1) a DL TCI state; (2) an UL TCI state; (3) a joint DL and UL TCI state; and/or (4) separate DL TCI state and UL TCI state.

The association/mapping between the TCI state(s)/beam (s) indicated in the DCI(s) and the TRPs in the multi-TRP system could follow those discussed/specified in example-1.2.1, example-1.2.2, example-1.2.3, example-1.2.4, example-1.2.5, example-1.2.a, example-1.2.b and example-1.2.c. There could be various means to associate/map between the TCI state(s)/beam(s) indicated in the DCI(s) and the time domain resources/transmission occasions indicated in the TD-RA field(s).

For N>1 TCI states/beams indication in a single DCI for beam indication, for a single DCI indicating a single TD-RA field, wherein the time domain resources/transmission occasions indicated in the TD-RA field are associated with different TRPs in the multi-TRP system, in one example, the UE could be explicitly indicated by the network the association/mapping between the TCI states/beams indicated in the DCI for beam indication and the time domain resources/transmission occasions indicated in the TD-RA field.

For instance, the UE could be indicated by the network the association/mapping between a TCI state/beam indicated in the DCI for beam indication and one or more transmission occasions in the TD-RA field. For example (option-3.3.1), the first TCI state and/or the TCI state with the lowest TCI state ID value indicated in the DCI for beam indication could correspond to the 1-st to n_0-th (n_0≥1) transmission occasions in the TD-RA field, the second TCI state and/or the TCI state with the second lowest TCI state ID value indicated in the DCI for beam indication could correspond to the (n_0+1)-th to n_1-th (n_1≥n_0) transmission occasions in the TD-RA field, and so on, and the last TCI state and/or the TCI state with the highest TCI state ID value indicated in the DCI for beam indication could correspond to the n_p-th to n_q-th (n_q≥n_p) transmission occasions in the TD-RA field; for a total of two TCI states/beams indicated in the DCI for beam indication, the first N_0 (N_0≥1) or the first half of the transmission occasions could correspond to the first (or the second) TCI state and/or the TCI state with the lowest (or the highest) TCI state ID value indicated in the DCI for beam indication, and the rest of or the second half of the transmission occasions could correspond to the second (or the first) TCI state and/or the TCI state with the highest (or the lowest) TCI state ID value indicated in the DCI for beam indication.

For another example (option-3.3.2), the (mod(i−1, N_tci)+1)-th TCI state and/or the TCI state with the (mod (i−1, N_tci)+1)-th lowest/highest TCI state ID value indicated in the DCI for beam indication could correspond to the i-th transmission occasion in the TD-RA field, where N_tci represents the total number of TCI state(s)/beam(s) indicated in the DCI for beam indication, i=1, . . . , K, where K represents the total number of transmission occasions indicated in the TD-RA field, and mod(x, y) calculates the remainder of the Euclidean division of x by y; for a total of two TCI states/beams indicated in the DCI for beam indication, the odd-numbered transmission occasions could correspond to the first (or the second) TCI state and/or the TCI state with the lowest (or the highest) TCI state ID value indicated in the DCI for beam indication, and the even-numbered transmission occasions could correspond to the second (or the first) TCI state and/or the TCI state with the highest (or the lowest) TCI state ID value indicated in the DCI for beam indication.

The total number of transmission occasions K indicated in the TD-RA field could be configured by the network (e.g., via higher layer RRC signaling and/or MAC CE command and/or dynamic DCI signaling) and/or fixed in the system specifications and/or reported by the UE based on UE's capability and/or equal to the total number of TCI states/ beams indicated in the DCI for beam indication. For a TCI state/beam indicated in the DCI for beam indication, the UE could be indicated by the network the starting/ending symbol/slot/mini-slot and/or the number of consecutive symbols/slots/mini-slots of the transmission occasion(s) associated with the TCI state/beam indicated in the DCI for beam indication.

The UE could be indicated by the network, e.g., via higher layer RRC signaling and/or MAC CE command and/or dynamic DCI signaling, which option(s) (from/out of option-3.3.1 and option-3.3.2) to use/being used for indicating the mapping/association between the transmission occasion(s) in the TD-RA field and the TCI states/beams indicated in the DCI for beam indication; for instance, a one-bit flag indicator could be incorporated/included in the DCI to differentiate between option-3.3.1 and option-3.3.2. The UE could be indicated by the network one or more conditions, e.g., whether the total number of TCI states/beams indicated in the DCI for beam indication is larger than a threshold, to switch between option-3.3.1 and option-3.3.2.

Specifically, a transmission occasion could be defined/ determined as follows.

For example, the 1-st transmission occasion indicated in the TD-RA field (e.g., corresponding to the first TCI state and/or the TCI state with the lowest TCI state ID value indicated in the DCI for beam indication) could be calculated/determined based on a first K0 value, a first S value and a first L value, the 2-nd transmission occasion indicated in the TD-RA field (e.g., corresponding to the second TCI state and/or the TCI state with the second lowest TCI state ID value indicated in the DCI for beam indication) could be calculated/determined based on a second K0 value, a second S value, and a second L value, and so on, and the N-th transmission occasion indicated in the TD-RA field (e.g., corresponding to the last TCI state and/or the TCI state with the highest TCI state ID value indicated in the DCI for beam indication) could be calculated/determined based on a N-th K0 value, a N-th S value, and a N-th L value.

The first K0 value, the second K0 value, and so on, and the N-th K0 value could be different; the first S value, the second S value, and so on, and the N-th S value could be different; the first L value, the second L value, and so on, and the N-th L value could be different. The first K0 value, the second K0 value, and so on, and the N-th K0 value are indicated/included in the TD-RA field; the first S value, the second S value, and so on, and the N-th S value are indicated/included in the TD-RA field; the first L value, the second L value, and so on, and the N-th L value are indicated/included in the TD-RA field.

For another example, the 1-st transmission occasion indicated in the TD-RA field (e.g., corresponding to the first TCI state and/or the TCI state with the lowest TCI state ID value indicated in the DCI for beam indication) could be calculated/determined based on a first K0 value, a first S value and a first L value, the 2-nd transmission occasion indicated in the TD-RA field (e.g., corresponding to the second TCI state and/or the TCI state with the second lowest TCI state ID value indicated in the DCI for beam indication) could be calculated/determined based on a second K0 value, a second S value having the same value as the first S value, and a second L value having the same value as the first L value, and so on, and the N-th transmission occasion indicated in the TD-RA field (e.g., corresponding to the last TCI state and/or the TCI state with the highest TCI state ID value indicated in the DCI for beam indication) could be calculated/determined based on a N-th K0 value, a N-th S value having the same value as the first S value, and a N-th L value having the same value as the first L value. The first K0 value, the second K0 value, and so on, and the N-th K0 value could be different. The first K0 value, the second K0 value, and so on, and the N-th K0 value are indicated/included in the TD-RA field; the first S value and the first L value are indicated/included in the TD-RA field.

Yet for another example, the 1-st transmission occasion indicated in the TD-RA field (e.g., corresponding to the first TCI state and/or the TCI state with the lowest TCI state ID value indicated in the DCI for beam indication) could be calculated/determined based on a first K0 value, a first S value and a first L value, the 2-nd transmission occasion indicated in the TD-RA field (e.g., corresponding to the second TCI state and/or the TCI state with the second lowest TCI state ID value indicated in the DCI for beam indication) could be calculated/determined based on a second K0 value having a difference/gap with respect to the first K0 value, a second S value, and a second L value, and so on, and the N-th transmission occasion indicated in the TD-RA field (e.g., corresponding to the last TCI state and/or the TCI state with the highest TCI state ID value indicated in the DCI for beam indication) could be calculated/determined based on a N-th K0 value having a difference/gap with respect to the (N−1)-th K0 value, a N-th S value, and a N-th L value.

The difference/gap could be configured by the network and set to 1 slot. The first S value, the second S value, and so on, and the N-th S value could be different; the first L value, the second L value, and so on, and the N-th L value could be different. The first K0 value is indicated/included in the TD-RA field; the first S value, the second S value, and so on, and the N-th S value are indicated/included in the TD-RA field; the first L value, the second L value, and so on, and the N-th L value are indicated/included in the TD-RA field.

Yet for another example, the 1-st transmission occasion indicated in the TD-RA field (e.g., corresponding to the first TCI state and/or the TCI state with the lowest TCI state ID value indicated in the DCI for beam indication) could be calculated/determined based on a first K0 value, a first S value and a first L value, the 2-nd transmission occasion indicated in the TD-RA field (e.g., corresponding to the second TCI state and/or the TCI state with the second lowest TCI state ID value indicated in the DCI for beam indication) could be calculated/determined based on a second K0 value having a difference/gap with respect to the first K0 value, a second S value having the same value as the first S value, and a second L value having the same value as the first L value, and so on, and the N-th transmission occasion indicated in the TD-RA field (e.g., corresponding to the last TCI state and/or the TCI state with the highest TCI state ID value indicated in the DCI for beam indication) could be calculated/determined based on a N-th K0 value having a difference/gap with respect to the (N−1)-th K0 value, a N-th S value having the same value as the first S value, and a N-th L value having the same value as the first L value. The difference/gap could be configured by the network and set to 1 slot. The first K0 value, the first S value and the first L value are indicated/included in the TD-RA field.

Other exact association/mapping relationships between the time domain resources/transmission occasions indicated in the TD-RA field and the TCI state(s)/beam(s) indicated in the DCI for beam indication and/or the corresponding indication method(s), e.g., via higher layer RRC signaling and/or MAC CE command and/or dynamic DCI signaling, are also possible.

In another example, the UE could be implicitly indicated by the network the association/mapping between the TCI states/beams indicated in the DCI for beam indication and the time domain resources/transmission occasions indicated in the TD-RA field. For instance, a TCI state/beam indicated in the DCI for beam indication could be associated with/mapped to one or more transmission occasions indicated in the TD-RA field if the TCI state/beam indicated in the DCI for beam indication and the corresponding transmission occasion(s) indicated in the TD-RA field are associated with the same TRP-specific ID value such as PCI value and/or the same CORESETPoolIndex value. Other implicit indication methods of the association/mapping between the TCI state(s)/beam(s) indicated in the DCI for beam indication and the time domain resources/transmission occasions indicated in the TD-RA field are also possible.

For N>1 TCI states/beams indication in a single DCI for beam indication, for a single DCI indicating N>1 TD-RA fields, wherein each TD-RA field indicating one or more transmission occasions is associated with a different TRP in the multi-TRP system, in one example, the UE could be explicitly indicated by the network, e.g., via higher layer RRC signaling and/or MAC CE command and/or dynamic DCI signaling, the exact association/mapping between the N>1 TCI states/beams indicated in the DCI for beam indication and the N>1 TD-RA fields (each indicating one or more transmission occasions) indicated in the DCI. For example, the first TCI state and/or the TCI state with the lowest TCI state ID value indicated in the DCI for beam indication could correspond to the first TD-RA field (indicating one or more transmission occasions) indicated in the DCI, the second TCI state and/or the TCI state with the second lowest TCI state ID value indicated in the DCI for beam indication could correspond to the second TD-RA field (indicating one or more transmission occasions) indicated in the DCI, and so on, and the last TCI state and/or the TCI state with the highest TCI state ID value indicated in the DCI for beam indication could correspond to the last TD-RA field (indicating one or more transmission occasions) indicated in the DCI. Other exact association/mapping relationships between the TCI states/beams indicated in the DCI for beam indication and the TD-RA fields (each indicating one or more transmission occasions) indicated in the DCI and/or the corresponding indication method(s), e.g., via higher layer RRC signaling and/or MAC CE command and/or dynamic DCI signaling, are also possible.

In another example, a TCI state, e.g., the higher layer parameter TCI-State, in the DCI for beam indication could include/comprise/incorporate at least one (absolute) TD-RA field ID/index value indicated in the DCI and/or at least one (relative) TD-RA field index within the N>1 TD-RA fields indicated in the DCI.

In yet another example, a TD-RA field indicated in the DCI could include/comprise/incorporate at least one (absolute) TCI state ID/index value indicated in the DCI for beam indication and/or at least one (relative) TCI state index within the N>1 TCI states/beams indicated in the DCI for beam indication.

In yet another example, the UE could be implicitly indicated by the network the association/mapping between the N>1 TCI states/beams indicated in the DCI for beam indication and the N>1 TD-RA fields (each indicting one or more transmission occasions) indicated in the DCI. For example, a TCI state/beam indicated in the DCI for beam indication could be associated with/mapped to a TD-RA field (indicating one or more transmission occasions) indicated in the DCI if the TCI state/beam indicated in the DCI for beam indication and the TD-RA field (indicating one or more transmission occasions) indicated in the DCI are associated with the same TRP-specific ID value such as PCI value and/or the same CORESETPoolIndex value. Other implicit indication methods of the association/mapping between the N>1 TCI states/beams indicated in the DCI for beam indication and the N>1 TD-RA fields (each indicating one or more transmission occasions) indicated in the DCI are also possible.

In yet another example, a TCI state, e.g., the higher layer parameter TCI-State, indicated in the DCI for beam indication could be associated with/mapped to a TD-RA field indicated in the DCI if the TCI state/beam indicated in the DCI for beam indication and the TD-RA field indicated in the DCI include/comprise/incorporate the same ID/index value. For example, this ID/index value could be a (absolute) TRP-specific ID/index value such as PCI value, TRP ID value, TRP index value and etc., based on a list/set/pool of TRP-specific ID/index values, e.g., higher layer configured to the UE and/or higher layer configured to the UE and activated by one or more MAC CE activation commands/bitmaps. For another example, this ID/index value could be an (relative) index within the list/set/pool of TRP-specific ID/index values, e.g., higher layer configured to the UE and/or higher layer configured to the UE and activated by one or more MAC CE activation commands/bitmaps. For yet another example, this ID/index value could be a CORE-SETPoolIndex value.

For N>1 TCI states/beams indication in a single DCI for beam indication, for N>1 DCIs each indicating at least one TD-RA field comprising of one or more transmission occasions, wherein each DCI indicating at least one TD-RA field comprising of one or more transmission occasions is associated with a different TRP in the multi-TRP system, in one example, the UE could be explicitly indicated by the network, e.g., via higher layer RRC signaling and/or MAC CE command and/or dynamic DCI signaling, the exact association/mapping between the N>1 TCI states/beams indicated in the DCI for beam indication and the N>1 DCIs indicating the TD-RA fields (each indicating one or more transmission occasions).

For example, the first TCI state and/or the TCI state with the lowest TCI state ID value indicated in the DCI for beam indication could correspond to the DCI (indicating at least one TD-RA field comprising of one or more transmission occasions) associated with the lowest CORESETPoolIndex value (indicated in the corresponding higher layer parameter ControlResourceSet), the second TCI state and/or the TCI state with the second lowest TCI state ID value indicated in the DCI for beam indication could correspond to the DCI (indicating at least one TD-RA field comprising of one or more transmission occasions) associated with the second lowest CORESETPoolIndex value (indicated in the corresponding higher layer parameter ControlResourceSet), and so on, and the last TCI state and/or the TCI state with the highest TCI state ID value indicated in the DCI for beam indication could correspond to the DCI (indicating at least one TD-RA field comprising of one or more transmission occasions) associated with the highest CORESETPoolIndex value (indicated in the corresponding higher layer parameter ControlResourceSet).

Other exact association/mapping relationships between the TCI states/beams indicated in the DCI for beam indication and the DCIs indicating the TD-RA fields each indicating one or more transmission occasions and/or the corresponding indication method(s), e.g., via higher layer RRC signaling and/or MAC CE command and/or dynamic DCI signaling, are also possible.

In another example, a TCI state, e.g., the higher layer parameter TCI-State, indicated in the DCI for beam indication could include/comprise/incorporate at least one (absolute) TD-RA field ID/index value indicated in at least one DCI and/or at least one (relative) TD-RA field index within all the TD-RA fields indicated in the N>1 DCIs.

In yet another example, a DCI indicating at least one TD-RA field and/or a TD-RA field indicated in a DCI could include/comprise/incorporate at least one (absolute) TCI state ID/index value indicated in the DCI for beam indication and/or at least one (relative) TCI state index within the N>1 TCI states/beams indicated in the DCI for beam indication.

In yet another example, the UE could be implicitly indicated by the network the association/mapping between the N>1 TCI states/beams indicated in the DCI for beam indication and the N>1 DCIs indicating the TD-RA fields each indicating one or more transmission occasions. For example, a TCI state/beam indicated in the DCI for beam indication could be associated with/mapped to a DCI indicating at least one TD-RA field (indicating one or more transmission occasions) if the TCI state/beam indicated in the DCI for beam indication and the DCI indicating at least one TD-RA field (indicating one or more transmission occasions) are associated with the same TRP-specific ID value such as PCI value and/or the same CORESETPoolIndex value. Other implicit indication methods of the association/mapping between the N>1 TCI states/beams indicated in the DCI for beam indication and the N>1 DCIs indicating the TD-RA fields each indicating one or more transmission occasions are also possible.

In yet another example, a TCI state, e.g., the higher layer parameter TCI-State, indicated in the DCI for beam indication could be associated with/mapped to a DCI indicating at least one TD-RA field if the TCI state/beam indicated in the DCI for beam indication and the DCI indicating at least one TD-RA field include/comprise/incorporate the same ID/index value. For example, this ID/index value could be a (absolute) TRP-specific ID/index value such as PCI value, TRP ID value, TRP index value and etc., based on a list/set/pool of TRP-specific ID/index values, e.g., higher layer configured to the UE and/or higher layer configured to the UE and activated by one or more MAC CE activation commands/bitmaps.

For another example, this ID/index value could be an (relative) index within the list/set/pool of TRP-specific ID/index values, e.g., higher layer configured to the UE and/or higher layer configured to the UE and activated by one or more MAC CE activation commands/bitmaps. For yet another example, this ID/index value could be a CORE-SETPoolIndex value.

For N>1 DCIs for beam indication with each DCI indicating a single TCI state/beam, for a single DCI indicating a single TD-RA field, wherein the time domain resources/ transmission occasions indicated in the TD-RA field are associated with different TRPs in the multi-TRP system, in one example, the UE could be explicitly indicated by the network the association/mapping between the DCIs for beam indication (and therefore, the TCI states/beams indicated therein) and the time domain resources/transmission occasions indicated in the TD-RA field. For instance, the UE could be indicated by the network the association/mapping between a DCI for beam indication (and therefore, the TCI state/beam indicated therein) and one or more transmission occasions in the TD-RA field.

For example (option-3.3.3), the DCI for beam indication associated with the lowest CORESETPoolIndex value (indicated in the corresponding higher layer parameter ControlResourceSet) and/or the DCI for beam indication indicating the lowest TCI state ID value could correspond to the 1-st to n_0-th (n_0≥1) transmission occasions in the TD-RA field, the DCI for beam indication associated with the second lowest CORESETPoolIndex value (indicated in the corresponding higher layer parameter ControlResourceSet) and/ or the DCI for beam indication indicating the second lowest TCI state ID value could correspond to the (n_0+1)-th to n_1-th (n_1≥n_0) transmission occasions in the TD-RA field, and so on, and the DCI for beam indication associated with the highest CORESETPoolIndex value (indicated in the corresponding higher layer parameter ControlResource-Set) and/or the DCI for beam indication indicating the highest TCI state ID value could correspond to the n_p-th to n_q-th (n_q≥n_p) transmission occasions in the TD-RA field; for a total of two DCIs for beam indication, the first N_0 (N_0≥1) or the first half of the transmission occasions could correspond to the DCI for beam indication associated with the lowest (or the highest) CORESETPoolIndex value and/or the DCI for beam indication indicating the lowest (or the highest) TCI state ID value, and the rest of or the second half of the transmission occasions could correspond to the DCI for beam indication associated with the highest (or the lowest) CORESETPoolIndex value and/or the DCI for beam indication indicating the highest (or the lowest) TCI state ID value.

For another example (option-3.3.4), the DCI for beam indication associated with the (mod(i−1, N_dci)+1)-th low-est/highest CORESETPoolIndex value and/or the DCI for beam indication indicating the TCI state with the (mod(i−1, N_dci)+1)-th lowest/highest TCI state ID value could correspond to the i-th transmission occasion indicated in the TD-RA field, where N_dci represents the total number of DCIs for beam indication, i=1, . . . , K, where K represents the total number of transmission occasions indicated in the TD-RA field, and mod(x, y) calculates the remainder of the Euclidean division of x by y; for a total of two DCIs for beam indication, the odd-numbered transmission occasions could correspond to the DCI for beam indication associated with the lowest (or the highest) CORESETPoolIndex value and/or the DCI for beam indication indicating the lowest (or the highest) TCI state ID value, and the even-numbered transmission occasions could correspond to the DCI for beam indication associated with the highest (or the lowest) CORESETPoolIndex value and/or the DCI for beam indication indicating the highest (or the lowest) TCI state ID value.

The total number of transmission occasions K indicated in the TD-RA field could be configured by the network (e.g., via higher layer RRC signaling and/or MAC CE command and/or dynamic DCI signaling) and/or fixed in the system specifications and/or reported by the UE based on UE's capability and/or equal to the total number of DCIs for beam indication. For a DCI for beam indication (and therefore, the TCI state/beam indicated therein), the UE could be indicated by the network the starting/ending symbol/slot/mini-slot and/or the number of consecutive symbols/slots/mini-slots of the transmission occasion(s) associated with the DCI for beam indication.

The UE could be indicated by the network, e.g., via higher layer RRC signaling and/or MAC CE command and/or dynamic DCI signaling, which option(s) (from/out of option-3.3.3 and option-3.3.4) to use/being used for indicating the mapping/association between the transmission occasion(s) in the TD-RA field and the DCIs for beam indication (and therefore, the TCI states/beams indicated therein); for instance, a one-bit flag indicator could be incorporated/ included in the DCI to differentiate between option-3.3.3 and option-3.3.4. The UE could be indicated by the network one or more conditions, e.g., whether the total number of DCIs for beam indication is larger than a threshold, to switch between option-3.3.3 and option-3.3.4.

Specifically, a transmission occasion could be defined/ determined as follows.

For example, the 1-st transmission occasion indicated in the TD-RA field (e.g., corresponding to the DCI for beam indication associated with the lowest CORESETPoolIndex value—indicated in the corresponding higher layer parameter ControlResourceSet—and/or the DCI for beam indication indicating the lowest TCI state ID value) could be calculated/determined based on a first K0 value, a first S value and a first L value, the 2-nd transmission occasion indicated in the TD-RA field (e.g., corresponding to the DCI for beam indication associated with the second lowest CORESETPoolIndex value—indicated in the corresponding higher layer parameter ControlResourceSet—and/or the DCI for beam indication indicating the second lowest TCI state ID value) could be calculated/determined based on a second K0 value, a second S value, and a second L value, and so on, and the N-th transmission occasion indicated in the TD-RA field (e.g., corresponding to the DCI for beam indication associated with the highest CORESETPoolIndex value—indicated in the corresponding higher layer parameter ControlResourceSet—and/or the DCI for beam indication indicating the highest TCI state ID value) could be calculated/determined based on a N-th K0 value, a N-th S value, and a N-th L value.

The first K0 value, the second K0 value, and so on, and the N-th K0 value could be different; the first S value, the second S value, and so on, and the N-th S value could be different; the first L value, the second L value, and so on, and the N-th L value could be different. The first K0 value, the second K0 value, and so on, and the N-th K0 value are indicated/included in the TD-RA field; the first S value, the second S value, and so on, and the N-th S value are indicated/included in the TD-RA field; the first L value, the second L value, and so on, and the N-th L value are indicated/included in the TD-RA field.

For another example, the 1-st transmission occasion indicated in the TD-RA field (e.g., corresponding to the DCI for beam indication associated with the lowest CORESET-PoolIndex value—indicated in the corresponding higher layer parameter ControlResourceSet—and/or the DCI for beam indication indicating the lowest TCI state ID value) could be calculated/determined based on a first K0 value, a first S value and a first L value, the 2-nd transmission occasion indicated in the TD-RA field (e.g., corresponding to the DCI for beam indication associated with the second lowest CORESETPoolIndex value—indicated in the corre-sponding higher layer parameter ControlResourceSet—and/ or the DCI for beam indication indicating the second lowest TCI state ID value) could be calculated/determined based on a second K0 value, a second S value having the same value as the first S value, and a second L value having the same value as the first L value, and so on, and the N-th transmission occasion indicated in the TD-RA field (e.g., corresponding to the DCI for beam indication associated with the highest CORESETPoolIndex value—indicated in the corresponding higher layer parameter ControlResourceSet—and/or the DCI for beam indication indicating the highest TCI state ID value) could be calculated/determined based on a N-th K0 value, a N-th S value having the same value as the first S value, and a N-th L value having the same value as the first L value. The first K0 value, the second K0 value, and so on, and the N-th K0 value could be different. The first K0 value, the second K0 value, and so on, and the N-th K0 value are indicated/included in the TD-RA field; the first S value and the first L value are indicated/included in the TD-RA field.

Yet for another example, the 1-st transmission occasion indicated in the TD-RA field (e.g., corresponding to the DCI for beam indication associated with the lowest CORESET-PoolIndex value—indicated in the corresponding higher layer parameter ControlResourceSet—and/or the DCI for beam indication indicating the lowest TCI state ID value) could be calculated/determined based on a first K0 value, a first S value and a first L value, the 2-nd transmission occasion indicated in the TD-RA field (e.g., corresponding to the DCI for beam indication associated with the second lowest CORESETPoolIndex value—indicated in the corresponding higher layer parameter ControlResourceSet—and/or the DCI for beam indication indicating the second lowest TCI state ID value) could be calculated/determined based on a second K0 value having a difference/gap with respect to the first K0 value, a second S value, and a second L value, and so on, and the N-th transmission occasion indicated in the TD-RA field (e.g., corresponding to the DCI for beam indication associated with the highest CORESETPoolIndex value—indicated in the corresponding higher layer parameter ControlResourceSet—and/or the DCI for beam indication indicating the highest TCI state ID value) could be calculated/determined based on a N-th K0 value having a difference/gap with respect to the (N−1)-th K0 value, a N-th S value, and a N-th L value. The difference/gap could be configured by the network and set to 1 slot. The first S value, the second S value, and so on, and the N-th S value could be different; the first L value, the second L value, and so on, and the N-th L value could be different. The first K0 value is indicated/included in the TD-RA field; the first S value, the second S value, and so on, and the N-th S value are indicated/included in the TD-RA field; the first L value, the second L value, and so on, and the N-th L value are indicated/included in the TD-RA field.

Yet for another example, the 1-st transmission occasion indicated in the TD-RA field (e.g., corresponding to the DCI for beam indication associated with the lowest CORESET-PoolIndex value—indicated in the corresponding higher layer parameter ControlResourceSet—and/or the DCI for beam indication indicating the lowest TCI state ID value) could be calculated/determined based on a first K0 value, a first S value and a first L value, the 2-nd transmission occasion indicated in the TD-RA field (e.g., corresponding to the DCI for beam indication associated with the second lowest CORESETPoolIndex value—indicated in the corresponding higher layer parameter ControlResourceSet—and/or the DCI for beam indication indicating the second lowest TCI state ID value) could be calculated/determined based on a second K0 value having a difference/gap with respect to the first K0 value, a second S value having the same value as the first S value, and a second L value having the same value as the first L value, and so on, and the N-th transmission occasion indicated in the TD-RA field (e.g., corresponding to the DCI for beam indication associated with the highest CORESETPoolIndex value—indicated in the corresponding higher layer parameter ControlResourceSet—and/or the DCI for beam indication indicating the highest TCI state ID value) could be calculated/determined based on a N-th K0 value having a difference/gap with respect to the (N−1)-th K0 value, a N-th S value having the same value as the first S value, and a N-th L value having the same value as the first L value. The difference/gap could be configured by the network and set to 1 slot. The first K0 value, the first S value and the first L value are indicated/included in the TD-RA field.

Other exact association/mapping relationships between the time domain resources/transmission occasions indicated in the TD-RA field and the DCIs for beam indication (and therefore, the TCI states/beams indicated therein) and/or the corresponding indication method(s), e.g., via higher layer RRC signaling and/or MAC CE command and/or dynamic DCI signaling, are also possible.

In another example, the UE could be implicitly indicated by the network the association/mapping between the DCIs for beam indication (and therefore, the TCI states/beams indicated therein) and the time domain resources/transmission occasions indicated in the TD-RA field. For instance, a DCI for beam indication (and therefore, the TCI state/beam indicated therein) could be associated with/mapped to one or more transmission occasions indicated in the TD-RA field if the DCI for beam indication (and therefore, the TCI state/beam indicated therein) and the corresponding transmission occasion(s) indicated in the TD-RA field are associated with the same TRP-specific ID value such as PCI value and/or the same CORESETPoolIndex value. Other implicit indication methods of the association/mapping between the DCIs for beam indication and the time domain resources/transmission occasions indicated in the TD-RA field are also possible.

For a single DCI indicating N>1 TD-RA fields each indicating one or more transmission occasions, wherein each TD-RA field indicating one or more transmission occasions is associated with a different TRP in the multi-TRP system, in one example, the UE could be explicitly indicated by the network, e.g., via higher layer RRC signaling and/or MAC CE command and/or dynamic DCI signaling, the exact association/mapping between the N>1 DCIs for beam indication (and therefore, the TCI states/beams indicated therein) and the N>1 TD-RA fields (each indicating one or more transmission occasions) indicated in the DCI. For example, the DCI for beam indication associated with the lowest CORESETPoolIndex value (indicated in the corresponding higher layer parameter ControlResourceSet) and/or the DCI for beam indication indicating the lowest TCI state ID value could correspond to the first TD-RA field (indicating one or more transmission occasions) indicated in the DCI, the DCI for beam indication associated with the second lowest CORESETPoolIndex value (indicated in the corresponding higher layer parameter ControlResourceSet) and/or the DCI for beam indication indicating the second lowest TCI state ID value could correspond to the second TD-RA field (indicating one or more transmission occasions) indicated in the DCI, and so on, and the DCI for beam indication associated with the highest CORESETPoolIndex value (indicated in the corresponding higher layer parameter ControlResourceSet) and/or the DCI for beam indication indicating the highest TCI state ID value could correspond to the last TD-RA field (indicating one or more transmission occasions) indicated in the DCI. Other exact association/mapping relationships between the DCIs for beam indication and the TD-RA fields (each indicating one or more transmission occasions) indicated in the DCI and/or the corresponding indication method(s), e.g., via higher layer RRC signaling and/or MAC CE command and/or dynamic DCI signaling, are also possible.

In another example, a DCI for beam indication could include/comprise/incorporate at least one (absolute) TD-RA field ID/index value indicated in the DCI and/or at least one (relative) TD-RA field index within the N>1 TD-RA fields indicated in the DCI.

In yet another example, a TD-RA field indicated in the DCI could include/comprise/incorporate at least one (absolute) entity ID/index value such as CORESETPoolIndex value of/associated with at least one DCI for beam indication and/or at least one (relative) index of at least one DCI for beam indication within the N>1 DCIs for beam indication.

In yet another example, the UE could be implicitly indicated by the network the association/mapping between the N>1 DCIs for beam indication (and therefore, the TCI states/beams indicated therein) and the N>1 TD-RA fields (each indicating one or more transmission occasions) indicated in the DCI. For example, a DCI for beam indication (and therefore, the TCI state/beam indicated therein) could be associated with/mapped to a TD-RA field (indicating one or more transmission occasions) indicated in the DCI if the DCI for beam indication and the TD-RA field (indicating one or more transmission occasions) indicated in the DCI are associated with the same TRP-specific ID value such as PCI value and/or the same CORESETPoolIndex value. Other implicit indication methods of the association/mapping between the N>1 DCIs for beam indication (and therefore, the TCI states/beams indicated therein) and the N>1 TD-RA fields (each indicating one or more transmission occasions) indicated in the DCI are also possible.

In yet another example, a DCI for beam indication (and therefore, the TCI states/beams indicated therein) could be associated with/mapped to a TD-RA field indicated in the DCI if the DCI for beam indication and the TD-RA field indicated in the DCI include/comprise/incorporate the same ID/index value. For example, this ID/index value could be a (absolute) TRP-specific ID/index value such as PCI value, TRP ID value, TRP index value and etc., based on a list/set/pool of TRP-specific ID/index values, e.g., higher layer configured to the UE and/or higher layer configured to the UE and activated by one or more MAC CE activation commands/bitmaps. For another example, this ID/index value could be an (relative) index within the list/set/pool of TRP-specific ID/index values, e.g., higher layer configured to the UE and/or higher layer configured to the UE and activated by one or more MAC CE activation commands/bitmaps. For yet another example, this ID/index value could be a CORESETPoolIndex value.

For N>1 DCIs each indicating at least one TD-RA field comprising of one or more transmission occasions, wherein each DCI indicating at least one TD-RA field comprising of one or more transmission occasions is associated with a different TRP in the multi-TRP system, in one example, the UE could be explicitly indicated by the network, e.g., via higher layer RRC signaling and/or MAC CE command and/or dynamic DCI signaling, the exact association/mapping between the N>1 DCIs for beam indication (and therefore, the TCI states/beams indicated therein) and the N>1 DCIs indicating the TD-RA fields (each indicating one or more transmission occasions).

For example, the DCI for beam indication associated with the lowest CORESETPoolIndex value (indicated in the corresponding higher layer parameter ControlResourceSet) and/or the DCI for beam indication indicating the lowest TCI state ID value could correspond to the DCI (indicating at least one TD-RA field comprising of one or more transmission occasions) associated with the lowest CORESET-PoolIndex value (indicated in the corresponding higher layer parameter ControlResourceSet), the DCI for beam indication associated with the second lowest CORESETPoolIndex value (indicated in the corresponding higher layer parameter ControlResourceSet) and/or the DCI for beam indication indicating the second lowest TCI state ID value could correspond to the DCI (indicating at least one TD-RA field comprising of one or more transmission occasions) associated with the second lowest CORESETPoolIndex value (indicated in the corresponding higher layer parameter ControlResourceSet), and so on, and the DCI for beam indication associated with the highest CORESETPoolIndex value (indicated in the corresponding higher layer parameter ControlResourceSet) and/or the DCI for beam indication indicating the highest TCI state ID value could correspond to the DCI (indicating at least one TD-RA field comprising of one or more transmission occasions) associated with the highest CORESETPoolIndex value (indicated in the corresponding higher layer parameter ControlResourceSet). Other exact association/mapping relationships between the DCIs for beam indication (and therefore, the TCI states/beams indicated therein) and the DCIs indicating the TD-RA fields (each indicating one or more transmission occasions) and/or the corresponding indication method(s), e.g., via higher layer RRC signaling and/or MAC CE command and/or dynamic DCI signaling, are also possible.

In another example, a DCI for beam indication could include/comprise/incorporate at least one (absolute) TD-RA field ID/index value indicated in at least one DCI and/or at least one (relative) TD-RA field index within all the TD-RA fields indicated in the N>1 DCIs.

In yet another example, a DCI indicating at least one TD-RA field and/or a TD-RA field indicated in a DCI could include/comprise/incorporate at least one (absolute) entity ID/index value such as CORESETPoolIndex value of/associated with at least one DCI for beam indication and/or at least one (relative) index of at least one DCI for beam indication within the N>1 DCIs for beam indication.

In yet another example, the UE could be implicitly indicated by the network the association/mapping between the N>1 DCIs for beam indication (and therefore, the TCI states/beams indicated therein) and the N>1 DCIs indicating the TD-RA fields (each indicating one or more transmission occasions). For example, a DCI for beam indication (and therefore, the TCI state/beam indicated therein) could be associated with/mapped to a DCI indicating at least one TD-RA field comprising of one or more transmission occasions if the DCI for beam indication and the DCI indicating at least one TD-RA field comprising of one or more transmission occasions are associated with the same TRP-specific ID value such as PCI value and/or the same CORESET-PoolIndex value. Other implicit indication methods of the association/mapping between the N>1 DCIs for beam indication and the N>1 DCIs indicating the TD-RA fields (each indicating one or more transmission occasions) are also possible.

In yet another example, a DCI for beam indication (and therefore, the TCI states/beams indicated therein) could be associated with/mapped to a DCI indicating at least one TD-RA field if the DCI for beam indication and the DCI indicating at least one TD-RA field include/comprise/incorporate the same ID/index value. For example, this ID/index value could be a (absolute) TRP-specific ID/index value such as PCI value, TRP ID value, TRP index value and etc., based on a list/set/pool of TRP-specific ID/index values, e.g., higher layer configured to the UE and/or higher layer configured to the UE and activated by one or more MAC CE activation commands/bitmaps. For another example, this ID/index value could be an (relative) index within the list/set/pool of TRP-specific ID/index values, e.g., higher layer configured to the UE and/or higher layer configured to the UE and activated by one or more MAC CE activation commands/bitmaps. For yet another example, this ID/index value could be a CORESETPoolIndex value.

An example of DCI based TCI state/beam indication (with MAC CE activated TCI states) for the multi-TRP operation and PDSCH(s) repetition is presented in FIG. 12. As illustrated in FIG. 12, the UE could be first higher layer configured by the network, e.g., via the higher layer RRC signaling, a list/pool of N_tci TCI states. Each TCI state contains at least a QCL source RS with a QCL type, e.g., QCL-typeA/B/C/D.

The UE could then receive from the network one or more MAC CE activation commands activating one or more TCI states from the higher layer configured list/pool of TCI states, e.g., up to eight TCI states could be activated by a MAC CE activation command. The UE could receive from the network one or more DCIs to indicate one or more beam(s) (i.e., the TCI state(s)) from the MAC CE activated TCI state(s)/beam(s) for the transmission/reception of the same PDSCH(s) transmitted from/associated with one or more TRPs in a multi-TRP system on different/non-overlapping time domain resources, e.g., different transmission occasions including different slots/mini-slots/symbols/etc.

For instance, the UE could receive from the network a single DCI to indicate N'>1 TCI states/beams from the MAC CE activated TCI states/beams for the same PDSCH(s) transmitted from/associated with different TRPs in the multi-TRP system on different/non-overlapping time domain resources such as different slots/mini-slots/symbols/ etc.—also referred to as different transmission occasions. As depicted in FIG. 9 and FIG. 12, the UE could receive from the network a single DCI to indicate N'=2 TCI states/beams (TCI #3 and TCI #5) from the MAC CE activated TCI states/beams for the same PDSCH-a transmitted from/associated with two TRPs, i.e., TRP-1 and TRP-2, in the multi-TRP system, respectively, on different/non-overlapping time domain resources/transmission occasions.

As described above, a DCI used to indicate to the UE a beam (i.e., a TCI state and/or a TCI state ID) for the transmission/reception of a PDCCH or a PDSCH could be at least one of the following.

In one example, a DL related DCI (e.g., DCI format 1_0, DCI format 1_1 or DCI format 1_2) could be used to indicate to the UE a beam (i.e., a TCI state and/or a TCI state ID) for the transmission/reception of a PDCCH or a PDSCH, wherein the DL related DCI may or may not include a DL assignment.

In another example, an UL related DCI (e.g., DCI format 0_0, DCI format 0_1, DCI format 0_2) could be used to indicate to the UE a beam (i.e., a TCI state and/or a TCI state ID) for the transmission/reception of a PDCCH or a PDSCH, wherein the UL related DCI may or may not include an UL scheduling grant.

Yet in another example, a custom/purpose designed DCI format could be used to indicate to the UE a beam (i.e., a TCI state and/or a TCI state ID) for the transmission/reception of a PDCCH or a PDSCH.

Furthermore, the TCI state indicated in the DCI for beam indication could be at least one of: (1) a DL TCI state; (2) an UL TCI state; (3) a joint DL and UL TCI state; and/or (4) separate DL TCI state and UL TCI state.

The association/mapping between the DCI(s) indicated TCI state(s)/beams (from the MAC CE activated TCI state(s)/beam(s)) and the TRPs in the multi-TRP system could follow those discussed/specified in example-1.3.1, example-1.3.2, example-1.3.3, example-1.3.4, example-1.3.5, example-1.3.a, example-1.3.b and example-1.3.c. There could be various means to associate/map between DCI(s) indicated TCI state(s)/beam(s)—from the MAC CE activated TCI state(s)/beam(s)—and the time domain resources/transmission occasions indicated in the TD-RA field(s).

For N'>1 TCI states/beams indication in a single DCI for beam indication, for a single DCI indicating a single TD-RA field comprising of one or more transmission occasions, wherein the time domain resources/transmission occasions indicated in the TD-RA field are associated with different TRPs in the multi-TRP system, in one example, the UE could be explicitly indicated by the network the association/mapping between the DCI indicated TCI states/beams (selected from the MAC CE activated TCI states/beams) and the time domain resources/transmission occasions indicated in the TD-RA field.

For instance, the UE could be indicated by the network the association/mapping between a TCI state/beam indicated in the DCI for beam indication and one or more transmission occasions in the TD-RA field. For example (option-3.4.1), the first TCI state and/or the TCI state with the lowest TCI state ID value indicated in the DCI for beam indication could correspond to the 1-st to n_0-th (n_0≥1) transmission occasions in the TD-RA field, the second TCI state and/or the TCI state with the second lowest TCI state ID value indicated in the DCI for beam indication could correspond to the (n_0+1)-th to n_1-th (n_1≥n_0) transmission occasions in the TD-RA field, and so on, and the last TCI state and/or the TCI state with the highest TCI state ID value indicated in the DCI for beam indication could correspond to the n_p-th to n_q-th (n_q≥n_p) transmission occasions in the TD-RA field; for a total of two TCI states/beams—selected from the MAC CE activated TCI states/beams—indicated in the DCI for beam indication, the first N_0 (N_0≥1) or the first half of the transmission occasions could correspond to the first (or the second) TCI state and/or the TCI state with the lowest (or the highest) TCI state ID value indicated in the DCI for beam indication, and the rest of or the second half of the transmission occasions could correspond to the second (or the first) TCI state and/or the TCI state with the highest (or the lowest) TCI state ID value indicated in the DCI for beam indication. For another example (option-3.4.2), the (mod(i−1, N_tci)+1)-th TCI state and/or the TCI state with the (mod(i−1, N_tci)+1)-th lowest/highest TCI state ID value indicated in the DCI for beam indication could correspond to the i-th transmission occasion indicated in the TD-RA field, where N_tci represents the total number of TCI state(s)/beam(s) indicated in the DCI for beam indication, i=1, . . . , K, where K represents the total number of transmission occasions indicated in the TD-RA field, and mod(x, y) calculates the remainder of the Euclidean division of x by y; for a total of two TCI states/beams—selected from the MAC CE activated TCI states/beams—indicated in the DCI for beam indication, the odd-numbered transmission occasions could correspond to the first (or the second) TCI state and/or the TCI state with the lowest (or the highest) TCI state ID value indicated in the DCI for beam indication, and the even-numbered transmission occasions could correspond to the second (or the first) TCI state and/or the TCI state with the highest (or the lowest) TCI state ID value indicated in the DCI for beam indication.

The total number of transmission occasions K indicated in the TD-RA field could be configured by the network (e.g., via higher layer RRC signaling and/or MAC CE command and/or dynamic DCI signaling) and/or fixed in the system specifications and/or reported by the UE based on UE's capability and/or equal to the total number of TCI states/beams—selected from the MAC CE activated TCI states/beams—indicated in the DCI for beam indication.

For a TCI state/beam (selected from the MAC CE activated TCI states/beams) indicated in the DCI for beam indication, the UE could be indicated by the network the starting/ending symbol/slot/mini-slot and/or the number of consecutive symbols/slots/mini-slots of the transmission occasion(s) associated with the TCI state/beam (selected from the MAC CE activated TCI states/beams) indicated in the DCI for beam indication. The UE could be indicated by the network, e.g., via higher layer RRC signaling and/or MAC CE command and/or dynamic DCI signaling, which option(s) (from/out of option-3.4.1 and option-3.4.2) to use/being used for indicating the mapping/association between the transmission occasion(s) in the TD-RA field and the TCI states/beams—selected from the MAC CE activated TCI states/beams—indicated in the DCI for beam indication; for instance, a one-bit flag indicator could be incorporated/included in the DCI to differentiate between option-3.4.1 and option-3.4.2.

The UE could be indicated by the network one or more conditions, e.g., whether the total number of TCI states/beams—selected from the MAC CE activated TCI states/beams—indicated in the DCI for beam indication is larger than a threshold, to switch between option-3.4.1 and option-3.4.2.

Specifically, a transmission occasion could be defined/determined as follows.

For example, the 1-st transmission occasion indicated in the TD-RA field (e.g., corresponding to the first TCI state and/or the TCI state with the lowest TCI state ID value indicated in the DCI for beam indication—selected from the MAC CE activated TCI states/beams) could be calculated/determined based on a first K0 value, a first S value and a first L value, the 2-nd transmission occasion indicated in the TD-RA field (e.g., corresponding to the second TCI state and/or the TCI state with the second lowest TCI state ID value indicated in the DCI for beam indication—selected from the MAC CE activated TCI states/beams) could be calculated/determined based on a second K0 value, a second S value, and a second L value, and so on, and the N-th transmission occasion indicated in the TD-RA field (e.g., corresponding to the last TCI state and/or the TCI state with the highest TCI state ID value indicated in the DCI for beam indication—selected from the MAC CE activated TCI states/beams) could be calculated/determined based on a N-th K0 value, a N-th S value, and a N-th L value. The first K0 value, the second K0 value, and so on, and the N-th K0 value could be different; the first S value, the second S value, and so on, and the N-th S value could be different; the first L value, the second L value, and so on, and the N-th L value could be different.

The first K0 value, the second K0 value, and so on, and the N-th K0 value are indicated/included in the TD-RA field;

the first S value, the second S value, and so on, and the N-th S value are indicated/included in the TD-RA field; the first L value, the second L value, and so on, and the N-th L value are indicated/included in the TD-RA field.

For another example, the 1-st transmission occasion indicated in the TD-RA field (e.g., corresponding to the first TCI state and/or the TCI state with the lowest TCI state ID value indicated in the DCI for beam indication—selected from the MAC CE activated TCI states/beams) could be calculated/determined based on a first K0 value, a first S value and a first L value, the 2-nd transmission occasion indicated in the TD-RA field (e.g., corresponding to the second TCI state and/or the TCI state with the second lowest TCI state ID value indicated in the DCI for beam indication—selected from the MAC CE activated TCI states/beams) could be calculated/determined based on a second K0 value, a second S value having the same value as the first S value, and a second L value having the same value as the first L value, and so on, and the N-th transmission occasion indicated in the TD-RA field (e.g., corresponding to the last TCI state and/or the TCI state with the highest TCI state ID value indicated in the DCI for beam indication—selected from the MAC CE activated TCI states/beams) could be calculated/determined based on a N-th K0 value, a N-th S value having the same value as the first S value, and a N-th L value having the same value as the first L value.

The first K0 value, the second K0 value, and so on, and the N-th K0 value could be different. The first K0 value, the second K0 value, and so on, and the N-th K0 value are indicated/included in the TD-RA field; the first S value and the first L value are indicated/included in the TD-RA field.

Yet for another example, the 1-st transmission occasion indicated in the TD-RA field (e.g., corresponding to the first TCI state and/or the TCI state with the lowest TCI state ID value indicated in the DCI for beam indication—selected from the MAC CE activated TCI states/beams) could be calculated/determined based on a first K0 value, a first S value and a first L value, the 2-nd transmission occasion indicated in the TD-RA field (e.g., corresponding to the second TCI state and/or the TCI state with the second lowest TCI state ID value indicated in the DCI for beam indication—selected from the MAC CE activated TCI states/beams) could be calculated/determined based on a second K0 value having a difference/gap with respect to the first K0 value, a second S value, and a second L value, and so on, and the N-th transmission occasion indicated in the TD-RA field (e.g., corresponding to the last TCI state and/or the TCI state with the highest TCI state ID value indicated in the DCI for beam indication—selected from the MAC CE activated TCI states/beams) could be calculated/determined based on a N-th K0 value having a difference/gap with respect to the (N−1)-th K0 value, a N-th S value, and a N-th L value.

The difference/gap could be configured by the network and set to 1 slot. The first S value, the second S value, and so on, and the N-th S value could be different; the first L value, the second L value, and so on, and the N-th L value could be different. The first K0 value is indicated/included in the TD-RA field; the first S value, the second S value, and so on, and the N-th S value are indicated/included in the TD-RA field; the first L value, the second L value, and so on, and the N-th L value are indicated/included in the TD-RA field.

Yet for another example, the 1-st transmission occasion indicated in the TD-RA field (e.g., corresponding to the first TCI state and/or the TCI state with the lowest TCI state ID value indicated in the DCI for beam indication—selected from the MAC CE activated TCI states/beams) could be calculated/determined based on a first K0 value, a first S value and a first L value, the 2-nd transmission occasion indicated in the TD-RA field (e.g., corresponding to the second TCI state and/or the TCI state with the second lowest TCI state ID value indicated in the DCI for beam indication—selected from the MAC CE activated TCI states/beams) could be calculated/determined based on a second K0 value having a difference/gap with respect to the first K0 value, a second S value having the same value as the first S value, and a second L value having the same value as the first L value, and so on, and the N-th transmission occasion indicated in the TD-RA field (e.g., corresponding to the last TCI state and/or the TCI state with the highest TCI state ID value indicated in the DCI for beam indication—selected from the MAC CE activated TCI states/beams) could be calculated/determined based on a N-th K0 value having a difference/gap with respect to the (N−1)-th K0 value, a N-th S value having the same value as the first S value, and a N-th L value having the same value as the first L value. The difference/gap could be configured by the network and set to 1 slot. The first K0 value, the first S value and the first L value are indicated/included in the TD-RA field Other exact association/mapping relationships between the time domain resources/transmission occasions indicated in the TD-RA field and the DCI indicated TCI state(s)/beam(s)—selected from the MAC CE activated TCI state(s)/beam(s)—and/or the corresponding indication method(s), e.g., via higher layer RRC signaling and/or MAC CE command and/or dynamic DCI signaling, are also possible.

In another example, the UE could be implicitly indicated by the network the association/mapping between the DCI indicated TCI states/beams (selected from the MAC CE activated TCI states/beams) and the time domain resources/transmission occasions indicated in the TD-RA field. For instance, a TCI state/beam indicated in the DCI for beam indication could be associated with/mapped to one or more transmission occasions indicated in the TD-RA field if the TCI state/beam indicated in the DCI for beam indication and the corresponding transmission occasions indicated in the TD-RA field are associated with the same TRP-specific ID value such as PCI value and/or the same CORESETPoolIndex value. Other implicit indication methods of the association/mapping between the DCI indicated TCI state(s)/beam(s)—selected from the MAC CE activated TCI state(s)/beam(s)—and the time domain resources/transmission occasions indicated in the TD-RA field are also possible.

For a single DCI indicating N'>1 TD-RA fields (each indicating one or more transmission occasions), wherein each TD-RA field (indicating one or more transmission occasions) is associated with a different TRP in the multi-TRP system, in one example, the UE could be explicitly indicated by the network, e.g., via higher layer RRC signaling and/or MAC CE command and/or dynamic DCI signaling, the exact association/mapping between the N'>1 DCI indicated TCI states/beams (selected from the MAC CE activated TCI states/beams) and the N'>1 TD-RA fields (each indicating one or more transmission occasions) indicated in the DCI.

For example, the first TCI state and/or the TCI state with the lowest TCI state ID value indicated in the DCI for beam indication could correspond to the first TD-RA field (indicating one or more transmission occasions) indicated in the DCI, the second TCI state and/or the TCI state with the second lowest TCI state ID value indicated in the DCI for beam indication could correspond to the second TD-RA field (indicating one or more transmission occasions) indicated in the DCI, and so on, and the last TCI state and/or the TCI state with the highest TCI state ID value indicated in the DCI for beam indication could correspond to the last TD-RA field (indicating one or more transmission occasions) indicated in the DCI. Other exact association/mapping relationships between the DCI indicated TCI states/beams—selected from the MAC CE activated TCI states/beams—and the TD-RA fields (each indicating one or more transmission occasions) indicated in the DCI and/or the corresponding indication method(s), e.g., via higher layer RRC signaling and/or MAC CE command and/or dynamic DCI signaling, are also possible.

In another example, a TCI state (selected from the MAC CE activated TCI states/beams), e.g., the higher layer parameter TCI-State, indicated in the DCI for beam indication could include/comprise/incorporate at least one (absolute) TD-RA field ID/index value indicated in the DCI and/or at least one (relative) TD-RA field index within the N'>1 TD-RA fields indicated in the DCI.

In yet another example, a TD-RA field indicated in the DCI could include/comprise/incorporate at least one (absolute) TCI state ID/index value indicated in the DCI for beam indication and/or at least one (relative) TCI state index within the N'>1 TCI states/beams (selected from the MAC CE activated TCI states/beams) indicated in the DCI for beam indication.

In yet another example, the UE could be implicitly indicated by the network the association/mapping between the N'>1 DCI indicated TCI states/beams (selected from the MAC CE activated TCI states/beams) and the N'>1 TD-RA fields (each indicating one or more transmission occasions) indicated in the DCI. For example, a TCI state/beam indicated in the DCI for beam indication could be associated with/mapped to a TD-RA field (indicating one or more transmission occasions) indicated in the DCI if the TCI state/beam indicated in the DCI for beam indication and the TD-RA field (indicating one or more transmission occasions) indicated in the DCI are associated with the same TRP-specific ID value such as PCI value and/or the same CORESETPoolIndex value. Other implicit indication methods of the association/mapping between the N'>1 DCI indicated TCI states/beams—selected from the MAC CE activated TCI states/beams—and the N'>1 TD-RA fields (each indicating one or more transmission occasions) indicated in the DCI are also possible.

In yet another example, a TCI state/beam (selected from the MAC CE activated TCI states/beams) indicated in the DCI for beam indication could be associated with/mapped to a TD-RA field indicated in the DCI if the TCI state/beam (selected from the MAC CE activated TCI states/beams) indicated in the DCI for beam indication and the TD-RA field indicated in the DCI include/comprise/incorporate the same ID/index value. For example, this ID/index value could be a (absolute) TRP-specific ID/index value such as PCI value, TRP ID value, TRP index value and etc., based on a list/set/pool of TRP-specific ID/index values, e.g., higher layer configured to the UE and/or higher layer configured to the UE and activated by one or more MAC CE activation commands/bitmaps. For another example, this ID/index value could be an (relative) index within the list/set/pool of TRP-specific ID/index values, e.g., higher layer configured to the UE and/or higher layer configured to the UE and activated by one or more MAC CE activation commands/bitmaps. For yet another example, this ID/index value could be a CORESETPoolIndex value.

For N'>1 DCIs each indicating at least one TD-RA field comprising of one or more transmission occasions, wherein each DCI indicating at least one TD-RA field comprising of one or more transmission occasions is associated with a different TRP in the multi-TRP system, in one example, the UE could be explicitly indicated by the network, e.g., via higher layer RRC signaling and/or MAC CE command and/or dynamic DCI signaling, the exact association/mapping between the N'>1 DCI indicated TCI states/beams (selected from the MAC CE activated TCI states/beams) and the N'>1 DCIs indicating the TD-RA fields (each indicating one or more transmission occasions).

For example, the first TCI state and/or the TCI state with the lowest TCI state ID value indicated in the DCI for beam indication could correspond to the DCI (indicating at least one TD-RA field comprising of one or more transmission occasions) associated with the lowest CORESETPoolIndex value (indicated in the corresponding higher layer parameter ControlResourceSet), the second TCI state and/or the TCI state with the second lowest TCI state ID value indicated in the DCI for beam indication could correspond to the DCI (indicating at least one TD-RA field comprising of one or more transmission occasions) associated with the second lowest CORESETPoolIndex value (indicated in the corresponding higher layer parameter ControlResourceSet), and so on, and the last TCI state and/or the TCI state with the highest TCI state ID value indicated in the DCI for beam indication could correspond to the DCI (indicating at least one TD-RA field comprising of one or more transmission occasions) associated with the highest CORESETPoolIndex value (indicated in the corresponding higher layer parameter ControlResourceSet). Other exact association/mapping relationships between the DCI indicated TCI states/beams— selected from the MAC CE activated TCI states/beams— and the DCIs indicating the TD-RA fields (each indicating one or more transmission occasions) and/or the corresponding indication method(s), e.g., via higher layer RRC signaling and/or MAC CE command and/or dynamic DCI signaling, are also possible.

In another example, a TCI state (selected from the MAC CE activated TCI states/beams), e.g., the higher layer parameter TCI-State, indicated in the DCI for beam indication could include/comprise/incorporate at least one (absolute) TD-RA field ID/index value indicated in at least one DCI and/or at least one (relative) TD-RA field index within all the TD-RA fields indicated in the N'>1 DCIs.

In yet another example, a DCI indicating at least one TD-RA field and/or a TD-RA field indicated in a DCI could include/comprise/incorporate at least one (absolute) TCI state ID/index value indicated in the DCI for beam indication and/or at least one (relative) TCI state index within the N'>1 TCI states/beams (selected from the MAC CE activated TCI states/beams) indicated in the DCI for beam indication.

In yet another example, the UE could be implicitly indicated by the network the association/mapping between the N'>1 DCI indicated TCI states/beams (selected from the MAC CE activated TCI states/beams) and the N'>1 DCIs indicating the TD-RA fields (each indicating one or more transmission occasions). For example, a TCI state/beam indicated in the DCI for beam indication could be associated with/mapped to a DCI indicating at least one TD-RA field comprising of one or more transmission occasions if the TCI state/beam indicated in the DCI for beam indication and the DCI indicating at least one TD-RA field comprising of one or more transmission occasions are associated with the same TRP-specific ID value such as PCI value and/or the same CORESETPoolIndex value. Other implicit indication methods of the association/mapping between the N'>1 DCI indicated TCI states/beams—selected from the MAC CE activated TCI states/beams—and the N'>1 DCIs indicating the TD-RA fields (each indicating one or more transmission occasions) are also possible.

In yet another example, a TCI state/beam (selected from the MAC CE activated TCI states/beams) indicated in the DCI for beam indication could be associated with/mapped to a DCI indicating at least one TD-RA field if the TCI state/beam (selected from the MAC CE activated TCI states/beams) indicated in the DCI for beam indication and the DCI indicting at least one TD-RA field include/comprise/incorporate the same ID/index value. For example, this ID/index value could be a (absolute) TRP-specific ID/index value such as PCI value, TRP ID value, TRP index value and etc., based on a list/set/pool of TRP-specific ID/index values, e.g., higher layer configured to the UE and/or higher layer configured to the UE and activated by one or more MAC CE activation commands/bitmaps.

For another example, this ID/index value could be an (relative) index within the list/set/pool of TRP-specific ID/index values, e.g., higher layer configured to the UE and/or higher layer configured to the UE and activated by one or more MAC CE activation commands/bitmaps. For yet another example, this ID/index value could be a CORESETPoolIndex value.

For N'>1 DCIs for beam indication with each DCI indicating a single TCI state/beam, for a single DCI indicating a single TD-RA field comprising of one or more transmission occasions, wherein the time domain resources/transmission occasions indicated in the TD-RA field are associated with different TRPs in the multi-TRP system, in one example, the UE could be explicitly indicated by the network the association/mapping between the DCIs for beam indication (and therefore, the TCI states/beams indicated therein—selected from the MAC CE activated TCI states/beams) and the time domain resources/transmission occasions indicated in the TD-RA field.

For instance, the UE could be indicated by the network the association/mapping between a DCI for beam indication (and therefore, the TCI state/beam indicated therein—selected from the MAC CE activated TCI states/beams) and one or more transmission occasions in the TD-RA field. For example (option-3.4.3), the DCI for beam indication associated with the lowest CORESETPoolIndex value (indicated in the corresponding higher layer parameter ControlResourceSet) and/or the DCI for beam indication indicating the lowest TCI state ID value could correspond to the 1-st to n_0-th (n_0≥1) transmission occasions in the TD-RA field, the DCI for beam indication associated with the second lowest CORESETPoolIndex value (indicated in the corresponding higher layer parameter ControlResourceSet) and/or the DCI for beam indication indicating the second lowest TCI state ID value could correspond to the (n_0+1)-th to n_1-th (n_1≥n_0) transmission occasions in the TD-RA field, and so on, and the DCI for beam indication associated with the highest CORESETPoolIndex value (indicated in the corresponding higher layer parameter ControlResourceSet) and/or the DCI for beam indication indicating the highest TCI state ID value could correspond to the n_p-th to n_q-th (n_q≥n_p) transmission occasions in the TD-RA field; for a total of two DCIs for beam indication (each indicating the TCI states/beams selected from the MAC CE activated TCI states/beams), the first N_0 (N_0≥1) or the first half of the transmission occasions could correspond to the DCI for beam indication associated with the lowest (or the highest) CORESETPoolIndex value and/or the DCI for beam indication indicating the lowest (or the highest) TCI state ID value, and the rest of or the second half of the transmission occasions could correspond to the DCI for beam indication associated with the highest (or the lowest) CORESETPoolIndex value and/or the DCI for beam indication indicating the highest (or the lowest) TCI state ID value.

For another example (option-3.4.4), the DCI for beam indication associated with the (mod(i−1, N_dci)+1)-th lowest/highest CORESETPoolIndex value and/or the DCI for beam indication indicating the TCI state with the (mod(i−1, N_dci)+1)-th lowest/highest TCI state ID value could correspond to the i-th transmission occasion indicated in the TD-RA field, where N_dci represents the total number of DCIs for beam indication, i=1, . . . , K, where K represents the total number of transmission occasions indicated in the TD-RA field, and mod(x, y) calculates the remainder of the Euclidean division of x by y; for a total of two DCIs for beam indication (each indicating the TCI states/beams selected from the MAC CE activated TCI states/beams), the odd-numbered transmission occasions could correspond to the DCI for beam indication associated with the lowest (or the highest) CORESETPoolIndex value and/or the DCI for beam indication indicating the lowest (or the highest) TCI state ID value, and the even-numbered transmission occasions could correspond to the DCI for beam indication associated with the highest (or the lowest) CORESET-PoolIndex value and/or the DCI for beam indication indicating the highest (or the lowest) TCI state ID value.

The total number of transmission occasions K indicated in the TD-RA field could be configured by the network (e.g., via higher layer RRC signaling and/or MAC CE command and/or dynamic DCI signaling) and/or fixed in the system specifications and/or reported by the UE based on UE's capability and/or equal to the total number of DCIs for beam indication (indicating the TCI states/beams selected from the MAC CE activated TCI states/beams). For a DCI for beam indication (and therefore, the TCI state/beam—selected from the MAC CE activated TCI states/beams—indicated therein), the UE could be indicated by the network the starting/ending symbol/slot/mini-slot and/or the number of consecutive symbols/slots/mini-slots of the transmission occasion(s) associated with the DCI for beam indication (and therefore, the TCI state/beam—selected from the MAC CE activated TCI states/beams—indicated therein).

The UE could be indicated by the network, e.g., via higher layer RRC signaling and/or MAC CE command and/or dynamic DCI signaling, which option(s) (from/out of option-3.4.3 and option-3.4.4) to use/being used for indicating the mapping/association between the transmission occasion(s) in the TD-RA field and the DCIs for beam indication (and therefore, the TCI states/beams—selected from the MAC CE activated TCI states/beams—indicated therein); for instance, a one-bit flag indicator could be incorporated/included in the DCI to differentiate between option-3.4.3 and option-3.4.4. The UE could be indicated by the network one or more conditions, e.g., whether the total number of DCIs for beam indication (indicating the TCI states/beams selected from the MAC CE activated TCI states/beams) is larger than a threshold, to switch between option-3.4.3 and option-3.4.4.

Specifically, a transmission occasion could be defined/determined as follows.

For example, the 1-st transmission occasion indicated in the TD-RA field (e.g., corresponding to the DCI for beam indication associated with the lowest CORESETPoolIndex value—indicated in the corresponding higher layer parameter ControlResourceSet—and/or the DCI for beam indication indicating the lowest TCI state ID value) could be calculated/determined based on a first K0 value, a first S value and a first L value, the 2-nd transmission occasion indicated in the TD-RA field (e.g., corresponding to the DCI for beam indication associated with the second lowest CORESETPoolIndex value—indicated in the corresponding higher layer parameter ControlResourceSet—and/or the DCI for beam indication indicating the second lowest TCI state ID value) could be calculated/determined based on a second K0 value, a second S value, and a second L value, and so on, and the N'-th transmission occasion indicated in the TD-RA field (e.g., corresponding to the DCI for beam indication associated with the highest CORESETPoolIndex value—indicated in the corresponding higher layer parameter ControlResourceSet—and/or the DCI for beam indication indicating the highest TCI state ID value) could be calculated/determined based on a N'-th K0 value, a N'-th S value, and a N'-th L value.

The first K0 value, the second K0 value, and so on, and the N'-th K0 value could be different; the first S value, the second S value, and so on, and the N'-th S value could be different; the first L value, the second L value, and so on, and the N'-th L value could be different. The first K0 value, the second K0 value, and so on, and the N'-th K0 value are indicated/included in the TD-RA field; the first S value, the second S value, and so on, and the N'-th S value are indicated/included in the TD-RA field; the first L value, the second L value, and so on, and the N'-th L value are indicated/included in the TD-RA field.

For another example, the 1-st transmission occasion indicated in the TD-RA field (e.g., corresponding to the DCI for beam indication associated with the lowest CORESET-PoolIndex value—indicated in the corresponding higher layer parameter ControlResourceSet—and/or the DCI for beam indication indicating the lowest TCI state ID value) could be calculated/determined based on a first K0 value, a first S value and a first L value, the 2-nd transmission occasion indicated in the TD-RA field (e.g., corresponding to the DCI for beam indication associated with the second lowest CORESETPoolIndex value—indicated in the corresponding higher layer parameter ControlResourceSet—and/or the DCI for beam indication indicating the second lowest TCI state ID value) could be calculated/determined based on a second K0 value, a second S value having the same value as the first S value, and a second L value having the same value as the first L value, and so on, and the N'-th transmission occasion indicated in the TD-RA field (e.g., corresponding to the DCI for beam indication associated with the highest CORESETPoolIndex value—indicated in the corresponding higher layer parameter ControlResourceSet—and/or the DCI for beam indication indicating the highest TCI state ID value) could be calculated/determined based on a N'-th K0 value, a N'-th S value having the same value as the first S value, and a N'-th L value having the same value as the first L value.

The first K0 value, the second K0 value, and so on, and the N'-th K0 value could be different. The first K0 value, the second K0 value, and so on, and the N'-th K0 value are indicated/included in the TD-RA field; the first S value and the first L value are indicated/included in the TD-RA field.

Yet for another example, the 1-st transmission occasion indicated in the TD-RA field (e.g., corresponding to the DCI for beam indication associated with the lowest CORESET-PoolIndex value—indicated in the corresponding higher layer parameter ControlResourceSet—and/or the DCI for beam indication indicating the lowest TCI state ID value) could be calculated/determined based on a first K0 value, a first S value and a first L value, the 2-nd transmission occasion indicated in the TD-RA field (e.g., corresponding to the DCI for beam indication associated with the second lowest CORESETPoolIndex value—indicated in the corresponding higher layer parameter ControlResourceSet—and/or the DCI for beam indication indicating the second lowest TCI state ID value) could be calculated/determined based on a second K0 value having a difference/gap with respect to the first K0 value, a second S value, and a second L value, and so on, and the N'-th transmission occasion indicated in the TD-RA field (e.g., corresponding to the DCI for beam indication associated with the highest CORESETPoolIndex value—indicated in the corresponding higher layer parameter ControlResourceSet—and/or the DCI for beam indication indicating the highest TCI state ID value) could be calculated/determined based on a N'-th K0 value having a difference/gap with respect to the (N'-1)-th K0 value, a N'-th S value, and a N'-th L value. The difference/gap could be configured by the network and set to 1 slot.

The first S value, the second S value, and so on, and the N'-th S value could be different; the first L value, the second L value, and so on, and the N'-th L value could be different. The first K0 value is indicated/included in the TD-RA field; the first S value, the second S value, and so on, and the N'-th S value are indicated/included in the TD-RA field; the first L value, the second L value, and so on, and the N'-th L value are indicated/included in the TD-RA field.

Yet for another example, the 1-st transmission occasion indicated in the TD-RA field (e.g., corresponding to the DCI for beam indication associated with the lowest CORESET-PoolIndex value—indicated in the corresponding higher layer parameter ControlResourceSet—and/or the DCI for beam indication indicating the lowest TCI state ID value) could be calculated/determined based on a first K0 value, a first S value and a first L value, the 2-nd transmission occasion indicated in the TD-RA field (e.g., corresponding to the DCI for beam indication associated with the second lowest CORESETPoolIndex value—indicated in the corresponding higher layer parameter ControlResourceSet—and/or the DCI for beam indication indicating the second lowest TCI state ID value) could be calculated/determined based on a second K0 value having a difference/gap with respect to the first K0 value, a second S value having the same value as the first S value, and a second L value having the same value as the first L value, and so on, and the N'-th transmission occasion indicated in the TD-RA field (e.g., corresponding to the DCI for beam indication associated with the highest CORESETPoolIndex value—indicated in the corresponding higher layer parameter ControlResourceSet—and/or the DCI for beam indication indicating the highest TCI state ID value) could be calculated/determined based on a N'-th K0 value having a difference/gap with respect to the (N'-1)-th K0 value, a N'-th S value having the same value as the first S value, and a N'-th L value having the same value as the first L value. The difference/gap could be configured by the network and set to 1 slot. The first K0 value, the first S value and the first L value are indicated/included in the TD-RA field.

Other exact association/mapping relationships between the time domain resources/transmission occasions indicated in the TD-RA field and the DCIs for beam indication (and therefore, the TCI states/beams indicated therein—selected from the MAC CE activated TCI states/beams) and/or the corresponding indication method(s), e.g., via higher layer RRC signaling and/or MAC CE command and/or dynamic DCI signaling, are also possible.

In another example, the UE could be implicitly indicated by the network the association/mapping between the DCIs for beam indication (and therefore, the TCI states/beams indicated therein—selected from the MAC CE activated TCI states/beams) and the time domain resources/transmission occasions indicated in the TD-RA field. For instance, a DCI for beam indication (and therefore, the TCI state/beam indicated therein—selected from the MAC CE activated TCI states/beams) could be associated with/mapped to one or more transmission occasions indicated in the TD-RA field if the DCI for beam indication (and therefore, the TCI state/beam indicated therein—selected from the MAC CE activated TCI states/beams) and the corresponding transmission occasion(s) indicated in the TD-RA field are associated with the same TRP-specific ID value such as PCI value and/or the same CORESETPoolIndex value. Other implicit indication methods of the association/mapping between the DCIs for beam indication and the time domain resources/transmission occasions indicated in the TD-RA field are also possible.

For N'>1 DCIs for beam indication with each DCI indicating a single TCI state/beam, for a single DCI indicating N'>1 TD-RA fields (each indicating one or more transmission occasions), wherein each TD-RA field indicating one or more transmission occasions is associated with a different TRP in the multi-TRP system, in one example, the UE could be explicitly indicated by the network, e.g., via higher layer RRC signaling and/or MAC CE command and/or dynamic DCI signaling, the exact association/mapping between the N'>1 DCIs for beam indication (and therefore, the TCI states/beams indicated therein—selected from the MAC CE activated TCI states/beams) and the N'>1 TD-RA fields (each indicating one or more transmission occasions) indicated in the DCI.

For example, the DCI for beam indication associated with the lowest CORESETPoolIndex value (indicated in the corresponding higher layer parameter ControlResourceSet) and/or the DCI for beam indication indicating the lowest TCI state ID value could correspond to the first TD-RA field (indicating one or more transmission occasions) indicated in the DCI, the DCI for beam indication associated with the second lowest CORESETPoolIndex value (indicated in the corresponding higher layer parameter ControlResourceSet) and/or the DCI for beam indication indicating the second lowest TCI state ID value could correspond to the second TD-RA field (indicating one or more transmission occasions) indicated in the DCI, and so on, and the DCI for beam indication associated with the highest CORESETPoolIndex value (indicated in the corresponding higher layer parameter ControlResourceSet) and/or the DCI for beam indication indicating the highest TCI state ID value could correspond to the last TD-RA field (indicating one or more transmission occasions) indicated in the DCI. Other exact association/mapping relationships between the DCIs for beam indication and the TD-RA fields (each indicating one or more transmission occasions) indicated in the DCI and/or the corresponding indication method(s), e.g., via higher layer RRC signaling and/or MAC CE command and/or dynamic DCI signaling, are also possible.

In another example, a DCI for beam indication (and therefore, the TCI states/beams indicated therein—selected from the MAC CE activated TCI states/beams) could include/comprise/incorporate at least one (absolute) TD-RA field ID/index value indicated in the DCI and/or at least one (relative) TD-RA field index within the N'>1 TD-RA fields indicated in the DCI.

In yet another example, a TD-RA field indicated in the DCI could include/comprise/incorporate at least one (absolute) entity ID/index value such as CORESETPoolIndex value of/associated with at least one DCI for beam indication (and therefore, the TCI states/beams indicated therein—selected from the MAC CE activated TCI states/beams) and/or at least one (relative) index of at least one DCI for beam indication (and therefore, the TCI states/beams indicated therein—selected from the MAC CE activated TCI states/beams) within the N'>1 DCIs for beam indication.

In yet another example, the UE could be implicitly indicated by the network the association/mapping between the N'>1 DCIs for beam indication (and therefore, the TCI states/beams indicated therein—selected from the MAC CE activated TCI states/beams) and the N'>1 TD-RA fields (each indicating one or more transmission occasions) indicated in the DCI. For example, a DCI for beam indication (and therefore, the TCI state/beam indicated therein—selected from the MAC CE activated TCI states/beams) could be associated with/mapped to a TD-RA field (indicating one or more transmission occasions) indicated in the DCI if the DCI for beam indication and the TD-RA field (indicating one or more transmission occasions) indicated in the DCI are associated with the same TRP-specific ID value such as PCI value and/or the same CORESETPoolIndex value. Other implicit indication methods of the association/mapping between the N'>1 DCIs for beam indication (and therefore, the TCI states/beams indicated therein—selected from the MAC CE activated TCI states/beams) and the N'>1 TD-RA fields (each indicating one or more transmission occasions) indicated in the DCI are also possible.

In yet another example, a DCI for beam indication (and therefore, the TCI states/beams indicated therein—selected from the MAC CE activated TCI states/beams) could be associated with/mapped to a TD-RA field indicated in the DCI if the DCI for beam indication and the TD-RA field indicated in the DCI include/comprise/incorporate the same ID/index value. For example, this ID/index value could be a (absolute) TRP-specific ID/index value such as PCI value, TRP ID value, TRP index value and etc., based on a list/set/pool of TRP-specific ID/index values, e.g., higher layer configured to the UE and/or higher layer configured to the UE and activated by one or more MAC CE activation commands/bitmaps. For another example, this ID/index value could be an (relative) index within the list/set/pool of TRP-specific ID/index values, e.g., higher layer configured to the UE and/or higher layer configured to the UE and activated by one or more MAC CE activation commands/bitmaps. For yet another example, this ID/index value could be a CORESETPoolIndex value.

For N'>1 DCIs for beam indication with each DCI indicating a single TCI state/beam, for N'>1 DCIs each indicating at least one TD-RA field comprising of one or more transmission occasions, wherein each DCI indicating at least one TD-RA field comprising of one or more transmission occasions is associated with a different TRP in the multi-TRP system, in one example, the UE could be explicitly indicated by the network, e.g., via higher layer RRC signaling and/or MAC CE command and/or dynamic DCI signaling, the exact association/mapping between the N'>1 DCIs for beam indication (and therefore, the TCI states/beams indicated therein—selected from the MAC CE activated TCI states/beams) and the N'>1 DCIs indicating the TD-RA fields (each indicating one or more transmission occasions).

For example, the DCI for beam indication associated with the lowest CORESETPoolIndex value (indicated in the corresponding higher layer parameter ControlResourceSet) and/or the DCI for beam indication indicating the lowest TCI state ID value could correspond to the DCI (indicating at least one TD-RA field comprising of one or more transmission occasions) associated with the lowest CORESET- PoolIndex value (indicated in the corresponding higher layer parameter ControlResourceSet), the DCI for beam indication associated with the second lowest CORESETPoolIndex value (indicated in the corresponding higher layer parameter ControlResourceSet) and/or the DCI for beam indication indicating the second lowest TCI state ID value could correspond to the DCI (indicating at least one TD-RA field comprising of one or more transmission occasions) associated with the second lowest CORESETPoolIndex value (indicated in the corresponding higher layer parameter ControlResourceSet), and so on, and the DCI for beam indication associated with the highest CORESETPoolIndex value (indicated in the corresponding higher layer parameter ControlResourceSet) and/or the DCI for beam indication indicating the highest TCI state ID value could correspond to the DCI (indicating at least one TD-RA field comprising of one or more transmission occasions) associated with the highest CORESETPoolIndex value (indicated in the corresponding higher layer parameter ControlResourceSet).

Other exact association/mapping relationships between the DCIs for beam indication (and therefore, the TCI states/beams indicated therein—selected from the MAC CE activated TCI states/beams) and the DCIs indicating the TD-RA fields (each indicating one or more transmission occasions) and/or the corresponding indication method(s), e.g., via higher layer RRC signaling and/or MAC CE command and/or dynamic DCI signaling, are also possible.

In another example, a DCI for beam indication (and therefore, the TCI states/beams indicated therein—selected from the MAC CE activated TCI states/beams) could include/comprise/incorporate at least one (absolute) TD-RA field ID/index value indicated in at least one DCI and/or at least one (relative) TD-RA field index within all the TD-RA fields indicated in the N>1 DCIs.

In yet another example, a DCI indicating at least one TD-RA field and/or a TD-RA field indicated in a DCI could include/comprise/incorporate at least one (absolute) entity ID/index value such as CORESETPoolIndex value of/associated with at least one DCI for beam indication (and therefore, the TCI states/beams indicated therein—selected from the MAC CE activated TCI states/beams) and/or at least one (relative) index of at least one DCI for beam indication (and therefore, the TCI states/beams indicated therein—selected from the MAC CE activated TCI states/beams) within the N'>1 DCIs for beam indication.

In yet another example, the UE could be implicitly indicated by the network the association/mapping between the N'>1 DCIs for beam indication (and therefore, the TCI states/beams indicated therein—selected from the MAC CE activated TCI states/beams) and the N'>1 DCIs indicating the TD-RA fields (each indicating one or more transmission occasions). For example, a DCI for beam indication (and therefore, the TCI state/beam indicated therein—selected from the MAC CE activated TCI states/beams) could be associated with/mapped to a DCI indicating at least one TD-RA field comprising of one or more transmission occasions if the DCI for beam indication and the DCI indicating at least one TD-RA field comprising of one or more transmission occasions are associated with the same TRP-specific ID value such as PCI value and/or the same CORESETPoolIndex value. Other implicit indication methods of the association/mapping between the N'>1 DCIs for beam indication and the N'>1 DCIs indicating the TD-RA fields (each indicating one or more transmission occasions) are also possible.

In yet another example, a DCI for beam indication (and therefore, the TCI states/beams indicated therein—selected from the MAC CE activated TCI states/beams) could be associated with/mapped to a DCI indicating at least one TD-RA field if the DCI for beam indication and the DCI indicating at least one TD-RA field include/comprise/incorporate the same ID/index value. For example, this ID/index value could be a (absolute) TRP-specific ID/index value such as PCI value, TRP ID value, TRP index value and etc., based on a list/set/pool of TRP-specific ID/index values, e.g., higher layer configured to the UE and/or higher layer configured to the UE and activated by one or more MAC CE activation commands/bitmaps. For another example, this ID/index value could be an (relative) index within the list/set/pool of TRP-specific ID/index values, e.g., higher layer configured to the UE and/or higher layer configured to the UE and activated by one or more MAC CE activation commands/bitmaps. For yet another example, this ID/index value could be a CORESETPoolIndex value.

The UE could be explicitly indicated by the network which strategy(s) out of/from Strategy-1 (SDM based PDSCH(s) repetition in a multi-TRP system), Strategy-2 (FDM based PDSCH(s) repetition in a multi-TRP system) and Strategy-3 (TDM based PDSCH(s) repetition in a multi-TRP system) to follow for the PDSCH(s) repetition in the multi-TRP system. For a given PDSCH(s) repetition strategy (Strategy-1, Strategy-2 or Strategy-3 in this disclosure), the UE could also be explicitly indicated by the network which design option(s) (e.g., option-2.2.1, option-2.2.2, option-2.2.3 and option-2.2.4 for Strategy-2 FDM based PDSCH(s) repetition) to follow for the TCI state/beam indication/mapping for the PDSCH(s) repetition in the multi-TRP system.

In one example, the UE could be indicated by the network, e.g., via higher layer RRC signaling and/or MAC CE command and/or dynamic DCI signaling, the exact strategy(s) (out of/from Strategy-1, Strategy-2 and/or Strategy-3 in this disclosure) to follow for the PDSCH(s) repetition in the multi-TRP system. For instance, one or more first multi-bit indicators could be included/incorporated in the DCI with each state of a first multi-bit indicator corresponding to a PDSCH(s) repetition strategy.

For a PDSCH(s) repetition strategy (SDM based PDSCH(s) repetition Strategy-1, FDM based PDSCH(s) repetition Strategy-2 or TDM based PDSCH(s) repetition Strategy-3 discussed in this disclosure), the UE could also be indicated by the network, e.g., via higher layer RRC signaling and/or MAC CE command and/or dynamic DCI signaling, the exact design options (e.g., out of/from option-2.2.1, option-2.2.2, option-2.2.3 and option-2.2.4 for Strategy-2 FDM based PDSCH(s) repetition) to follow for the TCI state indication/mapping for the PDSCH(s) repetition in the multi-TRP system. For instance, one or more second multi-bit indicators could be included/incorporated in the DCI with each state of a second multi-bit indicator corresponding to a TCI state/beam indication/mapping option for the corresponding PDSCH(s) repetition strategy.

In another example, the UE could be first higher layer RRC configured by the network a list of PDSCH(s) repetition strategies, e.g., the SDM based PDSCH(s) repetition Strategy-1, the FDM based PDSCH(s) repetition Strategy-2 and the TDM based PDSCH(s) repetition Strategy-3 discussed in this disclosure. The UE could then receive from the network one or more MAC CE activation commands/bitmaps to activate one or more PDSCH(s) repetition strategies from the higher layer configured list of PDSCH(s) repetition strategies.

In addition, for a PDSCH(s) repetition strategy, the UE could be first higher layer RRC configured by the network a list of TCI state/beam indication/mapping options for the PDSCH(s) repetition in the multi-TRP system (e.g., option-2.2.1, option-2.2.2, option-2.2.3 and option-2.2.4 for Strategy-2 FDM based PDSCH(s) repetition). The UE could then receive from the network one or more MAC CE activation commands/bitmaps to activate one or more TCI state/beam indication/mapping options from the higher layer configured list of TCI state/beam indication/mapping options for the corresponding PDSCH(s) repetition strategy.

Alternatively, the UE could be implicitly indicated by the network which strategy(s) out of/from Strategy-1 (SDM based PDSCH(s) repetition in a multi-TRP system), Strategy-2 (FDM based PDSCH(s) repetition in a multi-TRP system) and Strategy-3 (TDM based PDSCH(s) repetition in a multi-TRP system) to follow for the PDSCH(s) repetition in the multi-TRP system.

In one example, the UE may follow the SDM based PDSCH(s) repetition Strategy-1 if, (1) the UE receives from the network a single MAC CE command/DCI for beam indication indicting $N>1$ TCI states/beams or $N>1$ MAC CE commands/DCIs for beam indication each indicating at least one TCI state/beam, and (2) the UE is indicated by the network to receive the same PDSCH(s) on the same time-frequency domain resource(s).

In another example, the UE may follow the FDM based PDSCH(s) repetition Strategy-2 if, (1) the UE receives from the network a single MAC CE command/DCI for beam indication indicting $N>1$ TCI states/beams or $N>1$ MAC CE commands/DCIs for beam indication each indicating at least one TCI state/beam, and (2) the UE is indicated by the network to receive the same PDSCH(s) on different/non-overlapping frequency domain resources—e.g., (i) multiple (non-zero) bits/entries are indicated/configured in the bitmap in a single FD-RA field in the DCI or multiple RIVs are indicated/configured in a single FD-RA field in the DCI, (ii) $N>1$ FD-RA fields are indicated/configured in the DCI, and/or (iii) $N>1$ DCIs are indicated with each DCI indicating at least one FD-RA field.

In yet another example, the UE may follow the TDM based PDSCH(s) repetition Strategy-3 if, (1) the UE receives from the network a single MAC CE command/DCI for beam indication indicting $N>1$ TCI states/beams or $N>1$ MAC CE commands/DCIs for beam indication each indicating at least one TCI state/beam, and (2) the UE is indicated by the network to receive the same PDSCH(s) on different/non-overlapping time domain resources/transmission occasions—e.g., (i) $N>1$ transmission occasions are indicated/configured in a single TD-RA field in the DCI, (ii) $N>1$ TD-RA fields are indicated/configured in the DCI each indicating one or more transmission occasions, and/or (iii) $N>1$ DCIs are indicated with each DCI indicating at least one TD-RA field comprising of one or more transmission occasions.

In yet another example, the UE may follow both the SDM based PDSCH(s) repetition Strategy-1 and the FDM based PDSCH(s) repetition Strategy-2 if, (1) the UE receives from the network a single MAC CE command/DCI for beam indication indicting $N>1$ TCI states/beams or $N>1$ MAC CE commands/DCIs for beam indication each indicating at least one TCI state/beam, (2) the UE is indicated by the network to receive the same PDSCH(s) on partial overlapping frequency domain resources. On the overlapping frequency domain resource(s), the SDM based PDSCH(s) Strategy-1 is used. On the non-overlapping frequency domain resource(s)—e.g., (i) multiple bits/entries are indicted/configured in the bitmap in a single FD-RA field in the DCI or multiple RIVs are indicated/configured in a single FD-RA field in the DCI, (ii) N>1 FD-RA fields are indicated/configured in the DCI, and/or (iii) N>1 DCIs are indicated with each DCI indicating at least one FD-RA field—the FDM based PDSCH(s) repetition Strategy-2 is used.

In yet another example, the UE may follow both the SDM based PDSCH(s) repetition Strategy-1 and the TDM based PDSCH(s) repetition Strategy-3 if, (1) the UE receives from the network a single MAC CE command/DCI for beam indication indicting N>1 TCI states/beams or N>1 MAC CE commands/DCIs for beam indication each indicating at least one TCI state/beam, (2) the UE is indicated by the network to receive the same PDSCH(s) on partial overlapping time domain resources. On the overlapping time domain resource(s), the SDM based PDSCH(s) Strategy-1 is used. On the non-overlapping time domain resource(s)—e.g., (i) N>1 transmission occasions are configured/indicated in a single TD-RA field in the DCI, (ii) N>1 TD-RA fields are configured/indicated in the DCI each indicating one or more transmission occasions, and/or (iii) N>1 DCIs are indicated with each DCI indicating at least one TD-RA field comprising of one or more transmission occasions—the TDM based PDSCH(s) repetition Strategy-3 is used.

In yet another example, the UE may follow both the FDM based PDSCH(s) repetition Strategy-2 and the TDM based PDSCH(s) repetition Strategy-3 if, (1) the UE receives from the network a single MAC CE command/DCI for beam indication indicting N>1 TCI states/beams or N>1 MAC CE commands/DCIs for beam indication each indicating at least one TCI state/beam, (2) the UE is indicated by the network to receive the same PDSCH(s) on non-overlapping time and frequency domain resources.

On the non-overlapping frequency domain resource(s)—e.g., (i) multiple bits/entries are indicted/configured in the bitmap in a single FD-RA field in the DCI or multiple RIVs are indicated/configured in a single FD-RA field in the DCI, (ii) N>1 FD-RA fields are indicated/configured in the DCI, and/or (iii) N>1 DCIs are indicated with each DCI indicating at least one FD-RA field—the FDM based PDSCH(s) repetition Strategy-2 is used. On the non-overlapping time domain resource(s)—e.g., (i) N>1 transmission occasions are indicated/configured in a single TD-RA field in the DCI, (ii) N>1 TD-RA fields are indicated/configured in the DCI each indicating one or more transmission occasions, and/or (iii) N>1 DCIs are indicated with each DCI indicating at least one TD-RA field comprising of one or more transmission occasions—the TDM based PDSCH(s) repetition Strategy-3 is used.

In yet another example, the UE may follow the SDM based PDSCH(s) repetition Strategy-1, the FDM based PDSCH(s) repetition Strategy-2 and the TDM based PDSCH(s) repetition Strategy-3 if, (1) the UE receives from the network a single MAC CE command/DCI for beam indication indicting N>1 TCI states/beams or N>1 MAC CE commands/DCIs for beam indication each indicating at least one TCI state/beam, (2) the UE is indicated by the network to receive the same PDSCH(s) on partial overlapping time-frequency domain resources. On the overlapping time-frequency domain resource(s), the SDM based PDSCH(s) Strategy-1 is used.

On the non-overlapping frequency domain resource(s)—e.g., (i) multiple bits/entries are indicted/configured in the bitmap in a single FD-RA field in the DCI or multiple RIVs are indicated/configured in a single FD-RA field in the DCI, (ii) N>1 FD-RA fields are indicated/configured in the DCI, and/or (iii) N>1 DCIs are indicated with each DCI indicating at least one FD-RA field—the FDM based PDSCH(s) repetition Strategy-2 is used. On the non-overlapping time domain resource(s)—e.g., (i) N>1 transmission occasions are indicated/configured in a single TD-RA field in the DCI, (ii) N>1 TD-RA fields are indicated/configured in the DCI each indicating one or more transmission occasions, and/or (iii) N>1 DCIs are indicated with each DCI indicating at least one TD-RA field comprising of one or more transmission occasions—the TDM based PDSCH(s) repetition Strategy-3 is used.

FIG. 15 illustrates an example of a flowchart of a method 1500 for TCI state indication according to embodiments of the present disclosure. The steps of the method 1500 of FIG. 15 can be performed by any of the UEs 111-116 of FIG. 1, such as the UE 116 of FIG. 3. The method 1500 is for illustration only and other embodiments can be used without departing from the scope of the present disclosure.

The method begins with the UE receiving DCI including at least one TCI codepoint indicating first and second TCI states (step 1510). The UE determines, based on the first or second TCI states, a QCL assumption for receiving a PDCCH (step 1520). The UE receives the PDCCH that schedules first or second transmission occasions of a first or second PDSCHs, respectively (step 1530). The UE receives information on PDSCH repetition schemes (step 1540). For example, in step 1540, the information may be used to determine the QCL assumptions for receiving the PDSCHs as discussed herein.

The UE then determines, based on the first or second TCI states, a first QCL assumption for receiving the first PDSCH (step 1550) and determines, based on the first or second TCI states, a second QCL assumption for receiving the second PDSCH (step 1560). For example, in steps 1550 and 1560, the UE may determine, based on an indication, that: the first QCL assumption follows the QCL assumption for receiving the PDCCH and the second QCL assumption is different from the QCL assumption for receiving the PDCCH, or the second QCL assumption follows the third QCL assumption and the first QCL assumption is different from the QCL assumption for receiving the PDCCH.

In one or more embodiments, in steps 1550 and 1560, the UE may determine, when the information indicates or provides a higher layer parameter repetitionScheme set to 'fdmSchemeA' or 'fdmSchemeB' and a precoding granularity of $P_{BWP}$ resource blocks in frequency domain is set to 'wideband,' determining, based on the indication: the first QCL assumption according to the first TCI state, which is mapped to first $\lfloor n_{PRB}/2 \rfloor$ physical resource blocks (PRBs) for the first PDSCH transmission occasion, and the second QCL assumption according to the second TCI state, which is mapped to remaining $\lfloor n_{PRB}/2 \rfloor$ PRBs for the second PDSCH transmission occasion, wherein $n_{PRB}$ is a total number of allocated PRBs; or the first QCL assumption according to the second TCI state, which is mapped to the first $\lfloor n_{PRB}/2 \rfloor$ PRBs for the first PDSCH transmission occasion, and the second QCL assumption according to the first TCI state, which is mapped to the remaining $\lfloor n_{PRB}/2 \rfloor$ PRBs for the second PDSCH transmission occasion, wherein $n_{PRB}$ is the total number of allocated PRBs.

In one or more embodiments, in steps 1550 and 1560, the UE may determine, when the information indicates or provides a higher layer parameter repetitionScheme set to 'fdmSchemeA' or 'fdmSchemeB' and a precoding granularity of $P_{BWP}$ resource blocks in frequency domain is set to one of two values between {2, 4}, based on the indication: the first QCL assumption according to the first TCI state, which is mapped to even indexed precoding resource block groups (PRGs) for the first PDSCH transmission occasion, and the second QCL assumption according to the second TCI state, which is mapped to odd indexed PRGs for the second PDSCH transmission occasion; or the first QCL assumption according to the second TCI state, which is mapped to the even indexed PRGs for the first PDSCH transmission occasion, and the second QCL assumption according to the first TCI state, which is mapped to the odd indexed PRGs for the second PDSCH transmission occasion, and wherein the PRGs are numbered continuously in an increasing order starting with a PRG index of 0.

In one or more embodiments, in steps 1550 and 1560, the UE may determine, when the information indicates or provides a higher layer parameter repetitionScheme set to 'tdmSchemeA' or a higher layer parameter repetitionNumber in PDSCH-TimeDomainResourceAllocation set to 2, based on the indication: the first QCL assumption for receiving the first PDSCH according to the first TCI state and the second QCL assumption for receiving the second PDSCH according to the second TCI state; or the first QCL assumption for receiving the first PDSCH according to the second TCI state and the second QCL assumption for receiving the second PDSCH according to the first TCI state.

In one or more embodiments, in steps 1550 and 1560, the UE may receive two values 0 and 1 of a control resource set (CORESET) group index, wherein each CORESET group index is associated with one or more CORESETs; and receiving an indication, and determine: the first QCL assumption for receiving the first PDSCH according to the first TCI state, if the first PDSCH transmission occasion is scheduled by a PDCCH received in a CORESET associated with the CORESET group index value 0, and the second QCL assumption for receiving the second PDSCH according to the second TCI state if the second PDSCH transmission occasion is scheduled by a PDCCH received in a CORESET associated with the CORESET group index value 1; or the first QCL assumption for receiving the first PDSCH according to the second TCI state, if the first PDSCH transmission occasion is scheduled by a PDCCH received in a CORESET associated with the CORESET group index value 0, and the second QCL assumption for receiving the second PDSCH according to the first TCI state, if the second PDSCH transmission occasion is scheduled by a PDCCH received in a CORESET associated with the CORESET group index value 1.

In one or more embodiments, in steps 1550 and 1560, the UE may receive two values 0 and 1 of control resource set (CORESET) group index, wherein each CORESET group index is associated with one or more CORESETs; receive an indication; and determine, based on the indication: if the DCI is received in a CORESET associated with the CORESET group index value 0, the first QCL assumption for receiving the first PDSCH according to the first TCI state and the second QCL assumption for receiving the second PDSCH according to the second TCI state; and if the DCI is received in a CORESET associated with the CORESET group index value 1, the first QCL assumption for receiving the first PDSCH according to the second TCI state and the second QCL assumption for receiving the second PDSCH according to the first TCI state; or if the DCI is received in a CORESET associated with the CORESET group index value 0, the first QCL assumption for receiving the first PDSCH according to the second TCI state and the second QCL assumption for receiving the second PDSCH according to the first TCI state; and if the DCI is received in a CORESET associated with the CORESET group index value 1, the first QCL assumption for receiving the first PDSCH according to the first TCI state and the second QCL assumption for receiving the second PDSCH according to the second TCI state.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE), comprising:
a transceiver configured to:
    receive, via higher layer signaling, a configuration of a list of transmission configuration indication (TCI) states, wherein the TCI states in the list are joint TCI states for downlink and uplink;
    receive a first medium access control control element (MAC CE) associated with the list of TCI states, wherein the first MAC CE includes a first identification indicating a first control resource set (CORESET) pool index; and
    receive a second MAC CE associated with the list of TCI states, wherein the second MAC CE includes a second identification indicating a second CORESET pool index; and
a processor operably coupled to the transceiver, the processor configured to:
    identify, among the list of TCI states based on the first MAC CE, a first TCI state corresponding to the first CORESET pool index; and
    identify, among the list of TCI states based on the second MAC CE, a second TCI state corresponding to the second CORESET pool index,
wherein the transceiver is further configured to:
    perform a first physical downlink shared channel (PDSCH) reception and a first physical uplink shared channel (PUSCH) transmission based on the first TCI state; and
    perform a second PDSCH reception and a second PUSCH transmission based on the second TCI state.

2. The UE of claim 1, wherein:
the first MAC CE indicates a single TCI state among the list of TCI states and the first TCI state is the single TCI state indicated by the first MAC CE, and
the second MAC CE indicates a single TCI state among the list of TCI states and the second TCI state is the single TCI state indicated by the second MAC CE.

3. The UE of claim 1, wherein:
the first PDSCH reception and the first PUSCH transmission are associated with the first CORESET pool index, and
the second PDSCH reception and the second PUSCH transmission are associated with the second CORESET pool index.

4. The UE of claim 1, wherein:

the processor is further configured to:

identify two indicated TCI states among the list of TCI states; and determine, based on an explicit indication received via the higher layer signaling or downlink control information, association between the two indicated TCI states and a third PDSCH reception; and the transceiver is further configured to perform the third PDSCH reception based on the determined association.

5. A base station (BS), comprising:

a processor; and a transceiver operably coupled to the processor, the transceiver configured to:

transmit, via higher layer signaling, a configuration of a list of transmission configuration indication (TCI) states, wherein the TCI states in the list are joint TCI states for downlink and uplink;

transmit a first medium access control control element (MAC CE) associated with the list of TCI states, wherein the first MAC CE includes a first identification indicating a first control resource set (CORESET) pool index;

transmit a second MAC CE associated with the list of TCI states, wherein the second MAC CE includes a second identification indicating a second CORESET pool index;

perform a first physical downlink shared channel (PDSCH) transmission and a first physical uplink shared channel (PUSCH) reception based on a first TCI state among the list of TCI states, wherein the first TCI state corresponds to the first CORESET pool index; and perform a second PDSCH transmission and a second PUSCH reception based on a second TCI state among the list of TCI states, wherein the second TCI state corresponds to the second CORESET pool index.

6. The BS of claim 5, wherein:

the first MAC CE indicates a single TCI state among the list of TCI states and the first TCI state is the single TCI state indicated by the first MAC CE, and the second MAC CE indicates a single TCI state among the list of TCI states and the second TCI state is the single TCI state indicated by the second MAC CE.

7. The BS of claim 5, wherein:

the first PDSCH transmission and the first PUSCH reception are associated with the first CORESET pool index, and the second PDSCH transmission and a second PUSCH reception associated with the second CORESET pool index.

8. The BS of claim 5, wherein:

the processor is further configured to determine association between two indicated TCI states among the list of TCI states and third PDSCH transmission; and the transceiver is further configured to:

transmit, via the higher layer signaling or downlink control information, an explicit indication corresponding to the association; and perform the third PDSCH transmission based on the determined association.

9. A method for operating a user equipment (UE), the method comprising:

receiving, via higher layer signaling, a configuration of a list of transmission configuration indication (TCI) states, wherein the TCI states in the list are (i) joint TCI states for downlink and uplink or (ii) separate TCI states for downlink;

receiving a first medium access control control element (MAC CE) associated with the list of TCI states, wherein the first MAC CE includes a first identification indicating a first control resource set (CORESET) pool index;

receiving a second MAC CE associated with the list of TCI states, wherein the second MAC CE includes a second identification indicating a second CORESET pool index;

identifying, among the list of TCI states based on the first MAC CE, a first TCI state corresponding to the first CORESET pool index;

identifying, among the list of TCI states based on the second MAC CE, a second TCI state corresponding to the second CORESET pool index;

performing a first physical downlink shared channel (PDSCH) reception and a first physical uplink shared channel (PUSCH) transmission based on the first TCI state; and performing a second PDSCH reception and a second PUSCH transmission based on the second TCI state.

10. The method of claim 9, wherein:

the first MAC CE indicates a single TCI state among the list of TCI states and the first TCI state is the single TCI state indicated by the first MAC CE, and the second MAC CE indicates a single TCI state among the list of TCI states and the second TCI state is the single TCI state indicated by the second MAC CE.

11. The method of claim 9, wherein:

the first PDSCH reception and the first PUSCH transmission are associated with the first CORESET pool index, and the second PDSCH reception and the second PUSCH transmission are associated with the second CORESET pool index.

12. The method of claim 9, further comprising:

identifying two indicated TCI states among the list of TCI states;

determining, based on an explicit indication received via the higher layer signaling or downlink control information, association between the two indicated TCI states and a third PDSCH reception; and performing the third PDSCH reception based on the determined association.

* * * * *